US009376167B2

(12) United States Patent
Kawashima et al.

(10) Patent No.: US 9,376,167 B2
(45) Date of Patent: Jun. 28, 2016

(54) FRICTIONAL RESISTANCE REDUCTION DEVICE FOR SHIP

(75) Inventors: Hideki Kawashima, Tokyo (JP); Tetsugo Fukuda, Tokyo (JP); Yoshiaki Kodama, Tokyo (JP); Munehiko Hinatsu, Tokyo (JP); Toshifumi Hori, Tokyo (JP); Masahiko Makino, Tokyo (JP); Kazuyoshi Harumi, Tokyo (JP); Masashi Ohnawa, Tokyo (JP); Haruya Takeshi, Tokyo (JP); Tadanori Takimoto, Tokyo (JP)

(73) Assignee: NATIONAL MARITIME RESEARCH INSTITUTE, Tokyo (JP)

( * ) Notice: Subject to any disclaimer, the term of this patent is extended or adjusted under 35 U.S.C. 154(b) by 614 days.

(21) Appl. No.: 12/935,624

(22) PCT Filed: Mar. 31, 2009

(86) PCT No.: PCT/JP2009/001520
§ 371 (c)(1),
(2), (4) Date: Jul. 1, 2011

(87) PCT Pub. No.: WO2009/122736
PCT Pub. Date: Oct. 8, 2009

(65) Prior Publication Data
US 2011/0259440 A1   Oct. 27, 2011

(30) Foreign Application Priority Data

Apr. 1, 2008 (JP) .................. 2008-095466
Apr. 8, 2008 (JP) .................. 2008-100889
Apr. 8, 2008 (JP) .................. 2008-100894
Jul. 17, 2008 (JP) .................. 2008-186588
Mar. 27, 2009 (JP) .................. 2009-080676

(51) Int. Cl.
*B63B 1/38* (2006.01)

(52) U.S. Cl.
CPC ............. *B63B 1/38* (2013.01); *B63B 2001/385* (2013.01); *B63B 2001/387* (2013.01); *Y02T 70/122* (2013.01); *Y10T 137/3802* (2015.04)

(58) Field of Classification Search
CPC ................ B63B 1/38; B63B 2001/382; B63B 2001/385; B63B 2001/387
USPC ............................................... 114/67 R, 67 A
See application file for complete search history.

(56) References Cited

U.S. PATENT DOCUMENTS 4,380,893 A * 4/1983 Stokes et al. .................... 60/785
4,445,953 A   5/1984 Hawk
(Continued)

FOREIGN PATENT DOCUMENTS

EP   0650889 A1   5/1995
EP   0903287 A2   3/1999
(Continued)

OTHER PUBLICATIONS

International Search Report for PCT Application No. PCT/JP2009/001520, May 19, 2009.
(Continued)

*Primary Examiner* — Andrew Polay

(57) ABSTRACT

A inject gas control device that performs, for example, control reflecting variation in vessel velocity over time without adversely affecting the main engine is realized. That is, it is prevented that gas is drawn too much and thereby a gas supply or charged air rate becomes insufficient, efficiency of the main engine is decreased and exhaust gas is deteriorated, and analogous events occur because the gas supply or charged air rate is too much instead.
There are provided a main engine 4010 acquiring propelling power for a vessel 1, and a turbocharger 4011 that is driven by exhaust gas from the main engine 4010 and blows pressurized gas to the main engine 4010. A part of the pressurized gas and/or exhaust gas is drawn from between the turbocharger 4011 and the main engine 4010 (5023, 5024 and 5025). The drawn pressurized gas and/or exhaust gas are injected in the proximity 9 of the hull on or below the waterline (5040), and the drawing rate of the pressurized gas and/or the exhaust gas is controlled on the basis of a physical quantity related to a heat load on the main engine 10 and characteristics of the turbocharger (4200).

11 Claims, 54 Drawing Sheets

(56) References Cited

U.S. PATENT DOCUMENTS

| | | | |
|---|---|---|---|
| 4,872,118 A * | 10/1989 | Naidenov et al. | 701/124 |
| 4,973,275 A * | 11/1990 | Jarvi et al. | 440/66 |
| 5,074,813 A * | 12/1991 | Jarvi et al. | 440/66 |
| 5,511,504 A * | 4/1996 | Martin | 114/61.12 |
| 5,575,232 A | 11/1996 | Kato et al. | |
| 6,145,459 A * | 11/2000 | Takahashi et al. | 114/67 A |
| 6,186,085 B1 * | 2/2001 | Kato et al. | 114/67 A |
| 6,427,445 B1 * | 8/2002 | Isaac et al. | 60/602 |
| 6,789,491 B2 * | 9/2004 | Takahashi et al. | 114/67 A |
| 7,093,553 B2 * | 8/2006 | Robinson et al. | 114/288 |
| 7,162,872 B2 * | 1/2007 | Schmid et al. | 60/602 |
| 7,222,704 B2 * | 5/2007 | Pearson et al. | 188/378 |
| 2002/0014192 A1 | 2/2002 | Takahashi et al. | |
| 2006/0137345 A1 * | 6/2006 | Cho | 60/605.1 |
| 2008/0083361 A1 * | 4/2008 | Iglesias Schoo | 114/67 A |

FOREIGN PATENT DOCUMENTS

| | | |
|---|---|---|
| EP | 0926060 A2 | 6/1999 |
| GB | 2268699 A | 1/1994 |
| JP | S58-78288 U | 5/1983 |
| JP | S62-137891 U | 8/1987 |
| JP | 5116672 | 5/1993 |
| JP | 6126858 | 5/1994 |
| JP | 6191396 | 7/1994 |
| JP | 07237589 A * | 9/1995 |
| JP | 8243368 | 9/1996 |
| JP | H08-239084 A | 9/1996 |
| JP | H09-183396 A | 7/1997 |
| JP | H10-24891 A | 1/1998 |
| JP | 10100983 | 4/1998 |
| JP | H11-222180 A | 8/1999 |
| JP | 11348869 | 12/1999 |
| JP | 11348870 | 12/1999 |
| JP | 2000-219188 A | 8/2000 |
| JP | 2000296795 | 10/2000 |
| JP | 2001048082 | 2/2001 |
| JP | 2001097276 | 4/2001 |
| JP | 2002-019689 A | 1/2002 |
| JP | 2000-128062 A | 5/2002 |
| JP | 2003160091 | 6/2003 |
| JP | 2004188993 | 7/2004 |
| JP | 2005-186715 A | 7/2005 |
| JP | 2008-013128 A | 1/2008 |
| JP | 2008018128 | 1/2008 |
| JP | 2008095466 | 4/2008 |
| JP | 2008100889 | 5/2008 |
| JP | 2008100894 | 5/2008 |
| JP | 2009080676 | 4/2009 |
| WO | 87/07233 A1 | 12/1987 |
| WO | 94/26583 A1 | 11/1994 |
| WO | 9928180 | 6/1999 |
| WO | 2005122676 | 12/2005 |
| WO | 2009122736 | 10/2009 |

OTHER PUBLICATIONS

European Search Report for EP Patent Application No. EP 09 72 7111, Jun. 20, 2013.

KIPO, Korean Office Action for Korean Patent Application No. 10-2014-7008398, May 20, 2014.

* cited by examiner

SECTIONAL VIEW
ALONG LINE X-X

BUBBLES ARE DRAWN IN (COLLECTED)

Fig. 42
(a)
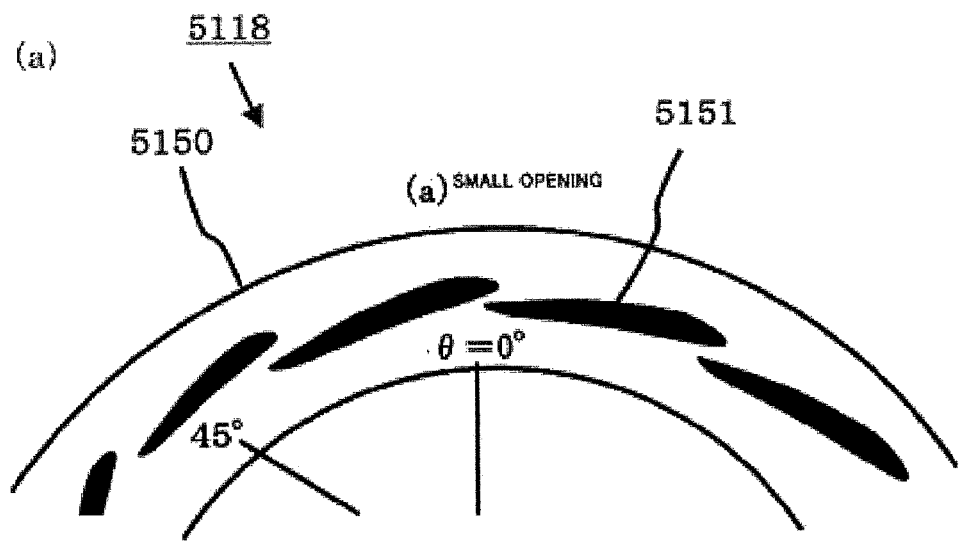
(b)
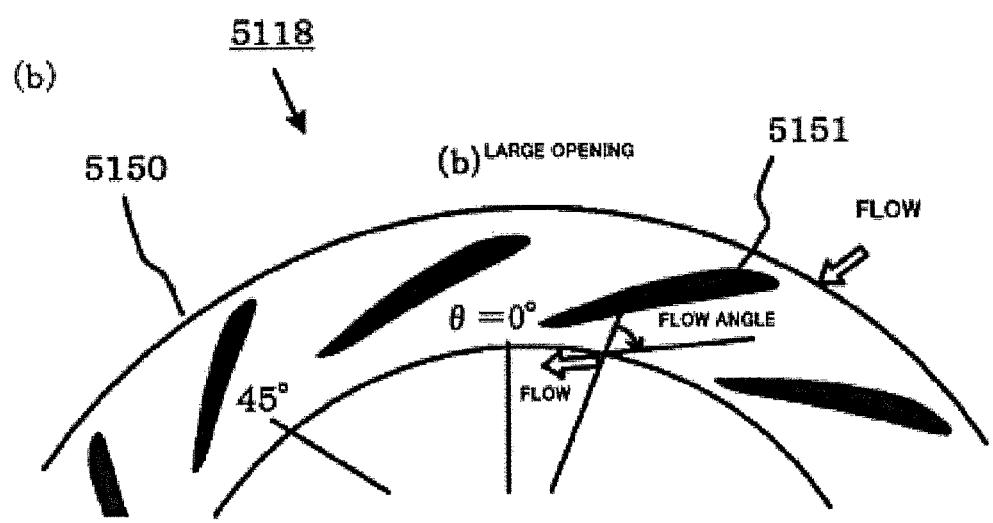

FRICTIONAL RESISTANCE REDUCTION DEVICE FOR SHIP

This application claims priority to, and is a national phase application under 35 U.S.C. §371 of PCT Application No. PCT/JP2009/001520, filed Mar. 31, 2009, which claims the benefit of Japanese Patent Application No. 2008-095466, filed Apr. 1, 2008, and Japanese Patent Application No. 2008-100894, filed Apr. 8, 2008 and Japanese Patent Application No. 2008-100889, filed Apr. 8, 2008 and Japanese Patent Application No. 2008-186588, filed Jul. 17, 2008 and Japanese Patent Application No. 2009-080676, filed Mar. 27, 2009, the entire content of the above applications are expressly incorporated herein by reference.

TECHNICAL FIELD

The present invention relates to, for example, a frictional resistance reduction device for a vessel, and more particularly, to a frictional resistance reduction device for a vessel that injects bubbles into water, controls inject conditions of gas and reduces the frictional resistance of a hull.

BACKGROUND ART

As to research on resistance reduction for vessels, a lot of results on wave-making resistance have been acquired. However, a distinct result on frictional resistance, which is said to be responsible for about 80% of the entire resistance of a large-scaled vessel, has not been acquired up to the present, because complicated turbulence phenomena are related thereto. When a vessel is sailing, a turbulent boundary layer is developed on or below the waterline along the surface of the hull. Accordingly, a frictional resistance is exerted on the surface of the hull, thereby reducing the propulsive performance of the vessel. In recent years, as to means for reducing such a frictional resistance on the surface of the hull, a microbubble system, which reduces the resistance by injecting microbubbles into the boundary layer along the surface, has received attention as a promising measure for reducing a frictional resistance and been researched. It is considered that the micro bubble system is a promising frictional resistance reduction device in an era from now on when energy saving is desired, because the system is remarkable in frictional resistance reduction effect, relatively resistant to fouling, has no problem of environmental contamination of the ocean and the hydrosphere.

However, this micro bubble system requires power because the system generates bubbles with a diameter of a several hundred μm or less from underwater sides of the vessel and the bottom of the vessel overcoming the water pressure. Considerations are required that increase a net reduction effect in consideration of both of a frictional resistance reduction effect and power for generating bubbles. Further, there is a problem how the frictional resistance is effectively reduced in a vessel sailing on the ocean and rivers, which receives various disturbances, such as waves and streams, and receives influences owing to freight conditions and navigational conditions. In particular, buoyancy acting on bubbles is small on microbubbles with a diameter of several hundred μm or less. When the micro bubbles are injected to the bottom of the vessel, the micro bubble is susceptive to influences of disturbances and easily diffused. Moreover, previous researches have mainly been of a laboratory level and researches using a model ship, and have not considered the disturbances and the navigational conditions.

Further, it is required, as a precondition, that construction and installation of such a gas supply or charged air device does not cost enormously.

In view of the present states of researches, the inventors of the present application use an actual vessel, equip the hull thereof with a gas inject device capable of injecting bubbles with a diameter larger or equal to that of micro bubbles, investigate a relationship between the inject of bubbles and a frictional resistance reduction effect in situations analogous to actualities, such as vessel conditions, navigational conditions, oceanographic conditions, search for increase in net reduction effect, and acquire a lot of findings. Further, researches are pursued for optimizing the particle diameters of bubbles in order not to diffuse the gas injected from the gas inject device in the sea and separate the gas from the bottom of the vessel, and also on components, devices and the shape of the bottom of a vessel. Moreover, the researches using such an actual vessel have determined that the injected bubbles are convolved into propeller means, reduce the propeller efficiency and adversely affect a net frictional resistance reduction effect.

On the other hand, marine diesel engines as the main engines of large scale vessels are equipped with turbochargers for compressing and providing air for combusting fuel. In recent years, the marine diesel engine has realized high power and high efficiency. This is because, in a large measure, the efficiency of the turbocharger has been increased.

Recently, the efficiency of the turbocharger has become higher. There appears a turbocharger exerting efficiency equal to or higher than that required by the engine. This means that air required for the engine or exhaust gas generated by combustion of fuel is more than necessary.

Energy-saving techniques that drive exhaust gas power turbines using the residual exhaust gas and rotate electric generators have generally become widespread (e.g., turbo compound system). There also arises a concept utilizing the residual exhaust gas as a source of generating the bubbles.

For example, as shown in following Patent Documents 1 to 4, concepts that use the exhaust gas from turbochargers and generate bubbles have been disclosed.

Patent Document 1 discloses a technical idea that adjusts fuel adjustment means and gas drawing rate adjustment means to reduce fuel consumption while drawing exhaust gas from a turbocharger and injecting the gas into water to reduce frictional resistance, and adjusts the flow rate of the exhaust gas so as to minimize the amount of fuel supply as a control. However, the idea disclosed in Patent Document 1 only controls the drawing rate so as to reduce the amount of fuel supply to a main engine with respect to a prescribed vessel velocity. The optimal control is not necessarily realized. Further, since only the exhaust gas is used, it is not used in a case of affecting the environment.

Patent Document 2 discloses a technical idea that provides a drawing port at a low pressure spot of a turbocharger compressing gas for a main engine and releases the drawn gas into water. Although the idea disclosed in Patent Document 2 refers to a valve for adjusting the flow rate, the idea discloses no specific control method.

Patent Document 3 discloses a technical idea that provides a branch line for a compressed air line of a turbocharger provided at a main engine, draws scavenged gas from a spot downstream from the intercooler and discharges bubbles. However, this idea discloses no specific control method either, and has a possibility of adversely affecting the operation of the main engine.

Patent Document 4 discloses a technical idea of a turbo compound system (exhaust gas passes through the blower turbine and the blower blows the gas to discharge bubbles) that branches exhaust gas out of a main engine, provides a turbine at a branch line, causes the turbine to drive a blower to discharge bubbles from the hull. However, the idea discloses no specific control method, and has a possibility of adversely affecting the operation of the main engine.

Patent Document 5 provides the hull with an air injection unit injecting air from a nozzle via an air injection control unit, provides a sensor detecting air bubbles or an air sheet released therefrom at the bottom of the hull, inputs signals from the sensor into the hull operation measurement unit, inputs wave information, relative wave information, displacement, movement velocity, acceleration, a direction, detected conditions of bubbles and a wind velocity and a wind direction into the hull operation measurement unit, detects bubble conditions on the basis of bottom of the vessel pressure information, bubble distribution information, frictional force information and hull resistance information, and optimally controls the released air layer and the bubble conditions.

Since such a configuration is adopted, various pieces of detected information are limited. The control is not performed by determination of navigational situations, such as the relative velocity between the vessel and the water and the draft conditions, and vessel situations, such as operating conditions of the vessel and the engine conditions. This cannot appropriately control the air bubbles and the air sheet. Further, this does not control the number of air injection units according to various pieces of detection information.

Patent Documents 6 and 7 disclose ideas that control supply of pressurized gas and exhaust gas according to pressure and the draft, supply the gas when the pressure rises to a certain degree and exceeds a pressure determined by a depth of water of protruding (injecting) and stop the gas when the pressure decreases. However, these documents do not disclose or suggest an idea that supplies gas at a higher level, stops even at a higher level or blocks after a backflow occurs.

Patent Document 8 discloses a technical idea that pertains to a micro bubble injecting device, integrally forms a fluid guide plate, which guides bubble-water mixture fluid aft, at the front end of a fluid nozzle provided at the hull, and converts a kinetic energy when the bubble-water mixture fluid is injected into propulsion of the vessel. However, the idea disclosed in Patent Document 8 is incapable of preliminarily determining the direction of the fluid to be injected. Further, there is a possibility that the fluid guide plate itself becomes a resistance preventing the vessel from sailing.

Patent Document 9 discloses a technical idea that injects bubbles from an air duct, provides strengthening devices straitening a drift at an upstream and downstream sides of the air duct, and secures a friction reduction region by spreading the bubbles along the drift. However, according to the idea disclosed in Patent Document 9, the strengthening device only plays a role that straitens the drift so as to smoothly flow from the upstream side to the downstream side with respect to the air duct. Therefore, when the velocity of the currents is high, there is a possibility that the bubbles are diffused on injecting. Further, since the air duct protrudes, there is a possibility that the air duct becomes a resistance preventing the vessel from sailing. In a case where the vessel is carried, when the vessel is mounted on a supporting stage, such as blocks, the air duct becomes an obstacle in security and working efficiency.

Patent Document 10 discloses a technical idea that provides the bottom of the vessel with a regulating member for regulating seawater streamed to the side of the bottom of the vessel by inject stream generation means and air injected by air injecting means so as not to escape toward the sides of the hull. However, the idea disclosed in Patent Document 10 provides the regulating member at the sides of the vessel and the regulating member is fixed such that a part thereof protrudes from the bottom of the vessel. Therefore, when the vessel is carried into a dock because of maintenance of the vessel, if the regulating member hits a supporting stage such as blocks, the vessel cannot only be fixed in a stable manner, but also the regulating member becomes an obstacle, thereby reducing working efficiency. Further, the regulating member itself is provided at a side of the hull. Accordingly, the contact area with seawater becomes significantly large, and the regulating member becomes the resistance adversely affecting the propulsion of the vessel, thereby reducing the net frictional resistance reduction effect of the air. Further, since the configuration where the air is injected from a center portion in the longitudinal direction of the hull is adopted, the frictional resistance reduction effect is limited.

Patent Document 11 discloses a technical idea where, in a vessel having a structure of blowing air into the bottom of the vessel, the bottom of the vessel has a substantially planar structure with respect to a flow, a lot of grooves are formed on the bottom of the vessel so as to be structures for taking air into the grooves and air is introduced, thereby separating the bottom of the vessel and water from each other. However, the idea disclosed in Patent Document 11 has a structure where the air is spread at the bottom of the vessel and the bottom of the vessel is covered with an air layer. The bottom of the vessel is accompanied by the air, but does not have a member and the like holding the air. An inclination of the vessel owing to disturbance of the wave, the flow and the like diffuses the air toward an area with lower pressure. This reduces the amount of air accompanying the bottom of the vessel. It is inevitable that the frictional resistance reduction effect is reduced accordingly.

On the other hand, for example, measures as disclosed in Patent Documents 12, 13 and 14 have been taken in order to reduce the frictional resistance of the vessel using micro bubbles.

This Patent Document 12 attaches an air injecting device communicated with the blower to a board side of the bow of the hull, attaches an air injecting device communicated with a compressor to the bottom of the vessel at the bow of the hull, covers areas around the both sides in the board direction of the bottom of the vessel and the sides of the vessel with micro bubbles generated by the air injecting device of the blower, covers areas around middle section in the board direction of the bottom of the vessel with micro bubbles generated by the air injecting device of the compressor, and entirely covers the wet surface of the hull.

Since such a configuration is adopted, only one air nozzle is provided on each surface of the sides of the vessel or the bottom of the vessel. It is incapable of controlling the manner of blowing bubbles according to the navigational condition of the vessel. The reduction in frictional resistance is limited. Further, in a typical blower, the gas supply or charged air rate varies and the air blowing rate varies according to variation in pressure owing to vertical movement of the waves. This does not causes stabilized reduction in frictional resistance. Further, the compressor has a limitation on a rate of air to be blown by the compressor.

Patent Document 13 provides a plurality of openings at upper and lower positions with different static pressures of outer plates of the hull, attaches air injecting devices to the respective openings, provides a gas drawing type blower device including a blower having a low discharge pressure and blower having a high discharge pressure on the deck at the bow, communicates the air injecting device on the upper stage and the blower with the low discharge pressure by the air supply pipe, and communicates the air injecting device on the lower stage and the blower with large discharge pressure by the other air supply pipe.

Since such a configuration is adopted and, in particular, one motor drives two blowers, it is incapable of controlling the manner of blowing bubbles according to the navigational condition of the vessel. The reduction in frictional resistance is limited. Further, the nozzles are arranged the upper and lower stages of the vessel. Accordingly, in particular at the nozzle on the upper stage, generation of the bubbles is susceptible to vertical movement of the waves. In the blower, the gas supply or charged air rate varies and gas supply or charged air rate varies according to variation in pressure owing to vertical movement of waves. Therefore, this idea is not stabilized and effective measures for reducing the frictional resistance.

Patent Document 14 provides a plurality of nozzles in a limited region in the proximity of the bow in an aggregated fashion in order to reduce frictional resistance between the hull and water by injecting gas into water from proximity of the bow during sailing and thereby causing micro bubbles to intervene at the outer shell of the hull. Hydrostatic pressures generated in the proximity of the nozzles diffuse the bubbles over the bottom of the vessel.

Since such a configuration is adopted, the bubbles from the nozzles on a curved surface below the valve in the bow section are susceptive to the navigational conditions of the vessel. Since the idea is a passive bubble diffusion system, the method is incapable of positively controlling generation of the bubble according to the navigational condition of the vessel and thereby effectively reducing the frictional resistance. Further, since the nozzles are arranged on an arc toward the downstream side in the limited region in the bow section, the resistance at the bow section cannot effectively be reduced.

Patent Document 1
  Japanese Patent Laid-Open No. 2001-097276
Patent Document 2
  Japanese Patent Laid-Open No. 2001-48082
Patent Document 3
  Japanese Patent Laid-Open No. 11-348870
Patent Document 4
  Japanese Patent Laid-Open No. 11-348869
Patent Document 5
  Japanese Patent Laid-Open No. 2004-188993
Patent Document 6
  International Publication No. WO2005122676
Patent Document 7
  International Publication No. WO1999028180
Patent Document 8
  Japanese Patent Laid-Open No. 8-243368
Patent Document 9
  Japanese Patent Laid-Open No. 2003-160091
Patent Document 10
  Japanese Patent Laid-Open No. 5-116672
Patent Document 11
  Japanese Patent Laid-Open No. 6-191396
Patent Document 12
  Japanese Patent Laid-Open No. 10-24891
Patent Document 13
  Japanese Patent Laid-Open No. 10-100983
Patent Document 14
  Japanese Patent Laid-Open No. 2000-296795

DISCLOSURE OF THE INVENTION

Problems to be Solved by the Invention

As described above, the ideas that use the exhaust gas from the main engine directly or indirectly or draw air from the turbocharger and use this for reducing the resistance of the vessel have been disclosed in various manners including the above Patent Documents. However, any of these is fraught with various problems on actual use, or ignores the problems to occur in actual use.

For example, gas passing through a turbocharger turbine is important gas securing performance and reliability of the main engine. The gas rate should appropriately be secured. It is necessary to control gas supply or charged air from the turbocharger to the main engine or exhaust gas from the main engine, within an appropriate condition, according to the operating conditions of the main engine. The draw of air from the turbocharger and the draw of the exhaust gas after the main engine should be controlled under a strictly controlled condition.

The gas can be drawn around the turbocharger includes "gas supply or charged air" can be drawn after the compressor of the turbocharger and before the cooler, "scavenged gas" can be drawn from between the cooler and the main engine, and "exhaust gas" can be drawn from between turbines of the turbocharger after the main engine. The draw of these changes the air to be supplied to the main engine in pressure, flow rate, temperature and the like. This offers a problem whether the main engine is operable under an appropriate condition and whether the main engine is operable under a permissible condition. The next problem is whether the drawn gas supply or charged air, scavenged gas and exhaust gas have conditions allowing the frictional resistance of the vessel to appropriately be reduced or not. These are different in temperature, flow rate, pressure and further position to be drawn. Accordingly, when the plurality of these are combined and used, there arises a problem how to acquire the optimal value of drawing. Further, in a case of the exhaust gas, an environmental problem that the exhaust gas may directly pollute the ocean is assumed, and it is assumed that there are unusable waters. In the waters where the exhaust gas is unusable, gas supply or charged air gas or scavenged gas is to be used. Situations can occur that cannot discharge the gas from bypass piping according to draft conditions and operating situations of the vessel. It is necessary to design so as not to damage the engine owing to immersion of sea water when the operation is stopped.

That is, various problems exist, in view of the control, function, security, and energy-saving design, to realize the saving of energy by actually utilizing the bypass gas from the turbocharger and reducing the frictional resistance of the vessel. However, the ideas, including the above Patent Documents, only draw and inject the residual gas for the sake of saving of energy or only control so as to minimize fuel consumption cannot actually solve the above problems and realize preferable conditions in security and operation. In other words, the above Patent Documents do not provide specific measures for resolutions.

Further, as described above, the ideas that use the exhaust gas from the main engine directly or indirectly or draw air from the turbocharger and use this for reducing the resistance of the vessel have been disclosed in various manners including the above Patent Documents. However, any of these is fraught with various problems on actual use, or ignores the problems to occur in actual use.

For example, gas passing though a turbocharger turbine is important gas securing performance and reliability of the main engine. The amount of the gas should appropriately be secured. The control only minimizing fuel cost is insufficient to efficiently maintain the main engine without adversely affecting the main engine. It is necessary to control air supply from the turbocharger to the main engine and exhaust gas from the main engine, within an appropriate condition, according to the operating conditions of the main engine. The draw of air from the turbocharger and the draw of the exhaust gas after the main engine should be controlled under a strictly controlled condition.

Further, the techniques that inject bubbles from the hull in order to reduce the frictional resistance on sailing of the vessel cannot control the inject conditions such as the direction of the injected gas and the inject rate, according to navigational situations of the vessel. Thus, the control for the gas outlet cannot be performed, when the vessel receives disturbances such as waves and flows, and against an inclination caused on turning.

Moreover, in the methods guiding the injected gas by means of external elements, the external elements themselves cause increase of the frictional resistance and have fixed structures. Accordingly, in a case of maintenance of the vessel or a case of carrying the vessel into a dock (hereinafter, collectively referred to as "docking situations"), when the vessel is mounted on a supporting stage such as blocks, the supporting stage resides under the external elements, thereby concentrating the stress and causing breakage.

With certain structures and dimensions of the external elements, there are problems because operators guide the vessel over the supporting stage such as the blocks in consideration of the external elements under docking situations and the external elements act as obstacles during maintenance of the hull (e.g., including verification of presence or absence of breakage, repairs of the breakage and coating). Moreover, attachment of the external elements protruding from the bottom of the vessel is concerns in operation of the vessel for officers in charge of operation, in view of security and maneuverability.

The present invention solves the problems of the conventional techniques. It is an object of the present invention to provide a frictional resistance reduction device for a vessel that is capable of appropriately controlling a inject of gas according to navigational situations of the vessel and vessel conditions, effectively reducing frictional resistance by appropriately injecting bubbles even with disturbance, and further utilizing an effect of generation of the bubbles.

It is another object of the present invention to provide a frictional resistance reduction device for a vessel that retains bubbles under the navigational situations of the vessel and the vessel conditions, such as cases of disturbances including waves and currents, and a case of an inclination caused by turning, and avoids formation of a resistance adversely affecting advance of the vessel.

It is still another object of the present invention to provide a frictional resistance reduction device for a vessel that is capable of reducing the frictional resistance without necessity of further generating energy for generating bubbles and reducing consumption of energy according thereto.

It is yet another object of the present invention to provide a frictional resistance reduction device for a vessel that realizes efficient reduction in frictional resistance by injecting bubbles in which the navigational conditions of the vessel is accurately reflected.

It is still another object of the present invention to provide a frictional resistance reduction device for a vessel that effectively reduces the frictional resistance even with variation in the navigational situations of the vessel and the vessel conditions, prevents bubbles from being convolved into propeller means, prevents efficiency of propeller means from being reduced and increases the net frictional force reduction effect.

It is yet another object of the present invention to provide a frictional resistance reduction device for a vessel that is capable of reflecting navigational conditions and/or vessel conditions of the vessel in adjustment of gas and injecting of gas and thereby realizing saving of energy, prevention of noise, prevention of adverse effects to fishing boats and a port.

It is still another object of the present application to provide a frictional resistance reduction device for a vessel that maintains high efficiency without adversely affecting the operation of the main engine when generating bubbles using residual gas from a turbocharger, appropriately controls drawing according to situations and realizes security and saving of energy.

It is yet another object of the present invention to provide frictional resistance reduction device and method for a vessel that is capable of maintaining high efficiency without adversely affecting the operation of the main engine when drawing the pressurized gas from the proximity of the turbocharger and generating bubbles, and thereby preventing the driving efficiency of the main engine from being reduced.

It is still another object of the present invention to provide frictional resistance reduction device and method for a vessel that is capable of controlling the inject condition of gas, for example including the inject rate and the inject direction, when injecting gas.

It is yet another object of the present invention to provide frictional resistance reduction device and method for a vessel that is capable of suppressing, to a minimum, that a resistance against sailing of the vessel is formed and/or an obstacle is formed under docking situations, and of restricting the diffusion of gas even when the vessel receives disturbances such as waves and flows or an inclination occurs owing to turning.

It is still another object of the present invention to provide frictional resistance reduction device and method for a vessel that is capable of preventing water from entering into a path for providing gas and stably supplying gas from gas supply or charged air means.

Means for Solving the Problems

In order to solve the problems, a frictional resistance reduction device for a vessel corresponding to claim 1 of the present application includes: a gas outlet injecting bubbles at least to a bottom of the vessel; gas supply or charged air means for blowing pressurized gas to the gas outlet; navigational condition detection means for detecting a navigational condition of the vessel; and means for controlling injecting of the gas according to a detection result from the navigational condition detection means such that propulsion of the vessel is not prevented while the injected bubbles efficiently reduces the frictional resistance of a hull.

The "gas outlet" is a device including a mechanism for injecting pressurized gas supplied from the gas supply or charged air means as bubbles.

Here, the gas supply or charged air means has a function of pressurizing and supplying air, and includes a turbocharger, a compressor, a blower (gas supply or charged air device), an electric generation system for driving the blower, and a mechanical system directly drives the blower using (high pressure) gas.

The navigational condition detection means may be a relative velocity detector detecting a relative velocity between water and the hull, which is a physical quantity varying according to navigation of the vessel, a draft detector detecting the height of the waterline of the vessel, an inclination detector detecting an inclination of the hull, and a shear force sensor detecting a shear force acting on the hull.

With these configuration, as to injecting of the pressurized gas from the gas supply or charged air means via the gas outlet, the navigational condition detection means detects the navigational condition of the vessel, and then means for controlling the injected bubbles such that the frictional resistance of the hull is efficiently reduced while not adversely affecting propulsion of the vessel controls injecting of air on the basis of the detection result from the navigational condition detection means. This can realize reduction in frictional resistance of the vessel in the optimal efficiency adapted to variations such as those in the relative velocity between water and the hull, the draft of the vessel, the inclination of the hull and the shear force acting on the hull.

In order to solve the problems, a frictional resistance reduction device for a vessel corresponding to claim 2 of the present application includes: a main engine acquiring propelling power of the vessel; a turbocharger that is driven by exhaust gas of the main engine and blowing pressurized gas to the main engine; drawing means for drawing the pressurized gas and/or exhaust gas from between the turbocharger and the main engine; a gas outlet injecting the drawn pressurized gas and/or exhaust gas at least to a bottom of the vessel on and below a waterline via a path; navigational condition detection means for detecting a navigational condition of the vessel; and a control device controlling a rate of pressurized gas and/or exhaust gas on the basis of at least any one of a physical quantity related to a heat load on the main engine and characteristics of the turbocharger and/or the navigational condition detection means.

The "gas supply or charged air bypass" and the "scavenging bypass" are compressed a gas in the turbocharger and a path for drawing the gas, and concepts including a gas before supply to a cooler (hereinafter, also referred to as "intercooler"), a gas intermediately cooled by the intercooler, and pipes through which the gases pass.

The "gas supply or charged air bypass rate adjustment means" and the "scavenging bypass rate adjustment means" are devices including functions of controlling a gas supply or charged air bypass rate and a scavenging bypass gas rate, respectively, according to a control device, which will be described later, and realized by means of, for example, an adjustment valve and the like connected to the control device.

The "control device" is realized by means of a machine, a device, an instrument, a program, a recording medium on which a program is stored, a computer or the like including functions of varying output values and operations (in the present application, for example, various bypass gas rates, operation of starting/stopping providing the pressurized gas to the gas outlet, operation of starting/stopping supplying the exhaust gas to the gas outlet, etc.) over time, based on a certain number of variables (in the present application, for example, a physical quantity related to the heat load of the main engine, scavenging gas pressure, exhaust gas temperature, characteristics of the turbocharger, turbocharger efficiency, pressure of the pressurized gas, pressure of the exhaust gas, the draft of the vessel, etc.), on the basis of a control principles according to the present application.

The "exhaust gas bypass" is the exhaust gas generated as a result of combustion in the engine or a path through which the exhaust gas is drawn, and a concept including a pipe through which the gas passes.

The "exhaust gas bypass rate adjustment means" is a device including a function of controlling an exhaust gas bypass rate according to a control device, which will be described later, for example, realized by means of an adjustment valve and the like connected to the control device.

Further, the exhaust gas from the turbocharger is bypassed and reused as bubbles, thereby decreasing the resistance on the outside of the hull. This facilitates decrease in resistance without need for separately generating energy for generating bubbles, allowing consumption of the energy thereof to be reduced. In this case, the control device is provided that controls the exhaust gas bypass rate on the basis of the physical quantity related to the heat load of the main engine and the characteristics of the turbocharger. Accordingly, it is secured, as a device, that the optimal value of the energy efficiency, in which, for example, variation in the vessel velocity corresponding to the load on the main engine is reflected over time, is selected. This allows the effect of reduction in resistance to be reflected over time while appropriately maintaining the condition of exhausting the exhaust gas generated by increase and decrease of the number of revolutions of the main engine. This further realizes a device that maximizes the energy consumption efficiency, on the basis of calculation and control, using vessel resistance reduction effect using bubbles generated by reusing the exhaust gas from the turbocharger.

In this case, instead of or together with the exhaust gas from the turbocharger, gas supply or charged air and/or scavenged gas from the turbocharger is bypassed and reused as bubbles, thereby reducing resistance on the outside of the hull. This facilitates reduction in resistance without separately generating energy for generating bubbles, and allows energy consumption to be further reduced. Here, a control device is provided that controls a gas supply or charged air bypass rate and/or a scavenging bypass rate on the basis of a physical quantity related to the heat load on the main engine and characteristics of the turbocharger. The optimal value, in which, for example, variation in the vessel velocity corresponding to the load on the main engine is reflected over time, can be acquired. Use of these gases instead of the exhaust gas facilitates reduction in resistance without causing a possibility that the exhaust gas causes environmental contamination, and effectively facilitates reduction in energy consumption owing thereto, particularly in a case where there is the possibility that the exhaust gas causes environmental contamination.

That is, the control is performed on the basis of the physical quantity related to the heat load of the main engine and the characteristics of the turbocharger. This can facilitate the optimization in all aspects, such as output of the main engine, fuel consumption efficiency and measures against the exhaust gas, of course in reduction in frictional resistance. In this case, in view of a fact that a surplus is generated most under 75% load on the main engine, further advantageous effect is expected, in a case of using what has the characteristics of the turbocharger according to which effective use of the surplus is applied to the proximity of 75% load on the main engine and gas can be drawn most at a navigational speed. Any conventional art does not include a concept of drawing from gas supply or charged air of the turbocharger, or a concept of drawing the gas from a high pressure spot between an intercooler and a compressor. This concept reduces viscosity of seawater because of high temperature, even without heating by the exhaust gas. Accordingly, an advantageous effect is expected in further reduction in frictional resistance.

In the configuration in claim 2, the control device may control starting/stopping supplying the pressurized gas and/ or the exhaust gas to the gas outlet according to the pressure of the pressurized gas and/or the exhaust gas and the draft of the vessel.

Here, in order to grasp and sense the draft, a method can be adopted that grasps the waterline from a proportional relationship between pressure and depth using, for example, a sensor measuring and detecting a pressure at the bottom of the vessel or at a surface of a side of the vessel lower than the waterline. A method may be adopted that images situations around a water surface by a camera from a side of the vessel, applies an image processing on the image and thereby estimates the draft. A pressure sensor may be used for sensing the pressure of the exhaust gas.

With such a configuration, the pressure of the pressurized gas and/or the exhaust gas is detected, the operation of starting/stopping supplying the pressurized gas and/or the exhaust gas, which is bypassed from between the turbocharger and the main engine, via the gas outlet is controlled on the basis of the detected pressure of the exhaust gas and the draft of the vessel. Accordingly, an event that seawater flows into the vessel, which occurs when the pressure is equal to or less than that at the gas discharge port, can be prevented. Further, supply of the pressurized gas and/or the exhaust gas is started when the pressure condition becomes a condition capable of injecting, and stopped when the condition becomes that incapable of injecting. This guarantees, as a device, more secure reduction in resistance of the vessel using bubbles. Separately therefrom, the pressure of the pressurized gas and/or the exhaust gas can be shared for managing the conditions of the turbocharger and the main engine, and the draft of the vessel can be shared for managing the amount of freight.

In this case, basically, when pressure of the pressurized gas and/or the exhaust gas is equal to or more than the pressure at the draft, injecting of gas is available. When the pressure of the pressurized gas and/or the exhaust gas is equal to or less than the pressure at the draft, injecting of gas is stopped. In actual cases, control is performed on the basis of a value therearound including a certain extent of error. This control holds effective control, even in cases where conditions vary, such as a case where injecting of gas and seawater flow to the opposite directions, thereby allowing a vessel resistance reduction effect using bubbles to be strongly attained.

Further, with respect to the above description, a configuration may be adopted that further comprises gas supply or charged air means provided at an exhaust gas bypass drawing the exhaust gas, wherein the drawing means controls a drawing rate of the exhaust gas, and the gas outlet, which is provided via the path from the gas supply or charged air means, injects bubbles.

Here, the gas supply or charged air means represents what has a function of generating gas, and includes a blower (gas supply or charged air device), an electric generation system for driving the blower, and a mechanical system that directly drives the blower by means of (high pressure) gas.

According to such a configuration, the exhaust gas from the turbocharger is bypassed and used as an exhaust gas bypass. The gas supply or charged air means is driven by the exhaust gas bypass. This generates bubbles to be generated by the gas supply or charged air means. The bubbles reduce the resistance of the vessel. Here, a control device is provided that controls the exhaust gas bypass rate on the basis of the physical quantity related to the heat load on the main engine and the characteristics of the turbocharger. The exhaust gas bypass rate, in which, for example, variation in the vessel velocity corresponding to the load on the main engine is reflected over time, is selected. This allows the optimal value to be selected each time with respect to generation of bubbles from the gas supply or charged air means, thereby securing, as a device, optimization in energy efficiency. As a result, the advantageous effect of reducing the resistance can be reflected over time, while appropriately maintaining the condition of exhausting the exhaust gas generated owing to increase and decrease in the number of revolutions of the main engine. This attains reduction in resistance of the vessel using bubbles generated by reuse of the exhaust gas of the own device, and allowing the energy consumption efficiency using the reduction to be optimized, as a device, on the basis of calculation and control. In other words, it is different, in that control is performed on the basis of the navigational condition detection means, the physical quantity related to the heat load of the main engine, and the characteristics of the turbocharger, from the conventional turbo compound system (i.e., a system of discharging bubbles from the exhaust gas by means of the blower via a blower turbine). Therefore, the exhaust gas can be drawn, while an appropriate value is maintained also in view of restriction on exhaust gas. For example, in a case where the exhaust gas cannot be discarded directly into the seawater and a case where it is necessary to raise the temperature of the exhaust gas and reduces NOx, a preferable control can be performed.

Further, with respect to the above description, a configuration may be adopted that further comprises a variable nozzle improving gas supply or charged air characteristics of the turbocharger, wherein the variable nozzle is controlled according to a drawing rate of the pressurized gas and/or the exhaust gas, the physical quantity related to the heat load on the main engine, and the characteristics of the turbocharger.

The "main engine" of the vessel represents an engine driven by liquid fuel or gas fuel, or a gas turbine drive by gas fuel.

The "turbocharger" supplying pressurized gas to the main engine may, for example, cause the exhaust gas to pass therethrough, rotate an exhaust gas turbine, drive a compressor and the like, and thereby supply the pressurized gas to the main engine. The exhaust gas rate passing through the exhaust gas turbine of the turbocharger is an important physical quantity for the main engine to secure performance and reliability. It is necessary that the value thereof is appropriately be secured. Further, it is necessary that the gas supply or charged air rate from the turbocharger to the main engine is controlled under an appropriate condition according to the operating condition of the main engine. Drawing of gas from the turbocharger and drawing of the exhaust gas after the main engine should be controlled under strictly controlled conditions.

The "variable nozzle improving gas supply or charged air characteristics of the turbocharger" indicates what can adjust the direction and angle of vanes at the nozzle such that gas including air and exhaust gas preferably flows into the turbocharger, when the gas including air and exhaust gas is supplied to the turbocharger. More specifically, the variable nozzle reduces the area of the path and controls the direction of flow so as not to reduce the efficiency in driving the turbocharger. That is, the variable nozzle is arranged at a position capable of controlling the inflow condition of exhaust gas before the exhaust gas flows into the exhaust gas turbine pertaining to the turbocharger and/or a position capable of controlling the inflow condition of air before air flows from the atmosphere into the compressor pertaining to the turbocharger, and cause the inflow air to act on the exhaust gas turbine and the compressor even if the inflow gas varies.

The "physical quantity related to the heat load on the main engine" is a physical property value measured or detected in relation to the heat load on the main engine. For example, scavenging gas pressure, exhaust gas temperature (or temperature of an exhaust gas pipe, or ambient temperature that is capable of being treated alike or has a relationship therewith on a one-to-one correspondence), flow rate, the number of revolutions (peripheral speed) of the turbocharger and the like, may be adopted. The efficiency of the turbocharger, and property and characteristic values of a degree of matching between the turbocharger and the engine can be adopted as the characteristics of the turbocharger. As acquisition of physical quantities, sensors detectable respective physical property values can be adopted.

With such a configuration, the degree of open or close and aperture setting of the vane pertaining to the variable nozzle are controlled according to a certain variable. This can optimize the inflow condition of the exhaust gas supplied to the turbocharger. Accordingly, the variable nozzle is controlled according to the pressurized gas bypass and/or the exhaust gas bypass, the drawing rate of pressurized gas and/or exhaust gas, the physical quantity related to the heat load of the main engine, and characteristics of the turbocharger. Accordingly, the gas supply or charged air characteristics of the turbocharger are improved. That is, the pressurized gas is preferably supplied to the main engine, without reducing the turbocharger efficiency. The variable nozzle may be controlled so as to follow the optimal turbocharger efficiency on the basis of a certain variable pertaining to the characteristics of the turbocharger.

The variable nozzle is further provided. Accordingly, adaptive adjustment of the variable nozzle can acquire gas to be injected even under low load or high road, thereby allowing reduction in frictional resistance by injected gas to be realized.

In order to solve the problems, a frictional resistance reduction device for a vessel corresponding to claim 6 of the present application comprises: a vessel; a plurality of gas outlets injecting bubbles at least to a bottom of the vessel; gas supply or charged air means for blowing pressurized gas to the plurality of gas outlets via a path; a drive device driving the gas supply or charged air means; gas adjustment means for controlling injecting of gas from the gas outlets; navigational condition detection means for detecting a navigational condition of the vessel; and a control device that controls the gas adjustment means according to a detection result from the navigational condition detection means and changes a inject condition of the pressurized gas from the gas outlets.

Here, gas adjustment means represents an inverter or rotation adjustment device of a motor for controlling drive of the drive device, a valve or a damper for adjusting starting/stopping supplying air and adjusting an air rate, and generally, hydraulic and pneumatic drive devices including a motor and a solenoid for driving these elements.

Here, the gas supply or charged air means represents a blower or a turbine-driven compressor securing an gas supply or charged air rate effective for generating bubbles, a pneumatic source preliminarily mounted on the vessel, or exhaust gas that is derived from the engine and pressurized. In particular, it is preferable that variation in gas supply or charged air rate be small even if the pressure at a discharge side varies.

The drive device is an eclectically driven motor, an engine driven by liquid fuel or gas fuel. In addition thereto, the drive device is a turbine gaining rotational force using the exhaust gas from the engine of the vessel, a hydraulic motor or a pneumatic motor driven by hydraulically or pneumatically.

The navigational condition detection means represents a relative velocity detector detecting a relative velocity between water and the hull, which is a physical quantity varying according to navigation of the vessel, a draft detector detecting the height of waterline of the vessel, an inclination detector detecting an inclination of the vessel, and a shear force sensor detecting a shear force acting on the hull.

Typically, the control device is electrically controlled. The control device represents concepts including a program for attaining a control object, an algorithm, an electronic medium storing them, and a computer for executing the program and algorithm, in addition to an electric control circuit. The control device includes, in addition to electric control systems, what is controlled pneumatically or hydraulically, and any combination thereof.

The control of the gas adjustment means according to the detection result of the navigational condition detection means represents control of the inverter of the motor, the rotation adjustment device, the valve and damper for adjusting starting/stopping supplying air and adjusting the air rate, the motor and the solenoids, and the hydraulic and pneumatic drive devices for driving these elements on the basis of the relative velocity between water and the hull detected by the relative velocity detector, the waterline of the vessel detected by the draft detector, the inclination detected by the inclination detector, and the shear force acting on the hull detected by the shear force sensor. The control varies injecting of air responsive to the conditions.

With such a configuration, the navigational condition detection means detects the navigational condition of the vessel. The control device performs controls that adjusts the gas adjustment means to change the number of injecting at the plurality of working gas outlets injecting bubbles to the bottom of the vessel and/of the inject rate of gas under control of the control device according to the detection result and effectively injects bubbles to the bottom of the vessel according to the navigational condition of the vessel. Accordingly, control of the bubble inject condition in which the navigational condition of the vessel is accurately reflected realizes more efficient reduction in frictional resistance.

In the configuration in claim 6, the gas supply or charged air means may plurally be provided, and supplied to a plurality of gas outlets via a plurality of paths.

With the above configuration, the navigational condition detection means detects the navigational condition of the vessel. The control device controls the drive device according to the detection result. The number of working nozzles injecting bubbles to the bottom of the vessel and/or the inject rate of gas is changed. The control is performed such that the bubbles are effectively injected to the bottom of the vessel according to the navigational condition of the vessel. In view of alleviating adverse effects owing to inclination and waves, it is preferable that the gas outlets be plurally provided. This plural provision exerts a novel effect capable of controlling injecting so as to inject bubbles only from the middle one or fully inject bubbles according to the relative velocity and the draft. Further, this plural provision enables the individual gas supply or charged air means to be minimized, thereby allowing the center of gravity of the vessel to be lowered.

In the configuration in claim 6, the plurality of gas outlets may be arranged along a fore shape of the bottom of the vessel.

With such a configuration, gas can be injected along the bottom of the vessel of the hull from the gas outlets arranged along the fore shape of the vessel formed in a so-called boat shape. That is, arrangement of the gas outlets along the fore shape of the bottom of the vessel enables a large area to be covered with the injected gas. This enables a separate control such that air is selectively injected on a spot where resistance is acting most and selectively facilitates reduction in resistance.

In the configuration in claim 6, the gas outlets may include a configuration that does not protrude from a surface of the bottom of the vessel.

The configuration that does not protrude from the surface of the bottom of the vessel is, for example, a configuration that does not protrude from the keel line. The configuration may be a configuration where a part equipped with the gas outlets is concave from the surface of the bottom of the vessel, or a configuration where the gas outlets are arranged on a surface substantially flush with the surface of the bottom of the vessel. The shape and the dimensions of the configuration are not subjected to any limitation.

This configuration can prevent the gas outlet from being a resistance when the vessel is sailing. Since the gas outlet does not protrude, the configuration does not become a load on operation under docking situations. More specifically, when the vessel is mounted on the supporting stage such as blocks for fixing the hull, there is no need to consider a protrusion owing to the gas outlet. Since the gas outlets form the same plane with substantially identical height to the bottom of the vessel, no consideration is necessary. Further, since the gas outlets can be treated as with another element even in repair of the bottom of the vessel, the working efficiency is not impaired.

In the configuration in claim 6, the plurality of gas outlets may control a inject direction of the pressurized gas and/or a inject rate of the pressurized gas.

The navigational condition of the vessel varies according to the relative velocity between water and the hull, the height of waterline of the vessel, the inclination of the hull, the shear force acting on the hull, the depth of water in a navigational region and the like, which are physical quantities varying according to navigation of the vessel.

The navigational condition can vary owing to variation in any one of prescribed situations of the vessel (total amount of freight including passengers and cargoes, at the time unnecessary to injecting gas, at the time of energy saving operation, etc.), a navigational location immediately after departure from a port or on cruising, the weather and currents. Accordingly, it is necessary to adjust the inject condition of gas in various situations along with the navigational conditions. It is necessary to adjust the inject rate and the inject direction of gas to acquire a desired frictional resistance reduction effect.

The inject rate of gas can be adjusted by means of the drive control by the gas supply or charged air means, generation rate of gas and the like. Further, the inject rate of gas can also be adjusted by means of changing the aperture of the nozzle immediately before injecting. On the other hand, the inject direction of gas can be adjusted by means of providing a straightening plate on the nozzle to adjust the angles, changing the directions of a nozzle configuration itself of the nozzle, and utilizing a fluid element.

Such a configuration is effective, in a case incapable of acquiring a desired frictional resistance reduction effect owing to the navigational condition of the vessel, even if the gas supply or charged air means for generating gas appropriately controls the supply rate. For example, there is a tendency that the bubbles are diffused by buoyancy responsive to the navigational conditions varying according to influences due to the relative velocity between water and the hull, the height of waterline of the vessel, the inclination of the hull, the shear force acting on the hull, the depth of water in a navigational region and the like. In these cases, if the inject direction of gas can preliminarily be adjusted, the loss of the frictional resistance reduction effect can be prevented. The above configuration realizes that. Further, this allows a control of effectively spreading bubbles around the bottom of the vessel (e.g., control of injecting bubbles slightly inward, because a slow velocity easily causes diffusion) in cases of inclination of the hull and small inject rate of bubbles, thereby allowing the frictional resistance to be effectively reduced even under vessel conditions different from usual conditions.

In order to solve the problems, a frictional resistance reduction device for a vessel corresponding to claim 11 of the present application comprises: a vessel; a gas outlet that is provided at a bottom of the vessel and injects bubbles via a path to the bottom of the vessel; gas supply or charged air means blowing compressed gas to the gas outlet; a drive device driving the gas supply or charged air means; and bubble condition control means that is provided at least after the gas outlet and for controlling the injected bubbles.

The bubble condition control means has a function of controlling the injected bubbles so as to effectively exert the frictional resistance reduction effect, and includes an end plate, and a bubble convolvement prevention structure.

The end plate is a plate-like material made of materials, such as metallic material including iron and steel, lumber including cedar and cypress, and FRP. It is preferable that the materials be rigid and resistant to rust owing to adverse effect of moisture and the like. It is further preferable to coat the surface of the materials so as not to cause rust. Methods of arranging the end plate include a method of connecting the connecting portion material to the bottom of the vessel and arranging the material thereon by means of a connecting method including screws, nails and adhesives. However, it is preferable to adopt methods where the vessel main body pertaining to the bottom of the vessel and the end plate are fitted to each other by their shapes and/or both are dovetailed together, or connected by welding. In arrangement, the arranging strength may be improved using the connecting portion material for reinforcement.

With such a configuration, the gas supply or charged air means driven by the drive device causes the gas outlet to inject gas. A plurality of end plates may be arranged, in the astern direction with reference to the gas outlet, around an end portion of the bottom of the vessel in the longitudinal direction thereof. Accordingly, the injected bubbles can flow while being retained at the bottom of the vessel in the water.

In a case of adopting the end plate as the bubble condition control means, according to this configuration, the end plate is arranged after the gas outlet of the bottom of the vessel. Accordingly, small amount of the contact area with water is sufficient in comparison with the case of arranging the end plate on the side of the vessel (e.g., comparison with the above Patent Document 11), and increase in frictional resistance owing to the end plate is significantly small. Further, it is advantageous to provide the end plate on the bottom of the vessel, in view of stability of the vessel. More specifically, accumulation of air on the vessel side disturbs the balance, which further means that the bubbles have generated in vain. This configuration with arrangement on the bottom of the vessel can avoid such an event.

In a case of adopting a bubble convolvement prevention structure as the bubble condition control means, the bubble convolvement prevention structure can prevent the bubbles from being convolved into the propeller means and the like and becoming obstruction of maneuvering, without receiving any effect owing to waves or currents.

The configuration in claim 11 may further include retractable diffusion limiting means for limiting bubble diffusion, which is provided as the bubble condition control means.

Here, the diffusion limiting means, for example, suppresses bubble diffusion around the bottom of the vessel caused by normal sailing (including sailing in a straight line and turning) and a sudden inclination of the vessel owing to waves and wind force. The diffusion limiting means may be the end plate, a rib structure (e.g., a rib structure with a triangular profile), a mound structure, a fin structure and the like.

More specifically, the diffusion limiting means is made of materials, such as metallic material including iron and steel, and FRP and the like, and may be a plate-like or streamlined structure where the whole or a part thereof protruding from the hull. It is preferable that the materials be rigid and resistant to rust owing to adverse effect of moisture and the like. It is further preferable to coat the surface of the materials so as not to cause rust. The shape and the dimensions of the diffusion limiting means are not subjected to any limitation.

Accordingly, "retractable diffusion limiting means" represents what is capable of causing the diffusion limiting means to be a state of protruding from the main body of the vessel, such as the bottom of the vessel or a bow section, or a state of retracting.

Here, the state of protruding the diffusion limiting means represents a state where diffusion limiting means can prevent bubble diffusion around the bottom of the vessel caused by a sudden inclination of the hull owing to influences, such as rolling by normal sailing (including sailing in a straight line and turning) with the diffusion limiting means, waves, wind force and the like, and a state where diffusion limiting means can exert an effect on a prescribed operation under docking situations, and also includes a state where a part of the end plate (a distal end, etc.) protrudes.

On the other hand, a state of retracting the diffusion limiting means represents, for example, a state where a surplus space arranged in the main body of the vessel, such as the bottom of the vessel or the bow section stores the entire parts of the diffusion limiting means and no part protrude or a part of the diffusion limiting means is retracted and the other part protrudes, or a state where the diffusion limiting means is folded at a boundary plane between the diffusion limiting means and the main body of the vessel. The above limiting means can also function as the diffusion limiting means. The retraction is performed when air is not injected, when the ship is carried into a dock, and when cooperation with injecting of gas is performed as control.

The configuration realizing the protrusion and the retraction of the diffusion limiting means includes means for reversibly driving the diffusion limiting means by a drive mechanism. The drive mechanism is a power source, such as a hydraulic, water-pressurized or pneumatic actuator, or a motor, capable of linking to the diffusion limiting means, and preferably arranged in the surplus space provided in the main body of the vessel, such as the bottom of the vessel or the bow section. In this case, the drive mechanism is capable of driving the diffusion limiting means so as to protrude and be retracted. The drive mechanism may be operated manually or automatically on sailing according to control on the basis of a predetermined condition.

The drive mechanism may be a link mechanism configured by combination with a joint and the like. This allows the linear movement of the drive mechanism to be converted into rotational movement by means of the link mechanism and the like.

On the other hand, the diffusion limiting means can protrude by the self weight according to receiving gravity and/or by urging by an elastic member such as a spring attached thereto, and be retracted by receiving compressing load from underneath. In other words, the state where the diffusion limiting means protrudes is maintained unless receiving compressing load from underneath greater than the self weight of the diffusion limiting means or the elastic force of the elastic member. On the contrary, the state of retracting the diffusion limiting means is maintained during receiving the compressing load. In particular, in order to bend the diffusion limiting means, it is preferable that a prescribed inclination be provided for easily bending the diffusion limiting means and the compressing load be received without contacting with the diffusion limiting means or the like. A configuration may be adopted where variable movement by a drive mechanism or a link mechanism and movement by the self weight of the diffusion limiting means or the elastic member attached to the diffusion limiting means are combined and thereby realizes protrusion and retraction. More specifically, the self weight may be used when the diffusion limiting means protrudes, and retraction may be performed by the drive mechanism or the like at an arbitrary timing.

With such a configuration, the diffusion limiting means can limit diffusion of the gas blown from the gas supply or charged air means and injected from the gas outlet during sailing, and the gas can flow while being maintained in the proximity of the bottom of the vessel. With the retractable configuration, when the vessel entering a port or sailing in shallow water, if reduction in frictional resistance by bubbles is unnecessary, the diffusion limiting means is retracted. Accordingly, the diffusion limiting means does not act as a resistance or an obstruction, and does not become a load on operation under docking situations. That is, in comparison with the case where the end plate is not retractable as in the above Patent Document 16, retraction can be performed when the vessel is sailing and the diffusion limiting means is unnecessary, thereby reducing the frictional resistance. Further, when stability of the vessel is required, protrusion thereof also serves as stabilization means (i.e., in addition to resistance, an effect of lowering the center of gravity is exerted). Moreover, when bubbles are injected, the diffusion limiting effect is acquired together with the stabilization effect.

The configuration in claim 11 may further include diffusion limiting means that is transformable according to an internal/external force limiting bubble diffusion and provided as the bubble condition control means.

Here, as in the above the "diffusion limiting means" can prevent bubble diffusion around the bottom of the vessel caused by a sudden inclination of the vessel owing to influences by normal sailing (including sailing in a straight line and turning), waves and wind force, and configured with a flexible material.

More specifically, the diffusion limiting means may be, for example, a hollow object (hereinafter, also referred to as "hollow structure") made of material having a certain extent of elasticity, rigidity, flexibility or resiliency and/or strength including vinyl, rubber or various textile (e.g., materials used for a flak jacket and the bottom of the vessel of an air-cushion vehicle), or an object in which a flexible material such as sponge is filled. In this case, the shape (e.g., a round, an oval, a triangle, a rectangle, another polygon, etc.) is not subjected to any limitation. However, the shape is preferably adopted to which an internal force is applied by filling or encapsulating fluid (gas such as air, or liquid such as water or oil) or fine particles such as powder or dirt therein, thereby allowing a desired shape to be maintained even in sailing. In particular, with flexibility, under docking situations, when the vessel is mounted on the supporting stage such as blocks, it is preferable that the diffusion limiting means be capable of being compressed (crushed) by an external force owing to the pressure. Further, the injected or encapsulated fluid of fine particles may be drawn or taken out. The inside and the outside of the object may be configured only with an elastic material, which may be anything capable of maintaining an expanded state without being compressed owing to the water pressure when the vessel is sailing, preventing bubbles from being diffused when the vessel is sailing and maintaining the bubbles to be retained at the bottom of the vessel and flow.

Accordingly, the "transformable diffusion limiting means" includes that the diffusion limiting means is capable of being in a state of protruding from the bottom of the vessel or a state of being contacted, and represents what is transformable into various shapes and states desired.

Here, the state where the diffusion limiting means protrudes represents that fluid such as air or water, fine particles or the like is injected or encapsulated into the hollow diffusion limiting means to apply an internal force, thereby maintaining a desired shape without being compressed by the water pressure even when the vessel is sailing. Further, the diffusion limiting means may be anything that is not hollow, and likewise includes anything capable of maintaining a desired shape without being compressed by the water pressure even when the vessel is sailing.

On the other hand, the state of contracting the diffusion limiting means represents a state where there is no or substantially no internal force pertaining to the diffusion limiting means, or a state of maintaining a state of contracting where the diffusion limiting means is crushed during receiving the compressing load greater than the internal force despite of presence or absence of the internal force. Further, the contraction is performed when gas is not injected, when the vessel is carried into a dock and when cooperation with injecting of gas is performed as control.

With such a configuration, the diffusion limiting means is expanded by applying a prescribed internal force. This can prevent bubbles from being diffused around the bottom of the vessel caused by a sudden inclination of the hull owing to influences of rolling by normal sailing (including sailing in a straight line and turning), waves, wind force and the like. Further, the diffusion limiting means is contracted without application of the internal force thereto, or contracted during receiving a load greater than the internal force, because the diffusion limiting means is crushed. Accordingly, in a state of contraction, when gas is not injected, the diffusion limiting means does not become a resistance. Further, under docking situations, the diffusion limiting means is crushed by receiving the compressing load from the supporting stage such as blocks. Accordingly, the diffusion limiting means does not become an obstacle, the vessel can be fixed, and no influence exerted on operation such as a repair of the bottom of the vessel.

On the other words, in comparison with the case of the end plate not retractable as in the above Patent Document 16, and with the end plate that is not transformable according to the internal/external force, in this configuration, retraction by reducing the internal force when it is unnecessary in sailing reduces the frictional resistance, while also serving as stabilization means by increasing the internal force and protruding when stability of the vessel is required. When the bubbles are injected, the effects of diffusion limitation and of the stabilization means can be acquired at the same time. Further, transformation is automatic according to pressure. A deep waterline causes contraction (small amount of bubbles), and an inclination causes expansion at the risen side, thereby preventing air from escaping.

The configuration in claim 11 may further includes limiting flow generation means for generating a flow limiting diffusion of bubbles injected from the gas outlet. The limiting flow generation means is provided as the bubble condition control means.

The bubbles generated by the injected gas receive an influence owing to buoyancy by a starboard and port inclinations of the hull. Accordingly, diffusion can be suppressed by blocking the moving direction of bubbles by the diffusion limiting means. On the other hand, as described above, the diffusion limiting means may be a solid plate-like object or an object expanded using elastic material. Without limitation thereto, the object may be a pseudo wall formed by injecting liquid at a prescribed flow velocity. More specifically, the limiting flow generation means capable of generating the pseudo wall by the flow of liquid is arranged in the hull in the proximity of the bottom of the vessel, thereby allowing this technical idea to be realized.

With such a configuration, the limiting flow generation means generates the flow of liquid having a prescribed extent and a thickness dimension. This forms a so-called pseudo wall (end plate), blocks the bubble diffusion path, and suppresses the bubble diffusion generated by the inclination of the vessel, thereby allowing the bubbles to flow while being retained in the proximity of the hull. Further, the limiting flow generation means is arranged in the bottom of the vessel so as not to protrude. This prevents the limiting flow generation means itself from becoming a resistance, and negates the need for considering the positions of blocks in consideration of the limiting flow generation means under docking situations, thereby negating the operational obstruction.

For example, a pump is used in order to generate such a limiting flow. It is preferable that the direction of the limiting flow be, for example, a direction substantially orthogonal to the bottom of the vessel. For example, if the flow rate of the limiting flow is proportional to the inject rate of bubbles, limiting flow is generated more efficiently. Further, for example, when the vessel is inclined, a control may be performed such that the limiting flow is generated more at a shallow area. Together therewith/alternatively thereto, the flow rate of the limiting flow may be controlled according to the vessel velocity. This can effectively prevent the bubbles from being diffused, and prevent the limiting flow generation means itself from being a resistance.

The configuration in claim 11 may further include a convolvement prevention structure that prevents bubbles from being convolved into the propelling device of the vessel and is provided on a stern side after the gas outlet at least on the bottom of the vessel as the bubble condition control means.

The convolvement prevention structure represents structural measures for preventing bubbles from being convolved into the propeller means, indicates all structures effectively preventing bubbles from being convolved into the propeller means, such as a protuberance having an after-mentioned curved surface, including a V-shaped mound, a fin structure, a bubble protection and a porous, and preferably is a structure where increase in resistance is small as the vessel is propelled.

With the above configuration, the convolvement prevention structure arranged at least on the bottom of the vessel after the gas outlet causes the bubbles blown by the gas supply or charged air means and injected from the gas outlet to escape so as not to be convolved into the propeller means. More specifically, the bubble convolvement prevention structure can prevent the bubbles from being convolved into the propeller means and the like and becoming an obstruction against maneuvering, without receiving influences owing to waves and currents. In particular, according to the mound and fin structures, the shape can prevent convolvement. Accordingly, an event that the function is impaired owing to a failure and the like is not required to be considered. The prevention of bubble convolvement can always be realized.

The configuration in claim 11 may further include bubble drawing means for drawing at least bubbles provided after the gas outlet and before a propelling device of the vessel, as the bubble condition control means, wherein the drawn bubbles are discharged to the outside.

Here, the bubble drawing means represents what is operated using a dedicated power, such as a blower drawing the bubbles, a compressor, a pump drawing water in which bubbles are mixed, and an ejector and what uses existing facilities of the vessel.

With the above configuration, the bubbles injected from the gas outlet are drawn by the bubble drawing means arranged before the propeller means such that the bubbles are not convolved into the propeller means. The drawn bubbles are discharged to the outside where there is no influence owing to the propeller means. According to this, although, in a case of the configuration that recirculates the drawn bubbles as disclosed in National Publication of International Patent Application No. 2001-524421, recirculation causes decrease in temperature and reduction in viscosity is not expected, this configuration discharges the bubbles to the outside and thereby does not decrease the temperature and reduction in viscosity can be expected, in contrast to that.

The configuration in claim 11 may further include bubble convolvement detection means for detecting convolvement of bubbles into a propelling device of the vessel, as the bubble condition control means, wherein a inject condition of the gas outlet and/or an operating condition of the propelling device is changed when the bubble convolvement detection means detects convolvement of bubbles.

Here, the bubble convolvement detection means generally represents a sensor that detects variation in driving force of the propeller owing to convolvement of bubbles into the propeller means as variation in thrust force or torque of the propeller drive shaft, a vibration sensor that detects vibration generated at the propeller means by convolvement of bubbles, an acoustic sensor that detects sounds generated by convolvement of the bubbles and variation thereof, and imaging means that detects convolvement of the bubbles as images by a video camera and the like.

With the above configuration, when the bubbles injected from the gas outlet are convolved into the propeller means, the inject condition of the gas outlet and/or the operating condition of the gas supply or charged air means are changed, thereby reducing the convolvement of the bubbles into the propeller means.

Previously, there is no idea that detects convolvement of bubbles and performs control based thereon. However, this configuration is also capable of detecting occurrence of cavitations and thereby effectively taking measures. In this case, a detector detecting variation in thrust force or torque, a detector detecting vibration, a detector detecting generated sounds, imaging means, a ultrasonic sensor, a pneumatic sensor and the like, can be adopted as the bubble convolvement detection means. Further, control on the propeller side, and control on injecting of gas (control on the rate, the direction, and the number of working nozzles), and a combination of both and the like, can be adopted as control method.

In order to solve the problems, a frictional resistance reduction device for a vessel corresponding to claim 18 of the present application includes: a vessel; a plurality of gas outlets injecting bubbles at least to the bottom of the vessel; gas supply or charged air means for blowing pressurized gas to the plurality of gas outlets via a path; gas control means for controlling injecting of the pressurized gas from the gas outlets; and a control device that adjusts the gas control means according to a condition of navigational condition detection means for detecting a navigational condition of the vessel and/or the vessel conditions determination means and performs control of starting/stopping injecting gas from the gas outlet.

Here, the vessel conditions determination means generally represents means, apparatuses and equipment for determining situations where the vessel resides in a broad sense, such as operating conditions of the engine of the vessel, the specific fuel consumption of the engine, a GPS (Global Positioning System) detecting which waters and location the vessel resides in, a gyro, a radar, an amount of freight measurement. The navigational condition of the vessel represents physical quantities varying according to navigation of the vessel (the relative velocity between water and the hull, height of waterline of the vessel, inclination of the hull, shear force acting on the hull, depth of water in the navigational region, etc.) owing to influences of waves, currents, wind directions, wind force, the waterline of the vessel and the like. The vessel conditions represent conditions grasped by means of determining the conditions where the vessel resides, such as engine operating conditions, specific fuel consumption, a GPS, a gyro, a radar, an amount of freight measurement.

In the above case, starting/stopping conditions may include cases where waves become weaker/stronger, currents become weaker/stronger, winds become weaker/wilder, the relative velocity become higher/lower, the waterline becomes lower/higher, the shear force becomes stronger/weaker, the depth of water becomes deeper/shallower, the engine starting up/in stop operation, the specific fuel consumption becomes worse/better, leaving/approaching a port, and another vessel leaving/approaching.

Conditions for controlling the amount of bubbles may include control that increases/decreases the amount according to the relative velocity becomes higher/lower, the waterline becomes lower/higher, the shear force becomes stronger/weaker, and the depth of water becomes deeper/shallower.

Methods (and advantageous effects) of starting/stopping include preliminarily operating the gas supply or charged air means and then opening the valve/preliminarily closing the valve and then stopping the gas supply or charged air means (preventing seawater from coming in the air supply pipe), opening/closing at a prescribed relative velocity (injecting gas at a relative velocity having frictional reduction effect), and stopping when entering a port/opening when leaving the port (preventing eutrophication).

With such a configuration, the navigational condition detection means detects the navigational condition of the vessel and/or the vessel conditions determination means determines the situations where the vessel resides and the device adjusts the gas adjustment means on the basis of the detection result and/or the determination result, injects gas from the gas outlet and stop the injecting, thereby effectively controlling injecting of bubbles according to the navigational conditions and the vessel conditions. With respect to this point, previously, there is no concept that adjusts the gas adjustment means according to the navigational conditions of the vessel and/or the vessel conditions and performs control that starts/stops injecting of gas. With the adjustment of the gas adjustment means according to the navigational conditions of the vessel and/or the vessel conditions in the configuration, injecting of air is started/stopped responsive to the navigational conditions of the vessel, such as waves, currents, the wind direction, wind force, the draft of the vessel, and the vessel conditions, such as engine operating conditions and specific fuel consumption. This exerts advantageous effects, such as prevention of noise and prevention of adverse influences to fishing boats and ports, in addition to an energy consumption effect.

In the configuration corresponding to the embodiments of the present invention, when the navigational condition detection means and/or the vessel conditions determination means detects/determines that the vessel is stopped, the gas supply or charged air means may be stopped.

Methods (effects thereof) of stopping the gas supply or charged air means may include stopping after stopping the valve (preventing seawater from coming in), stopping before stopping the engine (stopping before power-down of the electric generator and stopping the turbocharger), stopping simultaneously with the stop of the engine (operating together with the turbocharger), stopping after unloading of the freight (adjustment of the draft).

With such a configuration, when it is detected/determined that the vessel is stopped, the control device stops the gas supply or charged air means to stop the injecting of gas from the gas outlet. In a case of using the turbocharger, injecting of gas may be stopped in a linked manner to the stop of the turbocharger accompanying a stop of the engine. Further, the injecting is stopped by determining a stop of the vessel. This can prevent navigational condition detection means from performing erroneous detection owing to residence of bubbles at the hull accompanying a stop of the vessel (measurement of the depth of water when entering a port, etc.).

In configurations corresponding to the embodiments of the present invention, the navigational condition detection means may be a relative velocity detector detecting a relative velocity between the hull and the water, and adopt a configuration where the number of gas outlets and/or the inject rate of gas are increased or decreased according to increase or decrease of the relative velocity.

The systems of the relative velocity detectors (sensors) may include an ultrasonic system, an electromagnetic system, and a laser system. When the relative velocity detector is used for an air-lubricated method, a lot of bubbles intervene at the surface of the sea, thereby allowing measurement to be more accurate because of diffused reflection in cases of the laser system and the ultrasonic relative velocity sensor.

With such a configuration, the number of nozzles and/or the inject rate of gas are controlled according to increase and decrease of the relative velocity between the hull and a water system, such as seawater or river water, instead of an absolute ground velocity of the vessel. Because the control is performed according to detection of the relative velocity, the control becomes more accurate than that using a displacement, kinetic, acceleration sensors. Further, the relative velocity sensor can be shared for another use such as measurement of currents.

In the configurations corresponding to the embodiments of the present invention, the navigational condition detection means may be a draft detector detecting the draft of the vessel, and adopt a configuration where the number of gas outlets and/or the inject rate of gas are increased or decreased according to the height of the waterline.

The draft of the vessel can be shared for used for managing the amount of freight. In principle, it is controlled such that injecting of gas is available when the pressure of the pressurized gas and/or the exhaust gas is equal to or more than that at the draft, and injecting of gas is stopped when the pressure of the pressurized gas and/or the exhaust gas is equal to or less than that at the draft. Because this control appropriately injects gas, the seawater does not cause backflow.

In the configurations corresponding to the embodiments of the present invention, the navigational condition detection means may be an inclination detector detecting an inclination of the hull, adopt a configuration where the number of working gas outlets laterally arranged on the vessel and/or the inject rate of gas is controlled according to the inclination.

The inclination detector can be used for another application for the vessel (e.g., the air inject rate of air is decreased or stopped when freight conditions are verified and when variation in inclination is large, etc.).

With such a configuration, the gas adjustment device is controlled according to the degree of inclination of the hull detected by the inclination detector. Because the number of gas outlets and/or the inject rate of gas is appropriately adjusted when turning and rolling, the bubble diffusion conditions are appropriately controlled by decreasing the number of working nozzles where gas is injected at a shallow side of the inclination and increasing the number of working nozzles where gas is injected at a deep side of the inclination when the vessel is inclined, thereby allowing effectiveness in frictional resistance reduction to be improved.

In the configurations corresponding to the embodiments of the present invention, the navigational condition detection means may adopt a configuration of being attached to a spot at least without receiving influences of the bubbles.

The navigational condition detection means includes what is arranged at a prescribed part of the hull facing water, such as a depth sounder measuring a depth of water at a navigational region. A principal object of the present application is to reduce the frictional resistance by causing bubbles injected from the gas outlet to flow around the bottom of the vessel while retaining the bubbles therearound. The inject condition of gas is controlled on the basis of the various types of detection results from the navigational condition detection means. Accordingly, optimization of the detection condition improves the reliability of the detection result, forms a desired inject condition and thereby improves the reduction in frictional resistance.

With such a construction, the position where the navigational condition detection means facing water is arranged at a position without receiving influences of the injected gas. More specifically, the position is a spot where the navigational condition detection means is not covered with gas during detection, gas does not come into a detection region and a stable detection condition can be maintained. This allows a desired detection result to be reliably acquired. Because attachment of the navigational condition detection means does not receive influences owing to bubbles, fouling of marine organisms is a little, which can prevent unexpected failures, malfunctions, accidents and the like owing to the fouling from occurring. Systems of the navigational condition detection means include a relative velocity detector, a draft detector and an inclination detector. When any one of these is used, attachment on the position without receiving influences of bubbles can be performed.

In the configurations corresponding to the embodiments of the present invention, a configuration may be adopted that the path is raised on or above the waterline and then connected to the gas outlet.

With this configuration, the piping passes at a height equal to or above the waterline. This can prevent seawater from coming into the gas outlet arranged on or below the waterline, thereby allowing security of the main engine to be further increased.

That is, a heavy main engine (in a case of using a turbocharger) and the gas supply or charged air means can be arranged on or below the waterline while backflow of water is prevented, thereby improving stability of the vessel. In this case, the backflow of water can be prevented in a threefold manner by a structure where the path is raised once at the waterline or higher and then connected to the gas outlet, a structure with open and close means arranged before the gas outlet, and a structure of cooperation with a valve arranged after the turbocharger and the gas supply or charged air means.

In the configurations corresponding to the embodiments of the present invention, a configuration may be adopted that the path is blocked at the proximity of the gas outlet when injecting of the pressurized gas and/or the exhaust gas is stopped.

Blocking of the path includes, for example, a manner where an open/close valve, which passes and blocks the air supply pipe connected to the gas supply or charged air means and the gas outlet, opens always at least during gas supply or charged air and closes when gas supply or charged air is stopped. The operation of opening and closing can be realized by a gate value that open and closes the fluid path by operation of a disc-shaped valve body stored in a valve box of the valve in a right angle with respect to the fluid path, a stop valve capable of adjusting the flow rate by closing the valve body stopping the flow of the fluid, a check valve that unidirectionally maintains the fluid and prevents backflow or the like. The open/close can be performed manually or automatically according to control on the basis of a predetermined condition on sailing.

According to this configuration, provision of the configuration blocking the path allows the path to be blocked when gas supply or charged air is stopped, or gas does not pass. This can prevent backflow of water in the air supply pipe. Further, without contact with water, corrosion in the air supply pipe, and fouling owing to adhesion and reproduction of algae and shellfish, such as barnacles and oysters, can be prevented. Moreover, since the opening is closed when bubbles are not injected, increase in frictional resistance can be suppressed.

In this case, a method can be considered for the control of blocking the path. This method blocks the path in the proximity of the gas outlet, first. Next, the bypass valve is closed and subsequently the turbocharger is stopped. A pressure is thus reserved in the piping path. Accordingly, intrusion of water can further be prevented.

Advantages of the Invention

According to the present invention, bubbles are injected from the plurality of gas outlets arranged at the bottom of the vessel, by controlling the plural pieces of gas supply or charged air means provided corresponding to the respective gas outlets, according to the navigational condition. Therefore, rise of bubbles can be inhibited by the bottom of the vessel itself, the bubble retention effect can be maintained, and the frictional resistance can effectively be reduced by a small amount of bubbles, in comparison with an arrangement only at the sides of the vessel. Further, the case of arrangement only on the sides of the vessel, since the depth of water is shallow, influences of waves cannot be ignored when the vessel is used in the ocean. However, at the bottom of the vessel, the influences of waves are alleviated. This allows bubbles to be stably injected, thereby effectively exerting the frictional resistance reduction effect. One piece of gas supply or charged air means are correspondingly provided with respect to one gas outlet. Accordingly, injecting of bubbles can easily be controlled with respect to each separate gas outlet, and the problem of variation in inject rate of bubbles owing to waves can also be alleviated. Further, the condition of gas supply or charged air can be controlled according to the detection result from the navigation detection means. Accordingly, the injecting of bubbles can finely be controlled according to the navigational condition in comparison with a case of constantly injecting gas. A further frictional resistance reduction effect can thus be expected.

Further, according to the present invention, the gas supply or charged air from the gas outlets symmetrically arranged with respect to the planar center line of the hull is symmetrically controlled according to the detection result from the navigational condition detection means. Accordingly, in particular, when the vessel is sailing in a straight line, a uniform frictional resistance reduction effect can be expected. This can prevent the ability to hold a straight line from being impaired owing to the injecting of bubbles. Further, control is symmetrically performed on the laterally arranged gas outlets. Accordingly, the control can be performed by means of circuits with the laterally same configurations, the same circuit, or output from the same port. This allows the control to be simplified and can facilitate rationalization of the circuits.

Further, according to the present invention, the gas supply or charged air means is arranged on the top of the hull and the gas from the gas supply or charged air means is guided into the bottom of the vessel via the air supply pipe. This can reduce variation in inject rate of bubbles along with variation in pressure owing to influences of waves in a case of use in the ocean, by a buffer effect due to the volume of the air supply pipe. This indicates that, because the air supply pipe has a considerable volume from the top of the hull to the bottom of the vessel, the gas intervening in this volume space is alleviated by a resiliency effect when being compressed and decompressed, and variation in pressure in the gas outlets owing to variational height of the waves are reduced. Further, bend of the path at the bottom of the vessel at the right angle causes an effect that the gas changes the direction and two-dimensionally spreads. However, the gas is guided into the gas outlet. This can solve the problem of impairing the distribution of velocity of flow of gas at the gas outlet, particularly in the direction parallel to the bottom of the vessel.

Further, according to the present invention, a plurality of perforated plates having pluralities of apertures are arranged in series such that the positions of apertures are displaced, and configures the gas outlet. Accordingly, the plurality of perforated plates cause the flow of gas to be bent, and can exert a so-called baffle plate effect. This baffle plate causes an effect that the plurality of displaced perforated plates provide resistance, and is capable of injecting gas from the gas outlet in a uniform state. Further, this allows the plurality of perforated plates having the same aperture pitch to be utilized, and manufacturing economies of scale can be expected in view of in view of industry, thereby enabling a product to be provided at low cost.

Moreover, according to the present invention, the gas supply or charged air means may be the positive-displacement gas supply or charged air device. This enables the gas to be blown more stably, in view of a problem of injected amount of bubbles along with variation in pressure at the gas outlet owing to influences of waves caused in case of using in the ocean and a problem of variation in pressure acting on the gas outlet along with the amount of freight, that is the height of waterline. As a result, this can prevent impairment in frictional reduction effect along with variation in the injected amount of bubbles owing to variational height of waves and the height of the waterline. When the wave is high, the apparent waterline becomes deeper, and the frictional resistance tends to increase. Accordingly, the reduction in frictional resistance by bubbles is expected. However, the conventional method increases the pressure at the bubble nozzle. Accordingly, there is a phenomenon that the amount of bubbles is conversely decreased. Further, when the amount of freight is increased and the waterline is deepened, the contact area of the hull is increased. Thus, further reduction in frictional resistance is expected. However there is a problem that the amount of bubbles is also decreased. In view of these phenomena, the positive-displacement gas supply or charged air device is used; the gas supply or charged air devices are used for the respective gas outlets; the gas outlets are arranged at the bottom of the vessel. Accordingly, this enables a stable amount of bubbles to be injected without receiving influences of waves and the draft.

Further, according to the present invention, the plurality of gas outlets are arranged along the fore shape of the bottom of the vessel. This enables the gas to be injected, without making vacant and useless surface at the bottom of the vessel. Accordingly, the frictional reduction effect can be further improved. In particular, the bottom of the vessel at the bow section corresponds to a distal end of a so-called boat shape. The plurality of gas outlets are laterally arranged at this portion, and the injecting of gas is controlled. Accordingly, in particular, when the relative velocity of the vessel is slow or the waterline is shallow, the bottom of the vessel can evenly be covered with a small amount of bubbles, and the sides of the vessel can be covered with bubbles rising in the water, thereby allowing the effect of reduction in frictional resistance to be further improved.

Moreover, according to the present invention, the gas adjustment means adjusts and injects gas from the plurality of gas outlets arranged at least at the bottom of the vessel, according to the detection result from the navigational condition detection means detecting the navigational condition of the vessel. Therefore, rise of the bubbles can be inhibited by the bottom of the vessel itself, the bubble retention effect can be maintained, and the frictional resistance can effectively be reduced by a small amount of bubbles, in comparison with an arrangement of the gas outlets only on the sides of the vessel. In particular, a case where influences of waves and the draft is considered, the gas outlet at the bottom of the vessel is mainly used, and these influences can be alleviated. Further, injecting of bubbles can easily be controlled by the gas adjustment means with respect to each separate gas outlet. In particular, in a case of use in the ocean, the problem of variation in inject rate of bubbles owing to waves can also be alleviated by predicting variation in pressure and adjusting the blowing gas. Moreover, the gas adjustment means can control the blowing condition according to the detection result from the navigation detection means. Accordingly, the injecting of bubbles can finely be controlled according to navigational situations in comparison with a case of uniformly injecting gas, and further frictional resistance reduction effect can be expected.

Further, according to the present invention, the relative velocity detector detects the relative velocity between the hull and water, and the number of working gas outlets and/or the inject rate of gas are increased and decreased according to increase and decrease in relative velocity. Accordingly, frictional resistance can finely be reduced according to the navigational condition of the vessel. The reduction in frictional resistance is determined by the relative velocity between currents in the ocean or the water flow in the river and the hull, instead of a ground velocity where the navigational speed of the vessel is by use of the GPS or a beacon. Therefore, the number of working gas outlets and/or the inject rate of gas are increased when the relative velocity is large on the basis of the hull and the water. The number of gas outlets and/or the inject rate of gas are reduced when the relative velocity is small. This allows the net reduction effect of the frictional resistance to be increased.

Moreover, according to the present invention, the relative velocity detector is attached to a spot of the hull without receiving influences of waves and/or bubbles. Accordingly, in particular, this can prevent error from being generated in the relative velocity of the vessel used in the ocean. For example, various types, such as an ultrasonic system, an electromagnetic system and a heat wave system, can be considered as the relative velocity detector. However, any one of these causes an error, with intervention of bubbles and also with influences of waves. Accordingly, attachment of the relative velocity detector to the spot without these influences can eliminate the error, and realize an appropriate control of injecting gas.

Moreover, according to the present invention, by means of the draft detector detecting the draft of the vessel, responsive to the height of waterline, the number of working gas outlets and/or the inject rate of gas is increased and decreased. Thus, the frictional resistance can finely be reduced according to the navigational condition of the vessel. More specifically, when the amount of freight to the vessel is large, the waterline rises (becomes deeper). In this case, the contact area of the hull with water is increased. In this case, increase of the number of working gas outlets and/or the inject rate of gas can reduce the frictional resistance more effectively. In contrast, in a state where the amount of freight is small, the balance is maintained by ballast water, and the waterline is lowered (becomes shallower), decrease of the number of working gas outlets and/or the inject rate of gas can reduce the net frictional resistance with maintaining the balance without use of power of the drive device in vain.

Further, according to the present invention, the inclination of the hull is detected by the inclination detector and the number of working gas outlets laterally arranged on the vessel and/or the inject rate of gas are controlled. Therefore, the frictional resistance can effectively be reduced without using the power in vain when the vessel is turning and rolling. More specifically, in a state where the one side of the bottom of the vessel is raised owing to turning or rolling, the contact area of the hull with water becomes smaller on the raised side than that of the opposite sunk side. Accordingly, in order to appropriately distribute injecting of gas, it is preferable that the number of working gas outlets and the inject rate of gas be decreased on the risen side, and increased on the opposite side. In this case control is performed only on the number of working gas outlets, or only on the inject rate of gas, or on both of them simultaneously. In any event, inclination detector detects the hull and the gas adjustment means adjusts the injecting of gas, thereby allowing the net frictional resistance to be reduced automatically and appropriately without using power in vain.

Further, according to the present invention, the gas adjustment means performs adjustment at least on the plurality of gas outlets injecting bubbles to the bottom of the vessel and controls starting/stopping injecting gas according to the navigational condition of the vessel and/or the vessel conditions. In particular, in a case of the frictional resistance reduction effect by injecting gas cannot be expected, the injecting bubbles is stopped. In a case of the reduction effect can be expected, bubbles are injected. This prevents the power from being used in vain, and can effectively reduce the net frictional resistance. The frictional resistance at the hull is substantially proportional to a square of the relative velocity between the hull and water. Accordingly, if the relative velocity between the hull and water is decreased, the frictional resistance is suddenly decreased, and the power and energy consumed by the gas supply or charged air means become larger than the frictional reduction effect. In such a case, it is desirable to stop injecting of gas from a systematical standpoint. Accordingly, when the velocity becomes equal to a prescribed velocity or less, and when approaching a port, the injecting of gas is stopped. When the velocity becomes the prescribed velocity or more, and when a prescribed time elapsed after departing the port, the injecting gas is started. These determinations are made by the navigational condition detection means and/or the vessel conditions determination means, and the injecting of bubbles are started/stopped. This enables the control to be appropriately performed.

Further, according to the present invention, when it is detected/determined that the vessel is stopped, the gas supply or charged air means is stopped, and injecting bubbles from the gas outlet is stopped, the gas supply or charged air means blowing gas can be stopped if the reduction in frictional resistance is not required. This negates use of power and energy consumption in vain, and can realize a frictional resistance reduction device for a vessel that has systematically high energy efficiency and is economic.

Moreover, according to the present invention, the gas is injected from the gas outlet, and a plurality of end plates are arranged in an aft direction at substantially ends of the bottom of the vessel in a longitudinal direction. Accordingly, the injected bubbles can flow along the bottom of the vessel over the entire bottom of the vessel in the water. This allows the frictional resistance to effectively be reduced. The operation of the end plate can prevent the bubbles from being distributed to a part with lower water pressure, even when the vessel is inclined owing to disturbance such as waves and flows. This can stably facilitate reduction in frictional resistance.

Further, according to the present invention, the plurality of end plates are substantially symmetrically arranged along with the planar shape of the bottom of the vessel. This can substantially prevent (the group of) the end plates from being a resistance impeding the sailing of the vessel. Moreover, this allows the gas outlets to be arranged along with the front planar shape of the bottom of the vessel to the front most surface in the proximity of the bow section, thereby facilitating reduction in frictional resistance over the entire bottom of the vessel.

Further, according to the present invention, (the group of) the end plates is made into a shape analogous to the planar shape of the bottom of the vessel, thereby enabling the effect of retaining bubbles to be further improved.

Moreover, the present invention may adopt a configuration where the end plate is defined by a substantially triangular profile whose base is at the bottom of the vessel or a curve such as a quadratic function curve. This profile allows the contact area with water to be decreased, and allows the frictional resistance owing to arrangement of the end plates to be reduced, in comparison with a case of using a flat plate. This further improves the effect of substantially avoiding the resistance of impeding the sailing of the vessel owing to (the group of) the end plates. The bubbles in the water pertaining to the injected air flow while being effectively retaining along the bottom of the vessel.

Further, according to the present invention, the fore and aft ends of the end plate have a streamlined shape at the fore and/or the aft end, and thereby minimizes the water resistance. This allows the frictional resistance owing to arrangement of the end plates to be further reduced, and the bubbles in the water pertaining to the injected air effectively flow along the bottom of the vessel.

Moreover, according to the present invention, the concave portion is formed at the bottom of the vessel in the longitudinal direction, the astern direction with reference to the gas outlet. This further improves the effect that the bubbles in the water pertaining to the injected air effectively flow along the bottom of the vessel while being retained up to the end of the concave portion of the bottom of the vessel. The effect of the concave portion can prevent the bubbles from being diffused to a part with a lower water pressure even when the vessel is inclined owing to disturbance of waves and flows, and stably facilitates reduction in frictional resistance.

Further, according to the present invention, the uneven profile whose sectional width is at least one with respect to the height in the longitudinal direction with reference to the gas outlet is formed. Accordingly, the bubbles in the water pertaining to the injected air adhere to the concave portion by the resistance. This allows the bubbles to flow while being retained up to the end of the uneven profile of the bottom of the vessel.

Further, according to the present invention, the uneven profile may have a profile where substantially triangular shapes are laterally arranged. Since the height of the triangle is formed equal to or less than the height capable of being sufficiently covered with bubbles, the bubbles actually adhere to the concave portion pertaining to the triangle because of the differential pressure. This allows the bubbles to flow while being retained up to the end of the uneven profile of the bottom of the vessel. Moreover, since the substantially triangular shapes are laterally arranged, a lot of vertices of the substantially triangular shapes exist. This facilitates operation of carrying the vessel on bases under docking situations, thereby allowing the operation to be improved.

Further, according to the present invention, the plurality of end plates arranged at substantially end portion of the bottom of the vessel in the aft direction with reference to the gas outlet also serve as stabilization means of the vessel. This further improves the effect of suppressing rolling and turning over onto the side of the vessel owing to natural phenomena and a collision object, and allows the injected bubbles to flow while being retaining up to the end of the bottom of the vessel in the water. Moreover, the effect of the plurality of end plates, which also serve as the stabilization means, makes the vessel resistant to inclination even under disturbance such as waves and flows. Even when the vessel is inclined to a certain extent, the effect by the end plates prevents the bubbles from being diffused to a part with lower water pressure, thereby allowing the frictional resistance to be stably reduced.

Further, the present invention negates the need of separately providing the stabilization means, or allows the performance, functionality and equipment of the stabilization means to be minimize, thereby enabling economic efficiency of the vessel to be improved.

Moreover, the present invention enables the equipment of the bilge keel to be saved, and allows the resistance of currents acting on the vessel to be reduced because the height of the end plate is less than that of the bilge keel.

Further, according to the present invention, bubbles injected from the gas outlet by the gas supply or charged air means driven by the drive device adhere to the surface of the bottom of the vessel by the fluid effect of a difference of steps attracting the bubbles, and can flow over the entire bottom of the vessel while being retained, thereby allowing the reduction effect of the frictional resistance to be improved.

Further, the present invention enables the bubbles injected from the gas outlet to be drawn by bubble drawing means at the position where the bubbles leave the bottom of the vessel and start diffusion. This can avoid diffusion of bubbles in the water.

According to the present invention, bubble is supplied by the gas supply or charged air means and bubbles are injected from the gas outlet arranged at the bottom of the vessel.

Therefore, rise of the bubbles is suppressed by the bottom of the vessel itself. This allows the bubble retention effect to be maintained, and enables the frictional resistance to be effectively reduced by a small amount of bubbles. In particular, in a case of using the vessel in the ocean, the influences of waves have been incapable of being ignored. However, the influences of the waves are alleviated at the bottom of the vessel, thereby enabling the bubbles to be stably injected. Moreover, the convolvement prevention structure preventing bubbles from being convolved into the propeller means allows the bubbles to escape without receiving influences of waves and currents and without being convolved into the propeller means. This can prevent the efficiency of the propeller means from being decreased, and prevent the propulsion from being decreased, and allows the net reduction effect in frictional force to be improved.

In addition to the injecting of bubbles from the bottom of the vessel, injecting from a part other than the bottom of the vessel also exerts an analogous effect. Moreover, arrangement of the convolvement prevention structure at a part other than the bottom of the vessel also exerts an analogous effect.

Further, according to the present invention, the protuberance having the curved surface, which is the convolvement prevention structure, causes the bubbles to escape, and the bubbles are never convolved into the propeller means. This can prevent the efficiency of the propeller means from being decreased, and prevent the propulsion from being decreased. Moreover, the protuberance having the curved surface can be configured as a simple structure. Accordingly, the protuberance never becomes an obstacle under docking situations. Since a flow along the bottom of the vessel smoothly changes at the protuberance having the curved surface, convolvement of bubbles can effectively be prevented without increasing the frictional resistance at the hull. Further, the streamline goes downwards at the protuberance having the curved surface, and the flow velocity below the propeller means is decreased. Accordingly, improvement in propeller efficiency can be expected.

Further, according to the present invention, the V-shaped mound, which is the protuberance and laterally spreads centered at the planar center line of the hull, can prevent bubbles from being convolved into the propeller means. This allows bubbles to effectively escape in a symmetric manner from the symmetric propeller means arranged on the planar center line. Moreover, the mound has a V-shaped form. This further improves the effect of causing the bubbles to escape, and can prevent increase in frictional resistance of the flow along the bottom of the vessel. Further, the symmetric shape facilitates manufacture.

Further, according to the present invention, the bubble protection arranged in the proximity of the propeller means prevents only bubbles reaching the proximity of the propeller means from being coming into the propeller means. This can prevent the bubbles from being convolved without impeding a flow of water into the propeller means.

Further, according to the present invention, at the bubble protection that has a plurality of apertures and arranged in a substantially V-shape, the apertures act as a resistance against bubbles in a part below the propeller means where bubbles whose distribution of velocity of flow are substantially V-shaped are easily convolved and are thereby capable of effectively preventing convolvement. Moreover, the bubble protection has a plurality of apertures, and an area above the substantially V-shaped part is vacant. Accordingly, the water flow into the propeller means is not impeded, and the propulsive efficiency is never decreased.

According to the present invention, the bubble drawing means arranged at the fore part of the propeller means draws the bubbles to be convolved into the propeller means before convolvement, and discharges the drawn bubbles to the outside, thereby causing the bubbles not to reach the propeller means. This can reliably prevent bubbles from being convolved. Further, since the bubble drawing means is arranged in the proximity of the propeller means, the frictional reduction effect by the bubbles injected to the bottom of the vessel can sufficiently be exerted.

Further, according to the present invention, in the bubble drawing means, the gas-liquid separation mechanism separates the drawn bubbles and water from each other. This prevents water from being mixed into the bubble drawing means including a blower, a compressor and a pump, thereby allowing the functionality to be stably exerted. The water separated by the gas-liquid separation mechanism can be used for another application of the vessel, such as for cooling water and an anti-rolling tank.

Further, according to the present invention, the convolvement prevention structure preventing convolvement of bubbles is arranged after the bubble drawing means. Accordingly, even if residual bubbles having not been drawn flow out of the bubble drawing means owing to various disturbances, the convolvement prevention structure causes the bubbles to escape, and can reliably prevent the convolvement into the propeller means. Accordingly, the bubble drawing means can be stopped and only the convolvement prevention structure can be operated, in a case where the amount of bubbles is small, or according to the vessel conditions or the navigational condition. This can prevent the efficiency of the propeller means from being reduced, and prevent the propulsion from being decreased, in a finer manner.

According to the present invention, when the bubble convolvement detection means detects the convolvement of the bubbles into the propeller means, the inject condition of the gas outlet and/or the operating condition of the gas supply or charged air means are changed. This can further prevent the bubbles from being convolved, and prevent the reduction in propeller efficiency to be continued. This can also prevent vibration and noise at the propeller means along with the convolvement of bubbles from being generated, thereby allowing damage of the propeller means to be reduced, and preventing the harmful effect on the vessel.

According to the present invention, when the bubble convolvement detection means detects convolvement of bubbles into the propeller means, change of the operating condition of the propeller means can increase the number of revolutions to maintain the propulsion and can decrease the number of revolutions to reduce the convolvement of bubbles if the propulsion of the propeller is decreased owing to convolvement of bubbles. Further, the operation condition is changed such that the number of revolutions is decreased for addressing vibration and noise, or the angles of blades are changed in a case of a variable-pitch propeller, thereby changing the condition into that with less influence against mixing of bubbles. This enables the influence owing to convolvement of bubbles to be reduced.

According to the present application, a part of the pressurized gas and/or the exhaust gas among the residual gas from the turbocharger can be reused as bubbles. This facilitates reduction in resistance without any need of energy for generating bubbles, thereby allowing energy consumption thereof to be reduced. Further, control where, for example, variation in vessel velocity is reflected over time can be attuned without adversely affecting the main engine. More specifically, this can prevent shortage of gas supply or charged air rate, reduction in efficiency of the main engine and deterioration of the exhaust gas owing to over drawing, and also prevent analogous events owing to too much gas from occurring. Further, effective use of the residual gas from the turbocharger and the exhaust gas from the main engine are improved as much as possible.

Further, according to the present application, optimal values can be set for the respective conditions varying over time on the basis of the scavenging gas pressure and the exhaust gas temperature, which are physical quantities allowing the operating conditions represented as the heat load on the main engine to be grasped in the most appropriate manner, and the turbocharger efficiency, which is characteristics of the turbocharger, and various operations can be automatically processed. Moreover, use of the setting values allows the energy consumption efficiency utilizing the vessel resistance reduction effect using bubbles to be automatically maximized.

Further, according to the present application, the gas supply or charged air and the scavenged gas from the turbocharger can be reused as bubbles. This facilitates reduction in resistance without any need for energy for generating bubbles, thereby allowing the energy consumption thereof to be reduced. Moreover, the gas supply or charged air bypass rate and/or the scavenging bypass rate are controlled on the basis of the physical quantity related to the heat load on the main engine and the characteristics of the turbocharger. Accordingly, a inject gas control device perfuming control in which, for example, variation in vessel velocity and the like are reflected over time can be realized, without adversely affecting the main engine. More specifically, this can prevent shortage of gas supply or charged air rate, reduction in efficiency of the main engine and deterioration of the exhaust gas owing to over drawing, and also prevent analogous events owing to too much gas from occurring. Further, effective use of the residual gas (gas supply or charged air and scavenged gas) from the turbocharger is improved as much as possible.

Further, according to the present application, the gas supply or charged air and/or the scavenged gas are heated and supplied to the gas outlet. This can reduce the water viscosity resistance, further improve the frictional resistance reduction effect of the vessel, and still further improving reduction in energy consumption.

Moreover, according to the present application, the exhaust gas from the turbocharger can be reused as bubbles. This facilitates reduction in resistance without energy for generating bubbles, thereby allowing the energy consumption thereof to be reduced. Further, the exhaust gas bypass rate is controlled on the basis of the physical quantity related to the heat load on the main engine and the characteristics of the turbocharger. This realizes a inject gas control device performing control in which, for example, variation in vessel velocity is reflected over time is realized without adversely affecting the main engine. More specifically, this can prevent shortage of gas supply or charged air rate, reduction in efficiency of the main engine and deterioration of the exhaust gas owing to over drawing, and also prevent analogous events owing to too much gas from occurring. Further, effective use of the residual gas from the turbocharger is improved as much as possible.

Further, according to the present application, the gas supply or charged air means is driven by the exhaust gas bypass from the turbocharger, and the bubbles generated from the gas supply or charged air means is used. This facilitates reduction in resistance without energy for generating bubbles, and allows the energy consumption thereof to be reduced. Moreover, in this time, the exhaust gas bypass rate is controlled on the basis of the physical quantity related to the heat load on the main engine and the characteristics of the turbocharger.

This facilitates optimization of the energy efficiency in which, for example, variation in vessel velocity and the like are reflected over time, without adversely affecting the main engine. Accordingly, the residual gas of the turbocharger can effectively be used as a driving source of the gas supply or charged air means.

Further, according to the present application, the exhaust gas bypass from the turbocharger drives the electric generator in the gas supply or charged air means. The electric power from the electric generator drives the blower. The bubbles generated from the blower are used. Accordingly, the residual gas that includes high pressure and high temperature gas and has a high energy value is effectively reused for a source of electric generation, among residual gases. Moreover, the blower is driven by the electric power. This facilitates control of the number of revolutions and, in a case of plural arrangements, operations where the numbers of revolutions are differentiated.

Moreover, according to the present application, the exhaust gas bypass from the turbocharger drives the turbine in the gas supply or charged air means. The drive at the turbine (e.g., a coaxial configuration) drives the blower. The bubbles generated by the blower are used. Accordingly, the residual gas that includes high pressure and high temperature gas and has a high energy value can be effectively reused for the direct driving source of the blower, among residual gases. In particular, the drive by the turbine directly drives the blower, thereby increasing efficiency of conversion.

Further, according to the present application, the piping path is arranged at above the waterline and then connected to the gas outlet on or below the waterline. This can prevent backflow of seawater from the gas outlet, thereby allowing the security of the main engine to be further secured in view of the device.

Moreover, according to the present application, the gas pressure is made to adaptively vary with respect to the plurality of piping path (system) arranged for the respective gas outlets symmetrically arranged. This enables the injecting of bubbles from the nozzles arranged at a shallow spot and the nozzles arranged at a deep position to be substantially uniformly controlled even in a case under rolling conditions (rolling) of the vessel.

Further, according to the present application, starting/stopping supplying the pressurized gas and/or the exhaust gas to the gas outlet is controlled by adjusting the pressurized gas rate adjustment means and/or the exhaust gas rate adjustment means, according to the pressure of the pressurized gas and/or the exhaust gas and the draft of the vessel. The control of the adjustment means enables the supply to be started when a sufficient condition for injecting bubbles is realized, and enables the supply to be stopped when the condition becomes insufficient. This allows the gas supply or charged air at an appropriate inject condition. An event of backflow of seawater into the main engine can be prevented.

Moreover, according to the present application, drawing rates of pressurized gas and/or the exhaust gas are controlled on the basis of the physical quantity related to the heat load on the main engine and the characteristics of the turbocharger. This can continuously optimizes, as a device, the energy efficiency pertaining to reduction in resistance by use and generation of bubbles by the exhaust gas, from the starting of the operation of the engine, and then operation and to the stopping of the engine, without adversely affecting the main engine.

Moreover, according to the present application, the path is blocked properly. This minimizes a possibility of a dangerous event that seawater comes into the main engine against the intention.

According to the present application, the variable means are controlled whenever necessary. This can always optimize the condition of the inflow gas flowing into the turbocharger, and improve the gas supply or charged air characteristics. For example, the inflow condition (direction, pressure, velocity, etc.) of the gas is controlled by means of a certain variable varying according to increase and decrease of the exhaust gas rate. Accordingly, the turbocharger operates without receiving a strong influence of the rate of the inflow gas flowing into the turbocharger. Therefore, the pressurized gas can preferably supplied to the main engine without reducing the turbocharger efficiency, thereby maintaining the overall efficiency of the main engine in a prescribed extent. Further, the inject condition (e.g., direction, inject rate, velocity, etc.) of the gas is controlled. This can minimize influences received from the navigational condition and the like, inject the gas to desired regions and positions in the proximity of the hull. That is, a preferable frictional resistance reduction effect is acquired, useless injecting of gas is prevented, and the energy efficiency is improved. Moreover, the gas is controlled by the limiting means having a transformable shape in order to maintain the effect pertaining to the highly efficient injecting of gas for a long time. This can prevent diffusion owing to the influence of the navigational condition, and realize reduction in frictional resistance more preferably. Further, this also allows the maintenance to be easily performed. Therefore, an integrated combination of these allows energy saving in the entire sailing of the vessel.

Further, according to the present application, a prescribed variable part pertaining to the variable nozzle is controlled responsive to the conditions of the pressurized gas derived from between the turbocharger and the main engine and/or the exhaust gas. This allows the inflow condition into the turbocharger to be optimized, irrespective of increase or decrease of the drawing flow rate pertaining to the pressurized gas or the exhaust gas. Therefore, the pressurized gas can preferably be supplied to the main engine without decreasing the turbocharger efficiency. That is, highly efficient drive of the turbocharger can be realized, thereby allowing the main engine efficiency to be maintained within a prescribed extent.

Moreover, according to the present application, the inject conditions, such as the direction in which the gas is injecting according to the navigational condition, the inject rate and the velocity, can be controlled. This allows the injecting region, amount, time period, timing and the like of the gas injected in the proximity of the hull to be preferably specified. For example, the hull is inclined in various directions by receiving forces transversely and slantly owing to waves and currents. However, the inclination is detected as the navigational condition, and the inject condition is controlled responsive to the inclination, thereby allowing the optimal frictional resistance reduction effect to be acquired.

Moreover, according to the present application, the limiting means for limiting the diffusion of gas is configured to be retractable. Accordingly, the limiting means is retracted in cases where the limiting means can be a navigational obstacle, such as a case where the vessel without injecting gas is sailing in shallow waters, and a case where the hull is fixed under docking situations. This can prevent the limiting means from being an obstacle or a load on operation. Therefore, energy-saving measures can be taken on sailing by retracting the limiting means. In a case other than that on sailing, the limiting means does not become an obstacle, thereby allowing the working efficiency to be improved.

Further, according to the present application, the variable nozzle improving the gas supply or charged air characteristics of the turbocharger can control the opening/closing degree of the vane, the aperture setting and the like, responsive to increase and decrease of the bypassed pressurized gas and the exhaust gas rate. This allows the inflow condition of the exhaust gas supplied to the turbocharger to be preferably controlled. Moreover, in the control of the variable nozzle, the control is performed according to the pressurized gas and exhaust gas drawing rates, physical quantity related to the heat load on the main engine, and the characteristics of the turbocharger, thereby enabling the control to be performed in consideration both of the drawing of the pressurized gas or the exhaust gas and the condition of the main engine. Accordingly, the pressurized gas can preferably be supplied to the main engine without deteriorating the characteristics of the turbocharger. The pressurized gas and the exhaust gas can be drawn while the overall efficiency of the main engine is maintained within a prescribed extent. The effect of variable nozzle improves the characteristics of the turbocharger in cases where light or heavy load other than the standard load is applied. This enables the bypass rate of the pressurized gas and the exhaust gas to be drawn more.

Moreover, according to the present application, the scavenging gas pressure and the exhaust gas temperature, which are necessarily utilized as physical quantities for grasping the operating condition of the main engine, is used, and the control is performed on the basis of the turbocharger efficiency as the characteristics of the turbocharger, thereby enabling the variable nozzle to be optimally controlled responsive to various conditions varying over time. Further, existing detection means and the like can be used. Operations corresponding to the load on the main engine can automatically be processed.

Further, according to the present application, the inject condition can be controlled, responsive to the detection result of the navigational condition detection means, in consideration of the condition of bubbles after injecting, before injecting the gas, which is supplied from the gas supply or charged air means, into the proximity of the hull. This allows the gas to be injected in a manner more analogous to a desirable one. Moreover, the navigational conditions varying according to various scenes of the vessel that can appear on sailing can be detected as numerical information by the navigational condition detection means, and the detection result can be supplied as information to another device and the like.

Moreover, according to the present application, the inject rate and the inject direction injected from the gas outlet can be controlled according to the navigational condition. For example, in cases of big waves, strong winds and turning of the vessel, the inject direction of gas is preliminarily be adjusted according to the direction and inclination of the bottom of the vessel, thereby allowing the frictional resistance to be efficiently reduced. Further, the inject rate of gas may be adjusted to be small, standard and large amounts, according to the navigational conditions, such as cases of a slow speed in a port and the like and cruising on sailing. The inject direction may be adjusted in the center direction with respect to the bottom of the vessel and gas is locally injected therein. Instead, the gas may be injected substantially parallel thereto. This enables the inject condition of gas to be arbitrarily operated according to the navigational condition of the vessel, allows the frictional resistance to be reduced, thereby enabling the energy consumption rate to be further improved.

Further, according to the present application, since the gas outlet does not protrude, the gas outlet does not become a navigational resistance of the vessel. More specifically, there is no part that receives the water resistance and increases the degree of resistance by adhesion of algae and the like. This facilitates further reduction in frictional resistance to be generated on sailing. Moreover, this does not become a load or an obstacle or operation under docking situations either. For example, when the hull is mounted on the blocks and the like where the hull is fixed, the gas outlet has no protrusion. Accordingly, the same plane with substantially same degree of height as that of the bottom of the vessel can be configured. Therefore, there is no need to consider damage and the like owing to concentration of stress. Further, when the bottom of the vessel is repaired, the inject nozzle can be dealt with as with another part. Accordingly, the working efficiency is not decreased either. Therefore, this also facilitates reduction in working hours for repair and the like.

Further, according to the present application, the straightening plate preliminarily defines the fluid path of the bubbles. This facilitates more preferable adjustment of the inject direction of the gas. Moreover, the straightening plate can also serve as a structural element of the vessel, and can strengthen the gas outlet. Without protrusion, the strengthen plate does not become load on operation under docking situations. That is, the straightening plate exerts an effect of an adjustment element of the inject direction of gas and an effect of the structural element. Further, with respect to sailing of the vessel, the bottom of the vessel has no protrusion, thereby reducing worries for an operator of the vessel.

Moreover, according to the present application, the diffusion limiting means adopts the retractable configuration. This allows the diffusion limiting means to be efficiently used according to the injecting conditions of gas and the navigational conditions of the vessel. For example, in low speed sailing where the frictional resistance effect is low, injecting of gas is stopped and the diffusion limiting means is retracted in an intentional and predetermined manner. This eliminates a protrusion from the hull, and the diffusion limiting means does not become a resistance. Further, the diffusion limiting means can serve as a function as a resistance against rolling of the hull, in addition to the bubble diffusion limiting effect, by protruding from the hull. The diffusion limiting means can also allow the hull to be stabilized by lowering the center of gravity. If the diffusion limiting means can be retracted according to the docking situations such as maintenance, the obstacle against operation is eliminated, thereby reducing the load on operators. Accordingly, in view of improving efficiency in energy resources and operation, the present invention is significantly useful.

Further, according to the present application, a part (the distal end etc.) of the diffusion limiting means can be in a state without protrusion. Accordingly, the diffusion limiting means never becomes an obstacle under docking situations, and the vessel can be fixed. Moreover, this negates a case where the diffusion limiting means acts as an obstacles and adversely affecting operations such as repair of the bottom of the vessel. More specifically, the state where the diffusion limiting means is retracted and does not protrude by the load of the hull itself when the hull is fixed can be maintained. In this state, the substantially same plane as the bottom of the vessel is configured, and operation can be applied thereto as with the other part. Therefore, working efficiency is not impaired.

Further, according to the present application, the folded diffusion limiting means is provided. Accordingly, the folded diffusion limiting means is smoothly protruded in cursing and the substantially straight line sailing is maintained, suppresses the bubble diffusion owing to an inclination caused in normal operation and sailing and a swing of the vessel occurring suddenly, and causes the bubbles to flow while retaining the bubbles in the proximity of the bottom of the vessel. On the other hand, when the diffusion limiting means is folded under docking situations, the diffusion limiting means never becomes an obstacle. Accordingly, the vessel can be fixed, and influence to be adversely affected on operations such as repair of the bottom of the vessel is negated. Moreover, for example, only if the diffusion limiting means is mounted on the bilge portion of the hull and slightly bent outward, the difference of height with the bottom of the vessel is eliminated. This increases the degree of freedom of arrangement, negates the need of securing a space for retraction in the hull, and facilitates maintenance. Moreover, a function of a bilge keel is included into the diffusion limiting means. This can contribute to stabilization of the hull in sailing.

Further, according to the present application, the retractable diffusion limiting means may be configured to be expandable. This can change the degree of protrusion according to increase and decrease of the inject rate of gas, prevent the diffusion limiting means itself from becoming a cause of the frictional resistance and from becoming a navigational obstacle by contracting at a location of shallow sea bottom.

Moreover, according to the present application, the diffusion limiting means may droop by gravity, or be urged by a spring. This negates the need for a power source when the diffusion limiting means operates, thereby the consumption of energy thereof to be saved. On the other hand, the self weight of the hull is added, and thereby the diffusion limiting means is automatically retracted under docking situations. Accordingly, the diffusion limiting means does not become an obstacle, the vessel can be fixed, and the influence to adversely affect operations, such as repair of the bottom of the vessel, is negated.

Moreover, according to the present application, separate arrangement of pieces of diffusion limiting means in a line allows the material with standard dimensions to be used, the weight of diffusion limiting means which is not so heavy is sufficient, thereby enabling the productivity to be improved. Further, a configuration can be adopted that is capable of retracting only the piece of the diffusion limiting means at the spot of receiving the load from the blocks under docking situations or configured in a foldable structure, reinforcement is also easy, and the configuration can prevent the damage of diffusion limiting means owing to the concentration of stress and the like. Accordingly, the necessity of repair of the diffusion limiting means itself is also reduced, thereby realizing more efficient operation.

Further, according to the present application, the diffusion limiting means may be configured to be transformable according to internal and/or external forces. This enables the shape of the diffusion limiting means to be flexibly changed, in contrast to a fixed diffusion limiting means. More specifically, if application of the internal force can maintain the expanded state, the function as the diffusion limiting means is exerted, and the bubble diffusion owing to influences of the normal sailing maintaining a substantially straight sailing and an inclination of the vessel caused in sailing and rolling caused suddenly is suppressed, thereby causing the bubbles to flow while retaining the bubbles in the proximity of the bottom of the vessel. On the other hand, the diffusion limiting means can be transformed responsive to influences of stopping of the internal force and/or the external force. If the retraction is not especially performed, this can prevent the diffusion limiting means itself from being a navigational resistance and from being an obstacle against under docking situations. Moreover, for example, the internal force may be increased and the degree of protrusion is increased, thereby improving the function as the stabilization means for addressing the rolling of the hull. Further, when the waterline is deep, the bubbles injected in the proximity of the hull are small and the degree of protrusion (transformation) of the diffusion limiting means may be small, transformation and contraction is caused by an influence of the draft (external force). This can prevent the diffusion limiting means from being a cause of increase in frictional resistance. Therefore, the present invention is more effective in view of improving efficiency in energy resources and operation.

Further, according to the present application, the diffusion limiting means having a hollow structure may be adopted. This allows the diffusion limiting means to be expanded by pressurization from the inside by means of a flow of fluid, such as gas or liquid, or powder. Moreover, after the expansion, for example, closing of the valve can maintain the pressure constant. Accordingly continuous flow is not required, thereby allowing the amount of energy consumption for supplying the fluid to be saved. Further, the fluid can easily be discharged, a short time period is sufficient for contraction, and discharge by the self weight of the hull can be performed under docking situations, thereby allowing the vessel to be fixed in a short time period.

Further, according to the present application, the hollow structure can serve as the function of the air supply pipe and transfers the gas generated by the gas supply or charged air means to the gas outlet. In this case, the hollow structure is expanded by pressurization of gas, and can suppress the bubble diffusion caused by an inclination of the vessel, and also serve as the function of the diffusion limiting means. Moreover, for example, the hollow structure can directly be connected to the gas supply or charged air means or the air supply pipe, thereby allowing the path of the injected gas to be formed. This allows both the function as the diffusion limiting means and the function of the air supply pipe to be exerted.

Further, according to the present application, the diffusion limiting means may have a hollow structure that is configured with an elastic material and the inside is hollow. This allows the inside of the hollow structure to be pressurized, be enlarged and contract by means of the power of fluid accompanying the sailing of the vessel, without separately injecting fluid into the hollow structure. Accordingly, the force of the fluid accompanying the sailing of the vessel can be utilized and thereby allows the diffusion limiting means to be formed. This negates the need for a device and the like for injecting gas and the like into the hollow structure, thereby allowing the energy to be effectively utilized. Moreover, unless the vessel is sailing, the fluid force cannot be generated. This allows the hollow structure to contract under docking situations, and the fixation of the vessel can immediately be performed. The diffusion limiting means never becomes an obstacle, and does not influence operations such as repair of the bottom of the vessel.

Moreover, according to the present application, the degree of protrusion of the diffusion limiting means can be adjusted responsive to starboard and port inclinations of the hull. For example, the diffusion limiting means may be protruded at the bottom of the vessel on the side where the waterline becomes shallow owing to the inclination, thereby enabling diffusion of gas along with the inclination to be limited. Accordingly, the frictional resistance reduction effect significantly suitable for the sailing conditions can be attained.

Further, according to the present application, the limiting flow generation means may generate the flow limiting the diffusion of gas. Accordingly, the so-called pseudo wall (end plate) can be formed, the bubble diffusion caused by the diffusion of injected bubbles and the inclination of the vessel can be suppressed, and the bubbles are caused to flow while the bubbles are retained around the hull. Further, the diffusion of gas is limited by the effect of the fluid. This enables the elements not to protrude from the hull, negates the need to consider the positions of blocks under docking situations, thereby eliminating obstacle on operation. Therefore, working hours for repair and the like can be reduced.

Further, according to the present application, the open and close means for closing the path when gas is not injected, which is arranged in the path in the proximity of the gas outlet, may block the inflow of water when the gas supply or charged air is stopped, can prevent backflow of water into the gas supply or charged air means, and thereby can prevent the air supply pipe from being damaged. More specifically, this eliminates rust owing to moisture and fouling of marine organisms in the path, suppresses the increase in frictional resistance when injecting gas, negates the need for maintenance, and thereby enables the air supply pipe to be used for a long term. Moreover, closing of the path by the open and close means can prevent the frictional resistance owing to inflow of the water flowing into the path during sailing from being increased.

Further, according to the present application, in a case of arranging the navigational condition detection means in the water, arrangement at a part without receiving influences from the bubbles injected from the gas outlet negates the influence of disturbance of bubbles, and allows stable detection of various conditions. Moreover, this can prevent fouling of organisms that dwell at seashore, such as barnacles, and easily reproduce because of existence of air, thereby allowing the navigational condition to be stably detected for a long term.

BRIEF DESCRIPTION OF THE DRAWINGS

FIG. 1 (*b*) is a top view of the same vessel; FIG. 1 (*c*) is a bottom view of the same vessel;

FIG. 2 (*b*) is a side view of the same blower; FIG. 2 (*c*) is a diagram showing the internal structure of the same blower;

FIG. 10 (b) is a top view of the same vessel; FIG. 10 (c) is a bottom view of the same vessel;

FIG. 26 (b) is a top view of the same vessel; FIG. 26 (c) is a bottom view of the same vessel;

FIG. 34 (b) is a rear elevation view of the bubble protection plate;

FIG. 36 (a) shows a side sectional view of the vessel; FIG. 36 (b) shows a top view thereof;

FIG. 42 is an enlarging diagram principally showing a variable nozzle according to an embodiment of the present invention;

BEST MODE FOR CARRYING OUT THE INVENTION

A best mode for carrying out the present invention will hereinafter be described with reference to the drawings using embodiments. Hereinafter, an extent necessary for description for the sake of attaining the object of the present invention will schematically be shown. An extent necessary to describe an applicable part of the present invention will principally described. A part on which the description is omitted is pursuant to conventional techniques.

First Embodiment

Figure 1:
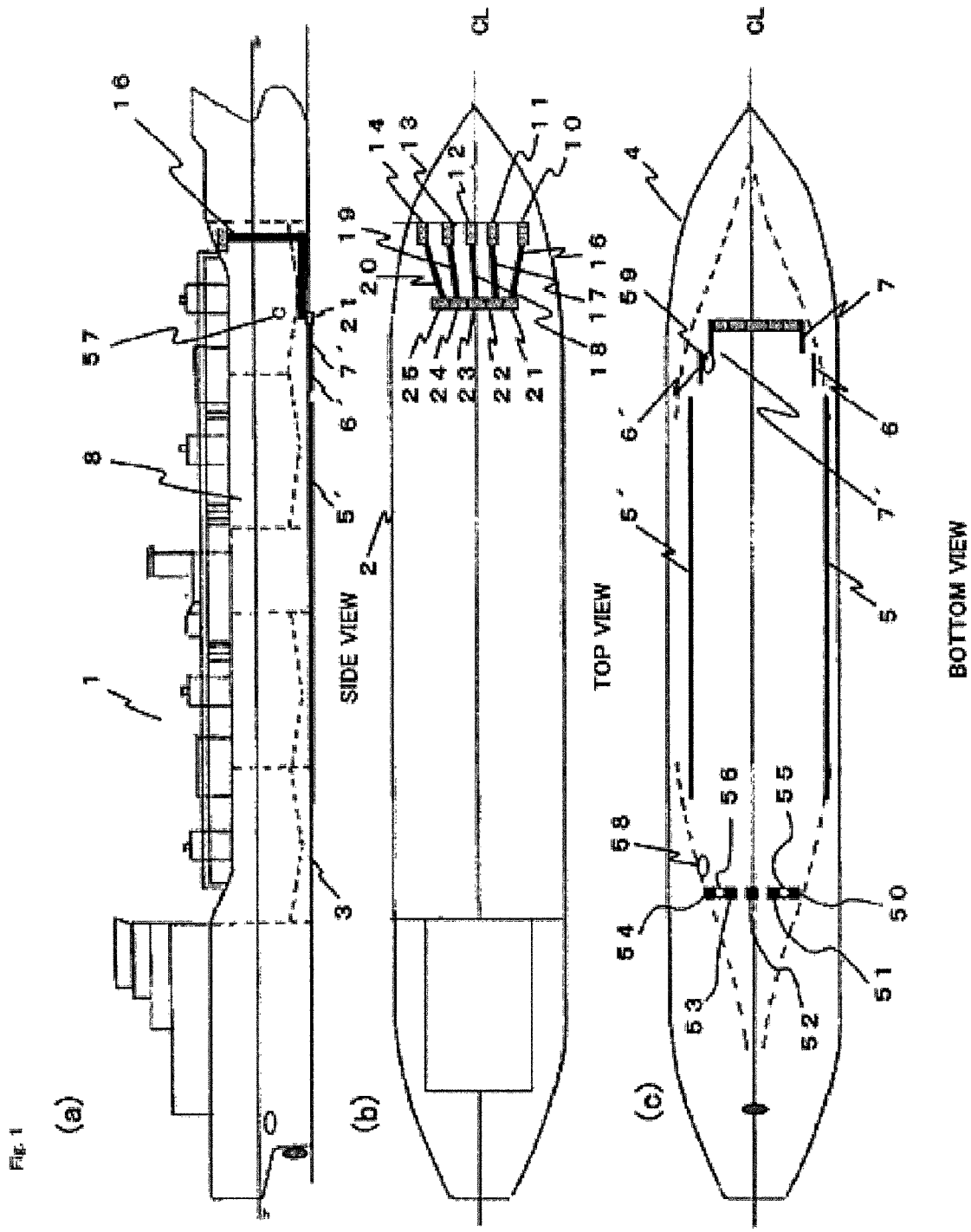
FIG. 1 (*a*) is a side view of a vessel to which a frictional resistance reduction device for a vessel of an embodiment of the present invention is applied.

FIG. 1 (a) shows an embodiment where a frictional resistance reduction device for a vessel of an embodiment of the present invention is applied to a vessel used on ocean. FIG. 1 (a) is a side view of the vessel. FIG. 1 (b) is a top view thereof. FIG. 1 (c) is a bottom view thereof. In FIG. 1, a principal configuration is exposed for the sake of illustration.

Blowers 11, 12, 13, 14 and 15 as gas supply or charged air means are arranged in a line on a deck 2 of a vessel 1. These blowers 11, 12, 13, 14 and 15 are arranged in casing in order to avoid splash of seawater broken at the bow on the deck 2. Air, as gas, is taken from a side opposite to the traveling direction of the hull for the sake of avoiding the splash as much as possible.

The air taken into the blowers 11, 12, 13, 14 and 15 are pressurized, passes through air supply pipes 16, 17, 18, 19 and 20 having bent portions, and guided into gas outlets 21, 22, 23, 24 and 25 arranged in the proximity of the bottom 3 of the vessel. In a case of this embodiment, the gas outlets 21, 22, 23, 24 and 25 are arranged substantially in a line, symmetrically with respect to a planar center line CL of the hull 4, in fore of the bottom 3 of the vessel. The gas outlets 21, 22, 23, 24 and 25 are arranged on the bottom 3 of the vessel is because of intentions that allow injected bubble to stay longer around the bottom 3 of the vessel and alleviate variation in pressure owing to waves and the like. The arrangement thereof in fore of the bottom 3 of the vessel is adopted in order to make the injected bubbles stay over the entire bottom of the vessel 3 as much as possible.

The arrangement of the gas outlets 21, 22, 23, 24 and 25 substantially in a line simplifies the configuration, and also facilitates arrangement of the blowers 11, 12, 13, 14 and 15, the air supply pipes 16, 17, 18, 19 and 20 and the like arranged corresponding thereto. Further, in this example, the number of gas outlets 21, 22, 23, 24 and 25 is five, which is an odd number. Accordingly, arrangement of the center one (gas outlet 23) on the planar center line CL can realizes one spot injecting of bubbles with ability of the vessel 1 to hold a straight line.

End plates 5, 5', 6, 6', 7 and 7', which guide the bubbles injected from the gas outlets 21, 22, 23, 24 and 25 so as not to dissipate the bubbles, are arranged on the bottom 3 of the vessel also symmetrically with respect to the planar center line CL of the hull 4. In addition thereto, shear force sensors 50, 51, 52, 53 and 54, which are shear force detectors detecting shear forces acting on the hull 4 owing to seawater and bubbles, are arranged on the bottom 3 of the vessel on the stern side.

Further, relative velocity sensors 55 and 56, as relative velocity detectors, are arranged on the stern side. Another relative velocity sensors 57 are arranged on the sides 8 of the vessel. The relative velocity sensors 55 and 56 are arranged apart from the gas outlets 21, 22, 23, 24 and 25. The relative velocity sensors 57 are arranged on a spot on the sides 8 of the vessel without influence of bubbles even if the spots are in the proximity. In particular, the relative velocity sensors 57 are arranged at lower parts away from influence of waves on the side 8 of the vessel. These relative velocity sensors 55, 56 and 57 adopt ultrasonic system, are capable of being used underwater, and reduce influences owing to waves and currents.

Further, video cameras 58 and 59, which monitor conditions of the injected bubbles, are arranged at fore and aft parts of the bottom 3 of the vessel. Images taken by the video cameras 58 and 59 are monitored by a person, and thereby being utilized for analyzing inject conditions of the bubbles.

Figure 2:
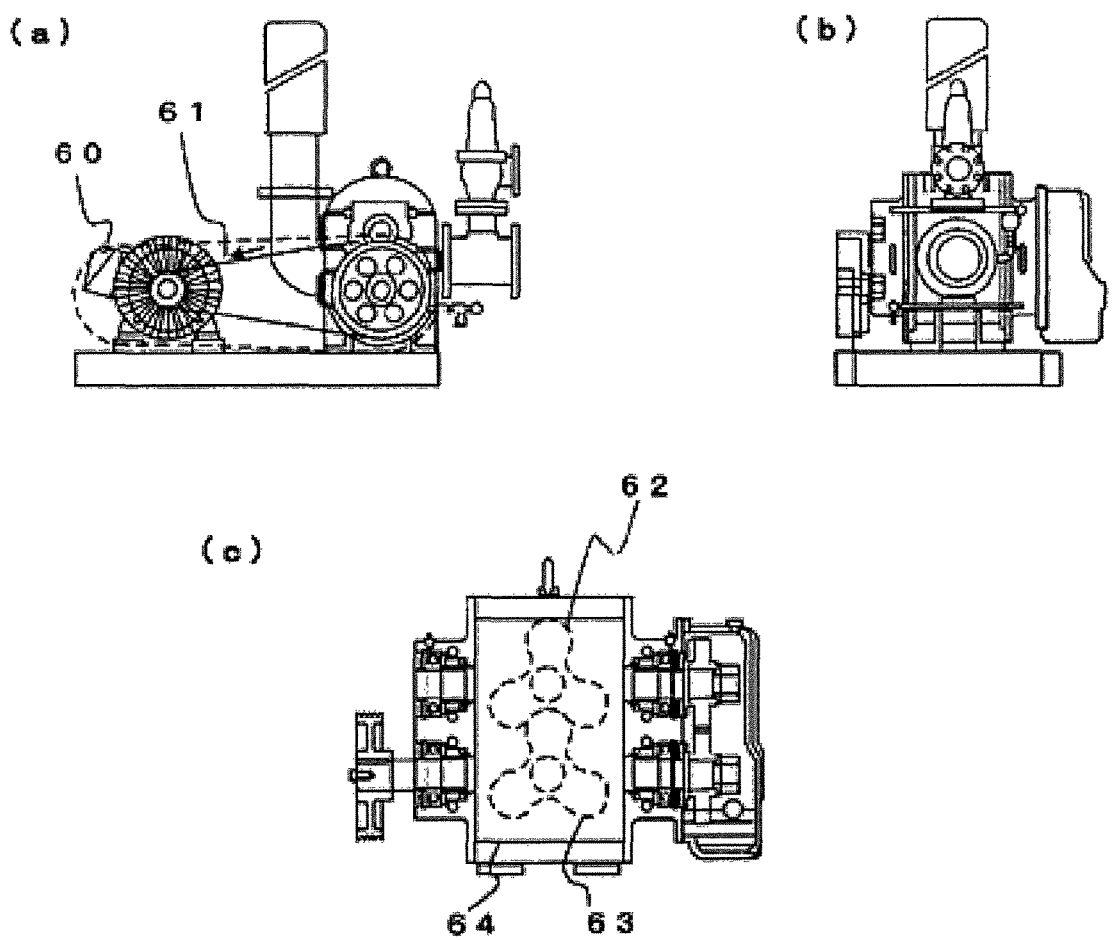
FIG. 2 (*a*) is a side view of a blower used for the frictional resistance reduction device for a vessel of the embodiment of the present invention.

FIG. 2 is a detailed diagram showing the blowers 11, 12, 13, 14 and 15. FIG. 2 (a) shows a front view. FIG. 2 (b) shows a side view. FIG. 2 (c) shows a sectional view partially representing an internal structure. The blowers 11, 12, 13, 14 and 15 are Roots-type positive-displacement blowers, and adopt a structure where an inverter-type motor 60 as the drive device drives two rotors 62 and 63 in the blower via a belt 61, the air taken between the blower interior wall 64 and the rotors 62 and 63 is compressed as the rotors 62 and 63 rotate, and supplied. Since the blowers 11, 12, 13, 14 and 15 are the positive-displacement type, the blowers are capable of supplying stably a predetermined rate of air even with previous variation in pressure. Although the Roots-type blower is the same positive-displacement type, the Roots-type blower is different from the piston type in that the Roots-type blower pressurizes air substantially continuously and thereby reduces pulsing, and can eliminate a tank and the like for smoothing pressure. Further, the rotation is smooth and vibration and noise are reduced. Accordingly, even with the arrangement of blowers 11, 12, 13, 14 and 15 on the deck 2, resonance cannot easily occur in the cabins therebelow.

Figure 3:
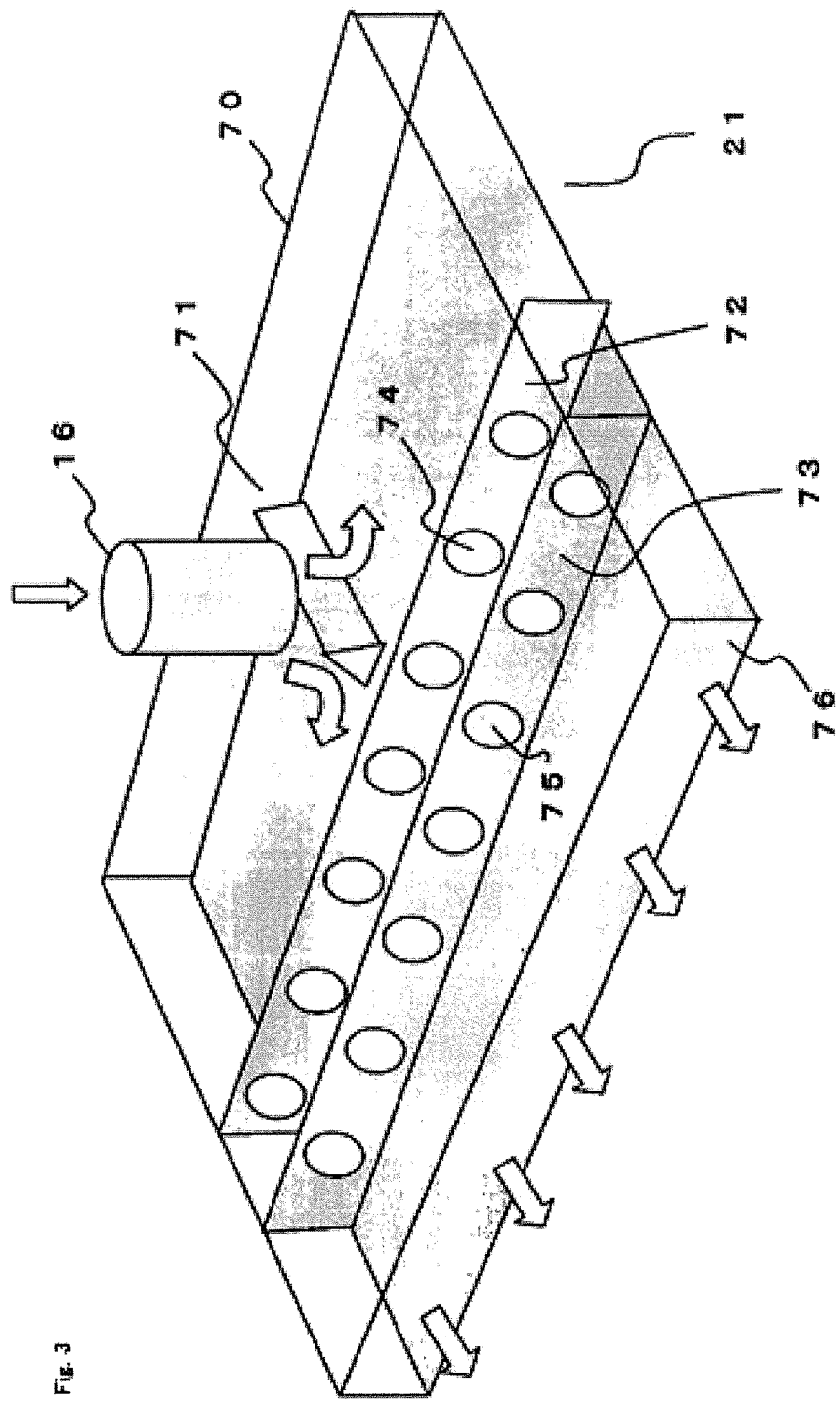
FIG. 3 is a perspective view of the gas outlet used for the frictional resistance reduction device for a vessel of the embodiment of the present invention.

FIG. 3 is a perspective view conceptually showing a detailed configuration of the gas outlets 21, 22, 23, 24 and 25. For the sake of simplicity of description, FIG. 3 shows a typical example of the plurality of air supply pipes and gas outlets. The air blown from the blower via the air supply pipe 16 is bent at right angle at a chamber 70 of the gas outlet 21 connected to the air supply pipe 16. A distribution component 71 having triangular profile for dispersing the blown air is arranged immediately below the connection part of the air supply pipe 16. A configuration is adopted according to which the air is bent at right angle at this part and dispersed laterally by the distribution component 71. As the air is bent at right angle, the air tends to uniformly spread along directions in a horizontal plane. However, the air tends to flow only toward perforated plates 72 and 73 in front thereof by presence of interior walls of the chamber 70 in the recess and at the right, left, top and bottom. Here, presence of the distribution component 71 further uniformizes the lateral distribution of the air with respect to the perforated plates 72 and 73.

A lot of perforations 74 and 75 are formed at the perforated plates 72 and 73. The positions of the perforated plates 72 and 73 are laterally displaced from each other, thereby forming an arrangement with perforations in a displaced manner. This embodiment shows an example using two perforated plates 72 and 73. Instead, the number thereof may be another number, such as three or four. Since perforated plates 72 and 73 are arranged so as to displace the positions of the perforations, the perforated plates 72 and 73 function as a so-called baffle plates, which bend the air flow to provide resistance. Accordingly, in addition to further uniformization of the air in the lateral direction, the air in the vertical direction is also uniformized, thereby enabling the air to be injected from a inject port 76 on a front surface.

Here, the perforated plates 72 and 73 are manufactured by continuously making round perforations on a corrosion resistant sheet metal, such as stainless steel by a press, and the arrangement with displaced perforation positions can be realized by cutting. This offers excellent productivity. If configured with a stainless material, since the perforations are round, edge portions are omitted, nearly preventing the stress from being concentrated when being pressed, in contrast to a case with square perforations. This alleviates progress of stress corrosion from the edge parts, even if used in seawater. The perforated plates 72 and 73 may be manufactured by using resin and by means of molding. In a case of using the resin, the shapes of the perforations are arbitrary in view of corrosion. However, in view of molding, round perforations are preferable.

Figure 4:
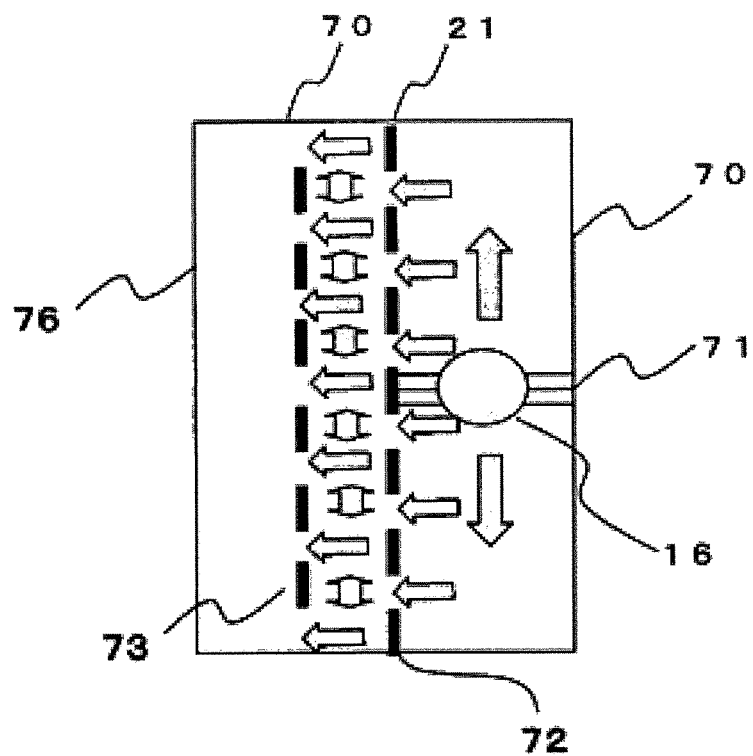
FIG. 4 is a conceptual view showing operation of the gas outlet used for the frictional resistance reduction device for a vessel of the embodiment of the present invention.

FIG. 4 a conceptual view showing effects of the configuration where the air guided by the air supply pipe 16 is bent into a substantially right angle and spread, and injected via perforated plates 72 and 73 arranged in series in a displaced manner.

Figure 5:
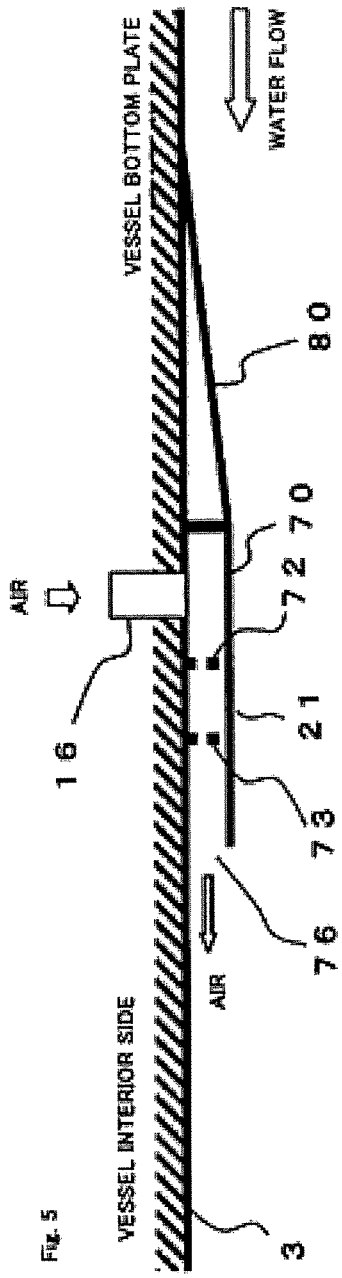
FIG. 5 is a sectional view showing attachment of the gas outlet, which is used for the frictional resistance reduction device for a vessel of the embodiment of the present invention, to the bottom of the vessel.

FIG. 5 shows a sectional view where the gas outlet 21 of this embodiment is attached to the bottom 3 of the vessel. In this figure, for the sake of simplicity of description, a typical example of the plurality of air supply pipes, gas outlets and the like is shown. The chamber 70 is arranged so as to protrude from the plane of the bottom 3 of the vessel. The air supply pipe 16 runs through the bottom 3 of the vessel and is connected to the chamber 70. The inject port 76 opens toward a downstream direction with respect to the water flow. A resistance reduction plate 80 is arranged at the front surface of the chamber 70, thereby allowing a configuration in consideration that the chamber 70 does not become a resistance owing to the water flow.

Figure 6:
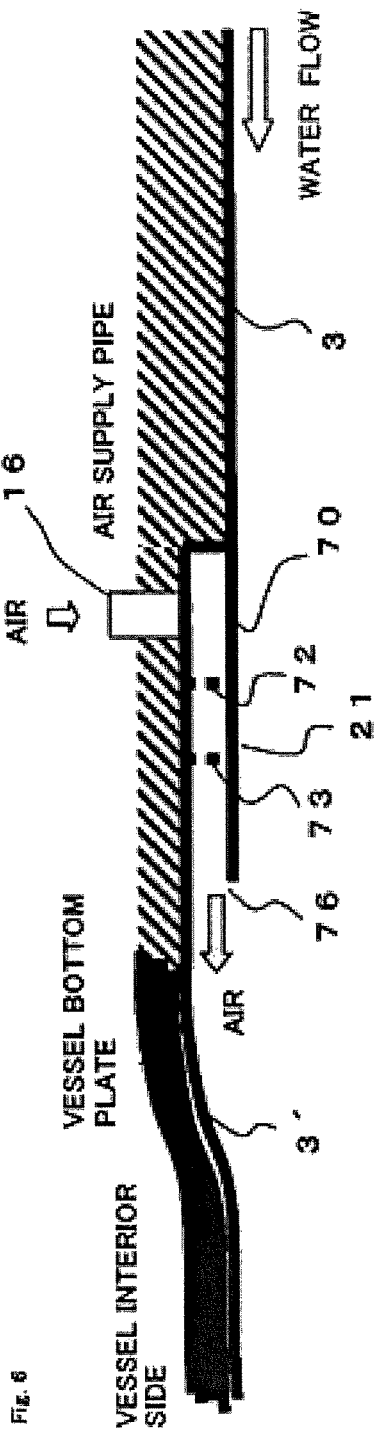
FIG. 6 is a sectional view showing another manner of attachment of the gas outlet, which is used for the frictional resistance reduction device for a vessel of the embodiment of the present invention, to the bottom of the vessel.

FIG. 6 shows another embodiment of attachment of the gas outlet 21 to the bottom 3 of the vessel. In this another embodiment, the shape of the bottom 3 of the vessel is designed in consideration that the shape forms a substantially same plane surface even if the chamber 70 intervenes. In this case, it is unnecessary to provide the resistance reduction plate 80, which has been provided in the above embodiment. However, considerations are taken such that a part of the bottom 3 of the vessel in the downstream side after the gas outlet 21 is configured as a curved surface, thereby allowing the bubbles injected from the inject port 76 to smoothly flow, to easily adhere to the bottom 3 of the vessel and not to increase resistance.

The above embodiment shown in FIG. 5 exerts an advantageous effect that realizes easy attachment to the bottom 3 of the vessel, including posterior attachment of the gas outlet 21. In the another embodiment shown in FIG. 6, it is unnecessary to especially provide the resistance reduction plate 80 and the like, exerting an advantageous effect expecting that increase in frictional resistance owing to attachment of the gas outlet 21 can be suppressed.

Figure 7:
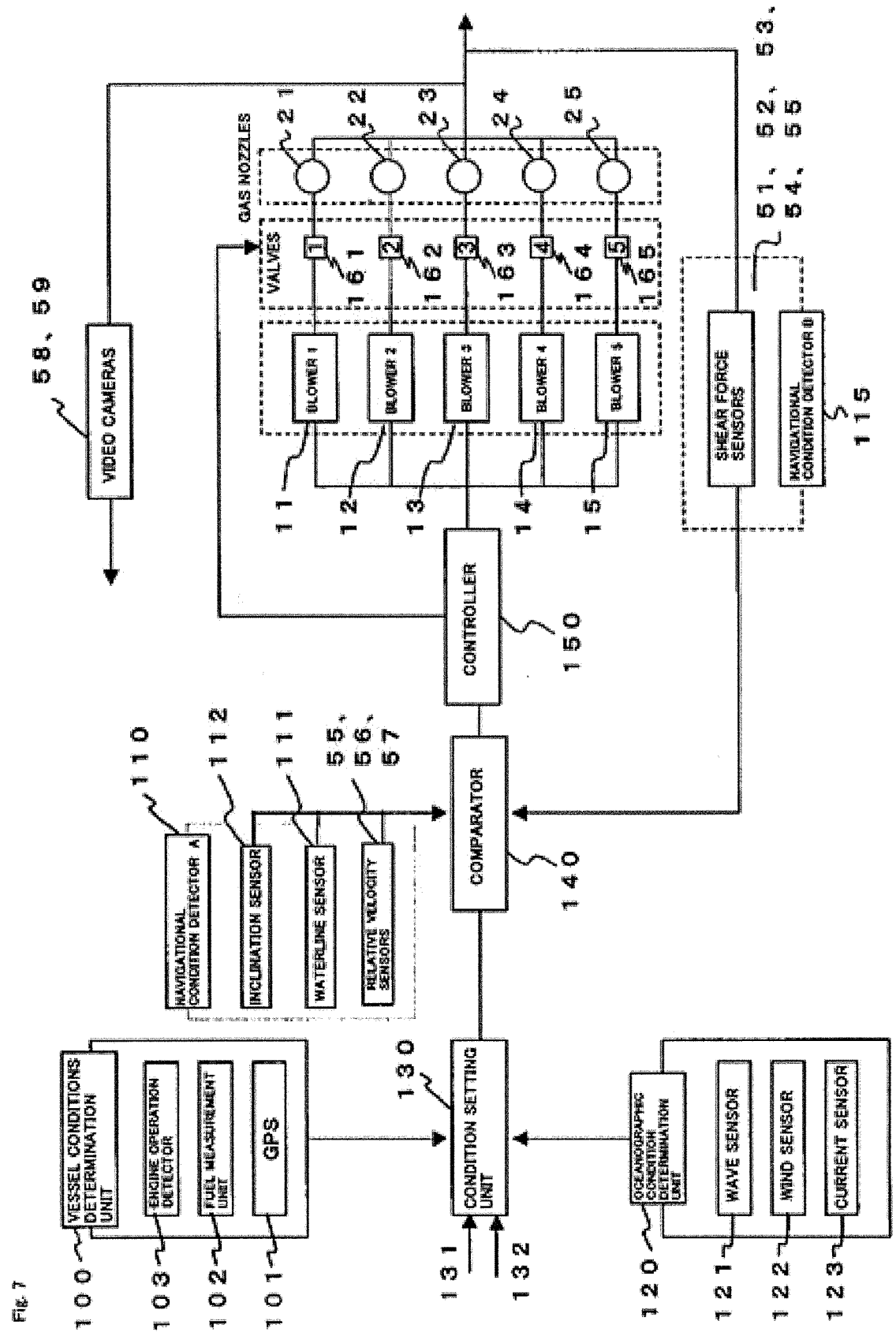
FIG. 7 is a control block diagram used for the frictional resistance reduction device for a vessel of the embodiment of the present invention.

FIG. 7 is a control block diagram of this embodiment.

The vessel conditions determination unit 100 includes a GPS 101 detecting the location of the vessel, a fuel measurement unit 102 measuring fuel consumption of engines of the vessel, and an engine operation detector 103 detecting operational conditions of the engines of the vessel. The vessel conditions determination unit 100 specifically determines the present conditions of the vessel, and determines the present conditions that vary in a small degree on sailing or vary gradually. For example, the GPS 101 grasps the location of the vessel on a map, and detects a distance to a port or a destination, an absolute velocity with respect to the ground and the like.

These are used for determining which locating or position on the map the bubble are injected and stopped. The measurement of the absolute velocity with respect to the ground is also used for the sake of complementing the relative velocity sensors 55, 56 and 57. The fuel measurement unit 102 measures how the engines consumes fuel per prescribed time, and also used for stopping the injecting of bubbles if the fuel consumption efficiency becomes lower than a prescribed fuel consumption efficiency. The engine operation detector 103 is used for acquiring information such as detection of operating conditions of the engines of the vessel, stop of injecting bubbles when the engines stop operation, or start of injecting bubbles a lapse of a prescribed time after operation is started. The engine operation detector 103 is also used for detecting the numbers of revolutions of the engines and changing the number of working gas outlets and/or the inject rate of bubbles. In addition thereto, the vessel conditions determination unit 100 further includes means for determining situations where the vessel resides, such as detectors for outputs of the engines, a gyro, a radar and means for measuring the amount of freight and condition of ballast water, and can be used for controlling injecting of bubbles according to the purposes.

The navigational condition detector A110 includes relative velocity sensors 55, 56 and 57; a draft sensor 111 detecting the draft level of the hull; and an inclination sensor 112 detecting so-called rolling, which is a lateral inclination with respect to the traveling direction of the hull. Separately therefrom, the shear force sensors 51, 52, 53, 54 and 55 configure a navigational condition detector B115. These navigational condition detectors A and B115 detects physical quantities that relatively easily vary as the vessel is sailing, or for the sake of changing the quantities. The configurations of shear force sensors 51, 52, 53 and 54 will be described in detailed later. In addition thereto, the navigational condition detection unit further includes sensors detecting swaying (swaying), pitching (pitching), surging (surging), heaving (heaving) and yawing (yawing) of the hull 4.

An oceanographic condition determination unit 120 includes a wave sensor 121, a wind sensor 122 and a current sensor 123. The wave sensor 121 detects wave heights, directions, periods of waves and the like. The wind sensor 122 detects wind velocities, directions of winds and the like. The current sensor 123 detects current velocities, directions, heights of currents and the like. In addition thereto, the oceanographic condition determination unit is used for considering information on waves, winds and currents and further the weather and the like, for example, stopping injecting of bubbles when the oceanographic condition is stormy, and injecting bubbles when the condition recovers.

Such information from the vessel conditions determination unit 100 and information from the oceanographic condition determination unit 120 are transmitted to a condition setting unit 130. The condition setting unit systematically sets conditions for injecting bubbles to the bottom 3 of the vessel. The conditions include starting/stopping of injecting bubbles, which gas outlets 21, 22, 23, 24 and 25 are caused to inject bubbles, how the inject rate is, how the timing of injecting is, how the temporal bubble inject sequence is composed, and when the injecting is started and when the injecting is stopped. In the setting unit, the conditions for injecting bubbles are set such that shear forces acting on the hull, the relative velocity of the hull, the draft, the inclination and the like are also considered. Condition setting for control according to these signals is also performed. The condition setting unit performs condition setting according to a condition setting instruction 131 for reducing the frictional resistance, and further performs condition setting according to condition setting instruction 132 for adjusting the waterline level by means of injecting bubbles, which will be described later.

A comparator 140 compares signals according to the setting by the condition setting unit 130. The blowers 11, 12, 13, 14 and 15 are controlled via a controller 150. These comparator 140 and controller 150 collectively configure a controller. The controller 150 also controls valves 161, 162, 163, 164 and 165 arranged on the discharge side of the blowers 11, 12, 13, 14 and 15. These are added for the sake of acquiring a desired air rate by adjusting these valves 161, 162, 163, 164 and 165, when controlling air rate lower than the control ranges of the motors by means of inverters of the blowers 11, 12, 13, 14 and 15, and when quickly adjusting the waterline level using the signal from the draft sensor 111. As to conditions where bubbles are injected from the gas outlets 21, 22, 23, 24 and 25, inject conditions of the bubbles and conditions where the bubbles stay at the bottom 3 of the vessel are imaged by video cameras 58 and 59. The images are utilized for analyzing and examining conditions of injecting air.

At the bottom 3 of the vessel, the shear force sensors 51, 52, 53, 54 and 55 are attached to the gas outlets 21, 22, 23, 24 and 25 downstream from the bottom 3 of the vessel. In order to deepen analysis of variation in shear force owing to injecting of bubbles, a corresponding number thereof are attached. Signals from the shear force sensors 51, 52, 53, 54 and 55 are fed back to the comparator 140. The signals are compared with shear force values preliminarily set by the condition setting unit 130. The operating conditions of the blowers 11, 12, 13, 14 and 15 are finely adjusted via the controller 150 pursuant to a prescribed rule, an algorithm and a constants according to the deviations. Further, the relative velocities between the hull and seawater are detected by the relative velocity sensors 55, 56 and 57, subjected to a prescribed statistical process, and the representative value is transmitted to the comparator 140. Signals from the draft sensor 111 and the inclination sensor 112 are also transmitted to comparator 140.

First, the comparator 110 compares the processed representative value by the relative velocity sensors 55, 56 and 57 and the condition setting value preliminarily set by the condition setting unit 130 with each other. For example, when the relative velocity of the hull exceeds the setting value, controls can be performed including increase of the number of working gas outlets, increase of the amount of bubbles, and increase both of them according to the deviations. When the relative velocity becomes lower than the setting value, controls can be performed including decrease of the number of working gas outlets, decrease of the amount of bubbles, and decrease of both of them. When decreasing the number of working gas outlets, it is preferable to stop outer gas outlets.

For example, the gas outlets 21 and 25 are stopped, or the gas outlets 21 and 22 and the gas outlets 25 and 24 are stopped. Likewise, the inject rates of bubbles are controlled. The inject rate of bubbles of gas outlets 21 and 25 are decreased or increased to the same degree. Further, the inject rate of bubbles of gas outlet 22 and 24 are decreased or increased to the same degree. Thus, symmetrical arrangement of the gas outlets with respect to the planar center line CL of the hull and the symmetrical control of the inject rates of bubbles can acquire a uniform frictional resistance reduction effect, in a case where the vessel is sailing in a straight line, which can frequently occur. Accordingly, ability of the vessel to hold a straight line can be maintained, and fuel consumption is decreased. Further, this facilitates the circuit configuration and the control method of the control device.

The comparator 140 compares a value detected by the draft sensor 111 and a condition setting value preliminarily set by the condition setting unit 130. For example, when the waterline of the hull 4 exceeds the setting value (when the amount of freight is large and the draft rises), controls are performed including increase of the number of working gas outlets, increase of the amount of bubbles or increase both of them according to the deviation. When the waterline falls (the freight is unloaded and the vessel is in a condition of ballast water), controls are performed including decrease of the number of working gas outlets, decrease of the amount of bubbles or decrease of both of them. In cases of decrease, it is preferable to control in an analogous fashion to that described above.

When swells come, the valves 161, 162, 163, 164 and 165 are controlled using signals from the draft sensor 111, and the pressures acting on the gas outlets 21, 22, 23, 24 and 25 are finely adjusted by increasing or decreasing in an immediate manner, thereby further alleviating variation in inject rate of bubbles.

The comparator 140 compares an inclination value of the hull detected by the inclination sensor 112 and a condition setting value preliminarily set by the condition setting unit 130 with each other. For example, the inclination of the hull exceeds the setting value owing to turning or rolling of the vessel, the inject spots of the gas outlets are changed or the amount of bubbles is increased or decreased according to the deviation. For example, the hull is inclined to the left viewed from the traveling direction, the right side of the bottom of the vessel is elevated. In this case, the frictional resistance can be effectively reduced without wastefully injecting bubbles by performing controls including increase of the number of working gas outlets on the left where an apparent waterline rises, increase of the inject rates thereof or increase both of them and performing controls including decrease of the number of working gas outlets on the right, decrease of the inject rates thereof or decrease of both of them. The inclination sensor 112 can be used not only for controlling injecting of bubbles but also for ballast water adjustment that detects the inclination of the hull 4 and maintains the balance in a shared manner.

Figure 8:
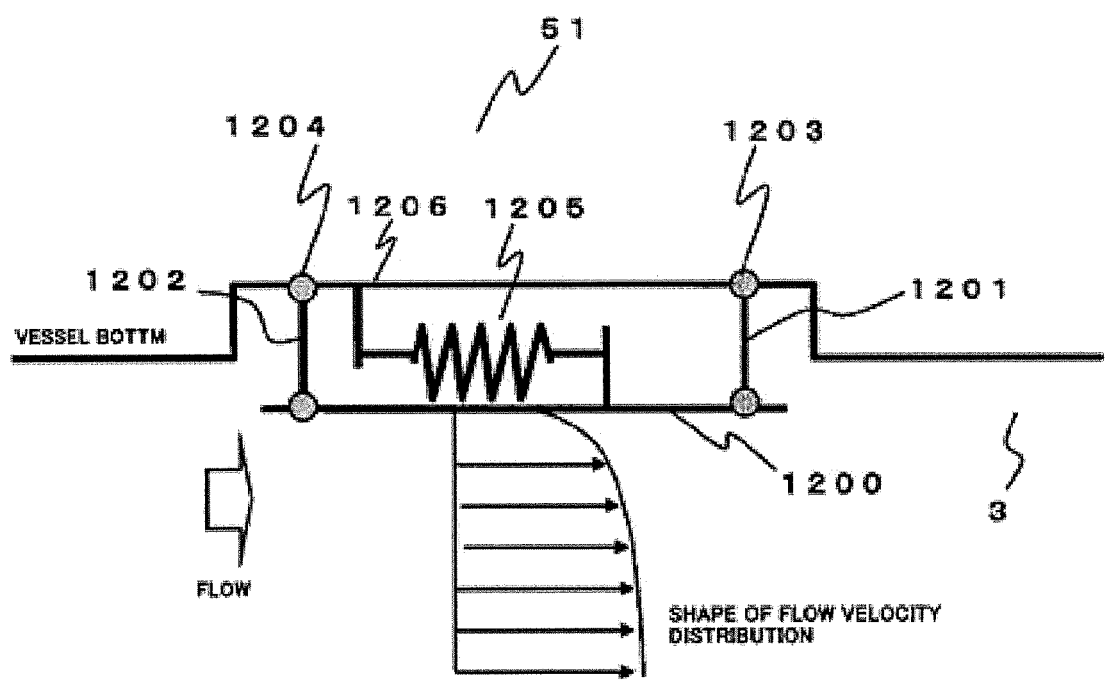
FIG. 8 is a sectional view of a shear force sensor used for the frictional resistance reduction device for a vessel of the embodiment of the present invention.

FIG. 8 representatively shows a schematic overview of the shear force sensor 51.

A detection plate 1200 is arranged at the substantially same height as the bottom 3 of the vessel. The detection plate 1200 is configured so as to be suspended by leaf springs 1201 and 1202. The leaf springs 1201 and 1202 are supported by pivots 1203 and 1204. A detector 1205 is attached to the detection plate 1200. The other end of the detector 1205 is fixed to a casing 1206. When a flow occurs, distribution of velocity of flow, which is as shown in the lower part of FIG. 8, is generated on a surface of the detection plate 1200. The leaf springs 1201 and 1202 are bent according to the shear force acting on the detection plate 1200 by distribution of velocity of flow, thereby displacing the detector 1205.

The displacement of the detector 1205 is electrically detected, and the shear force is detected. The faster the flow, the higher the detection value becomes. The slower the flow, the lower the detection value becomes. In a condition where bubbles are mixed in seawater, the shear force acting on the detection plate 1200 is decreased and the detection value is decreased in comparison with a condition only with seawater where bubbles are not mixed. A condition where bubbles are mixed and effectively acting on the bottom 3 of the vessel can be estimated by preliminarily measuring a relationship between a relative velocity with seawater where bubbles are not mixed and a shear force and a relationship between the amount of bubbles mixed therein, a relative velocity and a shear force. Further, a frictional resistance acting on the bottom 3 of the vessel or the entire hull can be estimated from the shear force. The shear force can be measured more accurately by increasing the number of the shear force sensors. However, also in an economic aspect, the entire state can be estimated by arranging a plurality of sensors in a limited area in the bottom 3 of the vessel.

In this embodiment, the values from the shear force sensors 51, 52, 53, 54 and 55 are statistically processed by the navigational condition detector B115, and the representative value is fed back to the comparator 140. The comparator 140 compares the fed back representative value of the shear force sensors and the condition setting value set by the condition setting unit 130. The blowers 11, 12, 13, 14 and 15 are controlled via the controller 150 according to the deviation, and the inject rate of bubbles from the gas outlets 21, 22, 23, 24 and 25 are controlled. When the shear force is greater than the setting value, or deviation is large, control is performed so as to increase inject rate of bubbles from the gas outlets 21 and 25. When the deviation is small, control is performed so as to decrease the rate. The feedback control acquires a desired condition-set shear force. The detection values of the shear force sensors 51, 52, 53, 54 and 55 are also used as indicators for verifying the reduction effect of the frictional resistance.

In summary, control of starting/stopping injecting gas includes a case mainly pursuant to determination by the vessel conditions determination unit 110, a case pursuant to determination by the oceanographic condition determination unit 120, and a case pursuant to the detection result of the navigational condition detectors A and B115. In the case pursuant to the vessel conditions determination unit 110, injecting of bubbles is stopped when the GPS 101 determines that the vessel is approaching a port or a destination, injecting is started when leaving the port, injecting is stopped when the vessel is approaching waters where is a swirling current region, injecting is started when the vessel is leaving the waters, injecting of bubbles is stopped when operations of the engines are stopped, and injecting of bubbles is started a predetermined time after the engines start. When the fuel consumption efficiency detected by the fuel detector 102 becomes below a predetermined one, injecting of bubbles are stopped. When it is estimated that the fuel consumption efficiency is improved, injecting of bubbles is started. When the oceanographic condition determination unit 120 determines that it is stormy such as a typhoon and rough weather, injecting of bubbles is stopped. When it recovers, injecting is started.

Further, when the wave height detected by the wave sensor becomes a prescribed value or more, injecting of bubbles is stopped; when the wave height becomes a prescribed value or less, injecting is started. The detection results of the navigational condition detectors A and B are compared with a set preset value; on the basis of magnitude of deviation, injecting is stopped when the deviation becomes a predetermined threshold or less, and injecting is started when the deviation exceeds the threshold. For example, the values from the relative velocity sensors 55, 56 and 57 are statistically processed and the representative value is transmitted to the comparator 140. When the velocity of the vessel 1 is decreased and the value becomes lower than a prescribed threshold set by the condition setting unit 130, the injecting of bubbles are stopped; when the value exceeds the value, the injecting is started. On the basis of temporal variation in statistically processed representative value from the relative velocity sensors 55, 56 and 57, when the vessel 1 starts moving and accelerates, the threshold is set to be reduced and bubbles are injected a little earlier. When the frictional resistance reduction effect is effectively exerted and the vessel is decelerated, the threshold may be reset upward and injecting of bubbles may be stopped a little earlier because the speed is decreased and bubbles still stay at the bottom 3 of the vessel.

As to the conditions for starting/stopping injecting gas, control may be performed according to precedence. When detection error, failure or an unpredictable event occurs, control may be performed complementarily using another condition. In any event, injecting of bubbles can be realized by starting/stopping injecting of bubbles under a prescribed condition in consideration of an actual frictional resistance reduction effect, or stopping injecting of bubbles when detecting/determining that the vessel is stopped.

Second Embodiment

Figure 9:
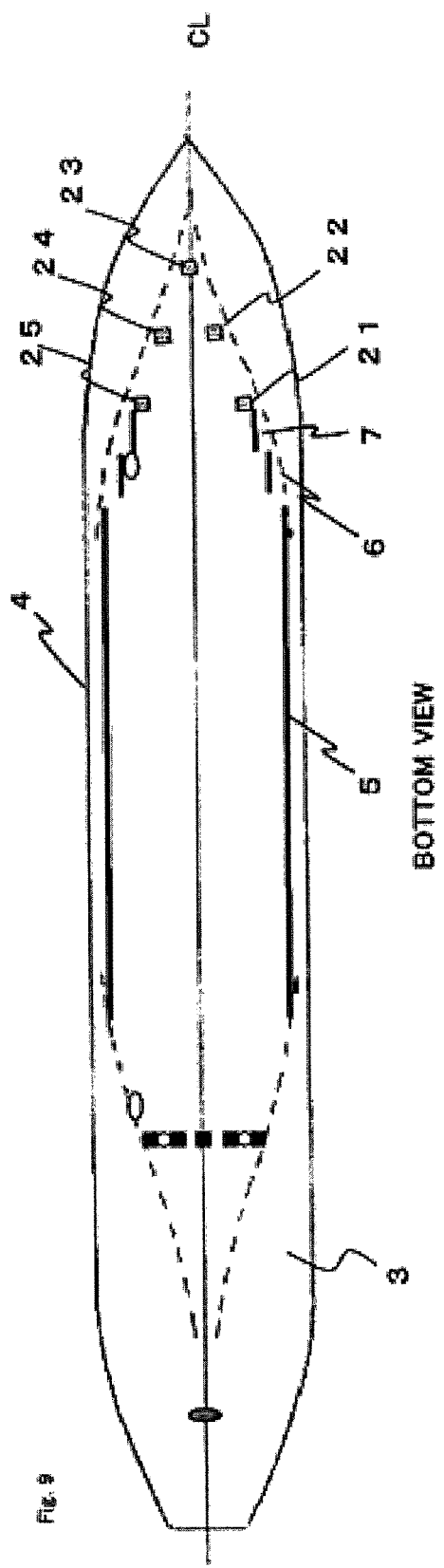
FIG. 9 is a bottom view of a vessel to which a frictional resistance reduction device for a vessel of a second embodiment of the present invention is applied.

FIG. 9 shows a second embodiment of the embodiments of the present invention. The second embodiment will be described on difference from the first embodiment. The other elements adopt configurations analogous to those in the first embodiment.

In FIG. 9, the gas outlets 21, 22, 23, 24 and 25 are arranged on the bottom 3 of the vessel 1, as shown in the figure. More specifically, a planar portion of the fore of the bottom 3 of the vessel is configured to be a so-called boat shape as indicated by broken lines. The gas outlets 21, 22, 23, 24 and 25 are arranged symmetrically with respect to the planar center line CL of the hull 4 along the fore shape of the bottom 3 of the vessel.

This allows the bubbles injected from the gas outlets 21, 22, 23, 24 and 25 to cover the entire surface of the bottom 3 of the vessel most effectively. Further, since the bubbles are along the fore shape, the bubbles can be injected from a spot such that the bubbles can be retained longest also for the stern. This allows reduction in frictional resistance to be further improved, and enables the fore having a large frictional resistance to be effectively covered. In this case, since the number of gas outlets 21, 22, 23, 24 and 25 is odd, the center gas outlet 23 can be arranged at the distal end of the so-called boat shape. This enables the bubbles to be injected from the one gas outlet 23 while maintaining the ability of the vessel 1 to hold a straight line, and allows the bottom 3 of the vessel to be covered with the bubbles most effectively.

As described above, these embodiments adopt the configuration where the plurality of gas outlets 21, 22, 23, 24 and 25 and the plurality of blowers 11, 12, 13, 14 and 15 blowing air to the plurality of gas outlets 21, 22, 23, 24 and 25 are arranged at the bottom 3 of the vessel, and the blowers are driven by respective inverter-type motors 60 as the drive device. Further, as the navigational condition detection means for detecting the navigational condition of the vessel 1, the relative velocity sensors 55, 56 and 57, the draft sensor 111 and the inclination sensor 112 are provided at the navigational condition detector A, and the shear force sensors 51, 52, 53, 54 and 55 are provided at the navigational condition detector B115. The control device controls the motors 60 of the respective blowers according to detection results from the navigational condition detectors A110 and B115.

According to this configuration, the rise of the bubbles is suppressed by the bottom 3 of the vessel itself, and the bubble retention effect can be maintained, thereby allowing the frictional resistance to be effectively reduced by a small amount of bubbles. Further, influences of waves are alleviated at the gas outlets 21, 22, 23, 24 and 25 arranged at the bottom 3 of the vessel, in comparison with a case of arrangement at the sides of the vessel. This enables bubbles to be stably injected. As a result, frictional resistance reduction effect at the hull can be exerted. Moreover, one blower is arranged for one gas outlet correspondingly. This facilitates the bubble injecting control with respect to the separate gas outlets 21, 22, 23, 24 and 25, and can alleviate the problem of variation in inject rate of bubbles owing to waves particularly in a case of using in the ocean. Further, the gas blowing condition can be controlled according to the detection results from the navigational condition detectors A110 and B115. This allows the injecting of bubbles to be finely controlled in a variable manner, responsive to navigational conditions, in comparison with a case of injecting gas contently. Accordingly, reduction in frictional resistance that further improves the net reduction effect can be expected.

The arrangement of the gas outlets 21, 22, 23, 24 and 25 substantially in a line allows the configuration to be simplified, and can also facilitate the arrangement of blowers 11, 12, 13, 14 and 15 and the air supply pipe 16, 17, 18, 19 and 20, which are provided accordingly. Moreover, since the number of the gas outlets 21, 22, 23, 24 and 25 is odd, the center one (gas outlet 23) can be arranged on the planar center line CL. This can realize one spot injecting of bubbles while holding the ability of the vessel to hold a straight line.

Since the distribution component 71, which has the triangular profile and disperses the blown air, is arranged immediately below the connection part of the air supply pipe 16, the distribution component 71 laterally disperses and uniformizes air.

The apertures of the perforated plates 72 and 73 used for the gas outlets 21, 22, 23, 24 and 25 are configured to be round apertures. This eliminates edges. In a case of using stainless material, concentration of stress cannot easily occur during pressing, thereby alleviating development of stress corrosion even in use in seawater.

The Roots-type blower is used as the gas supply or charged air means. This type is different from the piston-type, even though both types are the same positive-displacement type. The Roots-type blower pressurizes air substantially continuously and thereby reduces pulsing, and can eliminate a tank and the like for smoothing pressure. Moreover, the rotation is smooth and vibration and noise are reduced. Accordingly, even with the arrangement of the blowers 11, 12, 13, 14 and 15 on the deck 2, occurrence of resonance can be prevented in the cabins therebelow.

The number of gas outlets 21, 22, 23, 24 and 25 is odd. This enables the center gas outlet 23 to be arranged at the distal end of the so-called boat shape, enables the bubbles to be injected from the one gas outlet 23 while maintaining the ability of the vessel 1 to hold a straight line, and enables the bottom 3 of the vessel to be covered with bubbles most effectively.

The inverters of the motors 60 and the valves 161, 162, 163, 164 and 165 controlled by the controller 150 are provided as the gas adjustment means for controlling injecting gas from the gas outlets 21, 22, 23, 24 and 25. This enables the inject conditions, such as starting/stopping injecting bubbles and the inject rate of bubbles, to be arbitrarily controlled, thereby allowing the net frictional resistance to be effectively reduced.

The relative velocity sensors 55, 56 and 57 adopt the ultrasonic system. This allows use in the water, and enabling influences of waves and currents to be reduced.

The relative velocity sensors 55, 56 and 57 detect relative velocities with seawater. The prescribed statistical processing is applied thereto. The representative value is transmitted to the comparator 140, and used. Accordingly, the detection errors are reduced, thereby allowing accurate control.

The draft sensor used for the bubble injecting control can also be used for estimating the amount of freight in the vessel 1 and adjusting the draft of the vessel 1.

The inclination sensor 112 can be shared for detecting the inclination of the hull 4 and adjusting the ballast water for maintaining balance, in addition to use for the bubble injecting control.

The shear force sensors 51, 52, 53, 54 and 55 preliminarily measure the relationship between the relative velocity and the shear force in seawater without mixture of bubbles, and the relationship between the amount of bubble mixture, the relative velocity and the shear force in seawater with mixture of bubbles. Accordingly, the condition of bubble mixture effectively acting on the bottom 3 of the vessel can be estimated. Further, the frictional resistance acting on the bottom 3 of the vessel and the entire hull can be estimated from the shear force.

The vessel conditions determination unit 100 is provided in addition to the navigational condition detectors A110 and B115. The control of starting/stopping injecting gas from the gas outlets 21, 22, 23, 24 and 25 is performed according to these detection/determination conditions.

In a case where the reduction effect in frictional resistance by injecting bubbles cannot be expected according to this configuration, the injecting bubbles are stopped. In a case where the reduction effect can be expected, the bubbles are injected. This can prevent power from being used in vain, and allows the frictional resistance reduction effect to be effectively exerted.

A difference according to threshold is provided in the representative value, which has been subjected to the statistical processing of relative velocities. When the vessel 1 is stopped, the injecting of bubbles is stopped earlier, thereby effectively utilizing the residual bubbles. This can realizes the injecting of bubbles in consideration of the substantial frictional resistance reduction effect.

The waterline level is adjusted on the basis of the condition setting instruction 132. This allows distinction with the condition setting instruction 131 for reducing the frictional resistance, and enables the waterline level to be adjusted using the same gas outlets 21, 22, 23, 24 and 25 and the blowers 11, 12, 13, 14 and 15 for reducing the frictional resistance.

Further, according to the present application, the bubble size is made large when the relative velocity is fast, and the bubble size is made smaller when the relative velocity is slow. This can exert the advantageous effect specific to the present application that the buoyancy is increased when the bubble size become larger, and the bubbles adhere well to the bottom of the vessel even with the fast relative velocity.

When the waterline becomes deep, the bubble size becomes small and the frictional resistance reduction effect is reduced. However, according to the present application, the amount of bubbles is controlled according to the draft. Therefore, even in this case, this can exert the advantageous effect specific to the present application that can perform complement by increasing the amount of bubbles.

Third Embodiment

Figure 10:
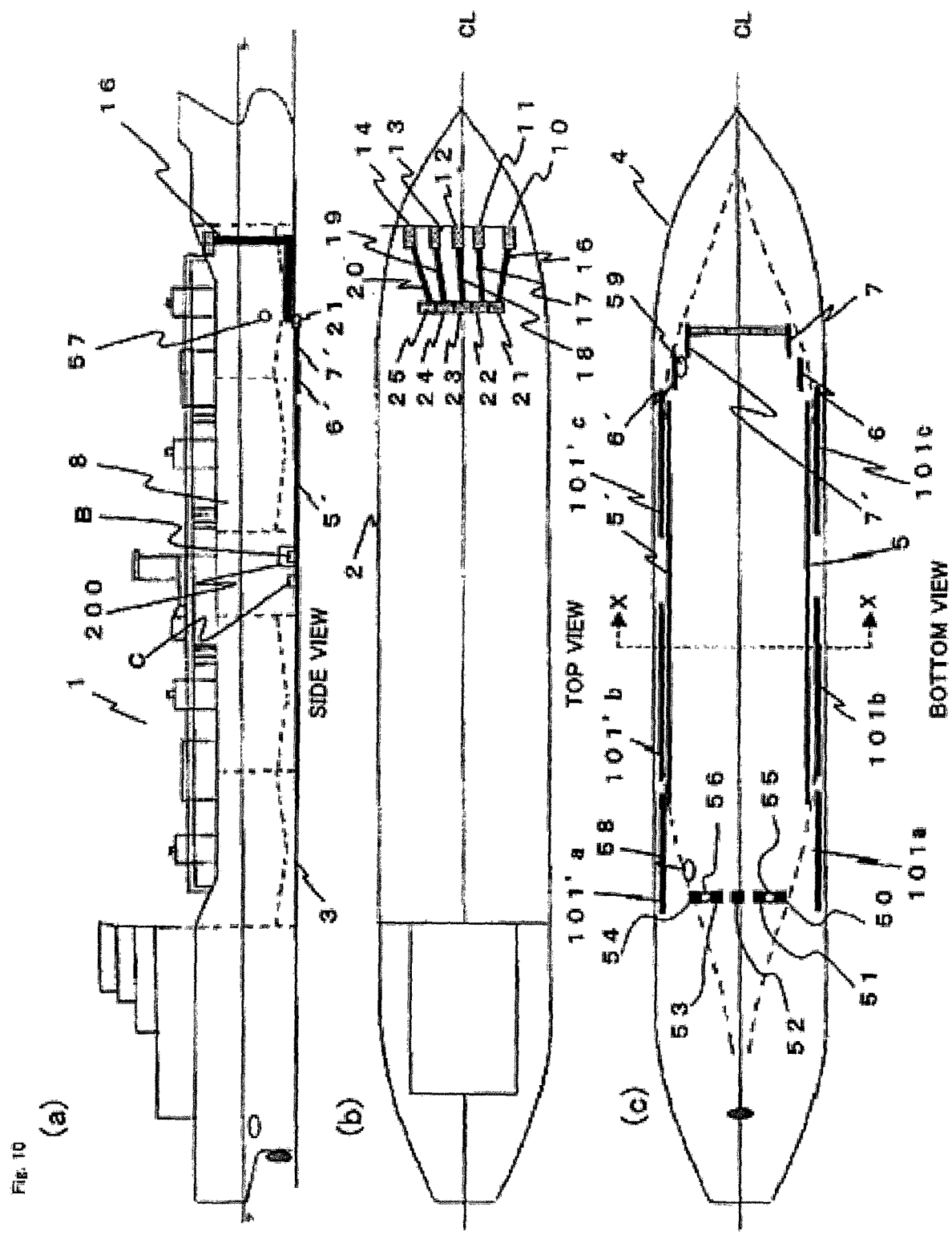
FIG. 10 (a) is a side view of a vessel to which a bubble retention device for a vessel of an embodiment of the present invention is applied.

FIG. 10 is an embodiment where a bubble retention device according to an embodiment of the present invention is applied to a vessel used in the ocean. FIG. 10 (*a*) shows a side view of the vessel. FIG. 10 (*b*) shows a top view thereof. FIG. 10 (*c*) shows a bottom view. A part of a principal configuration is represented in an exposed manner.

The blowers 10, 11, 12, 13 and 14 as the gas supply or charged air means are arranged in a line on the deck 2 of the vessel 1. These blowers 10, 11, 12, 13 and 14 are arranged in a casing on the deck 2 in order to avoid splash of seawater broken at the bow. For the sake of avoiding a splash as much as possible, the air as gas is taken from a direction opposite to the traveling direction of the hull.

The blowers 10, 11, 12, 13 and 14 are Roots-type positive-displacement blowers, and adopt a structure (not shown) where an inverter-type motor 60 (not shown) as the drive device drives two rotors in the blower via a belt, the air taken between the blower interior wall and the rotors is compressed as the rotors rotate, and supplied (not shown). Since the blowers 10, 11, 12, 13 and 14 are the positive-displacement type, the blowers are capable of supplying stably a predetermined rate of air even with previous variation in pressure. Although the Roots-type blower is the same positive-displacement type, the Roots-type blower is different from the piston type in that the Roots-type blower pressurizes air substantially continuously and thereby reduces pulsing, and can eliminate a tank and the like for smoothing pressure. Further, the rotation is smooth and vibration and noise are reduced.

Accordingly, even with the arrangement of blowers 10, 11, 12, 13 and 14 on the deck 2, resonance cannot easily occur in the cabins therebelow.

The air taken by the blowers 10, 11, 12, 13 and 14 is pressurized, passes through the air supply pipe 16, 17, 18, 19 and 20 having bent portions, and guided to gas outlets (hereinafter, also referred to as "air nozzle") 21, 22, 23, 24 and 25 arranged in the proximity of the bottom 3 of the vessel. In this embodiment, the gas outlets 21, 22, 23, 24 and 25 are arranged substantially symmetrically with respect to the planar center line CL of the hull 4 substantially in a line, on the fore surface of the bottom 3 of the vessel. The gas outlets 21, 22, 23, 24 and 25 are arranged on the bottom 3 of the vessel is for the sake of causing the injected bubbles to be retained longer at the bottom 3 of the vessel, and alleviating variation in pressure owing to waves. The arrangement at the fore of the bottom 3 of the vessel is for the sake of causing the injected bubbles to be retained over the entire bottom 3 of the vessel as much as possible.

The arrangement of the gas outlets 21, 22, 23, 24 and 25 substantially in a line is for the sake of simplifying the configuration, and also facilitating the arraignment of the blowers 10, 11, 12, 13 and 14 and the air supply pipes 16, 17, 18, 19 and 20, which are provided correspondingly. In this example the number of the air nozzles 21, 22, 23, 24 and 25 is five, which is an odd number. Accordingly, the center one (air nozzle 23) may be disposed on the planar center line CL. This can realize one spot injecting of bubbles while maintaining the ability of the vessel 1 to hold a straight line. In this case, the air nozzles 21, 22, 23, 24 and 25 can adopt a configuration where the nozzles are arranged substantially symmetrically with respect to the planar center line CL of the hull 4 along the planar shape of the fore of the bottom 3 of the vessel.

The end plates 5, 5', 6, 6', 7 and 7' for guiding bubbles injected from the air nozzles 21, 22, 23, 24 and 25 such that the bubbles do not escape are arranged also symmetrically with respect to the planar center line CL of the hull 4 on the bottom 3 of the vessel. The end plates 6 and 6' and 7 and 7' are illustrated so as to be in the same dimensions in this figure. However, the end plates 7 and 7' may have smaller dimensions than those of the end plates 6 and 6'. The number of end plates is not limited to that represented in this figure. In addition thereto, the shear force sensors 50, 51, 52, 53 and 54 as shear force detectors for detecting shear forces owing to seawater and bubbles acting on the hull 4 are arranged on the bottom 3 of the vessel.

The relative velocity sensors 55 and 56 as the relative velocity detectors are arranged aft. Other relative velocity sensors 57 are arranged on the sides 8 of the vessel. These relative velocity sensors 55 and 56 are arranged apart from the air nozzles 21, 22, 23, 24 and 25. On the other hand, the relative velocity sensors 57 are arranged on spots without any influence of bubbles on the sides 8 of the vessel, even if the spot is near the nozzles. In particular, the relative velocity sensors 57 are arranged at lower spots without receiving the influence owing to waves, even though the spots are on the sides 8 of the vessel. These relative velocity sensors 55, 56 and 57 adopt ultrasonic systems. This allows use in the water, and reduces the influence owing to waves and currents.

The video cameras 58 and 59 for monitoring conditions of injected bubbles are arranged at fore and aft parts of the bottom 3 of the vessel. Images taken by these video cameras 58 and 59 are monitored by a person and utilized for analyzing the inject condition of bubbles.

Figure 11:
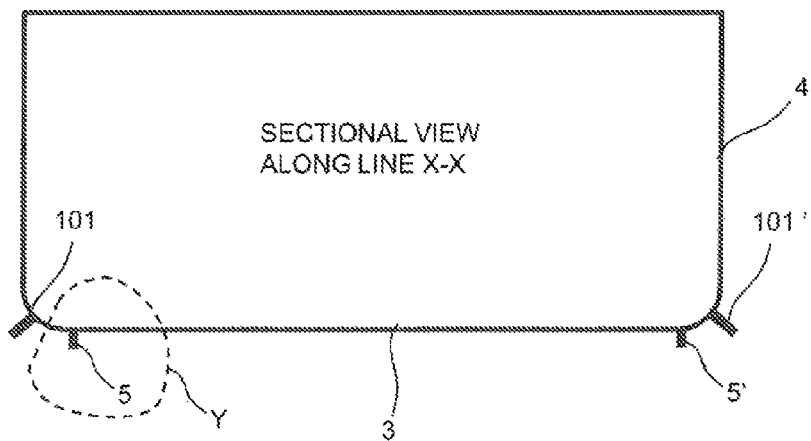
FIG. 11 is a sectional view of the hull according to an embodiment of the present invention taken along line X-X (of FIG. 10)

FIG. 11 is a sectional view of the hull 4 according to one embodiment of the present invention taken along line X-X (in FIG. 10). As shown in this figure, the end plates 5 and 5' and the bilge keels 101 and 101' are disposed. Typically, for example, the vessel is equipped with bilge keels arranged at connecting portions (bilge portion) between the bottom 3 of the vessel and the sides 8 of the vessel in order to facilitate stability on sailing. This can suppress rolling and turning over onto the side of the vessel, against natural phenomena, such as waves and currents, and a collision object. The end plates 5 and 5' according to the present invention can be arranged separately from the bilge keels 101 and 101'. The arrangement spots are preferably inside of the bilge keels 101 and 101' with respect to the planar center line CL.

On the other hand, the end plates 5 and 5' may be used for stabilizing the vessel. In this case, the performances pertaining to stabilization of the bilge keels 101 and 101' can be modified to an extent where the end plates 5 and 5' take charge of the stabilizing function. In this case, the design is preferably performed in consideration of structures, dimensions, arrangement spots and the like of the end plates 5 and 5' and the bilge keels 101 and 101', so as not to impede sailing of the vessel. The original purpose pertaining to the end plates 5 and 5' is to cause the bubbles to flow while retaining the bubbles at the bottom 3 of the vessel. Accordingly, designs of the end plates 5 and 5' and the bilge keels 101 and 101' are to be adopted in consideration of this.

Figure 12:
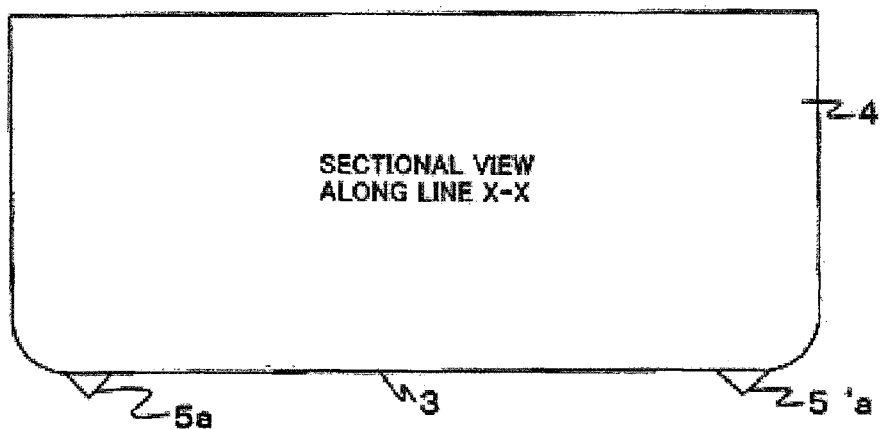
FIG. 12 is a sectional view of the hull according to another embodiment of the present invention taken along line X-X (of FIG. 10)

FIG. 12 is a sectional view of the hull 4 according to another embodiment of the present invention taken along line X-X (in FIG. 10). This figure shows a mode where the profile of the end plate is configured as a substantially triangle. As shown in this figure, the end plates 5a and 5a' have a substantially triangular shape whose base is the bottom 3 of the vessel. These end plates are different from the end plates 5 and 5' pertaining to FIG. 11 only in that the shapes are different. Accordingly, the detailed description thereof is omitted.

Here, in comparison between contact areas with water in cases of using this substantially triangular profile and the end plate 5 or 5' of the flat plate, the sum of two sides of the triangle is longer than one side. The adoption of the substantially triangle shape narrows the contact area with water, and allows the frictional resistance by arrangement of the end plates to be reduced. These end plates 5a and 5a' having a substantially triangular shape allow increase in frictional resistance of the end plates to be suppressed.

Figure 13:
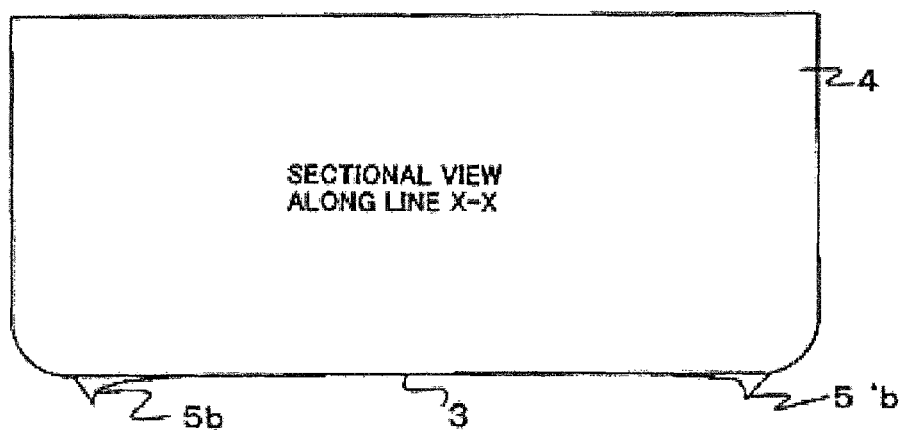
FIG. 13 is a sectional view of the hull according to yet another embodiment of the present invention taken along line X-X (of FIG. 10)

FIG. 13 is a sectional view of the hull 4 according to still another embodiment of the present invention taken along line X-X (FIG. 10). This figure shows a mode where the profile of the end plate is quadratic function curve or the like. As shown in this figure, the end plates 5b and 5b' have a shape to be a curve, such as a quadratic function curve, whose base is the bottom 3 of the vessel. These end plates 5b and 5b' are different from the end plates 5 and 5' pertaining to FIG. 11 only in that the shapes are different. Accordingly, the detailed description thereof is omitted. These end plates 5a and 5a' having the shape to be a curve, such as a quadratic function curve, allows increase in frictional resistance of the end plates to be suppressed.

Figure 14:
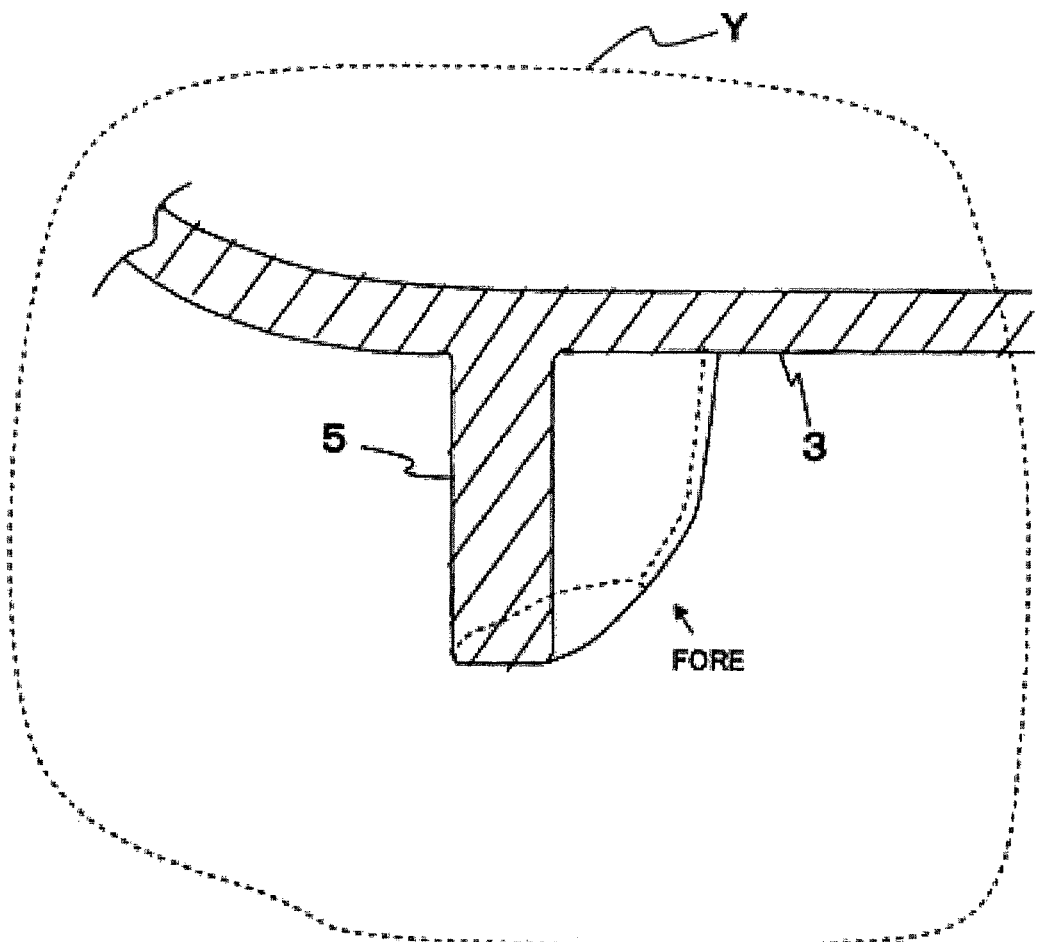
FIG. 14 is an enlarged view of a broken line Y part of FIG. 11 according to yet another embodiment of the present invention.

FIG. 14 is an enlarged view of a broken line Y part of FIG. 11 according to yet another embodiment of the present invention. This figure shows a mode where the fore of the end plate is a streamlined shape. As shown in this figure, the end plate 5 is preferably formed as a streamlined shape at its inner side with reference to the planar center line CL. It is necessary to perform the design in consideration that the end plate does not impede sailing of the vessel. More specifically, the distal end of the end plate 5 preferably has a shape similar to a shape where the angle of the surface is finely changed as with the distal end of a sword for facilitating cut an object. In cases where the end plate 5 has already been provided on the bottom 3 of the vessel, a component pertaining to the streamlined shape may be attached to the end plate 5. It is preferable that the aft part of the end plate also have a streamlined shape (not shown).

Figure 15:
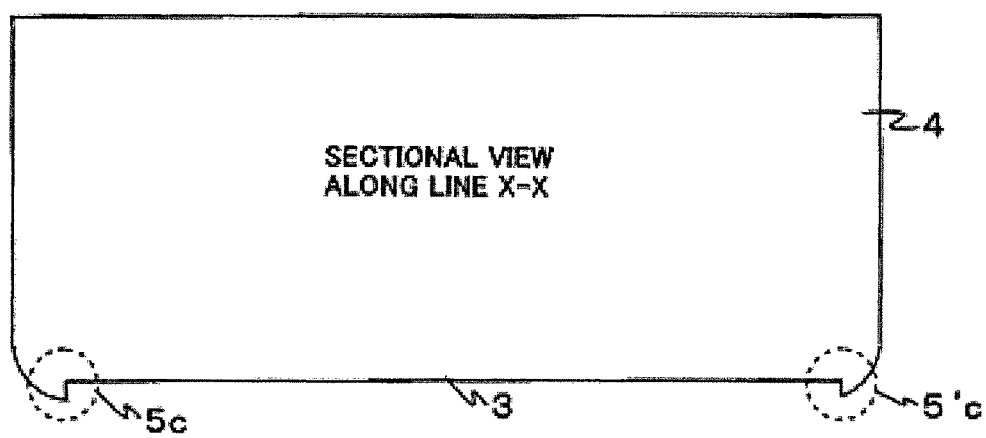
FIG. 15 is a sectional view of the hull according to still another embodiment of the present invention taken along line X-X (of FIG. 10)

FIG. 15 is a sectional view of the hull 4 according to still another embodiment of the present invention taken along line X-X (of FIG. 10). This figure shows a mode where a concave portion is formed at the bottom 3 of the vessel. As shown in this figure, there are adapted a configuration where the end parts 5c and 5c' are left instead of the end plates 5 and 5' shown in FIG. 11 and other parts are cut out, or a configuration where a configurational member pertaining to the concave portion having the end parts 5c and 5c' is arranged, or a configuration where the end parts 5c and 5c' are attached to the already provided bottom 3 of the vessel, or a configuration where the bottom 3 of the vessel itself has the concave portion. The forces of the end parts 5c and 5c' may be streamlined shapes as shown in FIG. 14. These end parts are different from the end parts 5 and 5' pertaining to FIG. 11 only in that the shape is different. Accordingly, further detailed description is omitted. The end parts 5c and 5c' and the concave portion sandwiched between these end parts enable bubbles to flow while being retained at the bottom of the vessel.

Figure 16:
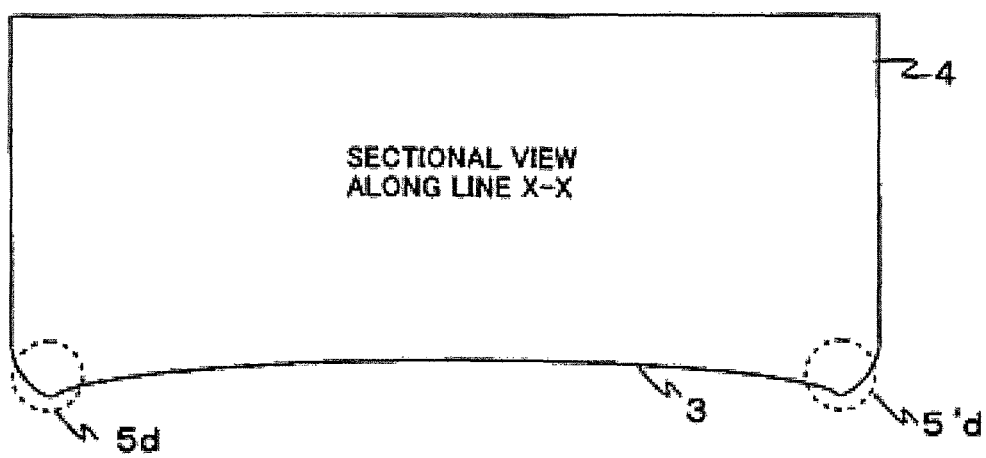
FIG. 16 is a sectional view of the hull according to yet another embodiment of the present invention taken along line X-X (of FIG. 10)

FIG. 16 is a sectional view of the hull 4 according to yet another embodiment of the present invention taken along line X-X (of FIG. 10). This figure shows a mode where a concave portion is formed at the bottom 3 of the vessel. As shown in this figure, there are adapted a configuration where the end parts 5d and 5d' are left instead of the end plates 5 and 5' shown in FIG. 11 and other parts are cut out, or a configuration where a configurational member pertaining to the concave portion having the end parts 5d and 5d' is arranged, or a configuration where the end parts 5d and 5d' are attached to the already provided bottom 3 of the vessel. These end parts are different from the end parts 5c and 5c' pertaining to FIG. 15 in the shapes at a part of the quadratic curve. The forces of the end parts 5d and 5d' may be streamlined shapes as shown in FIG. 14. These end parts are different from the end parts 5 and 5' pertaining to FIG. 11 only in that the shape is different. Accordingly, the detailed description is omitted. The end parts 5d and 5d' and the concave portion sandwiched between these end parts enable bubbles to flow while being retained at the bottom of the vessel.

Next, operation and a method of using the bubble retention device according to one embodiment of the present invention will be described using the conceptual view.

Figure 17:
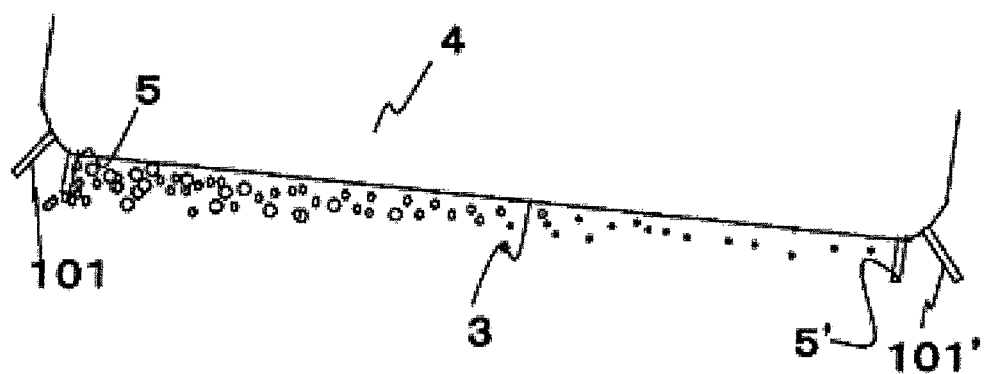
FIG. 17 is a conceptual view showing a state of retaining of bubbles in a case where end plates according to an embodiment of the present invention are arranged.

FIG. 17 is a conceptual view showing a state of retaining of bubbles in a case where end plates 5 and 5' according to an embodiment of the present invention are arranged. This figure shows a state of retaining bubbles when the vessel is inclined. In this case, in the sectional view taken along line X-X in FIG. 10, the inclination of the vessel causes a differential pressure between opposite ends of the bottom 3 of the vessel, and the bubbles moves to a low pressure part. This diffuses the bubbles out of the extent of the bottom 3 of the vessel, thereby reducing the frictional reduction effect by the bubbles. On the other hand, in the present application, the end plates 5 and 5' are arranged at the opposite ends of the bottom 3 of the vessel, thereby suppressing the bubble diffusion. More specifically, the bubbles moves from a high pressure part to a low pressure part, and it is impossible to move from the low pressure part to the high pressure part. Accordingly, to move to the low pressure part, the bubbles should detour around a barrier pertaining to the end plate 5. Thus, it is necessary to move to the high pressure part. Therefore, according to the above principle, the bubbles can be retained at the bottom 3 of the vessel. Likewise, in a case of reversed inclination. Even without the inclination of an extent shown in this figure, the bubbles detect a slight differential pressure according to a slight rolling and the like in sailing, and the bubbles move to a low pressure part in an analogous manner. However, the end plate 5 suppresses the diffusion owing to movement of bubbles, and the bubbles flow to the end of the end plate 5 while being retained. This allows the bubbles to be retained against the inclination of the vessel occurring owing to disturbance such as waves and flows and turning, and can effectively facilitate reduction in frictional resistance.

Figure 18:
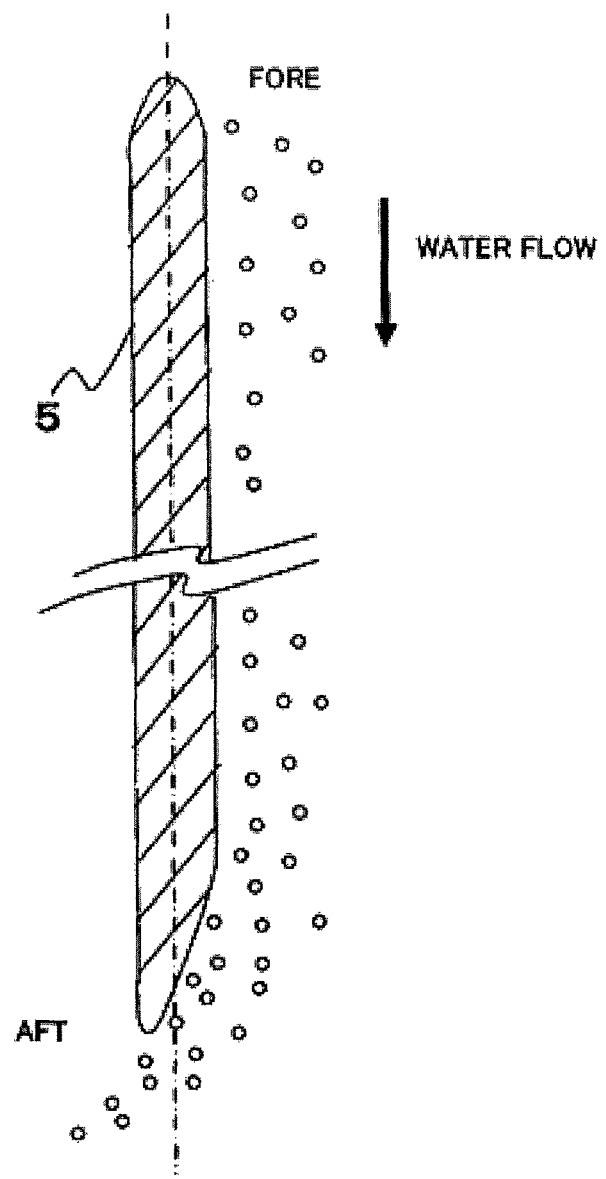
FIG. 18 is a conceptual view showing a state where bubbles flowing when a vessel is sailing in a case of arranging end plates according to an embodiment of the present invention whose fore and stern have streamline shapes.

FIG. 18 is a conceptual view showing a state where bubbles flow when a vessel is sailing in a case of arrangement pertaining to the end plates 5 and 5' according to an embodiment of the present invention whose fore and aft parts have streamlined shapes. In this figure, the fore parts of the end plates 5 and 5' have symmetrical shapes with respect to the center line. Accordingly, end plates 5 and 5' can avoid becoming a resistance impeding sailing of the vessel as much as possible. The aft parts of the end plates 5 and 5' have a smooth curve or inclination based on the center line from a deep aft part terminating a shallow aft part to form a streamlined shape. The bubbles are not released from the retained state suddenly at termination point pertaining to the aft parts of the end plates 5 and 5' as a boundary. Instead, the dimensions of the end plates 5 and 5' become smaller at the starting point of the smooth curve or inclination pertaining to the aft parts as a boundary. This shape smoothly releases the state of retaining bubbles. Accordingly, the bubbles gradually diffuse into the water. Further, a configuration where the aft parts open causes the bubbles, which have flowed while sufficiently covering the bottom of the vessel, to flow outwardly. This eliminates convolvement of the bubbles into the propeller (not shown) provided at the stern, and can thereby prevent the propulsion from dropping.

Fourth Embodiment

Figure 19:
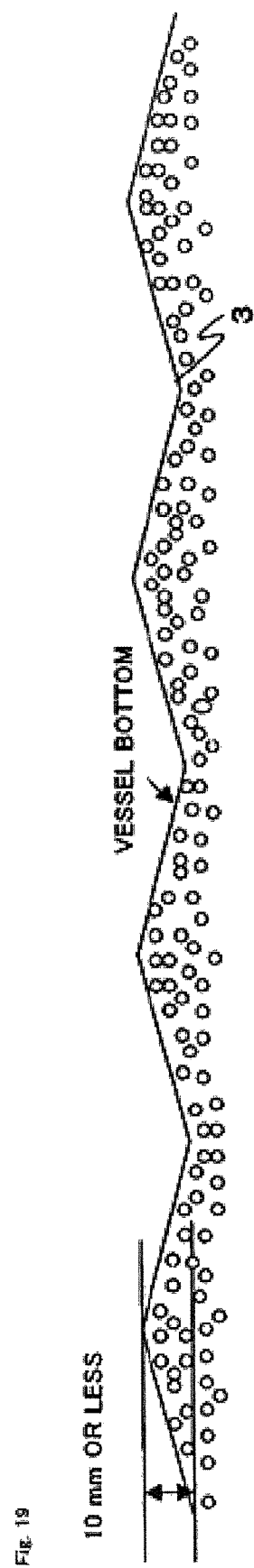
FIG. 19 is a sectional view conceptually showing a state of retaining bubbles when a vessel whose bottom has a triangular uneven profile in a sectional view is sailing, according to still another embodiment of the present invention.

FIG. 19 is a sectional view conceptually showing a state of retaining bubbles when a vessel whose bottom 3 has a triangular uneven profile in a sectional view is sailing, according to still another embodiment of the present invention. In this figure, in a case where the section of the bottom 3 of the vessel is an uneven profile pertaining to triangles, inclinations are formed by first and second triangles adjacent to each other whose bases are the bottom 3 of the vessel pertaining to the uneven profile. Differential pressures generated by the inclinations move the bubbles to a low pressure part. The bubbles surrounded by one triangular profile flow in the aft direction along the longitudinal direction with a low resistance, because crossing over the vertices of the triangles faces a resistance. This suppresses movement and diffusion of bubbles even by the differential pressure generated by the inclination of the hull on sailing of the vessel or a slight differential pressure generated by slight rolling. Accordingly, the bubbles flow while being retained at the bottom 3 of the vessel. The height dimension of the triangle whose base is the bottom 3 of the vessel is preferably equal to or less than 10 mm with reference to the bottom 3 of the vessel. The basic of this concept is to that the triangle is formed to have a height equal to or less than a height sufficiently covered with the bubbles. More specifically, the height dimension of the triangle whose base is the bottom 3 of the vessel is not limited to that equal to or less than 10 mm with reference to the bottom 3 of the vessel. Instead, the height may be about that where the bottom is sufficiently covered with bubbles.

Figure 20:
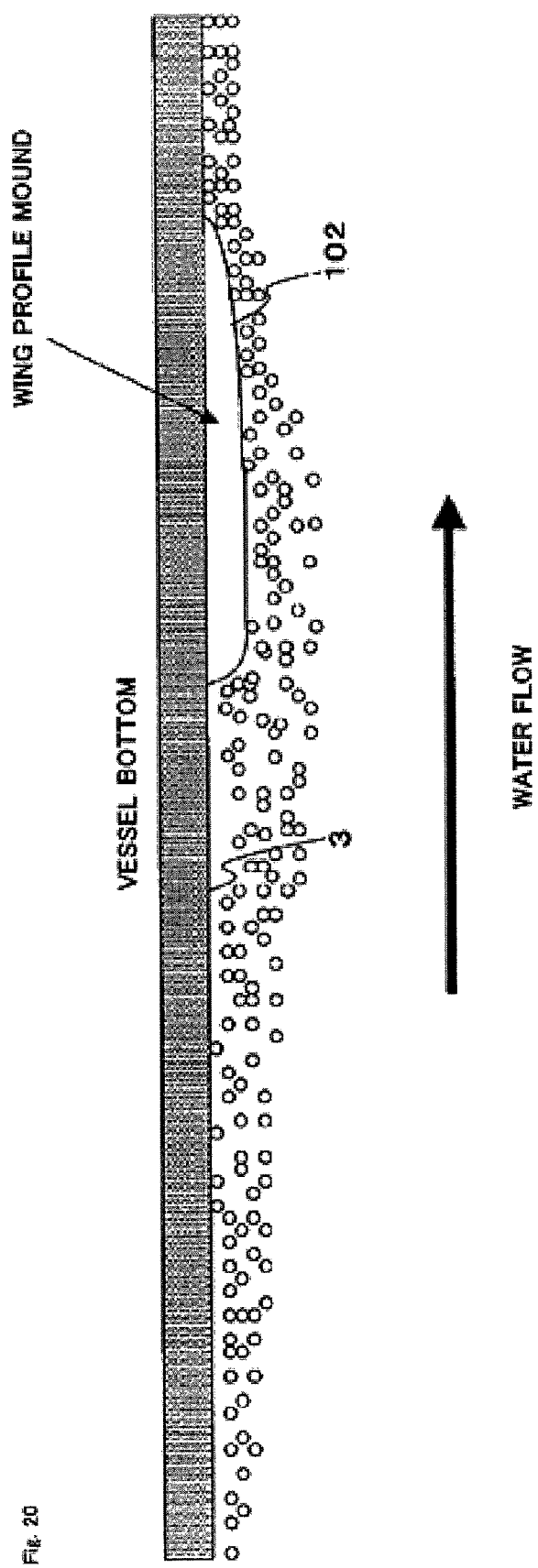
FIG. 20 is a sectional view conceptually showing a state of retaining bubbles at a vessel having a configuration including a mound that has a wing profile in a sectional view and arranged at the bottom of the vessel when the vessel is sailing, according to still another embodiment of the present invention.

FIG. 20 is a sectional view conceptually showing a state of retaining bubbles at a vessel having a configuration including a mound that has a wing profile in a sectional view when the vessel is sailing, according to still another embodiment of the present invention. In this figure, water flows in the opposite direction to the traveling direction of the vessel. Likewise, the bubbles also flow in the direction of the flowing water. On the other hand, as the bubbles flow downstream, the bubbles diffuse in the water. Accordingly, the frictional reduction effect by the bubble is reduced. However, a wing profile mound 102 is provided on the bottom 3 of the vessel. This attaches the bubbles to the bottom 3 of the vessel again, and improving the frictional reduction effect. More specifically, the bubbles flow along the shape of the wing profile mound 102. In order to cause the bubbles to flow along the shape of the wing profile mound 102, the surface shape of the wing profile mound 102 is required to be a shape having a smoothly curved profile in a sectional view. In a case where the starting end of wing profile mound 102 has an angle that is not smooth, there is a possibility that the surface of the wing profile mound 102 becomes a barrier and the bubbles diffuse at a collision. In a case where the terminating end of the wing profile mound 102 has an angle that is not smooth, the bubbles suddenly moves to a low pressure part pertaining to the bottom 3 of the vessel because of a differential pressure caused by an inclination between the terminating end and the bottom 3 of the vessel. This shape makes a part where bubbles do not accompanies the bottom 3 of the vessel. Accordingly, use of the differential pressure caused at the wing profile mound 102 having such a shape can suppress the bubble diffusion and improve the frictional reduction effect.

Figure 21:
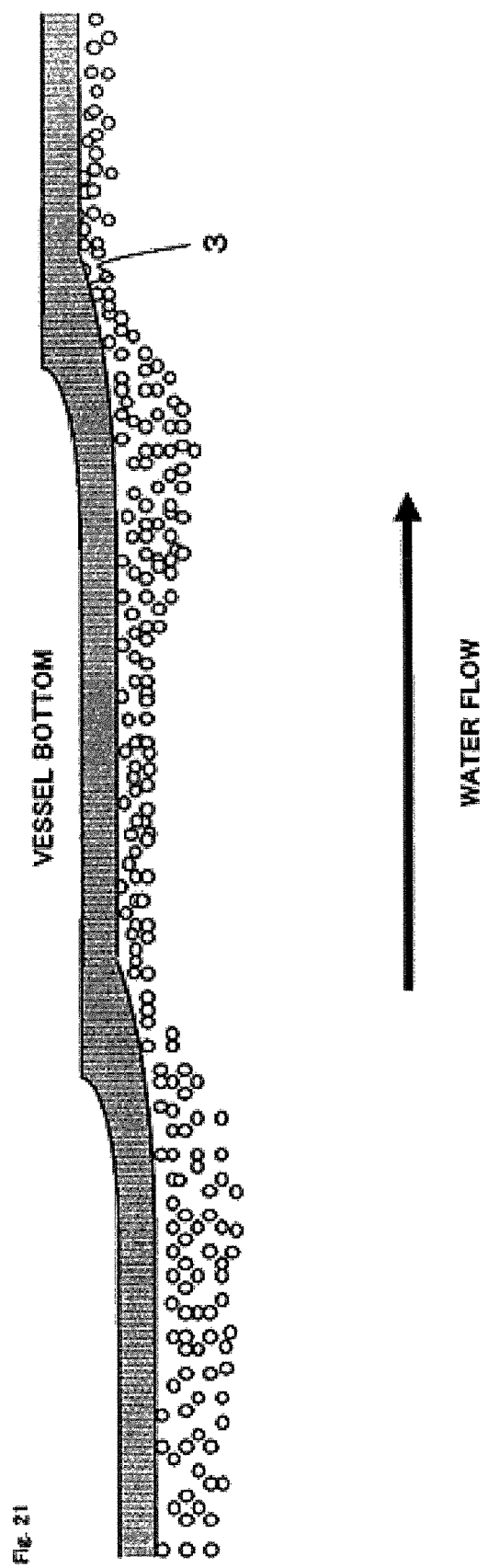
FIG. 21 is a sectional view conceptually showing a state of retaining bubbles at a vessel whose bottom has a configuration having a gentle step profile toward the stern in a sectional view when the vessel is sailing, according to yet another embodiment of the present invention.

FIG. 21 is a sectional view conceptually showing a state of retaining bubbles at a vessel whose bottom 3 has a configuration having a gentle step profile toward the stern in a sectional view when the vessel is sailing, according to yet another embodiment of the present invention. In this figure, analogous to the above, water flows in the opposite direction to the traveling direction of the vessel. Likewise, the bubbles flow in the flowing water direction. On the other hand, as the bubbles flow downstream, the bubbles diffuse in the water. This reduces the frictional reduction effect by the bubbles. However, the bottom 3 of the vessel has the gentle step profile toward the stern in a sectional view. This attaches the bubbles to the bottom 3 of the vessel again, and allows the frictional reduction effect to be improved. More specifically, fluid force effect because of the shapes of the first and second differences of steps allows the bubble diffusion to be suppressed, and enables the frictional reduction effect to be maintained. Analogous to the above, it is necessary that the terminating end of the difference of steps have a gently curved shape. Without this shape, the bubbles suddenly move to a low pressure part pertaining to the bottom 3 of the vessel, by a differential pressure caused by an inclination between the terminating end pertaining to the first difference of steps and the starting end of the second difference of steps. This forms a part where the bubbles do not attach to the difference of steps or the bottom 3 of the vessel is formed.

Fifth Embodiment

Figure 22:
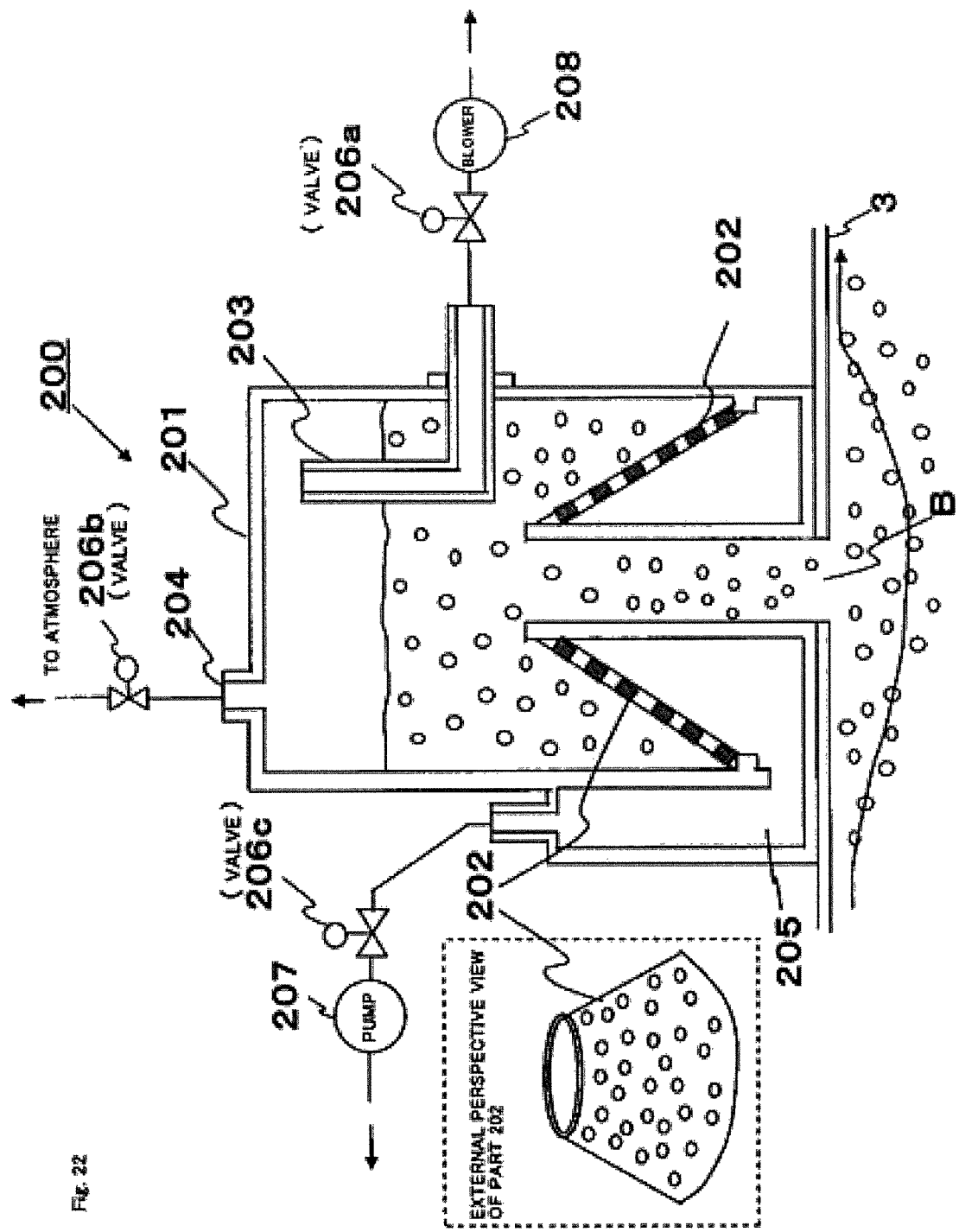
FIG. 22 is a sectional view for illustrating a configuration of a gas-liquid separator in a bubble retention device according to another embodiment of the present invention.
Figure 23:
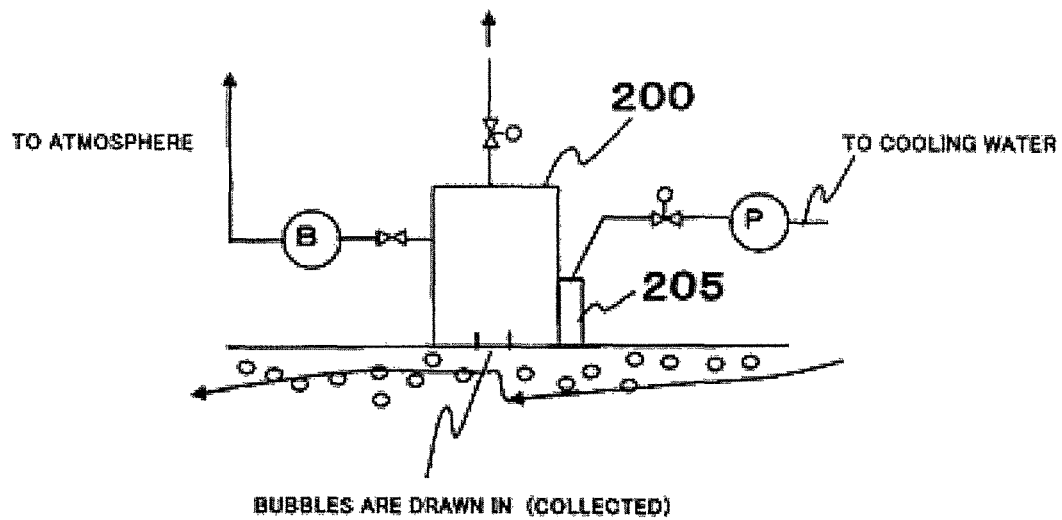
FIG. 23 is a conceptual view showing a method of using the gas-liquid separator in the bubble retention device according to another embodiment of the present invention.
Figure 24:
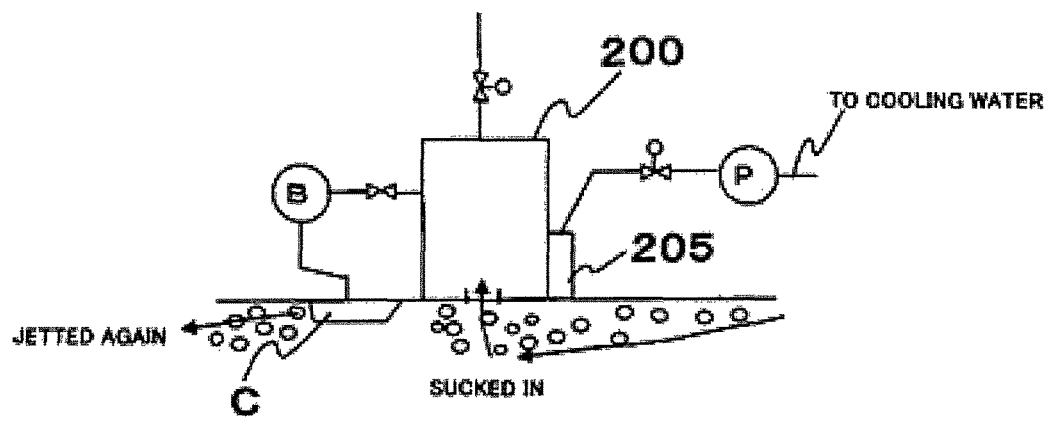
FIG. 24 is a conceptual view showing a method of using a gas-liquid separator in a bubble retention device according to another embodiment of the present invention.

FIG. 22 is a sectional view for illustrating a configuration of a gas-liquid separator 200 in a bubble retention device according to a fifth embodiment of the present invention. As shown in this figure, the gas-liquid separator 200 includes a main body 201, a bubble separation facilitating filter 202, a gas transfer pipe 203, a gas release port 204, a liquid transfer section 205, and valves 206*a*, 206*b* and 206*c*. The principle of the water displacement is applied to the gas-liquid separator 200. FIGS. 23 and 24 are conceptual views showing a method of using the gas-liquid separator 200 in the bubble retention device according to second embodiment of the present invention.

The main body 201 includes a moisture intake B, which is always open. The main body 201 internally includes a function of separating liquid and air from each other via the bubble separation facilitating filter 202. The bubble separation facilitating filter 202 has a conical shape surrounding a hollow cylinder having a moisture intake. The filter is formed into a conical shape. The gas transfer pipe 203 has a configuration where one opening is disposed inside of the main body 201, and the other opening is outside of the main body 201. The blower 208 has a function of drawing air from the opening pertaining to the outside via the valve 206a. The blower 208 is preferably has a configuration capable of transferring air even if water is mixed therein. A gas release port 204 is arranged on the top of the main body 201. A configuration capable of releasing unnecessary air to atmosphere via the valve 206b is adopted. On the other hand, the liquid transfer section 205 is provided inside of the main body 201, in a manner where the bubble separation facilitating filter 202 is a boundary, and a configuration capable of drawing water by a pump 207 via the valve 206c is adopted.

Figure 25:
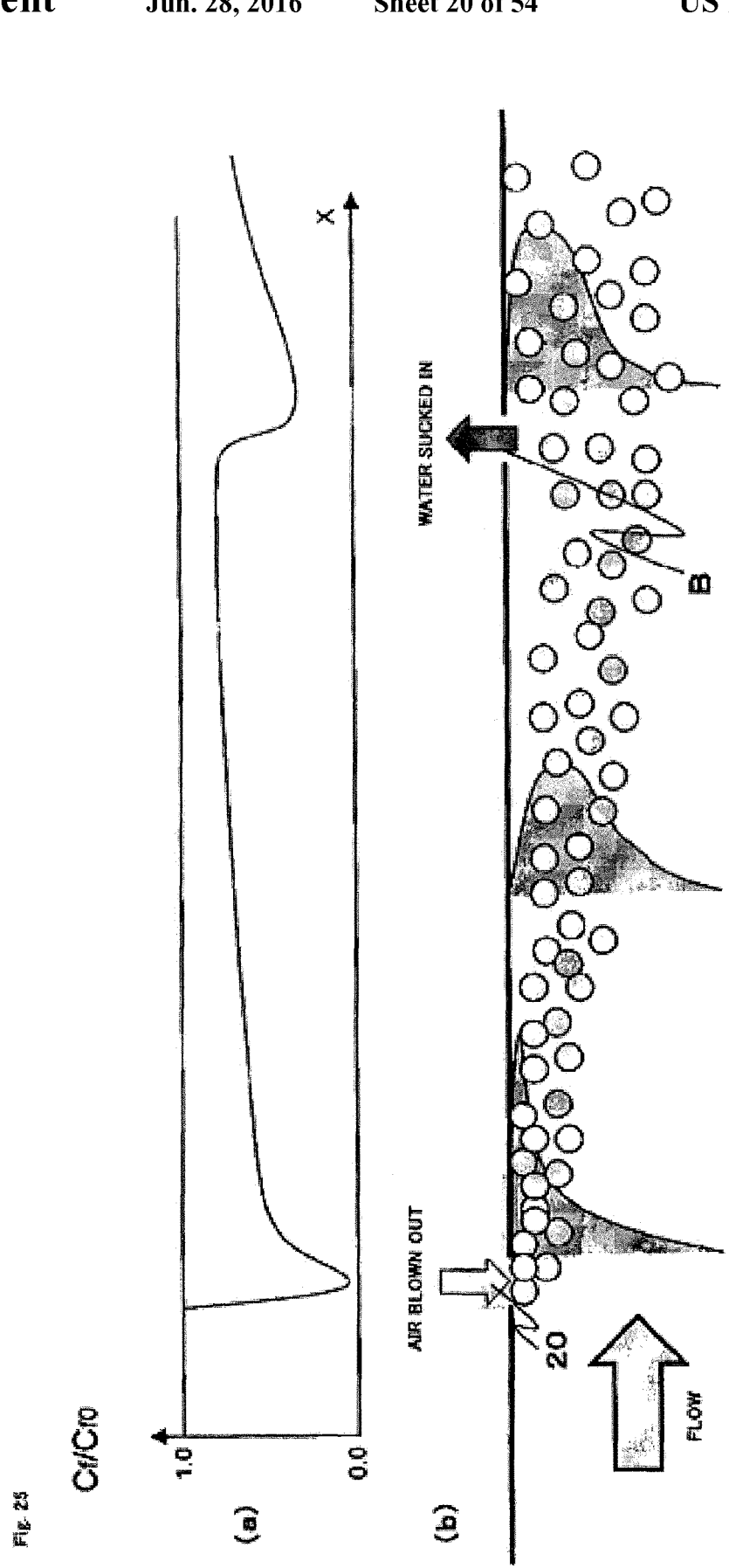
FIG. 25 is a diagram showing a situation pertaining to use of the gas-liquid separator in the bubble retention device according to another embodiment of the present invention.

Next, FIG. 25 is a diagram showing a situation pertaining to use of the gas-liquid separator 200 in the bubble retention device according to the fifth embodiment of the present invention. In this figure, (a) (hereinafter, also referred to as "(a)") is a conceptual view showing a frictional reduction effect when blowers 10, 11, 12, 13 and 14 according to an embodiment of the present invention blow air. In this figure, the abscissa axis represents a distance, and the ordinate axis represents what is converted from the frictional reduction effect into numeric value within an extent from 0.0 to 1.0. 1.0 represents the maximum value of the frictional force. 0.0 represents the minimum value of the frictional force (without friction). Further, in the figure, (b) (hereinafter, also referred to as "(b)") is a diagram showing a bubble diffusion condition in the water after blowing by the blowers 10, 11, 12, 13 and 14 according to an embodiment of the present invention. In this figure, the direction of the water flow is a direction from left to right. (a) and (b) have a relationship that both are correspond to each other. Accordingly, description will hereinafter be made using both figures and FIG. 22 as necessary.

First, as shown in (b), air injected via the air nozzle 20 drifts around the bottom 3 of the vessel. Accordingly, referring to (a), a state almost without friction because of the frictional reduction effect can be confirmed. However, referring to (b), once the bubbles are injected, the bubbles move along with the water flow. Accordingly, the bubbles diffuse in the water, and leave the proximity of the bottom 3 of the vessel. Therefore, referring to (a), the frictional reduction effect is suddenly reduced (the frictional force is suddenly increased). Subsequently, the frictional force increases at a certain rate (the numeric value approaches 1.0 from 0.0). This can also be considered as a phenomenon that occurs because moisture intrudes between the bubbles and the bottom 3 of the vessel. Therefore, referring to (b), the moisture intake B is arranged for drawing the incoming moisture before the bubbles diffuse (when the bubbles leave the bottom 3 of the vessel by about 5 to 7 mm) on the bottom 3 of the vessel in the astern direction (downstream direction of the water flow) with reference to the air nozzle 20. The gas-liquid separator 200 shown in FIG. 22 draws a small amount of moisture via the moisture intake B. This attracts the bubbles to the proximity of the bottom 3 of the vessel again. Accordingly, referring to (a), the frictional force is suddenly decreased immediate after drawing moisture. This recovers the frictional reduction effect. After the drawing, the bubbles diffuse in the water again, thereby gently increasing the frictional force.

Operation and a method of using of the gas-liquid separator 200 pertaining to the bubble retention device according to one embodiment of the present invention will hereinafter be described with reference to FIGS. 22, 23 and 24. The gas-liquid separator 200 pertaining to FIG. 22 is that the gas-liquid separator pertaining to FIGS. 23 and 24 is viewed sectionally from the rear. Accordingly, FIGS. 23 and 24 and FIG. 22 are laterally inverted.

As shown in FIG. 22, the moisture intake B always opens. Accordingly, the configuration is adopted where moisture comes inside of the main body 201 pertaining to the gas-liquid separator 200 via the moisture intake B. Here, water in the main body 201 can be retrieved by drawing of the pump 207. In retrieval, the bubble separation facilitating filter 202 separates gas included in water and liquid from each other. Accordingly, only liquid can be retrieved via the liquid transfer section 205. The retrieved moisture can be used for cooling water for the engine of the vessel. Presence and absence of drawing water can be operated by opening and closing the valve 206c. The pump 207 may always be driven. On the other hand, the gas separated by the bubble separation facilitating filter 202 can be retrieved by drawing of blower 208 via gas transfer pipe 203. Presence and absence of drawing gas can be operated by opening and closing the valve 206c. The blower 208 may always be driven.

Therefore, as shown in FIG. 23, the air drawn by the blower 208 is released to atmosphere, and the gas in the main body 201 is released to atmosphere via the valve 206b. Accordingly, the gas-liquid separator 200 can attract the gas to the proximity of the bottom 3 of the vessel again. As shown in FIG. 24, the gas drawn by the blower 208 can be injected again via the retrieved air nozzle C, thereby also allowing the frictional reduction effect to be amplified.

Sixth Embodiment

Figure 26:
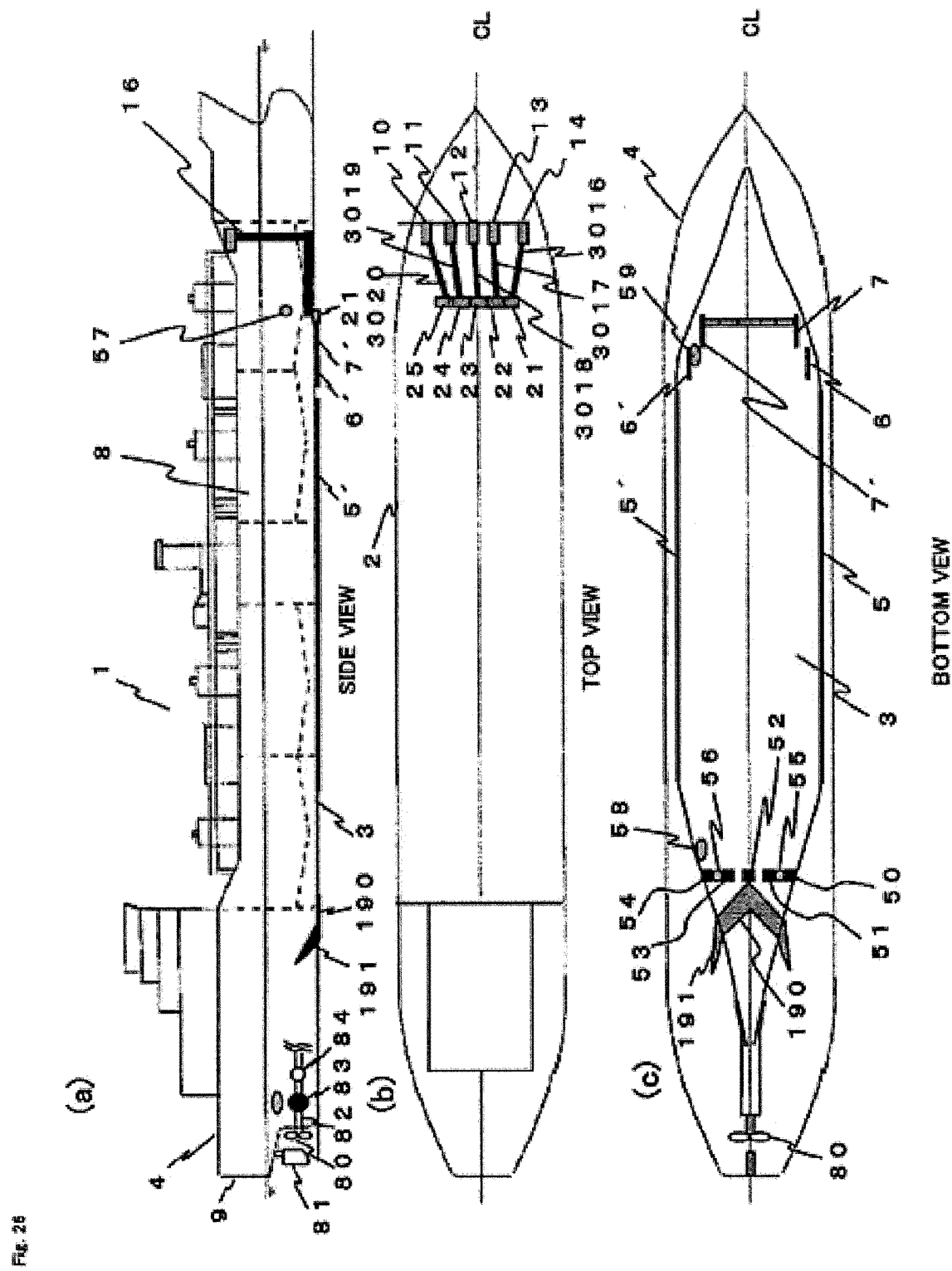
FIG. 26 (a) is a side view of a vessel to which a bubble convolvement prevention device of the vessel is applied according to sill another embodiment of the present invention.

FIG. 26 shows an example where the bubble convolvement prevention device for a vessel according to one embodiment of the present invention is applied to a vessel used in the ocean. FIG. 26 (a) is a side view of the vessel. FIG. 26 (b) is a top view thereof. FIG. 26 (c) is a bottom view. A part of a principal configuration is represented in an exposed manner.

The blowers 10, 11, 12, 13 and 14, as the gas supply or charged air means, are arranged on the deck 2 of the vessel 1. The taken air is separately pressurized, passes through the air supply pipes 3016, 3017, 3018, 3019 and 3020 having bent portions, and guided to the air nozzles 21, 22, 23, 24 and 25, which are gas outlets arranged in the proximity of the bottom 3 of the vessel. In this embodiment, the air nozzles 21, 22, 23, 24 and 25 are arranged at the fore of the bottom 3 of the vessel, symmetrically with respect to the planar center line CL of the hull 4, substantially in a line. The arrangement of the air nozzles 21, 22, 23, 24 and 25 at the bottom 3 of the vessel is for the sake of prolonging the retention of the injected bubbles over the entire bottom 3 of the vessel and alleviating variation in pressure owing to waves and the like. The arrangement at the fore of the bottom 3 of the vessel is for the sake of causing the injected bubbles to be retained over the entire bottom 3 of the vessel as much as possible.

The blowers 10, 11, 12, 13 and 14 are Roots-type positive-displacement blowers. Since the blowers are the positive-displacement type, the blowers are capable of stably supplying a predetermined rate of air even with previous variation in pressure. The Roots-type blower is capable of pressurizing air substantially continuously. Accordingly, pulsing is reduced, the rotation is smooth and vibration and noise are also reduced. Even with the arrangement of blowers 11, 12, 13, 14 and 15 on the deck 2, resonance cannot easily occur in the cabins therebelow.

The end plates 5, 5', 6, 6', 7 and 7', which guide the bubbles injected from the air nozzles 21, 22, 23, 24 and 25 so as not to escape, are arranged on the bottom 3 of the vessel symmetrically with respect to the planar center line CL of the hull 4. In addition thereto, the shear force sensors 50, 51, 52, 53 and 54, which detect shear forces owing to seawater and bubbles acting on the hull 4 are arranged aft on the bottom 3 of the vessel.

The relative velocity sensors 55 and 56 are arranged aft. Another relative velocity sensor 57 is arranged on the sides 8 of the vessel. These relative velocity sensors 55 and 56 are arranged apart from the air nozzles 21, 22, 23, 24 and 25. On the other hand, the relative velocity sensor 57 is arranged on a spot without any influence of bubbles on the sides 8 of the vessel, even if the spot is near the nozzles. In particular the relative velocity sensor 57 is arranged on a lower part of the sides 8 of the vessel without receiving influences of waves.

The video cameras 58 and 59 for monitoring conditions of injected bubbles are arranged at fore and aft parts of the bottom 3 of the vessel, respectively. Images taken by these video cameras 58 and 59 are monitored by a person and utilized for analyzing the inject condition of bubbles.

Here, a screw type propeller 80 is provided at the stern 9 of the hull 4 of the vessel 1. A rudder 81 is arranged aft thereof. Inside of the hull 4, the thrust torque gage 83 detecting the thrust force and torque is attached to the drive shaft 82 of the propeller 80. A vibration sensor 84 detecting vibration is attached in the proximity of the drive shaft 82. The thrust torque gage 83 may be a strain gage arranged on the surface of the drive shaft 82 of the propeller 80. Since the drive shaft 82 rotates, the thrust torque gage 83 picks up a signal wirelessly such that wires are not tangled. The vibration sensor 84 is arranged on the bearing or the like in the proximity of the drive shaft 82, and picks up vibration electrically.

V-shaped mound 190, which has a V-shape laterally spreading centered at the planar center line CL of the hull 4, is arranged on the bottom 3 of the vessel, as a protuberance of the bubble convolvement prevention structure. The mound is formed so as to include a wrapping portion 191 spreading around up to the sides 8 of the vessel.

The air nozzles will be described using the figure of the first embodiment. FIG. 3 is a perspective view conceptually showing the detailed structures of the air nozzles 21, 22, 23, 24 and 25. For the sake of simplicity of description, FIG. 3 shows a typical example of the plurality of air supply pipes and the air nozzles. The air blown from the blower 14 via the air supply pipe 16 is bent at right angle at a chamber 70 of the air nozzle 21 connected to the air supply pipe 16. A distribution component 71 having triangular profile for dispersing the blown air is arranged immediately below the connection part of the air supply pipe 16. A configuration is adopted according to which the air is bent at right angle at this part and dispersed laterally by the distribution component 71. This uniformizes the lateral distribution of the air with respect to the perforated plates 72 and 73.

A lot of perforations 74 and 75 are formed at the perforated plates 72 and 73. The positions of the perforated plates 72 and 73 are laterally displaced from each other, thereby forming an arrangement with the perforations in a displaced manner. Since perforated plates 72 and 73 are arranged so as to displace the positions of the perforations, the perforated plates 72 and 73 function as a so-called baffle plates, which bend the air flow to provide resistance. Accordingly, in addition to further uniformization of the air in the lateral direction, the air is uniformized also in the vertical direction, thereby enabling the air to be injected from a inject port 76 on a front surface.

Figure 27:
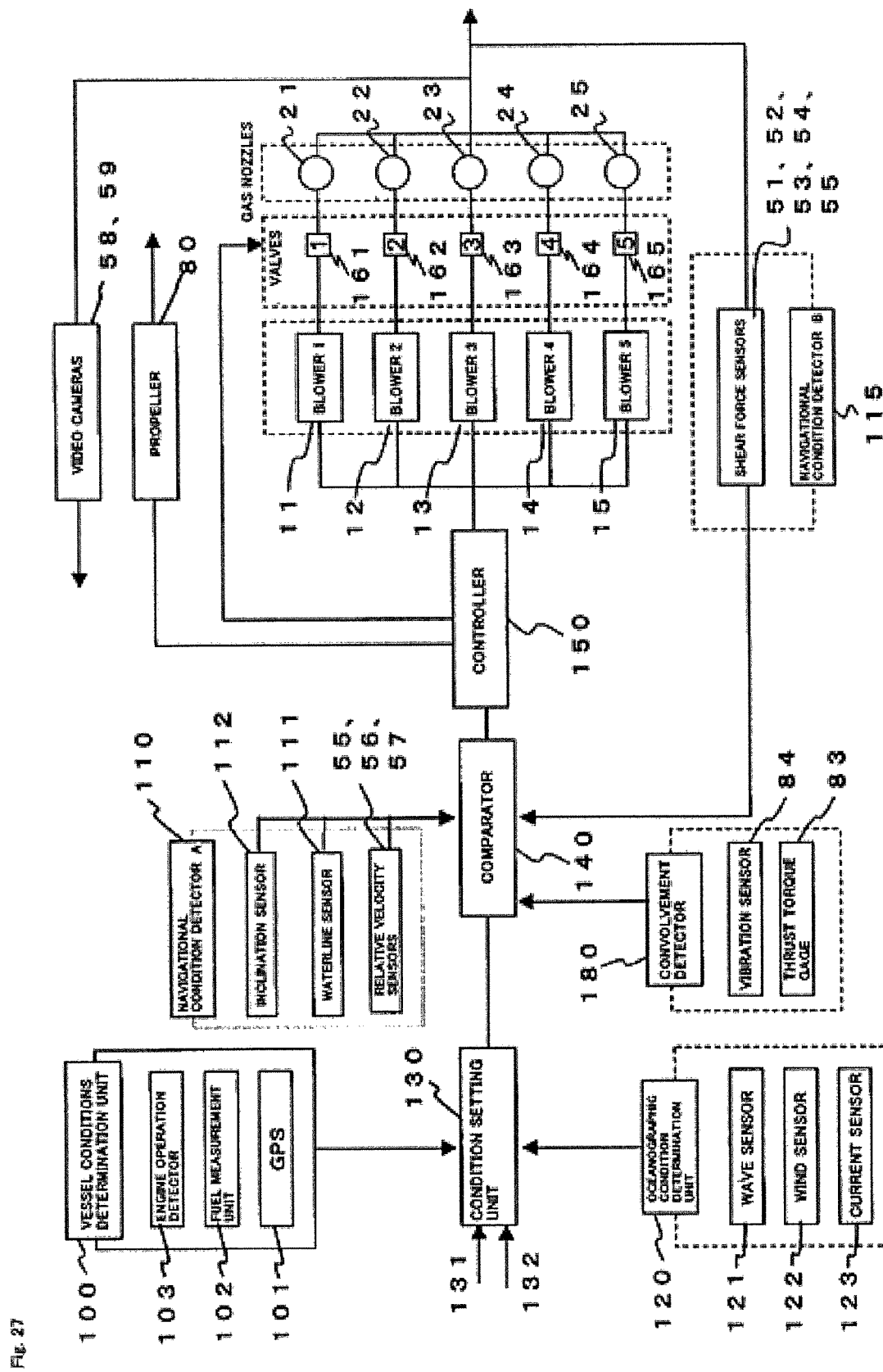
FIG. 27 is a block diagram of a bubble convolvement prevention device of a vessel of yet another embodiment of the present invention.

FIG. 27 is a control block diagram of this embodiment.

The vessel conditions determination unit 100 includes a GPS 101 detecting the location of the vessel 1, a fuel measurement unit 102 measuring fuel consumption of engines of the vessel 1, and an engine operation detector 103 detecting operational conditions of the engines of the vessel 1. The vessel conditions determination unit 100 specifically determines the present conditions of the vessel 1, and determines the present conditions that vary in a small degree on sailing or vary gradually.

The GPS 101 is used for determining which position or location on the map the bubble is injected or stopped. The fuel measurement unit 102 is used for measuring how much the engine consumes fuel in a prescribed time period and, when the fuel consumption efficiency falls below a prescribed efficiency, the injecting bubbles is stopped. The engine operation detector 103 detects various operating conditions including starting/stopping the engine of the vessel 1, and is used for acquiring information on stopping injecting bubbles when the operation of the engine is stopped, and starting injecting bubbles a prescribed time period after starting the operation. The engine operation detector 103 is also used for detecting the numbers of revolutions of the engines, and changes the number of working air nozzles and/or the inject rate of bubbles.

The navigational condition detector A110 includes the relative velocity sensors 55, 56 and 57, the draft sensor 111 detecting the waterline level of the hull, and the inclination sensor 112 detecting the lateral inclination with respect to the traveling direction of the hull, which is so-called rolling. Separate therefrom, the shear force sensors 51, 52, 53, 54 and 55 configure the navigational condition detector B115. These navigational condition detectors A and B detect physical quantities that relatively easily vary along with sailing of the vessel 1, or are controlled for the sake of changing.

The oceanographic condition determination unit 120 includes the wave sensor 121, the wind sensor 122 and the current sensor 123. The wave sensor 121 detects the wave height, direction, period and the like of a wave. The wind sensor 122 detects the wind velocity and direction of a wind. The current sensor 123 detects the current velocity, direction, height and the like of a current. In addition thereto, the oceanographic condition determination unit considers information on waves, winds, currents and the like including information on a general weather, and is used for determining that the injecting of bubbles is stopped when the oceanographic condition is stormy, and bubbles are generated when the condition is recovered.

The convolvement detector 180 includes an axial thrust torque gage 83 provided on the drive shaft 82 of the propeller 80, and the vibration sensor 84 arranged in the proximity of the drive shaft 83. These gage and sensors detect that bubbles are convolved into the propeller 80, and at least used for changing the operating conditions and the inject conditions of the blowers 10, 11, 12, 13 and 14 and the air nozzles 21, 22, 23, 24 and 25, and changing the operating condition of the propeller 80.

The information from the vessel conditions determination unit 100 and information from the oceanographic condition determination unit 120 are transmitted to the condition setting unit 130. The condition setting unit systematically sets conditions for injecting bubbles to the bottom 3 of the vessel. The conditions include starting/stopping injecting bubbles, which ones of the air nozzles 21, 22, 23, 24 and 25 the bubbles are injected from, which inject rate is to be set, which timing the injecting is started on, how a temporal bubble inject sequence is composed, when injecting is started and stopped and the like.

The condition setting unit also sets the inject condition and the operating condition of the air nozzles 21, 22, 23, 24 and 25 and the blowers 10, 11, 12, 13 and 14 along with bubble convolvement, and the controlling thresholds of the thrust torque gage 83 and the vibration sensor 84 in order to change the operating condition of the propeller 80. In addition to the thresholds, the condition setting unit further performs condition setting of the inject condition and the operating condition according to the detection values from the thrust torque gage 83 and the vibration sensor 84, condition setting for changing the operating condition of the propeller 80, combination condition setting, correction condition setting and the like. The condition setting instruction 131 for reducing the frictional resistance, and a condition setting instruction 131 for preventing bubble convolvement are also input into the condition setting unit 130.

According to the settings in the condition setting unit 130, the comparator 140 compares signals. The blowers 10, 11, 12, 13 and 14 and the propeller 80 are controlled via the controller 150. The controller 150 also controls the valves 161, 162, 163, 164 and 165 arranged on the discharge sides of the blowers 10, 11, 12, 13 and 14. These are attached for the sake of adjusting the valves 161, 162, 163, 164 and 165 and attains a desired air rate, in a case of controlling an air rate below the control region of the motors of the blowers 10, 11, 12, 13 and 14, and in a case of quickly adjusting the waterline level using the signal from the draft sensor 111.

Further, comparator 140 compares the detection signals from the thrust torque gage 83 and the vibration sensor 84 of the convolvement detector 180 and the thresholds thereof set by the condition setting unit 130. When it is determined that convolvement of bubbles above the threshold occur, the inject conditions of the air nozzles 21, 22, 23, 24 and 25 and/or the operating conditions of the blowers 10, 11, 12, 13 and 14 are changed, and the inject conditions are thus changed to those based on which the propeller 80 does not easily convolve the bubbles. When it is determined that convolvement of bubbles above the threshold occurs, the operating conditions of the propeller 80 are changed. This prevents the reduction in propeller efficiency from continuing, and reduces generation of vibration and noise and damage to the propeller 80. Under certain situations, the operating conditions of the propeller 80 are changed, thereby maintaining the propulsion. These changes in the inject condition of bubbles, the blower operating conditions, and the operating conditions of the propeller are used solely or in combination. The priority condition, changing procedures and the like are pursuant to the condition setting instruction 131 for reducing the frictional resistance, and the condition setting instruction 131 for the bubble convolvement prevention.

The signals from the shear force sensors 51, 52, 53, 54 and 55 attached on the bottom 3 of the vessel are fed back to the comparator 140, compared with the share force value preliminarily set by the condition setting unit 130. The operating conditions of the blowers 10, 11, 12, 13 and 14 are finely adjusted via the controller 150 pursuant to a prescribed rule according to the deviation, an algorithm and constants. The relative velocities between the hull 4 and seawater are detected by the relative velocity sensors 55, 56 and 57, and subjected to the prescribed statistical processing, and the representative value is transmitted to the comparator 140. The signals from the draft sensor 111 and the inclination sensor 112 are also transmitted to the comparator 140.

The comparator 140 compares the processed representative value from the relative velocity sensors 55, 56 and 57 and the setting value preliminarily set by the condition setting unit 130 with each other. The number of working nozzles, the inject rate of bubbles, and the bubble injecting pattern are controlled.

The comparator 140 also compares the value detected by the draft sensor 111 and the setting value preliminarily set by the condition setting unit 130 are compared with each other. The number of working nozzles and the inject rate of bubbles are controlled according to the draft of the hull 4. When swells come, the valves 161, 162, 163, 164 and 165 are controlled, and the pressures acting on the air nozzles 21, 22, 23, 24 and 25 are finely adjusted quickly by increasing and decreasing.

The comparator 140 also compares the inclination value of the hull 4 detected by the inclination sensor 112 and the setting value preliminarily set by the condition setting unit 130 with each other. The lateral inject spots of working air nozzles are changed responsive to the inclination of the hull 4, and inject rate of bubbles is increased or decreased, thereby allowing the frictional resistance to be effectively reduced.

Here, operation control on injecting of bubbles and the propeller using the signal from the convolvement detector 180 will be described. When bubbles are convolved into the propeller 80, the apparent density of seawater on which the propeller 80 is acting is reduced. This causes the propulsion to be decreased, and varies the thrust power and the torque of the propeller drive shaft 82. The thrust torque gage 83 attached to the drive shaft 82 detects this variation. In this case, detection may be made on the one. However, in this embodiment, both of them are detected and output in order to improve accuracy. In a region for a prescribed amount of convolvement, the propeller 80 vibrates. The vibration sensor 84 detects the vibration, applies processing, and output a signal thereof. This embodiment uses both the thrust torque gage 83 and the vibration sensor 84. However, any one of them may be sufficient.

In this embodiment, the thrust torque gage 83 is used mainly, and the vibration sensor 84 is used auxiliary for complement. The signal from the convolvement detector 180 is transmitted to the comparator 140.

The detection values from the thrust torque gage 83 and the vibration sensor 84 are also used as detection signals when cavitations occur at the propeller 80. The comparator 140 compares the thresholds as the setting values of the thrust power and the torque set by the condition setting unit 130 and the values of the thrust power and the torque detected by the convolvement detector 180 with each other. The threshold as the setting value of vibration set by the condition setting unit 130 and the detection value detected by the vibration sensor 84 are compared with each other. If any one of these three detection values falls below or exceeds the threshold, the number of working nozzles, the spots, and the inject rate of bubbles are controlled.

The bubble injecting control is performed by controlling the air nozzles 21, 22, 23, 24 and 25, the blowers 10, 11, 12, 13 and 14, and the valves 161, 162, 163, 164 and 165. The basic concept is to change the inject condition of bubbles when occurrence of convolvement of bubbles into the propeller 80 is detected. For example, the valves 161, 162, 163, 164 and 165 are controlled and the amount of bubbles is finely adjusted; the blowers 10, 11, 12, 13 and 14 are controlled and the amount of bubbles are decreased, thereby eliminating the convolvement of bubbles into the propeller 80; the working nozzles among the air nozzles 21, 22, 23, 24 and 25 are changed, and for example the injecting of bubbles from the air nozzle 23 disposed at the center is stopped by changing nozzles; or the air nozzles 22, 23 and 24 are stopped. The control of the number of nozzles, spots, and inject rate of these air nozzles 21, 22, 23, 24 and 25, blowers 10, 11, 12, 13 and 14, and valves 161, 162, 163, 164 and 165 can be used in any combination. However, the optimal combination is preliminarily acquired on the basis of a simulation, a model experiment, and a substantiative experiment. The optimal control condition is set by the condition setting unit 130.

In these optimal controls, the signals from the oceanographic condition determination unit 120 and the vessel conditions determination unit 100 are also used. For example, when the currents detected by the current sensor 123 is moving from a right diagonal to a left diagonal with respect to the traveling direction of the vessel 1, the bubbles are also drifted a little by the currents. Even under conditions where the convolvement of bubbles into the propeller 80 is typically detected and the air nozzles 22, 23 and 24 are stopped, in this case, this condition is changed to a condition for stopping the air nozzles 21 and 22. When, for example, the engine operation detector 103 detects change in output of the engine driving the propeller 80, the thrust power and the torque of the propeller drive shaft 82 are changed as a matter of course. Further, the threshold set by the condition setting unit is corrected in consideration of the change in output. This enables the thrust power and the torque against the convolvement of bubbles to be appropriately evaluated.

In any event, when the convolvement detector 180 detects the convolvement of bubbles into propeller 80, the air nozzles 21, 22, 23, 24 and 25, the blowers 10, 11, 12, 13 and 14, and the valves 161, 162, 163, 164 and 165 are controlled, and the operation conditions, such as the number of working nozzles, the spots and the inject rate of bubbles, are changed. This prevents the bubbles convolved into propeller 80, and prevents the reduction in propeller efficiency from continuing. Further, this can prevent vibration and noise at the propeller 80 along with the convolvement of bubbles from occurring, reduce damage to the propeller 80, and prevent a harmful effect on vessel 1. Thus, the bubble injecting control improves the thrust power, the torque and the detection value of the vibration. When every detection value exceeds or falls below the threshold, the injecting of bubbles are returned to the original control conditions.

Next, the control of changing the operating conditions of the propeller 80 when convolvement of bubbles is detected will be described. When the detection value detected by the thrust torque gage 83 falls below the threshold, and the convolvement of bubbles into the propeller is detected, in a case of performing output-oriented control, the output of the engine is increased, the rotation of the propeller drive shaft 82 is increased, and the thrust power and the torque are returned to the original. In this case, the propeller efficiency falls and the engine efficiency usually falls too. However, the output of the propeller 80 is maintained. Accordingly the hull velocity and the like do not fall. Under characteristics and conditions where the engine efficiency is not decreased even if the rotation is increased, the operation can be continued without decreasing the engine efficiency. In a case of performing efficiency-oriented operation with respect to propeller 80, the output of the engine is decreased, the rotation of the propeller drive shaft 82 is decreased, and the thrust power and the torque are further decreased. This attains results that alleviate the convolvement of bubbles into the propeller 80, recover the overall propeller efficiency, do not cause much decrease in thrust power and the torque, and can prevent vibration and noise along with convolvement of bubbles.

Thus, when the propulsion of the propeller 80 decreases along with convolvement of bubbles, change in operating conditions of the propeller 80 can increase the number of revolutions, and decrease the number of revolutions for addressing vibration and noise. The change in operating condition of the propeller 80 allows the influences owing to convolvement of bubbles to be reduced. When cavitations occur at the propeller 80, use of the detection values from the thrust torque gage 83 and the vibration sensor 84 can suppress occurrence of vibration and noise at the propeller 80, and also prevent damage to the propeller 80.

Here, effects of the V-shaped mound 190 and the wrapping portion 191 will be described.

Figure 28:
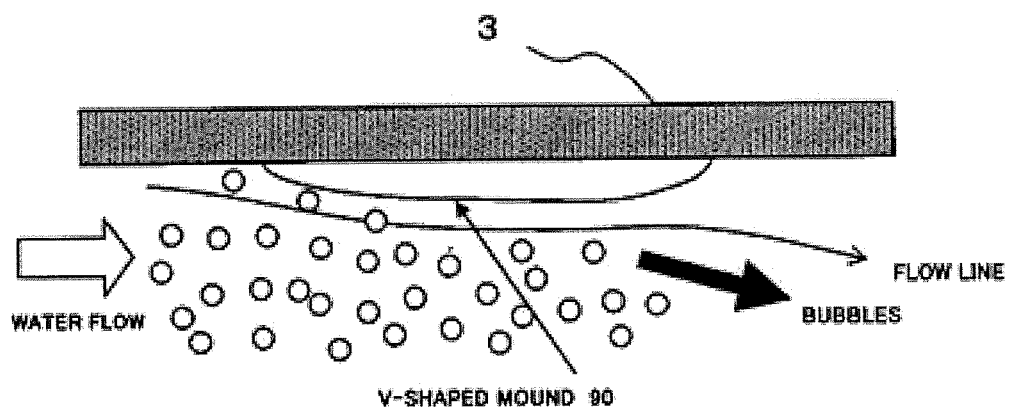
FIG. 28 is a conceptual view showing operation of an air nozzle used for a bubble convolvement prevention device of a vessel according to still another embodiment of the present invention.

The bubbles injected from the air nozzles 21, 22, 23, 24 and 25 to the bottom 3 of the vessel flow along the bottom 3 of the vessel, and are guided by the end plates 5, 5', 6, 6', 7 and 7'. However, a part of the bubbles rises along the sides 8 of the vessel to the surface of the sea. As the bubbles approach the propeller 80 side on the bottom 3 of the vessel, the bottom 3 of the vessel is gradually narrower, and the sides 8 of the vessel are gradually inclined. A part of bubbles having flowed along the inclined surface from the upstream direction winds around the slanted sides 3 of the vessel and rises to the water surface. However, a considerable amount still flows along the bottom 3 of the vessel. When the bubbles reach the V-shaped mound 190, the V-shaped mound 190 causes the bubbles to move apart from the bottom 3 of the vessel, as shown in FIG. 28. This is because of effects that the shape of the V-shaped mound 190 is a structure slightly low at the fore portion and protuberant at the aft portion and smoothly continuous, thereby causing the bubble to leave the bottom 3 of the vessel. The bubbles wind to the sides 3 of the vessel at the V-shaped mound 190 are guided to the water surface by the wrapping portion 191 having a similar protuberance. This further prevents the bubbles from flowing along the sides 3 of the vessel toward the propeller 80.

Figure 29:
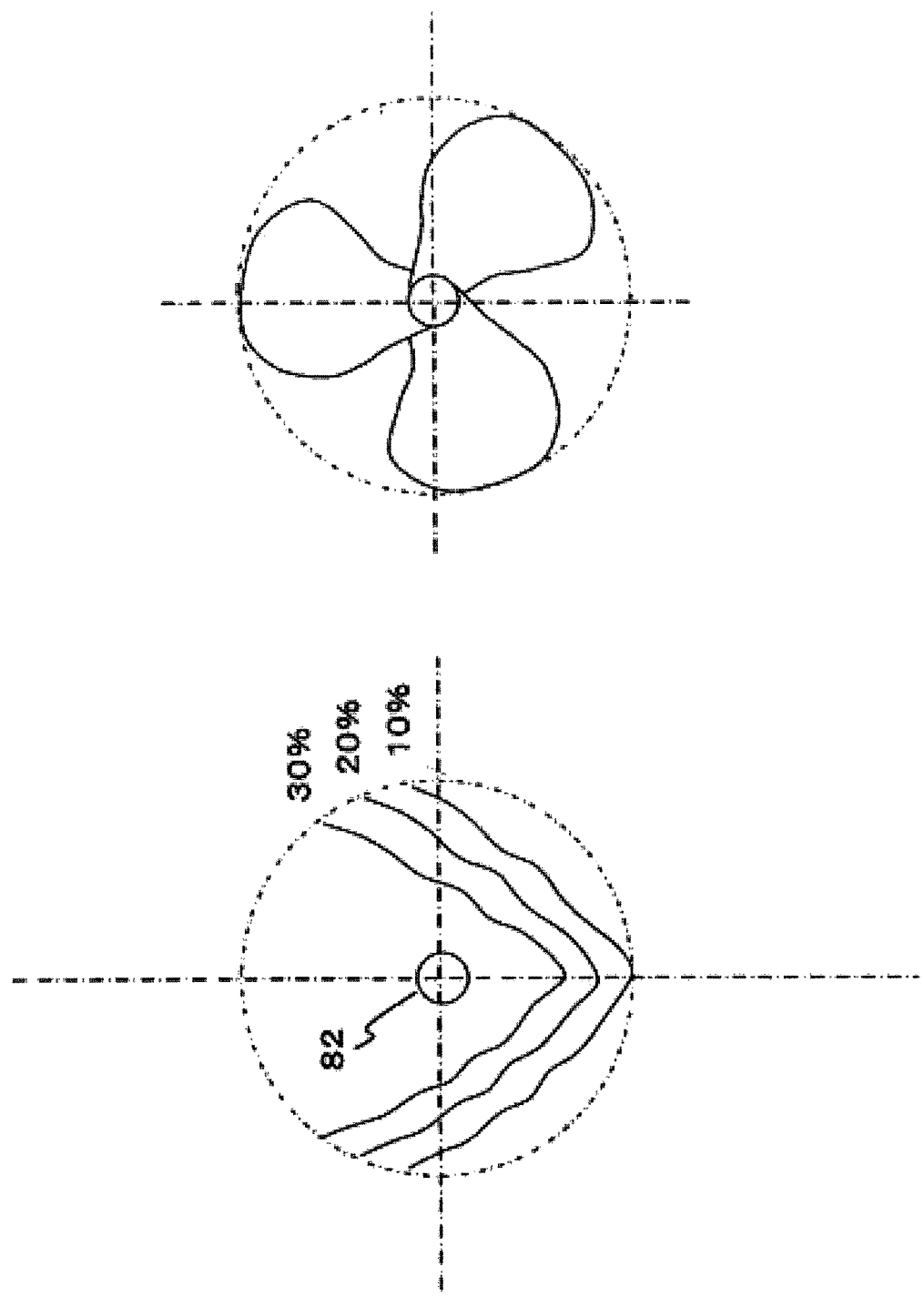
FIG. 29 is a diagram showing distribution of velocity of flow of water at a propeller of a vessel according to yet another embodiment of the present invention.

FIG. 29 shows the situations of the flow around the propeller 80. FIG. 29 illustrates how flow velocities around the propeller 80 distribute with respect to the navigational speed of the vessel 1. Lines where the velocities become slower by 10%, 20% and 30% with respect to the navigational speed are represented as iso-velocity lines. As apparent in FIG. 29, the flow velocities around the propeller 80 distribute in a substantially V-shaped manner. The velocities are high at lower part of the propeller 80, and low at the upper part. In view of propulsion of the vessel 1, the lower the flow velocities exert on the propeller 80, the higher the efficiency is. In comparison with the upper and lower parts of the propeller 80, the upper part effectively acts in view of propulsion. On the other hand, in view of the effect of bubbles, as a phenomenon, bubbles escape in a direction where the water pressure is low. If the velocity is high, the dynamic pressure component becomes high and the static pressure component becomes low, according to the Bernoulli theorem. That is, in comparison at the same level of depth of water, the bubbles tend to accumulate at an area with a high flow velocity, and tend to escape from an area with a low pressure.

The effects of the V-shaped mound 190 includes effects that separate the bubbles from the bottom 3 of the vessel by the V-shaped mound 190, lower the streamline downward further from the bottom 3 of the vessel, and slows the flow velocities at the lower part of the propeller 80. Accordingly, presence of the V-shaped mound 190 exerts an effect that separates the bubbles from the bottom 3 of the vessel, and causes the bubbles quickly wind around the sides 8 of the vessel. Since the flow velocities of the lower part of the propeller 80 are slowed, an effect that suppresses convolvement of bubbles into the propeller 80, and an effect that improves the propulsion of the propeller 80 are exerted. Further, since the V-shaped mound is formed so as to laterally spread centered at the planar center line CL of the hull 4, the bubbles can escape symmetrically and effectively apart from the propeller 80 arranged symmetrically on the planar center line CL. Since the mound has the substantially V-shape, increase in frictional resistance of the flow along the bottom 3 of the vessel against the hull 4 is further suppressed. The symmetric shape facilitates manufacture thereof. As to effects of the mound, since the mound can be formed as the protuberance made of a strength member at the bottom 3 of the vessel, the operation can proceed without any obstacles when the vessel 1 is carried in a dock and mounted on bases. The V-shaped mound 190 may be made of a strength member. This improves the strength in fore and aft directions at the bottom 3 of the vessel, and realizes a strong hull structure against bending owing to redundant wave forces (sagging and hogging) exerted on the vessel 1.

Seventh Embodiment

Figure 30:
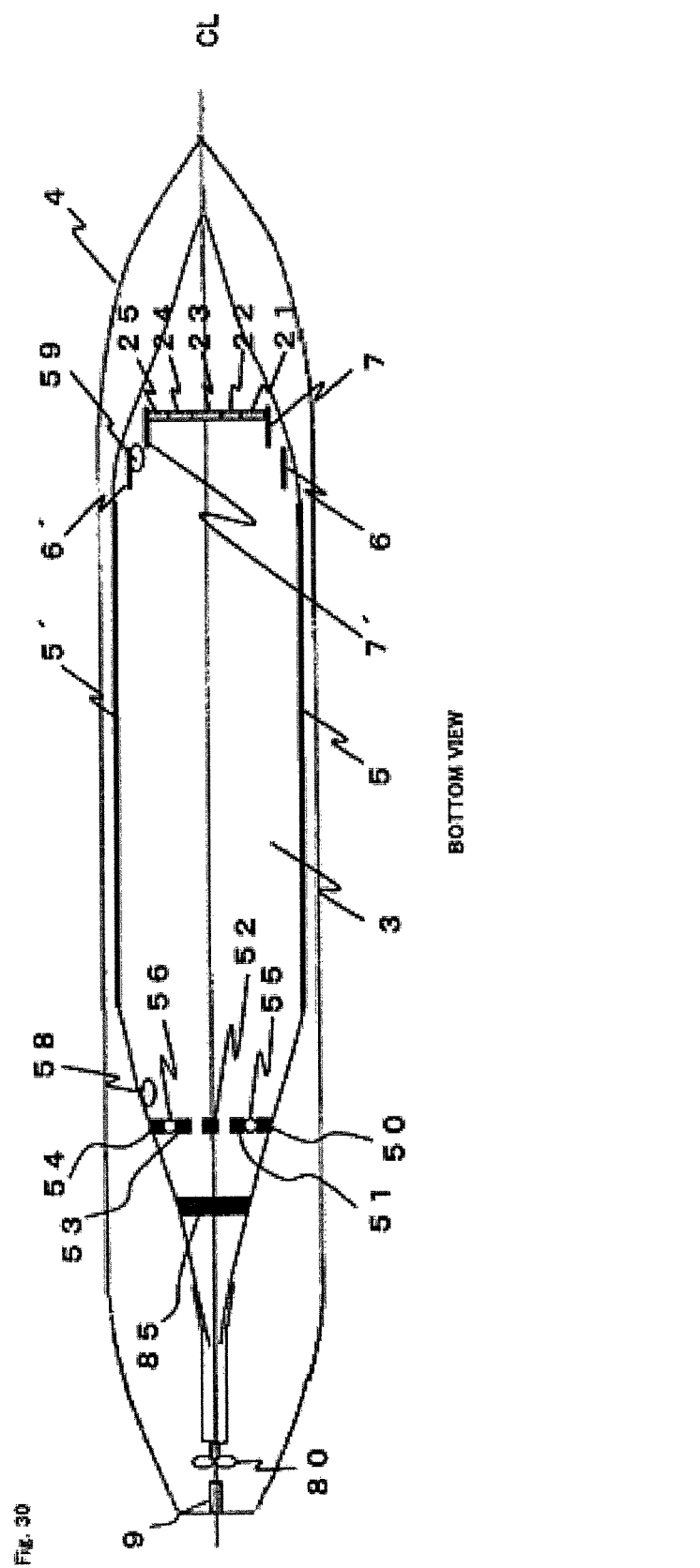
FIG. 30 is a bottom view of a vessel to which a bubble convolvement prevention device of the vessel is applied according to still another embodiment of the present invention.

FIG. 30 shows a seventh embodiment of the present invention. The seventh embodiment will be described only on difference from the sixth embodiment. Other elements have the same configurations as those of the sixth embodiment.

Figure 31:
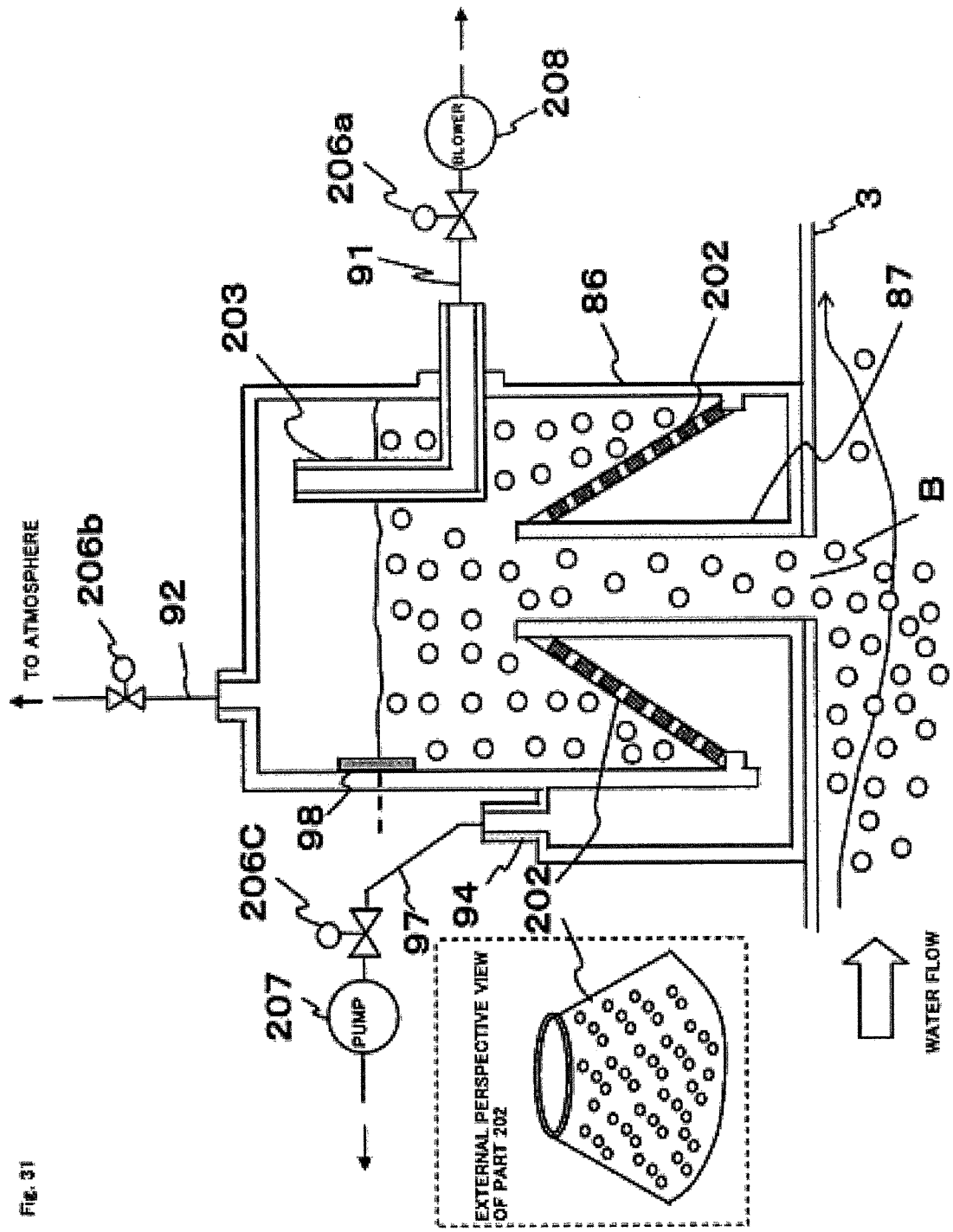
FIG. 31 is a sectional view principally showing a gas-liquid separation system used in another embodiment of the present invention.

In FIG. 30, the air nozzles 21, 22, 23, 24 and 25 injecting bubbles are arranged on the bottom 3 of the vessel 1. On the other hand, a bubble intake 85 drawing bubble-mixed seawater is arranged in fore of the propeller 80 provided at the stern 9 of the hull 4. FIG. 31 shows the detail of this part together with the gas-liquid separator.

In FIG. 31, a gas-liquid separation chamber 86 as gas-liquid separation mechanism is formed inside of a bubble intake B arranged at the bottom 3 of the vessel. The bubble-mixed seawater drawn from the bubble intake B enters the gas-liquid separation chamber 86 via the cylinder 87. The gas-liquid separation chamber 86 is formed so as to secure a sufficient volume. The bubble-mixed seawater flowed thereinto is sufficiently slowed down and the bubbles rise and accumulated as air. An air intake pipe 91 is connected to the gas-liquid separation chamber 86. The air intake pipe 91 is for discharging the air accumulated in the upper part by the blower 208 from the air connection pipe 203 via the air valve 206a, to the outside such as the atmosphere, where the propeller 80 does not cause reconvolvement. An air discharge pipe 92 discharging air is connected to the upper part. The air valve 206b is provided also at the air discharge pipe 92. The bubble separation filter 202 having a lot of apertures is provided at lower part of the gas-liquid separation chamber 86. Here, a resistant effect by the multiple apertures further separates the bubbles having not risen well. The seawater from which bubbles have been drawn is drawn by the pump 207 from the water intake pipe 94 via the water valve 206c, and transferred via the water pipe 97 for use for cooling water and anti-rolling tank of the vessel 1. A water level sensor 98 for detecting the water level is provided at the gas-liquid separation chamber 86. The number of revolutions of the blower 208 is controlled so as to provide certain air accumulation in the upper part. The blower 208 is a positive-displacement type even capable of blowing seawater-mixed bubbles, and made of an anti-corrosion material. The air connection pipe 203 faces downward from the top surface of the gas-liquid separation chamber 86, to which the air discharge pipe 92 is connected, and has a structure where the air is left in the upper part even if the balance of the pump 207 and blower 208 is lost, and absorbs the pulsing of pressure while the pump 207 operates. The bubble separation filter 202 is formed as a conical shape, and disposed in a slanted manner in a sectional view. This exerts a high bubble separating effect, and can prevent foreign matters from being mixed from the ocean into the pump 207 or the pipe 97. These bubble intake B, gas-liquid separation chamber 86, blower 208, pump 207 and the like configure the bubble drawing system.

With such a configuration, the bubble intake B arranged in fore of the propeller 80 draws the bubbles to be convolved into propeller 80 in advance, and reliably prevents the bubbles from reaching the propeller 80, thereby preventing the propeller efficiency from decreasing. The bubble intake B is arranged in the proximity of the propeller 80. Accordingly, the frictional reduction effect by bubbles injected to the bottom 3 of the vessel is sufficiently exerted, and subsequently the bubbles are drawn and discharged to the outside, where reconvolvement does not occur, thereby sufficiently exerting the frictional reduction effect. Even in case of trouble in any one of the blower 208 of the bubble drawing system and the pump 207, convolvement of bubbles can be prevented to a certain extent by closing the valve of the system concerned and opening the air valve 206b of the air discharge pipe 92.

The bubble-mixed seawater drawn from the bubble intake B is separated to sucked-in bubbles and water by the gas-liquid separator 86. This eliminates mixture of water into the blower 208 and the pump 207, and is capable of stably exerting the function. The water separated by the gas-liquid separator 86 can be used for another application for the vessel 1, such as the cooling water, supply water for the anti-rolling tank.

Eighth Embodiment

Figure 32:
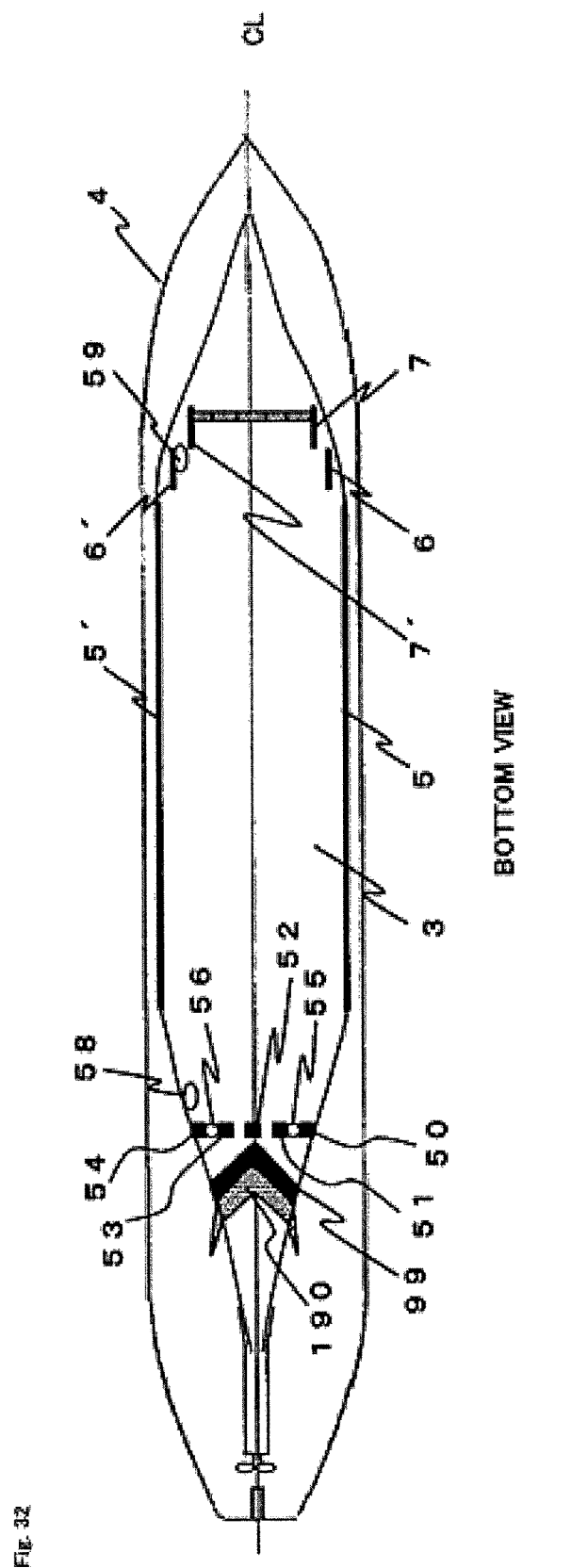
FIG. 32 is a bottom view of a vessel to which a bubble convolvement prevention device of the vessel is applied according to still another embodiment of the present invention.
Figure 33:
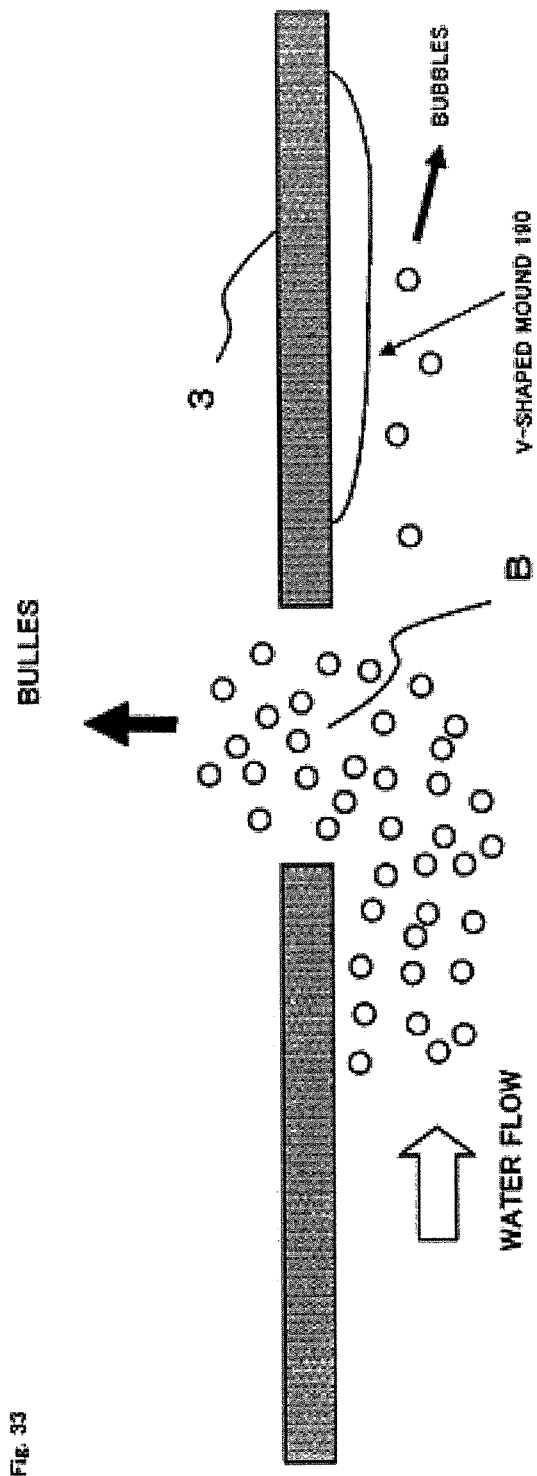
FIG. 33 is a conceptual view showing operation of an air intake used for a bubble convolvement prevention device of a vessel according to yet another embodiment of the present invention.

FIGS. 32 and 33 show an example of an eighth embodiment of the present invention. The eighth embodiment is an example of combination between the previous V-shaped mound and the bubble drawing system.

However, in the eighth embodiment, a bubble intake 99 has a substantially V-shaped appearance in conformity with the V-shaped mound 190, and is disposed in fore of the V-shaped mound 190, as shown in FIG. 32.

FIG. 33 shows the detailed operation thereof. The V-shaped mound 190 for preventing the convolvement of bubbles is arranged in the aft of the bubble intake 99. Accordingly, even if the bubbles having not been drawn yet flow out of the bubble intake 99 owing to various disturbances, the V-shaped mound 190 can cause the bubbles to escape, and reliably prevent convolvement into the propeller 80. According to a case where the amount of bubbles is small, situations of the vessel 1, and the navigational condition, the blower 208 and the pump 207 are stopped, thereby enabling only the V-shaped mound 190 to operate. This allows the reduction effect of the net frictional force to be improved in a finer manner. The V-shaped mound 190 is arranged in the proximity of an aft region of the bubble intake 99. In addition to the above effect of the V-shaped mound 190, this exerts an effect that causes the bubbles to escape because the flow velocity is lowered at the V-shaped mound 190, and an effect that facilitates that the bubbles having escaped is drawn from the bubble intake 99.

Ninth Embodiment

Figure 34:
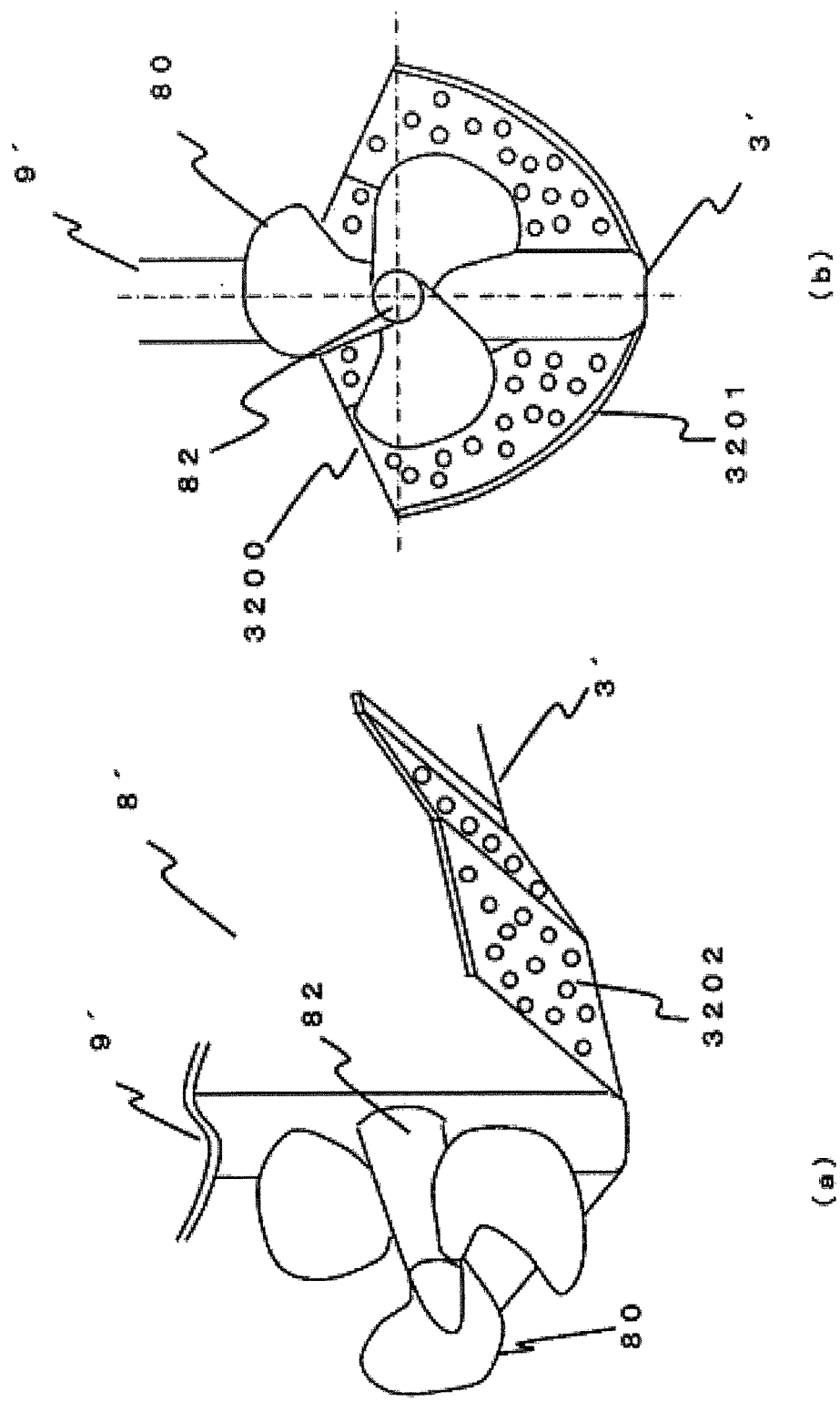
FIG. 34 (a) is a perspective view of a bubble protection plate used for a bubble convolvement prevention device of a vessel of another embodiment of the present invention.

FIG. 34 shows a ninth embodiment of the present invention. FIG. 34 (a) shows a perspective view thereof. FIG. 34 (b) shows an elevation view from the stern. Bubble protection plates 3200 and 3201 are arranged symmetrically at a propeller attachment section 9' at the stern so as to develop from an elongated section 3' of the bottom of the vessel in a substantially V-shaped manner when viewed from the stern. The bubble protection plates 3200 and 3201 are provided so as to be fixed to an elongated section 8' of the sides of the vessel, and formed so as to develop also toward the propeller 80 aft. A lot of round apertures 3202 are perforated at the bubble protection plate. The bubbles injected from the air nozzles 21, 22, 23, 24 and 25, flowing from the upstream and nearly drawn by the propeller 80 are baffled by the resistance of the bubble protection plates 3200 and 3201, and flow away along the shape of the bubble protection plates 3200 and 3201 while spreading around the propeller 80. On the other hand, the seawater flows into the inside of the bubble protection plates 3200 and 3201 by rotation of the propeller 80 from the round apertures 3202 perforated at the bubble protection plates 3200, and 3201 and reaches the propeller 80. In this case, in comparison with a case without the bubble protection plates 3200 and 3201, the distribution of velocities of flow at the lower part of the propeller is slightly slow, owing to presence of the bubble protection plates 3200 and 3201. This improves the propulsive efficiency of the propeller 80, and allows efficient operation from an overall aspect.

Thus, the bubble protection plates 3200 and 3201 cause the bubbles to escape away from the propeller 80, slow the flow velocity of seawater flowing along the hull 4 to flow therein, and slow the distribution of velocities of flow around the propeller 80. This therefore exerts effects that slow the distribution of velocities of flow at the lower part of the propeller and improves the propeller efficiency. Only for the purpose that bubble protection plates 3200 and 3201 cause the bubbles to escape and prevent the efficiency of propeller 80 from being decreased, the apertures 3202 are unnecessary. The bubble protection plates may be elongated more upward or more aft, or shortened downward or more fore. In any event, presence of the bubble protection plates 3200 and 3201 allows the amount of convolvement of bubbles into the propeller 80 to be reduced, and can prevent the propulsive efficiency of the propeller from being decreased, even with varying degrees. The multiple round apertures 3202 are perforated at the bubble protection plates 3200 and 3201. If a shape with edges such as square apertures is adopted, in a case where the bubble protection plates 3200 and 3201 are configured with stainless steel, the residual stress at the edges owing to pressing facilitates stress corrosion. As measures therefor, the round apertures, whose residual stress is small when being pressed, are perforated. Further, as to the effect of the bubble protection plates 3200 and 3201, since these plates are arranged at a region in fore of the propeller 80 where the flow velocity is high, it is prevented that the oceanic floating matters and algae are tangled into the propeller 80.

The advantageous effects of the sixth to ninth embodiments as described above will hereinafter be described.

First, the configuration includes the vessel 1, the air nozzles 21, 22, 23, 24 and 25 injecting bubbles at least to the bottom 3 of the vessel 1, the blowers 10, 11, 12, 13 and 14 blowing air to the air nozzles 21, 22, 23, 24 and 25, the propeller 80 arranged at the stern 9 of the hull 4 of the vessel 1, and the substantially V-shaped mound 190, which prevents the convolvement of bubbles into propeller 80, at the aft of the air nozzles 21, 22, 23, 24 and 25 toward the stern at least on the bottom 3 of the vessel.

With this configuration, the rise of the bubbles are impeded by the bottom 3 of the vessel itself, the bubble retaining effect can be maintained, and a small amount of bubbles can effectively reduce the frictional resistance. The influences of waves are alleviated at the air nozzles 21, 22, 23, 24 and 25 arranged on the bottom 3 of the vessel, in comparison with a case of arrangement on the sides of the vessel. This allows the stable frictional resistance reduction effect of the hull 4. In particular, the substantially V-shaped mound 190 exerts effects that separate the bubbles flowing along the bottom 3 of the vessel from the bottom 3 of the vessel, prevent the bubbles from flowing into the propeller 80, slow the flow velocity at the lower part of the propeller 80 by the V-shaped mound 190, suppress the reconvolvement of bubbles, and improve the propulsion of the propeller. In particular, the shape of the substantially V-shaped mound 190 is a structure slightly low at the fore portion and protuberant at the aft portion and smoothly continuous. This makes these effects remarkable.

The substantially V-shaped mound 190 can be formed so as to have a strength member as the protuberance at the bottom 3 of the vessel. Accordingly, there is no obstacle when the vessel 1 is carried on the bases under docking situations, thereby facilitating the operation.

The mound has the substantially V-shape. Accordingly, the configuration with the strength member improves the strength of the bottom 3 of the vessel in the fore and aft directions, and realizes a hull structure strong against bending owing to redundant wave forces exerted on the vessel 1.

The bubble protection plates 3200 and 3201 are arranged in the proximity and in fore of the propeller 80, where the flow velocity is high. This can prevent the oceanic floating matters and algae from being tangled into the propeller 80.

The bubble protection plates 3200 and 3201 are made of stainless perforated plate having the round apertures anticorrosive to seawater. This can reduce the occurrence of stress corrosion owing to residual stress at the edges, and increase corrosion resistance.

The bubble intake B at least drawing bubbles is arranged at the aft of the air nozzles 21, 22, 23, 24 and 25 and in fore of the propeller 80, draws the bubbles to be convolved into propeller 80 in advance, causes the bubbles not to reach the propeller 80, and discharges the drawn bubbles to atmosphere or the outside, where reconvolvement does not occur. This can reliably prevent the convolvement. Further, the bubble intake B is arranged in the proximity of the propeller 80. Accordingly, the frictional reduction effect by the bubbles injected to the bottom 3 of the vessel is sufficiently exerted. Subsequently, the bubbles are drawn, and the frictional resistance is reliably reduced. In case of trouble in the blower 208 or the pump 207, convolvement of bubbles can be prevented to a certain extent by opening the air valve 206b of the air discharge pipe 92.

The bubble separation filter 202, which is arranged at the lower part of the gas-liquid separation chamber 86 and has a lot of apertures allows the bubble separating effect to be improved, and can prevent mixture of foreign matters from the ocean into the pump 207 or the pipe 97.

The substantially V-shaped mound 190 is arranged in the proximity of the aft region of the bubble intake 99. Accordingly, the flow velocity is decreased at the substantially V-shaped mound 190. This exert an effect of causing the bubbles to escape, and facilitates that the bubbles having escaped are drawn from the bubbles intake 99.

The thrust torque gage 83 detecting the convolvement of bubbles into propeller 80 and the vibration sensor 84 are provided. When the gage or the sensor detects the convolvement of bubbles, the inject conditions of the air nozzles 21, 22, 23, 24 and 25 and/or the operating conditions of the blowers 10, 11, 12, 13 and 14 are changed. This can prevent further convolvement of bubbles, and prevent the efficiency of the propeller 80 from being decreased. Further, this can prevent occurrence of vibration and noise at the propeller 80 along with the convolvement of bubbles, prevent the propeller 80 from being damaged, and prevent the harmful effect on the vessel 1.

When the thrust torque gage 83 detecting the convolvement of bubbles into propeller 80, or vibration sensor 84 detects convolvement of bubbles, the operating conditions of the propeller 80 are changed. Accordingly, if the propulsion of the propeller 80 is decreased along with the convolvement of the bubbles, the frictional force reduction effect is improved by increasing the number of revolutions and reducing the number of revolutions as measures against vibration and noise, while the harmful effect on navigation of the vessel 1 is also prevented. Further, when the cavitations occur, the detection values from the thrust torque gage 83 and the vibration sensor 84 are utilized, and occurrence of vibration and noise at the propeller 80 is suppressed, and damage to the propeller 80 is also prevented.

Tenth Embodiment

Figure 35:
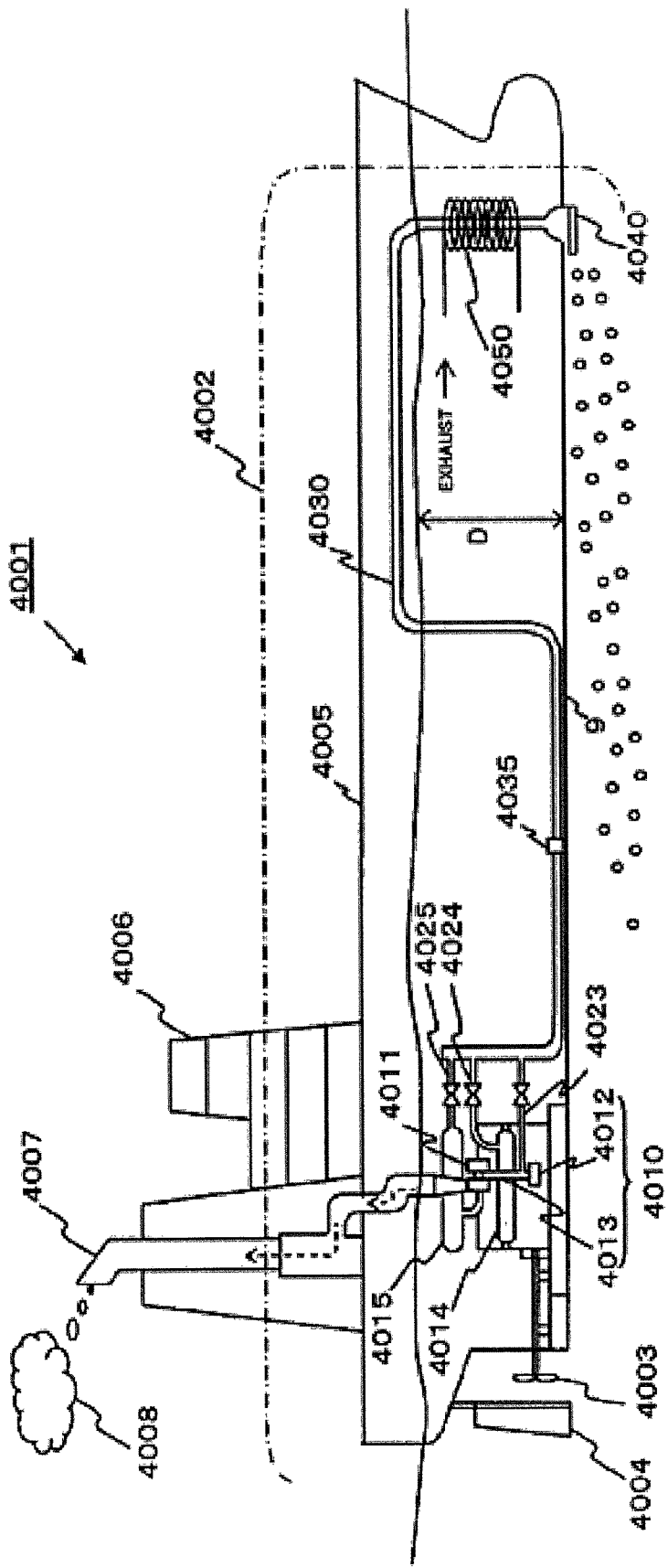
FIG. 35 is a diagram sectionally showing a inject gas control device according to one embodiment of the present invention and an overview of a vessel equipped with this device.

FIG. 35 is a diagram sectionally showing a inject gas control device according to one embodiment of the present invention and an overview of a vessel equipped with this device. As shown in this figure, a inject gas control device 4002 is mounted on a vessel 4001 according to the present application. The inject gas control device 4002 includes a main engine 4010, which is a propulsive main engine of the vessel 4001. In addition thereto, as equipment, the vessel 4001 is equipped with mechanisms necessary for sailing of the vessel, including: a screw 4003 driven by the main engine 4010 to acquire the propulsion of the vessel; a rudder 4004 changing and adjusting the traveling direction by changing the water flow using a plate of the vessel 4001 in the water; a deck 4005 as a floorboard; a deck 4006 as an upper floor; and a chimney 4007 discharging exhaust gas 4008 from the engine 4010 to air.

A air supply pipe 4030 is sequentially communicated with three bypass pipes, which are attached to the main engine 4010 and will be described later. The air supply pipe 4030, which includes bent portions, is a pipe for transferring a gas with a certain pressure and temperature to the gas outlet 4040. The piping is installed from a position of collecting the three bypass pipes so as to be a shape where the piping plunges once to a height around the bottom of the vessel, passes the bent portions, is bent at a height higher than the waterline and laid substantially horizontally, and passes the bent portions and plunges in the direction toward the bottom of the vessel. The piping path thus passes once at a height of the waterline or higher. This can prevent seawater from flowing reversely into the gas outlets arranged on or below the waterline, and avoid dangerous situations of the main engine in view of security. The gas outlet 4040, which is arranged at or in the proximity of the bottom of the vessel and injects bubbles from an opening perforated at or in the proximity of the bottom of the vessel into the water near the bottom 9 of the vessel, is connected to the other end of the air supply pipe 4030. A heater 4050 for heating gas passing through the air supply pipe 4030 is arranged before the gas outlet 4040 of the air supply pipe 4030. A flowmeter 4035 is attached to a part of the air supply pipe 4030 on or below the waterline. The gas supply or charged air or the scavenged gas is heated by the heater 4050 using the exhaust gas, thereby reducing the water viscosity resistance. This further improves the resistance reduction effect of the vessel, thereby allowing reduction in resistance to be further improved. As a driving source of the heater 4050, the exhaust gas from the turbocharger 4011 may be utilized. Instead, an energy generator such as an electric generator that is arranged separately may be used.

The main engine 4010 includes a turbocharger 4011 having a mechanism for forcedly blowing compressed air into the engine (combustion chambers), an intercooler 4012 cooling air compressed by the turbocharger 4011 while maintaining the pressure, an air supply pipe 4013 transferring the compressed air, a scavenged gas receiver 4014 for accumulating the compressed air, and the exhaust gas receiver 4015 for accumulating the generated gas combusted by the engine 4010. A gas supply or charged air bypass pipe 23, which bypasses a part of gas supply or charged air and guides the air to the air supply pipe 4030, is communicated with the air supply pipe 4013. A scavenging bypass pipe 4024, which bypasses a part of the scavenged gas and guides the gas to the air supply pipe 4030, is communicated with the scavenged gas receiver 4014. An exhaust gas bypass pipe 4025, which bypasses a part of the exhaust gas and guides the gas to the air supply pipe 4030, is communicated with the exhaust gas receiver 4015. The other ends of the gas supply or charged air bypass pipe 4023, the scavenging bypass pipe 4024, and the exhaust gas bypass pipe 4025 are sequentially connected to the air supply pipe 4030.

Figure 36:
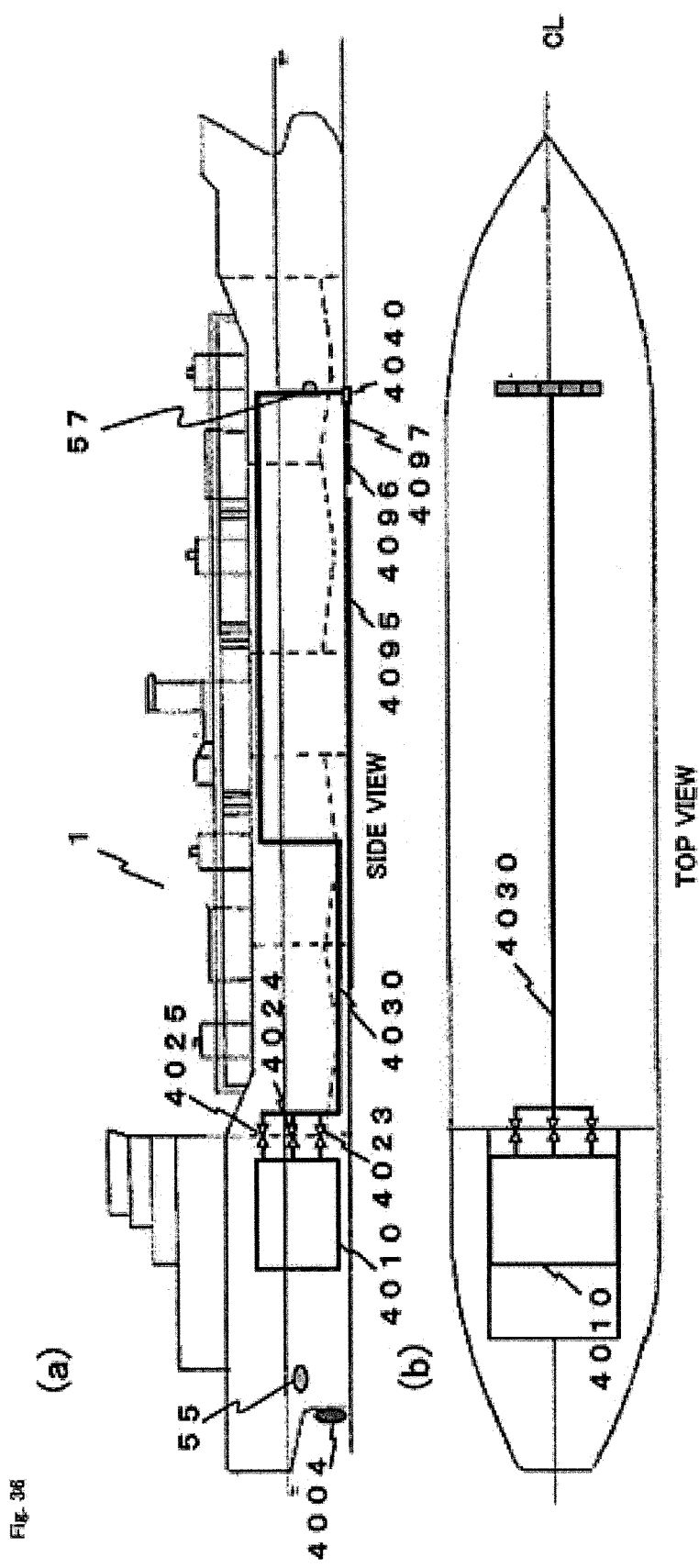
FIG. 36 pertains to an embodiment where a inject gas control device according to the embodiment of the present invention is applied to a vessel used in the ocean.

FIG. 36 pertains to an embodiment where a inject gas control device 4002 is applied to a vessel used in the ocean. FIG. 36 (*a*) shows a side sectional view of the vessel. FIG. 36 (*b*) shows a top view thereof. A part of a principal configuration is represented in an exposed manner. A residual gas (or a part thereof) of the turbocharger from the gas supply or charged air bypass pipe 4023 and/or the scavenging bypass pipe 4024 and/or the exhaust gas bypass pipe 4025 passes the air supply pipe 4030 having the bent portions, and is guided to the gas outlet 4040 arranged in the proximity of the bottom 9 of the vessel. For example, in this embodiment, the gas outlet 4040 is arranged at the fore of the bottom 9 of the vessel and in the proximity of the planar center line of the hull CL. The arrangement of the gas outlet 4040 in the proximity of the bottom 9 of the vessel is for the sake of prolonging the retention of the injected bubbles at the bottom 9 of the vessel and alleviating variation in pressure owing to waves. The arrangement at the fore in the proximity of the bottom 9 of the vessel is for an object for retaining the injected gas over the entire bottom 9 of the vessel as much as possible. Accordingly, the gas outlet 4040 may be at a spot other than the bottom 9 of the vessel. The spot may be an appropriate one on or below the waterline.

As shown in this figure, the air supply pipe 4030 (or 5030) is installed upwardly immediately after passing the main engine 4010. This exerts advantageous effects specific to the present application according to which a drafting force of the pressurized gas or the exhaust gas that still retains heat complements the frictional resistance of the air supply pipe 4030 (5030), and can secure the gas supply or charged air rate.

Alternative gas outlets 4040 may adopt a planer arrangement (not shown) so as to be plurally and symmetrically arranged with respect to the planar center line CL. In this case, the air supply pipes 4030 whose number corresponds to that of the gas outlets 4040 may be arranged. Instead, branched pipes from the air supply pipe 4030 may be arranged correspondingly with respect to the arrangement number. This allows the configuration to be simplified and can facilitate the arrangement. Preferably, the number of the discharge ports is an odd number, and a symmetric arrangement is adopted where the center one is disposed on the planar center line CL.

It is preferable that end plates 4095, 4096 and 4097 guiding bubbles in order not to let the bubbles injected from the gas outlet 4040 escape be arranged at the bottom 9 of the vessel. In a case of arranging a plurality of the gas outlets 4040, the end plates are also arranged symmetrically with respect to planar center line of the hull CL. In addition thereto, shear force sensor (not shown), which is a shear force detector detecting shear forces exerted on the hull owing to seawater and bubbles, may be arranged on the bottom 9 of the vessel, for example, at the stern.

Relative velocity sensors 55, which are relative velocity detectors, are arranged at the stern. Other relative velocity sensors 57 are arranged at the sides of the vessel. The relative velocity sensors 55 are arranged apart from the gas outlet 4040. The relative velocity sensors 57 are arranged at spots without influences of bubbles on the sides of the vessel even in the proximity thereof. In particular, the relative velocity sensors 57 are disposed at lower parts on the sides 8 of the vessel, on which influences of waves are not exerted. An ultrasonic system is adopted for these relative velocity sensors 55 and 57. This allows use in the ocean, and reduces influences owing to waves and currents.

The video cameras 58 and 59 for monitoring conditions of injected bubbles are arranged at fore and aft parts of the bottom 9 of the vessel. Images taken by these video cameras 58 and 59 are monitored by a person and utilized for analyzing the inject condition of bubbles.

The air nozzles will be described using the figure of the first embodiment. FIG. 3 is a perspective view conceptually showing the detailed structures of the air nozzles 4040. For the sake of simplicity of description, FIG. 3 shows a typical example of the air supply pipes and the air nozzles. The air bypassed via the air supply pipe 16 connected to the air supply pipe 4030 are bent at a chamber 70 of the gas outlet 4040 connected to the air supply pipe 16. A distribution component 71 having triangular profile for dispersing the blown air is arranged immediately below the connection part of the air supply pipe 16. A configuration is adopted according to which the air is bent at right angle at this part and dispersed laterally by the distribution component 71. As the air is bent at right angle, the air tends to uniformly spread along directions in a horizontal plane. However, the air tends to flow only toward perforated plates 72 and 73 in front thereof by presence of interior walls of the chamber 70 in the recess and at the right, left, top and bottom. Here, presence of the distribution component 71 further uniformizes the lateral distribution of the air with respect to the perforated plates 72 and 73.

A lot of perforations 74 and 75 are formed at the perforated plates 72 and 73. The positions of the perforated plates 72 and 73 are laterally displaced from each other, thereby forming an arrangement with perforations in a displaced manner. This embodiment shows an example using two perforated plates 72 and 73. Instead, the number thereof may be another number, such as three or four. Since perforated plates 72 and 73 are arranged so as to displace the positions of the perforations, the perforated plates 72 and 73 function as a so-called baffle plates, which bend the air flow to provide resistance. Accordingly, in addition to further uniformization of the air in the lateral direction, the air in the vertical direction is also uniformized, thereby enabling the air to be injected from a inject port 76 on a front surface.

Here, the perforated plates 72 and 73 are manufactured by continuously making round perforations on a corrosion resistant sheet metal such as stainless by a press, and the arrangement with displaced perforation positions can be realized by cutting. This offers excellent productivity. If configured with a stainless material, since the perforations are round perforations, edge portions are omitted, nearly preventing the stress from being concentrated when being pressed, in contrast to a case with square perforations. This alleviates progress of stress corrosion from the edge parts, even if used in seawater. The perforated plates 72 and 73 may be manufactured by using resin and by means of molding. In a case of using the resin, the shapes of the perforations are arbitrary in view of corrosion. However, in view of molding, round perforations are preferable.

Figure 37:
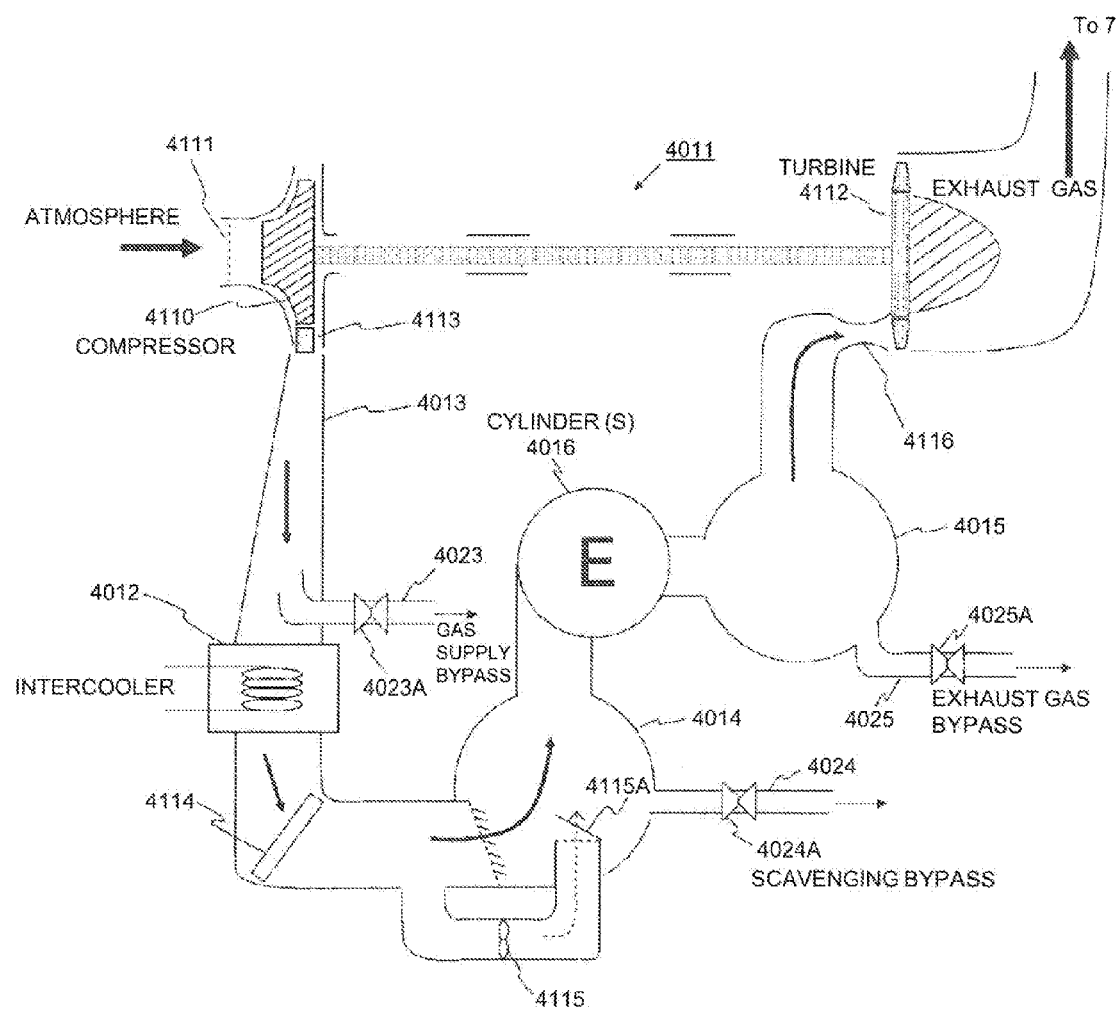
FIG. 37 is a system diagram showing a system bypassing a turbocharger according to an embodiment of the present invention.

FIG. 37 is a system diagram showing a system bypassing a turbocharger 4011 according to the present application. The mechanism of the surplus air bypass from the turbocharger according to the present application will be described using FIG. 37.

The turbocharger 4011 includes a compressor 4110 that draws atmosphere through a filter 4111 and compresses the air, a turbine 4112 that rotationally drives the compressor 4110, and a shaft connecting these. According to the mechanism of the turbocharger 4011, energy of the exhaust gas (temperature and pressure) having been discharged from the exhaust gas pipe is utilized. The turbine 4112 is driven and rotates at high speeds. The compressor 4110 is driven by this rotational force. The compressed air is transferred into the cylinders 4016 of the main engine (hereinafter, also referred to as the "cylinder" for the sake of the simplicity). Accordingly, an amount of mixture over an amount of original aspiration of an internal combustion engine is aspirated and combusted, thereby acquiring an output over an apparent piston displacement.

High temperature and pressure exhaust gas generated by combustion of fuel in each cylinder 4016 is accumulated in the exhaust gas receiver 4015 during the exhaust gas valve is opened. The pressure is caused to be static pressure. Adiabatic expansion is accomplished at the turbine nozzle 4116 and the turbine 4112. This generates turbine driving force, and rotates the turbocharger compressor 4110 directly connected thereto. The turbocharger compressor 4110 draws air from the outside, and applies adiabatic compression. The air is caused to be static pressure at a diffuser 4113 at an outlet of the compressor 4110. This generates high pressure and temperature air (gas supply or charged air). The air is cooled by an air cooler 4112, accumulated in the scavenged gas receiver 4014, and supplied to the cylinder 4016. In cases where the load on the engine 4010 is low and the energy of the exhaust gas is insufficient, such as a case immediate after startup, an auxiliary blower 4115 is actuated, draws air and support the operation of the turbocharger compressor 4110. In this configuration, according to the present application, the gas supply or charged air bypass pipe 4023, the scavenging bypass pipe 4024, the exhaust gas bypass pipe 4025 are provided and bypass the residual gas.

In more detailed operation, first, atmosphere is drawn through the filter 4111. Compressed air is generated by the compressor 4110 driven by the rotational force of the turbine 4112, and communicated to the air supply pipe 4013 via the diffuser 4113. The gas supply or charged air bypass pipe 4023 is communicated with the air supply pipe 4013, as described above. A part of the compressed high temperature air passes through the gas supply or charged air bypass pipe 4023 and thus is bypassed. The draw of gas by this bypass is performed by opening and closing the gas supply or charged air bypass adjustment valve 4023A, whose starting, operating and stopping are controlled on the basis of sensing of after-mentioned physical quantities. The gas supply or charged air acquired through the bypass by the gas supply or charged air bypass pipe 4023 is guided to the air supply pipe 4030.

The other air passing the air supply pipe 4013 is intercooled by the intercooler 4012. The intercooled compressed air is dehydrated by the mist catcher 4114 disposed in the communication pipe, passes through a movable gate, and communicated to the scavenged gas receiver 4014. The gas may be supplied to the scavenged gas receiver 4014 also from the auxiliary blower 4115 including an adjustment valve 4115A.

The scavenging gas bypass pipe 4024 is communicated with the scavenged gas receiver 4014, as described above. A part of the compressed air accumulated in the scavenged gas receiver 4014 passes through the scavenging bypass pipe 4024 and thus is bypassed. The draw of gas by this scavenging bypass is performed by opening and closing the scavenging bypass adjustment valve 4024A, whose starting, operating and stopping are controlled on the basis of sensing of after-mentioned physical quantities. The gas supply or charged air acquired through the bypass by the scavenging bypass pipe 4024 is guided to the air supply pipe 4030.

The other air accumulated in the scavenged gas receiver 4014 passes through the communication pipe and is guided to the cylinder 4016. In the cylinder 4016, fuel is added by spraying and the like and combusted. The exhaust gas generated by the combustion is guided to exhaust gas receiver 4015. The exhaust gas bypass pipe 4025 is communicated with the exhaust gas receiver 4015, as described above. A part of the exhaust gas accumulated in the exhaust gas receiver 4015 passes through the exhaust gas bypass pipe 4025 and thus is bypassed. The draw of gas by this exhaust gas bypass is performed by opening and closing the exhaust gas bypass adjustment valve 4025A, whose starting, operating and stopping are controlled on the basis of sensing of after-mentioned physical quantities. The gas supply or charged air acquired through the bypass by the exhaust gas bypass pipe 4025 is guided to the air supply pipe 4030.

The other exhaust gas in the exhaust gas receiver 4015 is guided to the turbine 4112 via the turbine nozzle 4116 having a narrow diameter. A part of this gas rotationally drives the turbine 4112, and is communicated to the chimney 4007 as the exhaust gas to be discharged.

Figure 38:
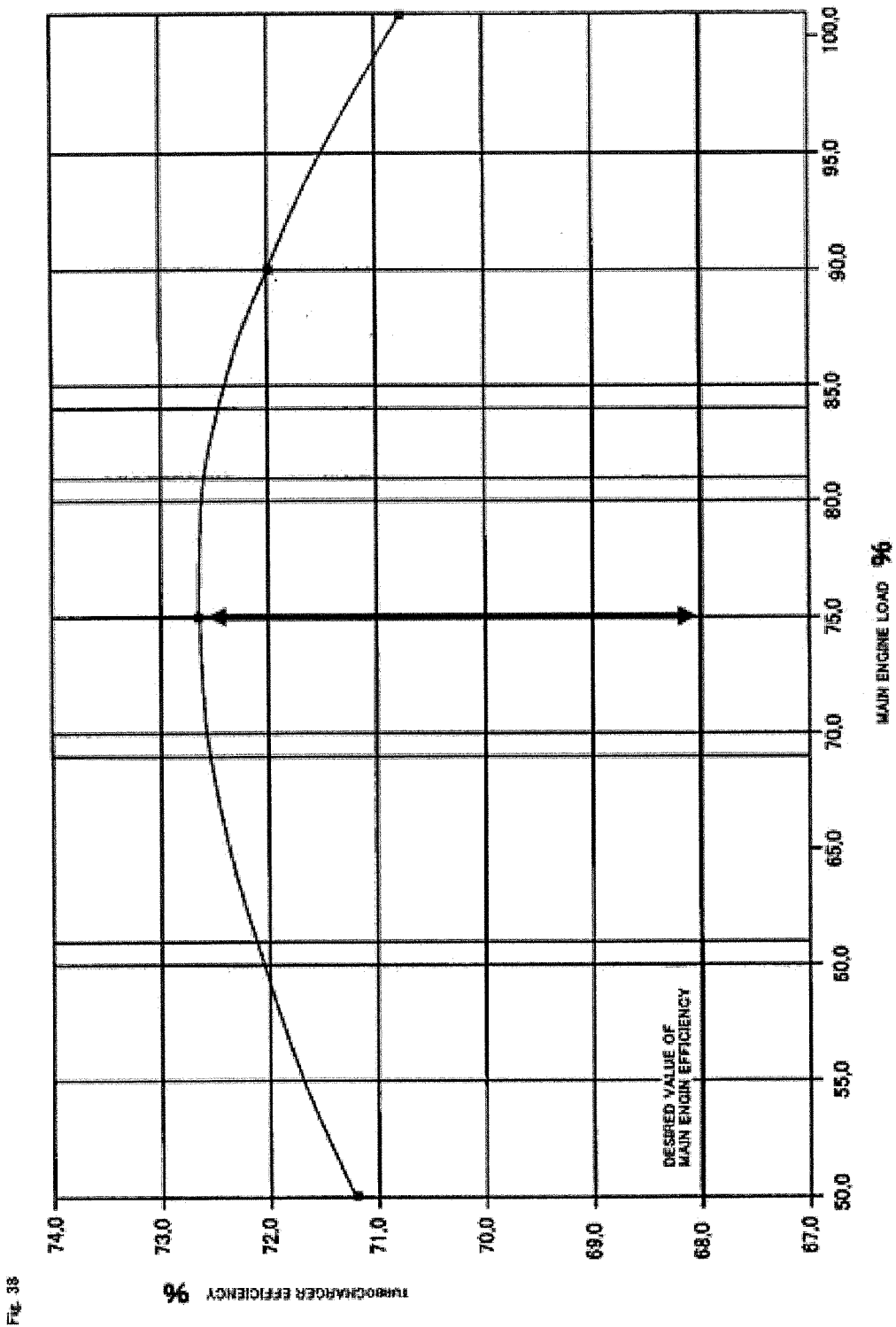
FIG. 38 is a diagram showing an actual relationship between main engine loads and turbocharger efficiency according to an embodiment of the present invention.

With respect to the starting point of the invention of the present application, as described above, there are actual situations of a tremendous advance in turbochargers and resultant generation of residual gas. FIG. 38 is a diagram showing an example of a relationship between a main engine loads and turbocharger efficiency. As shown in this figure, a considerable amount of surplus is actually generated with respect to a desired value of main engine efficiency. For example, when the main engine load is 75.0%, 72.7% efficiency is actually acquired while the desired value of the main engine efficiency is 68.0%. This difference causes the generation of the residual gas. This embodiment gives attention to that this generated gas has originally been discharged in vain, and intends to efficiently utilize this gas.

More specifically, the gas supply or charged air or the exhaust gas is principally used as the bypass gas. Accordingly, the temperature of this gas is high. When the gas is injected as bubbles, the water viscosity resistance is reduced. This exerts an advantageous effect specific to the present application, which is further reduction in frictional resistance.

Typically, the entire amount of high pressure scavenged gas or exhaust gas, which is a product by combustion thereof, passes through the turbocharger exhaust gas turbine 4112, and is used for driving the turbocharger compressor 4110. However, as described in FIG. 38, in the turbocharger having efficiency more than or equal to that required for the engine 4010, it is not necessary to supply the entire amount. As shown in FIG. 38, if the turbocharger efficiency is more than 3% of that required by the engine, about 10% of the scavenged gas or the exhaust gas can be bypassed without passing through the turbocharger turbine 4112. In a case of driving the power turbine (not shown), the exhaust gas bypass 4025 is effective. With respect to bubbles in this case, cooled high pressure air, which is the scavenging bypass 4024, is effective.

The scavenged gas and the exhaust gas are required for driving the turbocharger 4011 and in turn driving the engine 4010. The bypass rate should strictly be controlled according to the heat load on the engine 4010. As a result of numerous researches, the inventors of the present invention have found that it is preferable to control the bypass rate on the basis of the physical quantities related to the heat load on the main engine and the characteristics of the turbocharger. For example, the physical quantities may be a scavenging gas pressure and an exhaust gas temperature (or an exhaust gas pipe temperature, or an ambient temperature corresponding to an exhaust gas temperature in a one-to-one relationship). For example, the characteristics of the turbocharger may be turbocharger efficiency acquired by an after-mentioned method, or matching characteristics between the main engine and the turbocharger. As to these physical quantities, necessary values can be acquired by calculation or estimation using measurement of a part of temperatures, pressures and flow rates at paths and spots related to the turbocharger 4011 or the main engine.

Here, control of a bypass rate of gas during use of the residual gas by the turbocharger according to one embodiment of the present application, is described.

Figure 39:
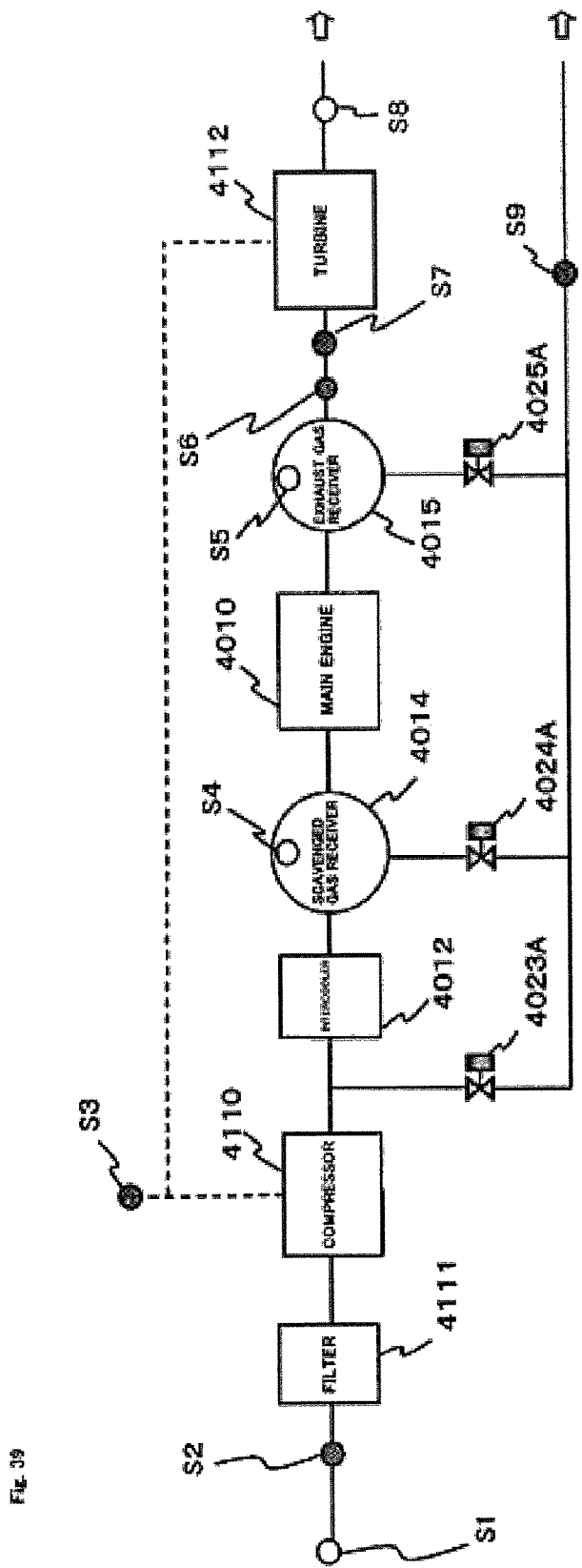
FIG. 39 is a block diagram showing an arrangement of devices according to this embodiment, various sensors acquiring basic data of control according to the present application, actuators and the like for the sake of realizing the control of the present invention.

FIG. 39 is a block diagram showing an arrangement of devices according to this embodiment, various sensors acquiring basic data of control according to the present application, actuators and the like for the sake of realizing the control of the present application. As shown in this figure, a barometric sensor S1 and an intake air temperature sensor S2 are arranged before entry of the filter 4111. A rotation speed sensor S3 is arranged so as to be coupled to the compressor 4110 and the turbine 4112. A scavenging gas pressure sensor S4 is arranged in the scavenged gas receiver 4014. An exhaust gas pressure sensor S5 is arranged in the exhaust gas receiver 4015. An exhaust gas temperature S6 and an exhaust gas mass flow rate sensor S7 are arranged between the exhaust gas receiver 4015 and the turbine 4112. A post-turbine exhaust gas pressure sensor S8 is arranged after the turbine 4112. A bypassed mass flow rate sensor S9 is arranged at the air supply pipe 4030 communicated from the gas supply or charged air bypass pipe 4023, the scavenging bypass pipe 4024 and the exhaust gas bypass pipe 4025.

Figure 40:
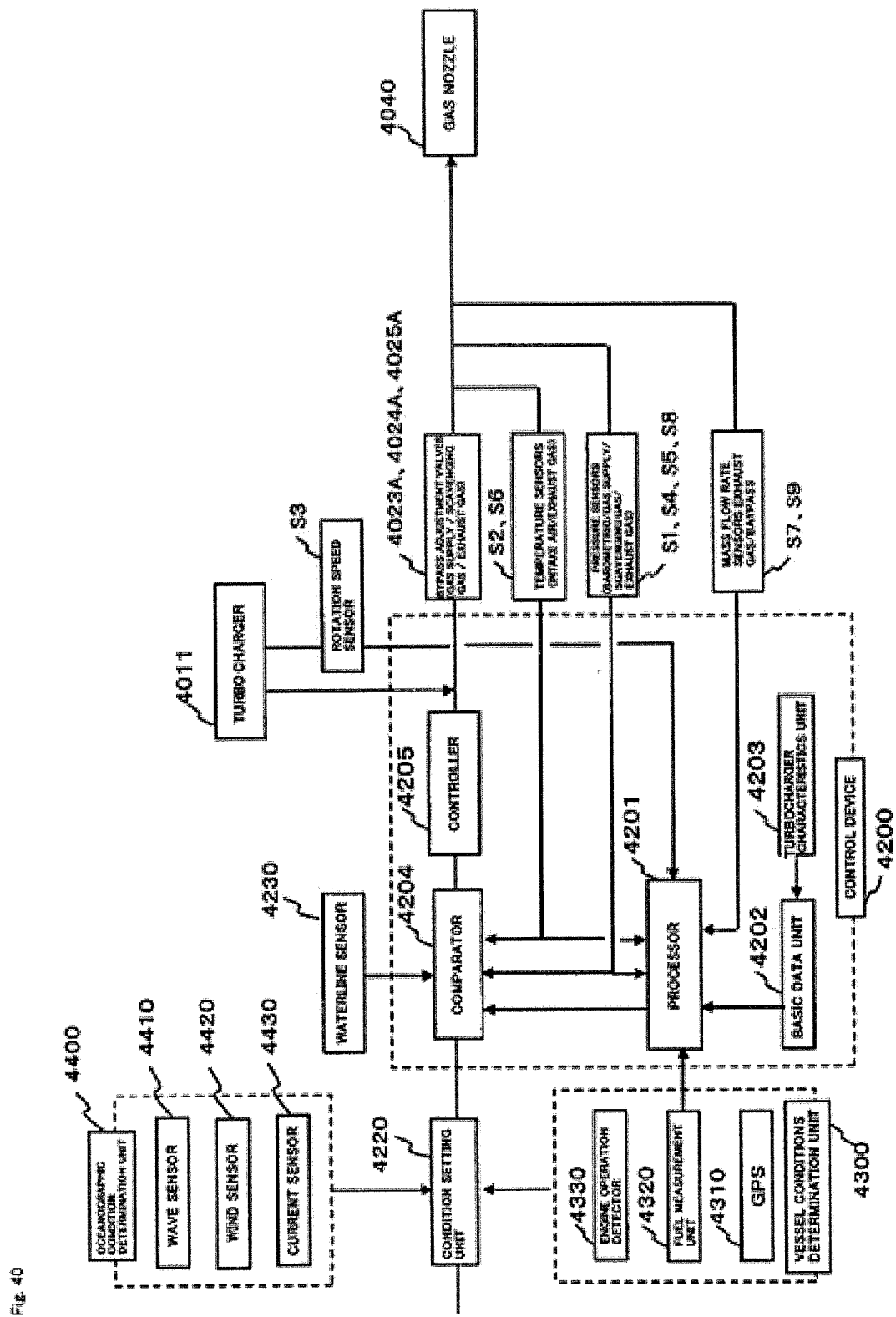
FIG. 40 is a control block diagram for illustrating a control system of the present application.

FIG. 40 is a control block diagram for illustrating a control system of the present application.

The functionality for realizing the control pertaining to present application includes: a control device 4200 that controls the above-mentioned various bypasses on the basis of values acquired by the various sensors (S1 to S9) from the turbocharger 4011 and the draft sensor 4230; a vessel conditions determination unit 4300 for acquiring and determining the vessel conditions (positional conditions, fuel conditions, operating conditions, etc.); an oceanographic condition determination unit 4400 for collecting and determining data pertaining to ambient oceanographic conditions; a condition setting unit 4220 for setting various conditions on the basis of or in comparison with determinations by the vessel conditions determination unit 4300 and the oceanographic condition determination unit 4400; and a gas outlet 4040 that discharges the bypassed gas, on which these functions have calculated optimal values, into the water around the bottom 9 of the vessel.

The control device 4200 includes: a processor 4201 that applies prescribed processing to the characteristics of the turbocharger and data acquired by the various sensors (S1 to S9 and 230); a basic data unit 4202 having a function of feeding basic data to the processor 4201; a turbocharger characteristics unit 4203 having a function of calculating and acquiring information pertaining to the characteristics of the turbocharger and providing the information for the basic data unit 4202; a comparator 4204 having a function of comparing and calculating the values from the various sensors (S1 to S9 and 230) and the values processed by the processor 4201; and a controller 4205 having a function of controlling the comparator 4204. In particular, the processor 4201 also has a function of calculating after-mentioned turbocharger efficiency on the basis of detection results from a prescribed sensor and the like.

The vessel conditions determination unit 4300 is equipped with a GPS 4310 detecting a location of the vessel, a fuel measurement unit 4320 measuring a fuel consumption of the engine of the vessel, and an engine operation detector 4330 detecting the operating conditions of the engine of the vessel. The vessel conditions determination unit 4300 particularly determines present conditions of the vessel, and determines present conditions that vary in a small degree or vary slowly during sailing. For example, the GPS 4310 grasps the location of the vessel on the map, and detects distances to ports and destinations, an absolute velocity with respect to the ground and the like.

This is utilized for determining which position or location on the map bubbles are injected or stopped. The measurement of the absolute velocity with respect to the ground is also used for the sake of complementing the rotation speed sensor S3. The fuel measurement unit 4320 is used for measuring how much fuel the engine consumes in a prescribed time period, and used for stopping injecting bubbles when the fuel consumption efficiency becomes lower than prescribed fuel consumption efficiency. The engine operation detector 4330 detects the operating conditions of the engine of the vessel, and is used for acquiring information for stopping injecting of bubbles when the operation of the engine is stopped, and for starting operation and, prescribed time period thereafter, starting injecting bubbles. The engine operation detector 4330 is also used for detecting the numbers of revolutions of the engines and changing the number of working gas outlets and/or inject rate of bubbles. In addition thereto, the vessel conditions determination unit 4300 includes an engine output detector, a gyro, radar, and means for determining conditions where the vessel resides, such as amount of freight measurement, condition of ballast water, and the like, and can be utilized for the bubble injecting control according to the purposes.

The vessel conditions determination unit 4300 includes a navigational condition detection unit, which is not shown. The navigational condition detection unit includes the relative velocity sensors 55 and 57, a draft sensor 4230 detecting the waterline level of the hull, and an inclination sensor (not shown) detecting so-called rolling, which is lateral inclination with respect to the traveling direction of the hull. Separately therefrom, a configuration also including a shear force sensor (not shown) may be adopted. The navigational condition detection units detect physical quantities which relatively easily vary along with sailing of the vessel or are controlled for the sake of variation. In addition thereto, the navigational condition detection unit includes sensors detecting swaying, pitching, surging, heaving and yawing of the hull.

The oceanographic condition determination unit 4400 includes a wave sensor 4410, a wind sensor 4420 and a current sensor 4430. The wave sensor 4410 detects the wave heights, directions and periods of waves. The wind sensor 4420 detects wind velocities and directions of winds. The current sensor 4430 detects current velocities, directions and heights of currents. The oceanographic condition determination unit 4400 considers information on waves, winds, currents and the like including information on a general weather, and is used for determining that for example the injecting of bubbles is stopped when the oceanographic condition is stormy, and bubbles are generated when the condition is recovered.

The information from the vessel conditions determination unit 4300 and information from the oceanographic condition determination unit 4400 are transmitted to the condition setting unit 4220. The condition setting unit 4220 systematically sets conditions for injecting bubbles to the bottom 9 of the vessel or in the proximity thereof. The conditions include starting/stopping injecting bubbles, which ones of the gas outlets 4040 the bubbles are injected from in a case of including a plurality of the nozzles, which inject rate is to be set, which timing the injecting is started on, how a temporal bubble inject sequence is composed, when injecting is started and stopped and the like. In the condition setting unit 4220, the conditions for injecting bubbles are set such that shear forces acting on the hull, the relative velocity of the hull, the draft, the inclination and the like are also considered. Condition setting for control according to these signals is also performed. The condition setting unit 4220 performs condition setting according to a condition setting instruction for reducing the frictional resistance, and further performs condition setting according to condition setting instruction for adjusting the waterline level by means of injecting bubbles.

According to the settings in the condition setting unit 4220, the comparator 4204 compares signals. The flow rates and gas acquiring rate of bypass adjustment valves 4023A, 4024A and 4025A are controlled by the controller 4205. The controller 4205 also controls the valve arranged on the discharge sides of auxiliary blowers (not shown). These are attached for the sake of adjusting valves of the auxiliary blowers and attaining a desired air rate, in a case of controlling an air rate below the control region of the motors of the inverters of the auxiliary blowers, and in a case of quickly adjusting the waterline level using the signal from the draft sensor 4230. As to situations where bubbles are injected from the gas outlets 4040, inject conditions of the bubbles and conditions where the bubbles stays at the bottom 9 of the vessel and the proximity thereof are imaged by the video camera 57. The images are utilized for analyzing and examining conditions of injecting air.

At the bottom 9 of the vessel and the proximity thereof, the shear force sensors (not shown) are attached to the gas outlets 4040 downstream from the bottom 9 of the vessel. In order to deepen analysis of variation in shear force owing to injecting of bubbles, a corresponding number thereof are attached. Signals from the shear force sensors are fed back to the comparator 4204. The signals are compared with shear force values preliminarily set by the condition setting unit 4220. The operating conditions of the blowers and/or bypass adjustment valves 4023A, 4024A and 4025A are finely adjusted via controller 4205 pursuant to a prescribed rule, an algorithm and constants according to the deviations. Further, the relative velocities between the hull and seawater are detected by the relative velocity sensors 55 and 57 and subjected to a prescribed statistical process, and the representative value is transmitted to the comparator 4204. Signals from the draft sensor 4230 and the inclination sensor (not shown) are also transmitted to comparator 4204.

First, the comparator 4204 compares the processed representative value of the relative velocity sensors 55 and 57 and the condition setting value preliminarily set by the condition setting unit 4220 with each other. For example, in a case where the gas outlet 4040 resides as a plurality of gas outlets 4041, 4042, 4043, 4044 and 4045 when the relative velocity of the hull exceeds the setting value, controls can be performed including increase of the number of working gas outlets 4040 to 4045, increase of the amount of bubbles, or increase of both of them according to the deviations. When the relative velocity becomes lower than the setting value, controls can be performed including decrease of the number of working gas outlets, decrease of the amount of bubbles, or decrease of both of them. When decreasing the number of working gas outlets, it is preferable to stop outer gas outlets.

For example, the gas outlets 4041 and 4045 are stopped, or the gas outlets 4041 and 4042 and the gas outlets 4045 and 4044 are stopped. Likewise, the inject rates of bubbles are controlled in an analogous manner. The inject rates of bubbles of gas outlets 4041 and 4045 are decreased or increased to the same degree. Further, the inject rates of bubbles of gas outlet 4042 and 4044 are decreased or increased to the same degree. Thus, the symmetrical control of the number of substantially symmetrically arranged gas outlets with respect to the planar center line CL of the hull and the inject rates of bubbles can acquire a uniform frictional resistance reduction effect, in a case where the vessel is sailing in a straight line, which can frequently occur. Accordingly, ability of the vessel to hold a straight line can be maintained, and fuel consumption is decreased. Further, this facilitates the circuit configuration and the control method of the control device.

The comparator 4204 compares a value detected by the draft sensor 4230 and a condition setting value preliminarily set by the condition setting unit 4220. For example, when the waterline of the hull exceeds the setting value (when the amount of freight is large and the waterline has risen), controls are performed including increase of the number of working gas outlets, increase of the amount of bubbles or increase of both of them according to the deviation. When the waterline has fallen (the freight is unloaded and the vessel is in a condition of ballast water), controls are performed including decrease of the number of working gas outlets, decrease of the amount of bubbles or decrease of both of them. In cases of decrease, it is preferable to control in an analogous fashion to that described above.

When swells come, the auxiliary blowers (not shown) and the bypass adjustment valves 4023A, 4024A and 4025A are controlled using signals from the draft sensor 4230, and the pressures acting on the gas outlets 4040 are finely adjusted by increasing or decreasing in an immediate manner, thereby further alleviating variation in inject rate of bubbles.

The comparator 4204 compares an inclination value of the hull detected by the inclination sensor (not shown) and a condition setting value preliminarily set by the condition setting unit 4220. For example, when the inclination of the hull exceeds the setting value owing to turning or rolling of the vessel, the inject spots of the working gas outlets are changed or the amount of bubbles is increased or decreased according to the deviation. For example, if the hull is inclined to the left viewed from a traveling direction, the right side of the bottom of the vessel is elevated. In this case, the frictional resistance of the hull can effectively be reduced without injecting bubbles in vain by performing controls including increase of the number of working gas outlets on the left where an apparent waterline rises, increase of the inject rates thereof or increase of both of them and performing controls including decrease of the number of working gas outlets on the right, decrease of the inject rates thereof or decrease of both of them. The inclination sensor can be shared not only for controlling injecting of bubbles but also for adjusting ballast water for detecting the inclination of the hull and maintaining the balance.

Measures for the cases of such rolling adopt a configuration where a plurality of gas pipe systems are separately provided so as to be capable of separately setting pressures. Accordingly, even if there arise a height difference (presence of inclination) between starboard and port, desired injecting of bubbles (e.g., substantially uniform discharge) are acquired by adjusting pressures. Alternatively, the gas may be guided from a plurality of gas tubes to spots of injecting bubbles once by way of a chamber.

Next, the control according to the present application will be described in detail.

As described above, according to the present application, the pressurized gas (gas supply or charged air and scavenged gas)/exhaust gas drawing rates are controlled on the basis of the physical quantities related to the heat load on the main engine and the characteristics of the turbocharger. In this case, as typical examples of physical quantities related to the heat load on the main engine, the scavenging gas pressure and the exhaust gas temperature (or exhaust gas pipe temperature, another ambient temperature corresponding to the exhaust gas temperature in a one-to-one correspondence, etc.) are adopted. As the characteristics of the turbocharger, the turbocharger efficiency is adopted.

The scavenging gas pressure is detected by the scavenging gas pressure sensor S4. The exhaust gas temperature is detected by the exhaust gas temperature sensor S6.

The characteristics of the turbocharger is acquired by (1) a method of acquiring overall efficiency of the turbocharger, which will be described below, and (2) correction of the overall efficiency of the turbocharger in a case with the scavenging bypass (exhaust gas bypass).

(1) Method of acquiring overall efficiency of the turbocharger $$\text{Overall efficiency of the turbocharger} = 0.9055 \times T_1/T_2 \times (R_1^{0.286}-1)/(1-R_2^{0.265}),$$

where $T_1$: turbocharger air intake temperature (e.g. 21° C.)+273;

$T_2$: pre-turbine exhaust gas temperature (e.g. 400° C.)+273;

$R_1$: (atmospheric pressure+scavenging gas pressure+intercooler differential pressure)/(atmospheric pressure−turbocharger filter differential pressure); and $R_2$: (atmospheric pressure+post-turbine exhaust gas pressure)/(atmospheric pressure+exhaust gas receiver pressure).

$$\text{Compressor efficiency} = 3614400 \times T_1 \times (R_1^{0.286}-1)/(\mu \times U^2)$$

where $\mu$: slip ratio (depending on turbocharger types);

D: vane wheel diameter (depending on turbocharger types); and

U: peripheral speed of a gear=$\pi \times D \times T$/Cspeed.

Turbine efficiency=overall efficiency of the turbocharger/compressor efficiency.

(2) Correction of overall efficiency of the turbocharger in a case with scavenging bypass (exhaust gas bypass)

The overall efficiency of the turbocharger acquired by (1) is multiplied by a correction expression below.

$$(m_t + m_{eq})/m_t,$$

where $m_t$: mass flow rate passing through the turbine; and $m_{eq}$: equivalent mass to bypass rate passing through the turbine.

Method of controlling scavenging bypass rate (1) In order to cause the overall efficiency of the turbocharger to be a required value or more, e.g., for the latest engine, overall efficiency of the turbocharger ≥68% or more, and e.g., for retrofit engine, overall efficiency of the turbocharger ≥64% or more.

(2) Control is performed such that the scavenging gas pressure becomes at least a prescribed value, and the exhaust gas temperature becomes a prescribed value or less.

Here, the temperature, pressure, and the number of revolutions of the turbocharger are the detection values from the respective sensors. The slip ratio and the vane wheel diameter are read from the basic data. The processor 4201 calculates overall efficiency of the turbocharger. The corrected value is acquired by correction by the processor 4201 using the exhaust gas/bypass mass flow rate sensors S7 and S9.

Pressure losses of the filter 4111 and the intercooler 4012, which are necessary to acquire the overall efficiency of the turbocharger, are calculated by the processor 4201 on the basis of values from the exhaust gas/bypass mass flow rate sensors (S7 and S9) and a pressure loss coefficient stored in the basic data unit 4202. Alternatively, instead of the calculation, pressure sensors (S1 to S9, etc.) are attached to required spots, and the losses are acquired by detection.

The overall efficiency of the turbocharger can be calculated on the basis of a graph or table of turbocharger overall characteristics preliminarily stored in the basic data unit 4202. In this case, the load on the main engine 4010 necessary for calculation is acquired on the basis of the fuel consumption measured by the fuel measurement unit 4320.

In this embodiment, the overall efficiency of the turbocharger is acquired by two different methods.

More specifically, the methods include a method of calculating by the processor 4201 on the basis of detection values from the respective sensors (S1 to S9, 230, etc.), and a method of acquiring on the basis of the graph or table. The results are compared by the comparator 4204. It is determined whether both are within a prescribed error range or not. If deviation from the prescribed error range is detected, a failure in the sensor is considered. Accordingly, the controller 4205 or a warning unit (not shown) issues a warning.

The detection value from the oceanographic condition determination unit 4400 and the vessel conditions determination unit 4300 are used for setting injecting condition of bubbles. The details are as described above.

The draft sensor 4230 is used for controlling starting/stopping supply of gas/exhaust gas to the gas outlets 4040 according to pressurized gas/exhaust gas pressures and the draft. The condition setting unit 4220 sets the inject condition, the inject rate and the injecting timing and the like of the gas/exhaust gas, according to conditions of the oceanographic condition determination unit 4400 and the vessel conditions determination unit 4300.

The turbocharger turbine bypass gas includes three types, as described below, at the spots of the main body of the engine. The characteristics are as described below.

A Exhaust bypass gas (the intake is at the exhaust gas receiver, temperature: 400° C., pressure: 0.2393 MPa gage pressure);

B Gas supply or charged air bypass gas (intake is at the air supply pipe (charge air pipe) before intercooler, temperature: 135° C., pressure: 0.255 MPa gage pressure); and C Scavenged gas bypass gas (intake is at scavenged gas receiver, temperature: 35° C., pressure: 0.2533 MPa gage pressure).

The invention of the present application generates bubbles directly from the bypass gas using the bypass gas from each spot of the turbocharger or a combination thereof, and secures that the amount thereof is utilized without deteriorating the performance and reliability of the engine.

In order to generate bubbles, it is preferable that pressure be high and temperature be high. Accordingly, A exhaust bypass gas is most suitable. However, a problem that the exhaust gas may directly pollute the ocean is assumed, and it is assumed that there are unusable waters. In the waters where the exhaust gas bypass gas cannot be used, B gas supply or charged air bypass gas or C scavenged gas bypass gas may be used. B and C are high pressure air. However, if the temperature is high, the volume is large. Accordingly, a pipe to the gas outlet should be wide and piping loss should be considered. In this case, measures, such as thermal insulation and covering, may be taken.

Since the scavenging bypass gas has low temperature, small-sized piping can be adopted. A combined configuration that heats the gas around bubble discharge port by the exhaust gas bypass gas can be considered. As described above, the bypass piping is raised once at the waterline or higher such that seawater cannot enter the engine 4010. A flowmeter 4035 is arranged intermediately at the bypass piping and strictly measures the bypass rate.

The control of starting/stopping injecting air can be summarized as follows. First, as a principal element of the present application, the bypass gas rate is controlled on the basis of the physical quantity related to the heat load on the main engine and the characteristics of the turbocharger, and the bypass gas is acquired and utilized as bubbles. Next, the operation of starting/stopping the supply operation of the pressurized gas and/or the exhaust gas from the gas outlet is controlled on the basis of the exhaust gas pressure and the draft of the vessel. Further, the controls include a case pursuant to the determination by the vessel conditions determination unit 4300, a case pursuant to the determination by the oceanographic condition determination unit 4400 and a case pursuant to the detection result by the navigational condition detection unit (not shown). In the case pursuant to the vessel conditions determination unit 4300, injecting of bubbles is stopped when the GPS 4310 determines that the vessel is approaching a port or a destination, injecting is started when leaving the port, injecting is stopped when the vessel is approaching waters that is a swirling current region, injecting is started when the vessel is leaving the waters; injecting of bubbles is stopped when operations of the engines are stopped, and injecting of bubbles is started a predetermined time after the engines start. When the fuel consumption efficiency detected by the fuel measurement unit 4320 becomes below a predetermined one, injecting of bubbles are stopped. When it is estimated that the fuel consumption efficiency is improved, injecting of bubbles is started. When the oceanographic condition determination unit 4400 determines that it is stormy such as a typhoon and rough weather, injecting of bubbles is stopped. When it recovers, injecting is started. Such controls can be performed. The starting/stopping injecting bubbles, and the inject rate are controlled in relation to the operating condition of the main engine. When the main engine requires air much, injecting is stopped or the inject rate is reduced.

Further, when the wave height detected by the wave sensor 4410 becomes a prescribed value or more, injecting of bubbles is stopped; when the wave height becomes a prescribed value or less, injecting is started. The detection results of the navigational condition detector are compared with a preset value; on the basis of the deviation, the injecting is stopped when the deviation becomes a predetermined threshold or less, and the injecting is started when the deviation exceeds the threshold. For example, the values from the relative velocity sensors 55 and 57 are statistically processed and the representative value is transmitted to the comparator 4204. When the velocity of the vessel 1 is decreased and the value becomes lower than a prescribed threshold set by the condition setting unit 4220, the injecting of bubbles are stopped; when the value exceeds the threshold, the injecting is started. On the basis of temporal variation in statistically processed representative value from the relative velocity sensors 55 and 57, when the vessel 1 starts moving and accelerates, the threshold is set to be reduced and bubbles are injected a little earlier. When the frictional resistance reduction effect is effectively exerted and the vessel is decelerated, the threshold may be reset upward and injecting of bubbles may be stopped a little earlier because the speed is decreased and bubbles still stay at the bottom 3 of the vessel.

As to the conditions for starting/stopping injecting gas, control may be performed according to precedence. When detection error, failure or an unpredictable event occurs, control may be performed complementarily using another condition. In any event, injecting of bubbles that considers the actual frictional resistance reduction effect can be realized by starting/stopping injecting of bubbles under a prescribed condition, and stopping injecting of bubbles when detecting/determining that the vessel is stopped.

In the above embodiments, as to the examples of physical quantities used for controlling the bypass gas rate, the description has been made principally with the example of the scavenging gas pressure and the exhaust gas temperature of the main engine. As to the examples of the physical quantities to be used for controlling operations of starting/stopping the supply operation from the gas outlets of the pressurized gas and/or the exhaust gas, the description has been made principally with the example of the exhaust gas pressure and the draft of the vessel. These physical quantities are acquired by the sensors. However, physical quantities by another sensor may be adopted. In the above description, the example adopting turbocharger efficiency as the characteristics of the turbocharger has been described. Further, the method of acquiring the turbocharger efficiency has also been described above. Instead or in addition thereto, another characteristics (e.g., matching characteristics between the main engine and the turbocharger) can be adopted as the characteristics of the turbocharger. Further, in the method of the turbocharger efficiency, various equations where constants and variables have been replaced can be adopted instead of the above expression for calculation.

The above description has been made with the example of injecting the gas (air) bypassed from the turbocharger directly into the water as bubbles. Instead, it may be configured such that the turbine drives an electric generator, a blower (gas supply or charged air means) is separately driven using the electric power gained by the electric power generation, and bubbles generated by the blower is discharged from the nozzle 4040. Alternatively, turbine may be equipped with, for example, a coaxially driven mechanism, the blower (gas supply or charged air means) may be driven directly, and bubbles may be generated therefrom.

To grasp and sense the draft, for example, a method may be adopted that uses sensors for measuring and detecting pressure below the waterline at the bottom of the vessel and the sides of the vessel and thereby grasps the draft from a proportional relationship between pressure and depth. Further, for example, a method may be adopted that takes images of situations around the surface of water by cameras from the sides of the vessel, and applies image processing to the images and thereby estimates the draft.

Eleventh Embodiment

Figure 41:
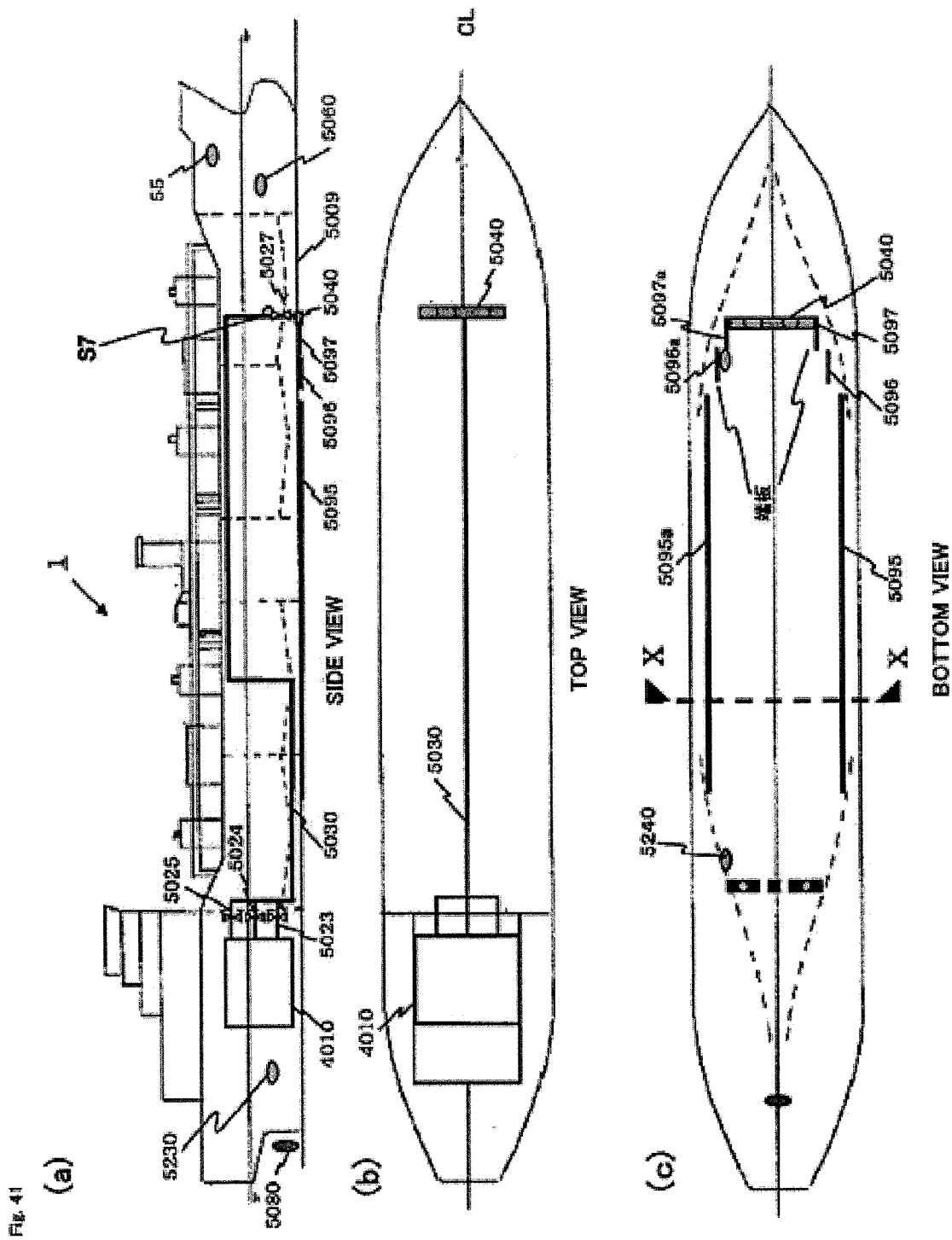
FIG. 41 is a diagram sectionally showing an overview of a vessel equipped with a frictional resistance reduction device for a vessel according to an embodiment of the present invention.

FIG. 41 is a diagram showing an overview of a vessel equipped with a frictional resistance reduction device for a vessel according to an embodiment of the present invention. FIG. 41 (*a*) is a side view of the vessel. FIG. 41 (*b*) is a top view thereof. FIG. 41 (*c*) is a bottom view thereof. A part of a principal configuration is represented in an exposed manner. As shown in (a), a inject gas control device is mounted on the vessel 1. The inject gas control device includes a main engine 10 including a propulsive engine of the vessel 1.

A air supply pipe 5030 is sequentially communicated with three bypass pipes (the gas supply or charged air bypass pipe 5023, the scavenging bypass pipe 5024 and the exhaust gas bypass pipe 5025) attached to the main engine 4010. Each bypass pipe includes a bypass adjustment valve. The air supply pipe 5030, which includes bent portions, is a pipe for transferring a gas with a prescribed pressure and temperature to the gas outlet 5040. The piping is installed from a position of collecting the three bypass pipes so as to be a shape where the piping plunges once to a height around the bottom of the vessel, passes the bent portions, is bent toward a height higher than the waterline and laid substantially horizontally, and passes the bent portions and plunges in the direction toward the bottom of the vessel. The piping path thus passes once at a height of the waterline or higher. This can prevent seawater from flowing reversely into the gas outlets arranged on or below the waterline in case of a failure of valves such as a bypass adjustment valve, and avoid dangerous situations of the main engine in view of security. The gas outlet 5040, which is arranged at or in the proximity of the bottom of the vessel and injects gas as bubbles from an opening perforated at or in the proximity of the bottom of the vessel into the water near the bottom 9 of the vessel, is connected to the other end of the air supply pipe 5030.

A residual gas (or a part thereof) of the turbocharger from the gas supply or charged air bypass pipe 5023 and/or the scavenging bypass pipe 5024 and/or the exhaust gas bypass pipe 5025 passes the air supply pipe 5030 having the bent portions, and is guided to the gas outlet 5040 arranged in the proximity of the bottom of the vessel. For example, in this embodiment, the gas outlet 5040 is arranged at the fore of the bottom 9 of the vessel, substantially symmetrically with respect to the planar center line of the hull CL. The arrangement of the gas outlet 5040 at the bottom 9 of the vessel is for the purpose of prolonging the retention of the injected bubbles at the bottom 9 of the vessel and alleviating influences owing to waves. The arrangement at the fore in the proximity of the bottom of the vessel is for an object for retaining the injected gas over the entire bottom 9 of the vessel as much as possible. In cases where these purpose and object are not necessary, the gas outlet 5040 may be at a spot other than the bottom 9 of the vessel. The spot may be an appropriate one on or below the waterline. Particularly, in a case of arrangement of the gas outlet 5040 at the bottom 9 of the vessel, it can be expected that the retention of bubbles become longer. Further, the bubbles with a diameter of at least a several hundred μm, exerts a buoyant effect. Accordingly, an effect that bubbles adhere to the bottom of the vessel is also expected. When the supply of the pressurized gas and/or the exhaust gas is stopped, a blocking valve 5027 is provided immediately before the gas outlet 5040 in order to prevent water from entering the air supply pipe 5030. Since the blocking valve 5027 is provided, the air supply pipe 5030 is resistant to influences of entry of water. Accordingly, as to material and thickness, it is unnecessary to consider high anti-corrosiveness and pressure-tightness. To stop the gas supply or charged air, it is preferable to preliminarily close the blocking valve 5027 under the gas pressure. To start the gas supply or charged air, it is preferable to open this valve after the gas pressure has risen at least to a prescribed value.

Thus, entry of water can be reliably blocked, thereby preventing entry of water into air supply pipe 5030 and occurrence of backflow. This can prevent the air supply pipe 5030 from being damaged. More specifically, this can prevent the formation of rust in the air supply pipe 5030 owing to water, obviate fouling of marine organisms, suppress increase in frictional resistance when gas is injected, alleviate maintenance, and in turn allow long-term use of the air supply pipe 30. It is preferable that the air supply pipe 5030 adopt a material resistant to seawater or surface coating be applied thereto. Since the air supply pipe 5030 is closed by the blocking valve 5027, increase in frictional resistance owing to entry of flowing water into the air supply pipe 5030 while the vessel is sailing can be suppressed. The operation of the blocking valve 5027 is pursuant to automatic control of opening and closing the valve, depending on presence or absence of the electric power or pressurized gas. However, under certain conditions, the control may be pursuant to manual operation of opening and closing the valve, or semiautomatic control.

In this embodiment, the gas supply or charged air is stopped before the main engine is stopped. The method of stopping includes preliminarily stopping the blocking valve 5027 and then closing the bypass valve, and subsequently stopping the main engine and the turbocharger. Starting is performed inversely. This can exert an advantageous effect specific to the present application that is capable of reliably preventing water from entering the air supply pipe 5030 and the main engine 4010.

When the main engine load becomes below a prescribed value (e.g. 50%), the gas supply or charged air is stopped. More specifically, the supply is stopped with an allowance for turbocharger efficiency required by the main engine. When the value exceeds the prescribed value, the gas supply or charged air is started. This can exert an advantageous effect specific to the present application that is capable of supplying without dropping below the gas rate required by the main engine.

The gas outlets 5040 are arranged in the planar configuration such that the plurality thereof are arranged substantially symmetrically with respect to the planar center line CL. The air supply pipes 5030 may be provided as many as the gas outlets 5040. Instead, branched pipes from the air supply pipe 5030 are provided as many as the corresponding number. This allows the configuration to be simplified and can facilitate the arrangement. Preferably, the number of the discharge ports is an odd number, and a symmetric arrangement is adopted where the center one is disposed on the planar center line CL.

Preferably, also for the gas outlets 5040, the diffusion limiting sections are disposed substantially symmetrical with respect to the planar center line of the hull CL. More specifically, as shown in (c), end plates 5095, 5096 and 5097 limiting diffusion of the gas injected as bubbles from the gas outlets 5040 are arranged, and end plates 5095a, 5096a and 5097a are arranged symmetrically with respect to the planar center line CL. The end plates 5096, 5096a, 5097 and 5097a are illustrated so as to be in the same dimensions in this figure. However, the end plates 5097 and 5097a may have smaller dimensions than those of the end plates 5096 and 5096a. The number of end plates is not limited to that of the figure, and need not be plural. One end plate may be provided on the longitudinal direction of the bottom of the vessel.

A draft sensor 5230 is provided at a spot without influences of waves and bubbles in the water at the stern. A relative velocity sensor 55 is provided at a spot without influences of waves and bubbles of the bow. A depth sounder 5060 is provided at a spot without influences of waves and bubbles in the water at the bow. The depth sounder 5060 performs sonic sounding that emits ultrasonic waves from a side of the vessel and acquires a depth from a time period until the ultrasonic waves reflected by the sea bottom and return. It is preferable to dispose the depth sounder 5060 at an appropriate spot resistant to influences of waves and bubbles so as not to receive influences on transmission and reception of the ultrasonic waves. Even in a case of providing a type of sensor in the water as the relative velocity sensor 55, it is preferable to provide the sensor at a spot without influences of waves and bubbles.

In addition thereto, a shear force sensor 5240, which detects a share force exerted on the hull owing to seawater and bubbles, is arranged on the bottom 9 of the vessel, for example at the stern.

The flow rate sensor S7 detects gas supply or charged air rate at the air supply pipe 5030, and monitors whether an appropriate gas rate of gas is transferred or not.

A system for bypassing the pressurized gas and the exhaust gas from the turbocharger will be described using FIG. 37 of the tenth embodiment.

The turbocharger 4011 includes a compressor 4110 that draws atmosphere through a filter 4111 and compresses the air, a turbine 4112 rotationally drives the compressor 4110, and a shaft connecting these. According to the mechanism of the turbocharger 4011, energy of the exhaust gas (temperature and pressure) having been discharged from the main engine is utilized. The turbine 4112 is driven and rotates at high speeds. The compressor 4110 is driven by this rotational force. The compressed air is transferred into the cylinders 4016 of the main engine (hereinafter, also referred to as the "cylinder" for the sake of the simplicity). Accordingly, an amount of mixture over an amount of original aspiration of an internal combustion engine is aspirated and combusted, thereby acquiring an output over an apparent piston displacement.

High temperature and pressure exhaust gas generated by combustion of fuel in each cylinder 4016 is accumulated in the exhaust gas receiver 4015 during the exhaust gas valve is opened. The pressure is caused to be static. Adiabatic expansion is accomplished at the turbine nozzle 4116 (the broken line part) and the turbine 4112. This generates turbine driving force, and rotates the compressor 4110 directly connected thereto. The compressor 4110 draws air from the outside, and applies adiabatic compression. The air is caused to be static pressure at a diffuser 4113 at an outlet of the compressor 4110. This generates high pressure and temperature air (gas supply or charged air). The air is cooled by an intercooler 4012, accumulated in the scavenged gas receiver 4014, and supplied to the cylinder 4016. In cases where the load on the main engine 4010 is low and the energy of the exhaust gas is insufficient, such as a case immediately after startup, an auxiliary blower 4115 is actuated, draws air and supports the operation of the turbocharger compressor 4110. In this configuration, according to the present application, the gas supply or charged air bypass pipe 4023, the scavenging bypass pipe 4024 and the exhaust gas bypass pipe 4025 are provided and bypass the residual gas.

In more detailed operation, first, atmosphere is drawn through the filter 4111. Compressed air is generated by the compressor 4110 driven by the rotational force of the turbine 4112, and communicated to the air supply pipe 4013 via the diffuser 4113. The gas supply or charged air bypass pipe 4023 is communicated with the air supply pipe 4013, as described above. A part of the compressed high temperature air passes through the gas supply or charged air bypass pipe 4023 and thus is bypassed. The draw of gas by this bypass is performed by opening and closing the gas supply or charged air bypass adjustment valve 4023A, whose starting and stopping is controlled on the basis of sensing of after-mentioned physical quantities. The gas supply or charged air acquired through the bypass by the gas supply or charged air bypass pipe 4023 is guided to the air supply pipe 4030.

The other air passing the air supply pipe 4013 is intercooled by the intercooler 4012. The intercooled compressed air is dehydrated by the mist catcher 4114 disposed in the communication pipe, passes through a movable gate, and communicated to the scavenged gas receiver 4014. The gas may be supplied to the scavenged gas receiver 4014 also from the auxiliary blower 4115 including an adjustment valve 4115A. The scavenging gas bypass pipe 4024 is communicated with the scavenged gas receiver 414, as described above. A part of the compressed air accumulated in the scavenged gas receiver 4014 passes through the scavenging bypass pipe 4024 and thus is bypassed. The draw of gas by this scavenging bypass is performed by opening and closing the scavenging bypass adjustment valve 4024A, whose starting and stopping is controlled on the basis of sensing of after-mentioned physical quantities. The gas supply or charged air acquired through the bypass by the scavenging bypass pipe 4024 is guided to the air supply pipe 4030.

The other air accumulated in the scavenged gas receiver 4014 passes through the communication pipe, and is guided to the cylinder 4016. In the cylinder 4016, fuel is injected thereinto and combusted. The exhaust gas generated by the combustion is guided to exhaust gas receiver 4015. The exhaust gas bypass pipe 4025 is communicated with the exhaust gas receiver 4015, as described above. A part of the exhaust gas accumulated in the exhaust gas receiver 4015 passes through the exhaust gas bypass pipe 4025 and thus is bypassed. The draw of gas by this exhaust gas bypass is performed by opening and closing the exhaust gas bypass adjustment valve 4025A, whose starting and stopping is controlled on the basis of sensing of after-mentioned physical quantities. The gas supply or charged air acquired through the bypass by the exhaust gas bypass pipe 4025 is guided to the air supply pipe 30.

The other exhaust gas in the exhaust gas receiver 4015 is guided to the turbine 4112 via the turbine nozzle 4116 having a narrow diameter. A part of this gas rotationally drives the turbine 4112, and communicated to the chimney (not shown) as the exhaust gas to be discharged.

On the other hand, the exhaust gas rate or the pressure bypassed by the exhaust gas bypass pipe 4025 occasionally vary according to control of opening and closing the exhaust gas bypass adjustment valve 4025A based on sensing of physical quantities. This causes a difference in inflow rate of the exhaust gas guided into the turbine 4112. The turbine 4112 rotates by the energy of the inflow exhaust gas. Air flows thereinto by the compressor 4110 directly connected to the turbine 4112, and pressurized to a high pressure and blown into the cylinder 4016. Accordingly, the main engine efficiency is dependent on driving efficiency of the turbine 4112, i.e. the exhaust gas rate or pressure of the exhaust gas to be drawn. Above all, the main engine efficiency also varies according to load conditions of the main engine 4010.

In this embodiment, a variable nozzle 4118 capable of changing the turbine nozzle 4116 is attached. The variable nozzle 4118 is capable of controlling the inflow condition of the exhaust gas that flows into the turbine 4112 of the turbocharger 4011. Accordingly, the turbine 4112 is driven in a preferable manner.

FIG. 42 is an enlarged view principally showing a variable nozzle according to an embodiment of the present invention. As shown in this figure, the variable nozzle 5118 includes an arc-shaped casing 5150 and a wing-shaped vane 5151 (the number thereof is not limited.). The vane 5151 has a shape that optimizes the fluid path of gas. It is preferable to minimize resistance. This is because the angle of the vane 5151 is changed to control such that the exhaust gas concentratedly flows onto the turbine 4112. The material and the dimensions thereof are not limited, but preferably are what has anti-corrosiveness against the exhaust gas and prevents included matter of the exhaust gas such as soot from accumulating and depositing.

FIG. 42 (a) shows the variable nozzle 5118 in a state with small opening and (b) shows that in a state with large opening. In (a), because spaces formed between the vanes 5151 are small, the fluid path of the exhaust gas is narrowed. Accordingly, when the inflow rate of the exhaust gas flowing therein is small, the exhaust gas passes through the variable nozzle 5118 in the narrowed state. This can cause the exhaust gas to collide with the turbine 4112 in a concentrated manner. On the other hand, in (b), because spaces formed between the vanes 5151 are large, the fluid path of the exhaust gas is secured in a state where the pressure loss is small.

Figure 43:
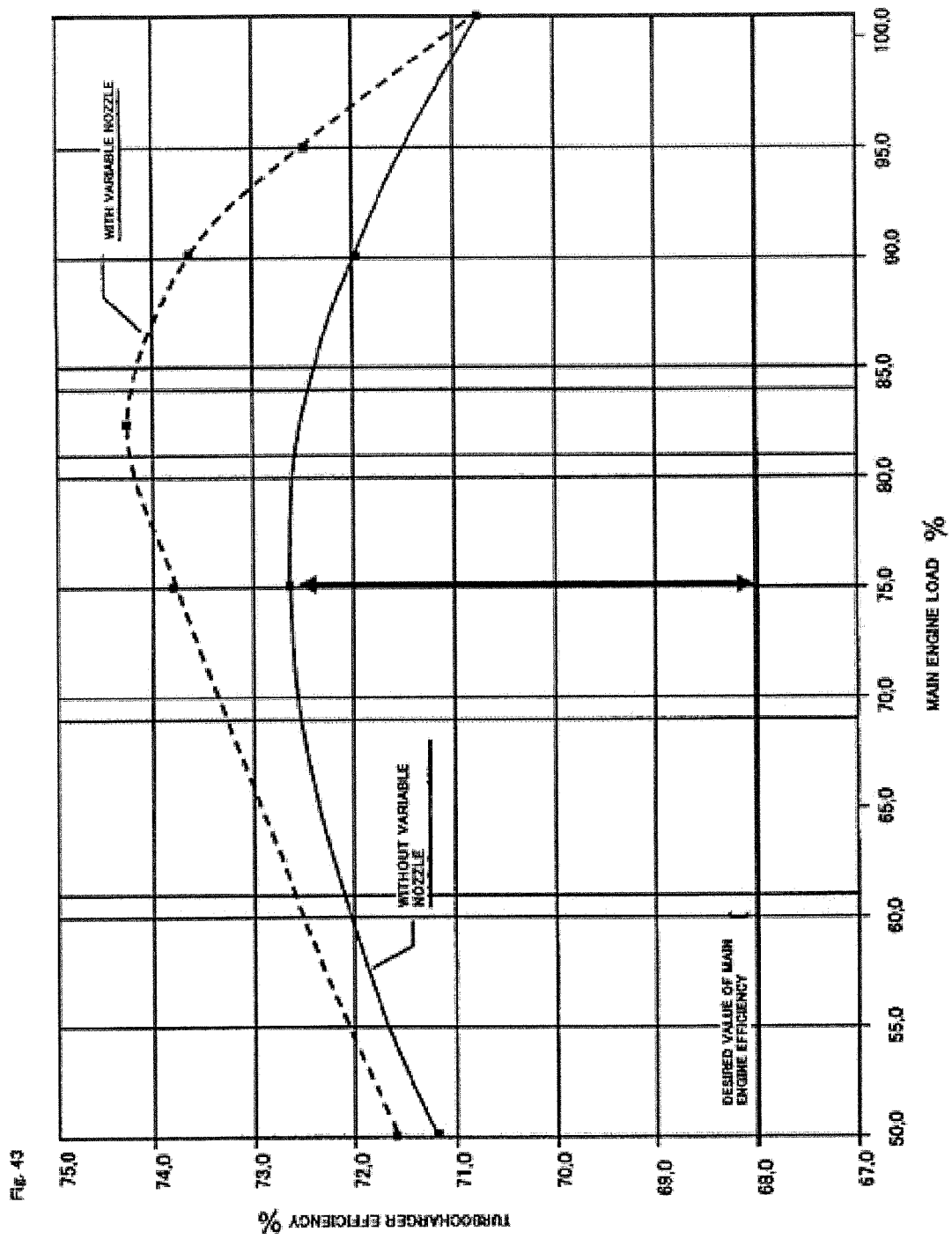
FIG. 43 is a characteristics diagram showing an example of relationship between a main engine load and an efficiency of a turbocharger according to presence or absence of a variable nozzle according to an embodiment of the present invention.

FIG. 43 is a characteristics diagram showing an example of relationship between a main engine load and an efficiency of a turbocharger according to presence or absence of a variable nozzle according to an embodiment of the present invention. As shown in this figure, a case without the variable nozzles 5118 is represented by the solid line, and a case with these nozzles is represented by the broken line.

In the case represented by the solid line, a considerable surplus is actually generated with respect to the desired value of the main engine efficiency. For example, with 75.0% main engine load, 72.7% efficiency can be acquired in actuality while the desired value of the main engine efficiency is 68.0%. This difference is available as residual gas. Accordingly, attention is given the fact that the thus generated gas has originally been discharged in vain. A concept of the frictional resistance reduction device of the present embodiment is to effectively utilize this. On the other hand, in the case where the variable nozzle 5118 is included and representation is made by the broken line, with 75.0% main engine load, high efficiency of 73.8% is realized while the desired value of the main engine efficiency is 68.0%. Even if the load on the main engine varies, the efficiency of the turbocharger 4011 is totally high, in comparison with a case without the variable nozzle 5118. According to these, the control of the variable nozzle 5118 optimizes the fluid path. Thus, the effect exerted by controlling the inflow condition of the exhaust gas flowing into the turbine 4112 can be confirmed. The control of the variable nozzle 5118 adjusts the area of the path of the gas and the fluid path so as not to decrease the turbocharger efficiency owing to variation in inflow gas condition, thereby allowing the gas to be preferably supplied to the exhaust gas turbine.

In the present application, the normal operation point of the main engine is disposed lower than a position substantially adjacent to the main engine load, which corresponds to the peak of the characteristics of the turbocharger (as shown in FIG. 43, the normal operation point of the main engine load is 75%, the peak without the variable nozzle is 76%, and the peak with the variable nozzle is 82%). The same is true in a case with the variable nozzle. According to this, an advantageous effect specific to the present application is exerted. This advantageous effect is that, in a case where the drawing rate of the pressurized gas is also near the peak, the amount of freight is increased and the waterline risen, when the main engine load is increased, the drawing rate of the pressurized gas can automatically be increased accordingly.

Figure 44:
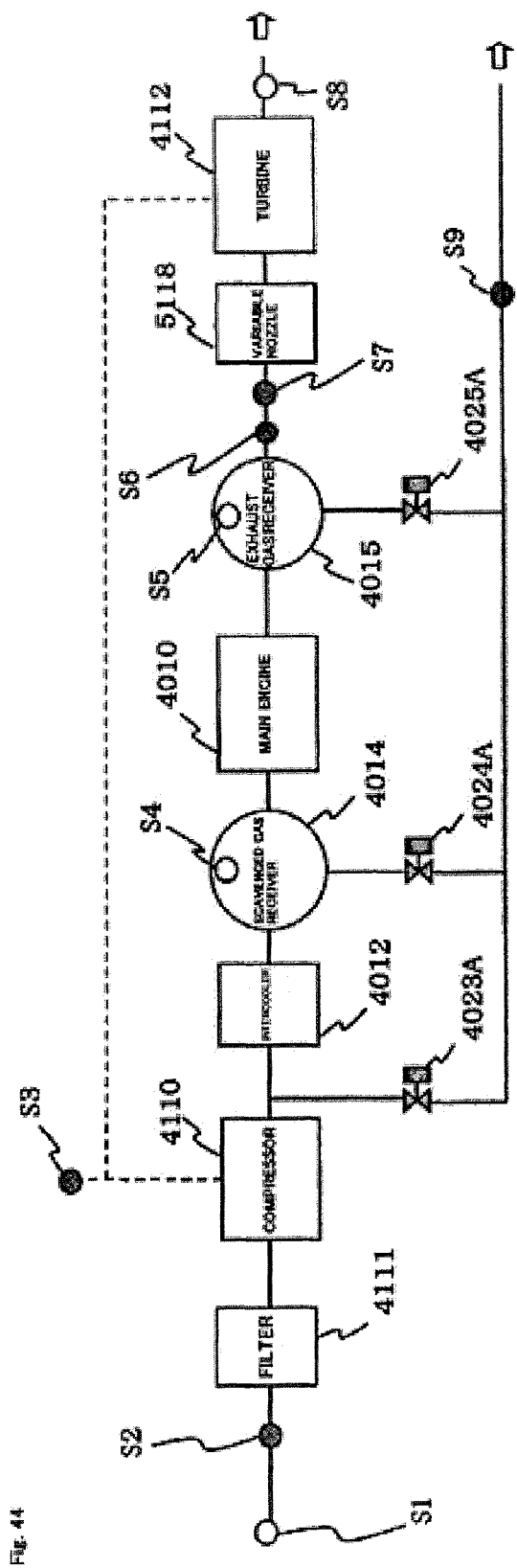
FIG. 44 is a block diagram showing an arrangement of a turbocharger and peripheral elements according to an embodiment of the present invention.

FIG. 44 is a block diagram showing an arrangement of a turbocharger and peripheral elements according to an embodiment of the present invention. As shown in this figure, the barometric sensor S1 and the intake air temperature sensor S2 are arranged before entry to the filter 4111. The rotation sensor S3 is arranged so as to be connected to the compressor 4110 and the turbine 4112. The scavenging gas pressure sensor S4 is arranged in the scavenged gas receiver 4014. The exhaust gas pressure sensor S5 is arranged in the exhaust gas receiver 4015. The exhaust gas temperature sensor S6 and the exhaust gas mass flow rate sensor S7 are arranged between the exhaust gas receiver 4015 and the turbine 4112. The variable nozzle 5118 is arranged in the fore of the turbine 4112. A post-turbine exhaust gas pressure sensor S8 is arranged after the turbine 4112. A bypassed mass flow rate sensor S9 is arranged at the air supply pipe 4030 communicated from the gas supply or charged air bypass pipe 4023, the scavenging bypass pipe 4024 and the exhaust gas bypass pipe 4025.

Figure 45:
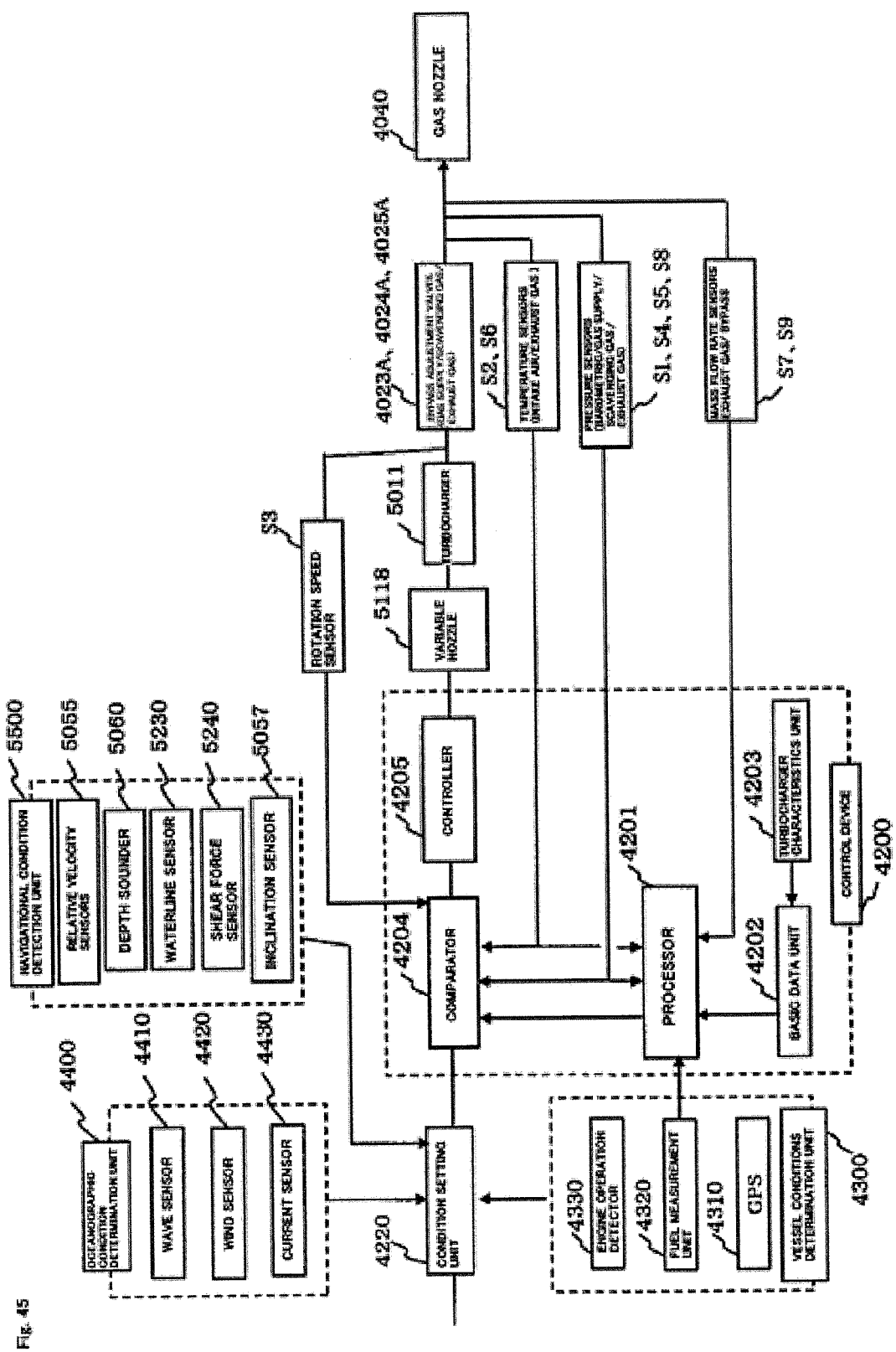
FIG. 45 is a control block diagram of control means according to an embodiment of the present invention.

FIG. 45 is a control block diagram of control means according to an embodiment of the present invention.

The functionality for realizing the control pertaining to the present application includes: a control device 4200 that controls the above-mentioned various bypasses on the basis of values acquired by the various sensors (S1 to S9) around the turbocharger 4011; a vessel conditions determination unit 4300 for acquiring information on the vessel conditions (positional conditions, fuel conditions, operating conditions, etc.) and determining the conditions on the basis thereof; an oceanographic condition determination unit 4400 for collecting data pertaining to ambient oceanographic conditions and determining the conditions on the basis thereof; a navigational condition detection unit 5500 for detecting the navigational condition of the vessel; a condition setting unit 4220 for setting various conditions on the basis of or in comparison with determinations by the vessel conditions determination unit 4300, the oceanographic condition determination unit 4400 or the navigational condition detection unit 5500; and a gas outlet 4040 that injects the bypassed gas, on which these functions have calculated optimal values, into the water around the bottom 9 of the vessel, wherein the variable nozzle 5118 is attached to the turbocharger 4011.

The control device 4200 includes: a processor 4201 that applies prescribed processing to the characteristics of the turbocharger and data acquired by the various sensors (S1 to S9); a basic data unit 4202 having a function of feeding basic data to the processor 4201; a turbocharger characteristics unit 4203 having a function of calculating and acquiring information pertaining to the characteristics of the turbocharger and providing the information for the basic data unit 4202; a comparator 4204 having a function of comparing and calculating the values from the various sensors (S1 to S9) and the values processed by the processor 4201; and a controller 4205 having a function of controlling the comparator 4204. In particular, the processor 4201 also has a function of calculating after-mentioned turbocharger efficiency on the basis of detection results from a prescribed sensor and the like.

The vessel conditions determination unit 4300 is equipped with a GPS 4310 detecting a location of the vessel, a fuel measurement unit 4320 measuring a fuel consumption of the engine of the vessel, and an engine operation detector 4330 detecting the operating conditions of the engine of the vessel.

The vessel conditions determination unit 4300 particularly determines the present conditions of the vessel, and determines the present conditions that vary in a small degree (or do not vary) or vary slowly during sailing. For example, the GPS 4310 grasps the location of the vessel on the map, and detects distances to ports and destinations, an absolute velocity with respect to the ground and the like.

The oceanographic condition determination unit 4400 includes a wave sensor 4410, a wind sensor 4420 and a current sensor 4430. The wave sensor 4410 detects wave heights, directions and periods of waves. The wind sensor 4420 detects wind velocities and directions of winds. The current sensor 4430 detects current velocities, directions and heights of currents. The oceanographic condition determination unit 4400 considers information on waves, winds, currents and the like including information on general weather, and the information is used for determining that for example the injecting of bubbles is stopped when the oceanographic condition is stormy, and the generation of bubbles is started when the condition is recovered.

The navigational condition detection unit 5500 includes relative velocity sensors 5055, depth sounder 5060, a draft sensor 5230 detecting the waterline level of the hull, a shear force sensor 5240 and an inclination sensor 5057 detecting so-called rolling, which is lateral inclination with respect to the traveling direction of the hull. The navigational condition detection units 5500 detect physical quantities which relatively easily vary along with sailing of the vessel or are controlled for the sake of variation. In addition thereto, the navigational condition detection unit 5500 includes sensors (not shown) detecting swaying, pitching, surging, heaving and yawing of the hull.

The information from the vessel conditions determination unit 4300, information from the oceanographic condition determination unit 4400 and information from the navigational condition detection unit 5500 are transmitted to the condition setting unit 4220. The condition setting unit 4220 systematically sets conditions for injecting bubbles to the bottom 9 of the vessel or in the proximity thereof. The conditions include starting/stopping injecting bubbles, which ones of the air nozzles 4040 the bubbles are injected from in a case of including a plurality of the nozzles, which inject rate is to be set, which timing the injecting is started on, how a temporal bubble inject sequence is composed, when injecting is started and stopped, which direction to be injected is set and the like.

In relation to the gas inject rate as bubbles, drawing rates of the gas supply or charged air, the scavenged gas and the exhaust gas as pressurized gas vary. However, the variable nozzle 5118 is controlled on the basis of the drawing rates of the gas supply or charged air bypass rate, the scavenging bypass rate and the exhaust gas bypass rate, the values from various sensors (S1 to S9) including physical quantities related to the heat load of the main engine 4010, the characteristics of the turbocharger 4011 and the characteristics of the variable nozzle 5118. More specifically, the values from various sensors (S1 to S9) and processing results related to the turbocharger 11, which have been processed using a part of the values from various sensors (S1 to S9) are compared by the comparator 4204, according to the conditions set by the condition setting unit 4220. The variable nozzle 5118 is controlled via the controller 4205 according to the result of this comparison.

The comparator 4204 compares signals according to the setting by the condition setting unit 4220. The bypass adjustment valves 4023A, 4024A and 4025A are adjusted via the controller 4205 according to the result of this comparison, thereby controlling the flow rate of the pressurized gas (the gas supply or charged air, the scavenged gas)/the exhaust gas.

Next, the control according to the present application will be described in detail.

As described above, according to the present application, the pressurized gas (gas supply or charged air and scavenged gas)/exhaust gas drawing rates are controlled on the basis of the physical quantities related to the heat load on the main engine and the characteristics of the turbocharger. In this case, as typical examples of physical quantities related to the heat load on the main engine, the scavenging gas pressure and the exhaust gas temperature (or exhaust gas pipe temperature, another ambient temperature corresponding to the exhaust gas temperature in a one-to-one correspondence, etc.) are adopted. As the characteristics of the turbocharger, the turbocharger efficiency is adopted.

The degrees of opening and directions of the vanes 5151 of the variable nozzle 5118 are controlled according to signals from the controller 4205. The controller 4205 transmits to the condition setting unit 4220 the signals from the vessel conditions determination unit 4300, the oceanographic condition determination unit 4400 and the navigational condition detection unit 5500. The comparator 4204 compares and processes the conditions set by the condition setting unit 4220. More specifically, the comparator 4204 feeds back the detection values from the temperature sensors (S2 and S6) and the pressure sensors (S1, S4, S5 and S8) and the results of processing performed by the processor 4201 using prescribed variables including the detection values, and the measurement result by the rotation speed sensor S having measured the rotation speed of the turbocharger 4011. The comparator 4204 compares those and transmits the optimal driving state of the variable nozzle 5118 to the controller 4205.

Here, as the temperature, pressure, and the number of revolutions of the turbocharger, the detection values are read from the respective sensors. The slip ratio and the vane wheel diameter are read from the basic data. The processor 4201 calculates overall efficiency of the turbocharger. The corrected value is acquired by correction by the processor 201 using the exhaust gas/bypass mass flow rate sensors S7 and S9.

Pressure losses of the filter 4111 and the intercooler 4012, which are necessary to acquire the overall efficiency of the turbocharger, are calculated by the processor 4201 on the basis of values from the exhaust gas/bypass mass flow rate sensors (S7 and S9) and a pressure loss coefficient stored in the basic data unit 4202. Alternatively, instead of the calculation, pressure sensors (S1 to S9, etc.) may be attached to required spots, and the losses may be acquired by detection.

The overall efficiency of the turbocharger can be calculated on the basis of a graph or a table of turbocharger overall characteristics preliminarily stored in the basic data unit 4202. In this case, the load on the main engine 4010 necessary for calculation is acquired on the basis of the fuel consumption measured by the fuel measurement unit 4320.

The invention of the present application generates bubbles directly from the bypass gas using the bypass gas from each spot of the turbocharger or a combination thereof, and secures that the amount thereof is utilized without deteriorating the performance and reliability of the main engine 4010. Here, control conditions of the vane 5151 of the variable nozzle 5118 according to the drawing rate of the bypass gas also vary.

In order to generate bubbles, it is preferable that pressure be high and temperature be high because a high temperature decreases the coefficient of viscosity. Accordingly, A exhaust bypass gas is most suitable. However, an environmental problem that the exhaust gas may directly pollute the ocean is assumed, and it is assumed that there are unusable waters. In the waters where the exhaust gas bypass gas cannot be used, B gas supply or charged air bypass gas or C scavenged gas bypass gas may be used. B and C are high pressure air. However, if the temperature is high, the volume is large. Accordingly, a pipe to the gas outlet 4040 should be wide and piping loss should be considered. In this case, measures, such as thermal insulation and covering, may be taken.

Since the scavenging bypass gas has low temperature, small-sized piping can be adopted. A combined configuration that heats the gas around bubble discharge ports by the exhaust gas or the bypass gas can be considered. As described above, the bypass piping is once raised higher than the waterline such that seawater cannot enter the main engine 4010.

For stating/stopping injecting of gas, the bypass gas rate is controlled on the basis of the physical quantity related to the heat load on the main engine and the characteristics of the turbocharger, and the bypass gas is acquired and utilized as bubbles, and operations pertaining to starting/stopping the supply operation of the pressurized gas and/or the exhaust gas from the gas outlet are controlled on the basis of the exhaust gas pressure and driving of variable nozzle 5118.

Accordingly, injecting of bubbles is stopped when the GPS 4310 determines that the vessel is approaching a port or a destination, injecting of bubbles is started when leaving the port, injecting of bubbles is stopped when the vessel is approaching waters where are a swirling current region, injecting is started when the vessel is leaving the waters, injecting of bubbles is stopped when stopping of operations of the engines are confirmed, and injecting of bubbles is started when a predetermined time has elapsed after the engines start. When the fuel consumption efficiency detected by the fuel measurement unit 4320 becomes below a predetermined one, injecting of bubbles is stopped. Such controls can be performed. When it is estimated that the fuel consumption efficiency is improved, injecting of bubbles is started. When the oceanographic condition determination unit 4400 determines that it is stormy such as a typhoon and rough weather, injecting of bubbles is stopped. When it recovers, injecting is started. Such controls can also be performed. The starting/stopping of injecting bubbles, and the inject rate are controlled in relation to the operating condition of the main engine. When the main engine requires air much, injecting is stopped or the inject rate is reduced.

Further, when the wave height detected by the wave sensor 4410 becomes a prescribed value or more, injecting of bubbles is stopped; when the wave height becomes a prescribed value or less, injecting is started. The detection results of the navigational condition detector are compared with a preset value; on the basis of the degree of the deviation, the injecting is stopped when the deviation becomes a predetermined threshold or less, and the injecting is started when the deviation exceeds the threshold. Such controls can also be performed. On the basis of temporal variation in statistically processed representative value from the relative velocity sensors 55, when the vessel 1 starts moving and accelerates, the threshold is set to be reduced and bubbles are injected a little earlier and the frictional resistance reduction effect is effectively exerted. When the vessel is decelerated, the threshold may be set upward and injecting of bubbles may be stopped earlier because the speed is decreased and bubbles still stay at the bottom 3 of the vessel during deceleration. Such controls can also be performed.

The injecting of bubbles in consideration of the substantial frictional resistance reduction effect can be realized, by which the injecting of bubbles is started/stropped under prescribed conditions, and injecting is stopped when it is detected/determined that the vessel is stopped, as described above.

Figure 46:
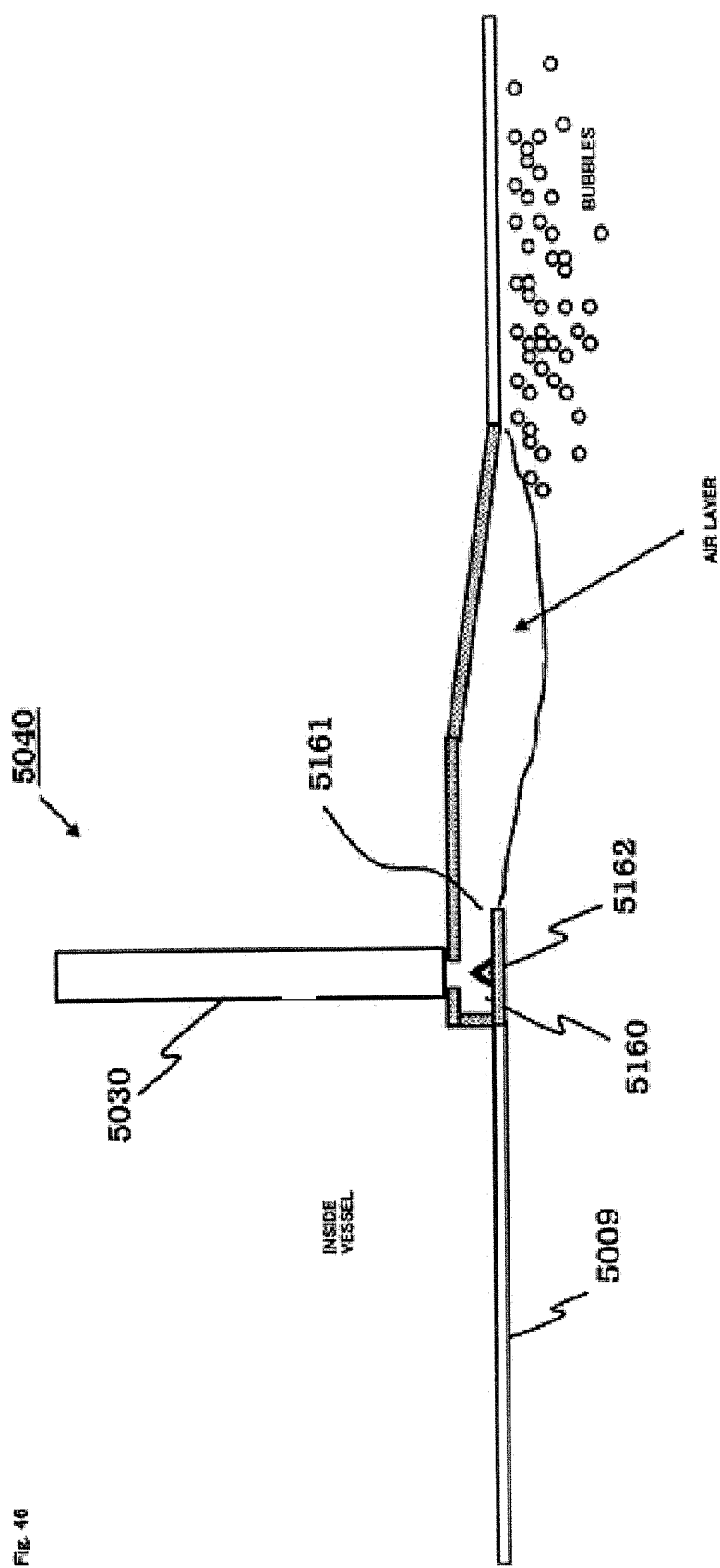
FIG. 46 is a sectional view showing a concept of a gas outlet according to an embodiment of the present invention.

FIG. 46 is a sectional view showing a concept of a gas outlet according to an embodiment of the present invention. In this figure, the exhaust gas bypassed by passing through the air supply pipe 5030 sequentially arranged at the main engine 4010 shown in FIG. 41 is bent at substantially right angle at the chamber 5160 of the gas outlet 5040 connected to the air supply pipe 5030. A distribution component 5162 for attracting the flow is arranged immediately below the connection part of the air supply pipe 5030. This component is for distributing gas including the transferred gas. The shape thereof is not subjected to any limitation. For example, the component may be a turntable having a triangular profile or a flap-shaped fluid element (in which negative pressure is generated when gas starts flowing, and cause an effect of attracting the flow is caused).

The inject condition of gas transferred from the air supply pipe 5030 can also be controlled by various physical quantities. For example, the navigational condition detection unit 5500 detects swaying (swaying), pitching (pitching), surging (surging), heaving (heaving) and yawing (yawing) of the hull. The inject condition is controlled on the basis of the detection results. More specifically, the detected data is transmitted to the condition setting unit 4220. The condition setting unit 4220 systematically sets conditions for injecting bubbles to the bottom 9 of the vessel or in the proximity thereof. The conditions include starting/stopping injecting bubbles, which ones of the air nozzles 5040 the bubbles are injected from in a case of including a plurality of the nozzles, which inject rate is to be set, which timing the injecting is started on, how a temporal bubble inject sequence is composed, when injecting is started and stopped and the like. Further, in relation to the inject rate of gas as bubbles, the variable nozzle 5118 is controlled, on the basis of the drawing rate of the gas supply or charged air bypass rate, the scavenging bypass rate or the exhaust gas bypass rate, the physical quantity values acquired by the navigational condition detection unit 5500, the characteristics of the turbocharger 4011, and the characteristics of the variable nozzle 5118. More specifically, the processing result related to the turbocharger 4011 processed using the physical quantity values acquired by the navigational condition detection unit 5500 are compared by the comparator 4204 according to the conditions set by the condition setting unit 4220. Thus, the variable nozzle 5118 is controlled via the controller 4205.

The distribution component 5162 may be a fixed type or a variable type controlled by various physical quantities. The direction and the angle of the variable distribution component 5162 can be changed by means of a hinge or a rotational shaft. The instruction system of the variable distribution component 5162 is the control system shown in FIG. 45. The angle and the like of the distribution component 5162 are adjusted according to the detection results from the navigational condition detection unit 5500. Further, the condition setting unit 4220 systematically adjusts the angle and the like of the distribution component 5162 (the control system may be any one of a feedback control and a feed forward control), on the basis of information from the vessel conditions determination unit 4300 (e.g., including the amount of check helm and the oblique sailing angle, but not limited thereto.) and information from the oceanographic condition determination unit 4400. Accordingly, the gas is bent at right angle at this part and directed in a desired angle, and the distribution component 5162 laterally disperses the air. The inject direction is thus adjusted according to the navigational conditions.

The injected air tends to disperse from the proximity of the bottom 9 of the vessel owing to influences of currents, the navigational direction and buoyancy by inclination of the vessel. Accordingly, in addition to the chamber 5160, the distribution component 5162 and the perforated plate (not shown), the fluid path of the bubbles uniformly flowing in a horizontal and lateral directions of the bottom 9 of the vessel is preliminarily directed, thereby allowing the bubbles to be injected along the proximity of the bottom of the vessel. This enables the frictional resistance to be reduced.

Figure 47:
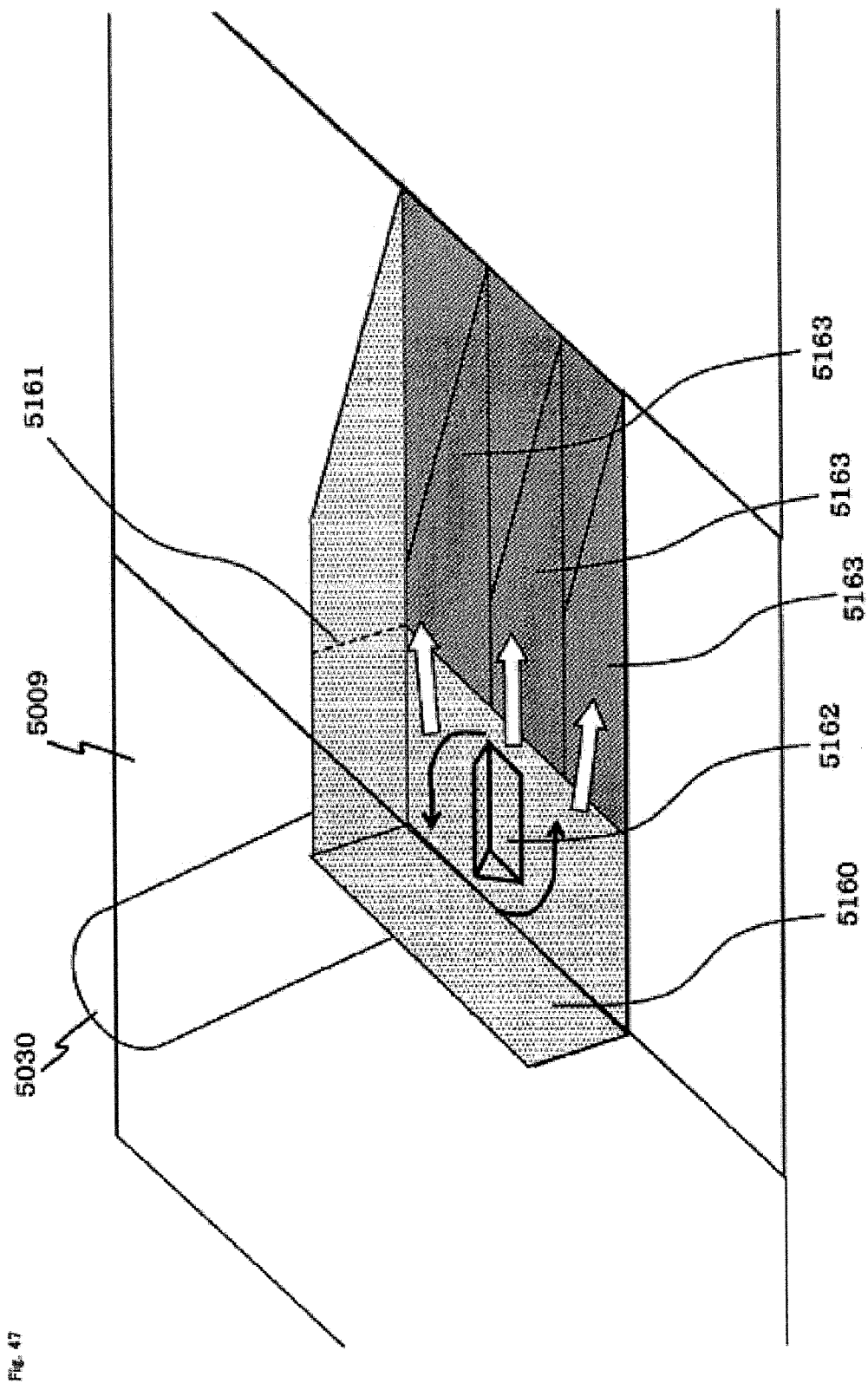
FIG. 47 is a transparent perspective view of a gas outlet including a straightening plate according to an embodiment of the present invention.

FIG. 47 is a transparent perspective view of a gas outlet including a straightening plate according to an embodiment of the present invention. As shown in this figure, the straightening plate 5163 is arranged such that the height is specified to be substantially consistent with the bottom 9 of the vessel and eliminating concave portion of the bottom 9 of the vessel, extending from a inject port 5161 indicated by the broken line to the bottom 9 of the vessel. In order to smoothly inject the gas, the plate does not block the inject port 5161. The straightening plate 5163 may be a single plate. However, it is preferable to arrange a plurality of the plates sequentially with an about 30 mm to 100 mm pitch. The shape thereof is not subjected to any limitation. Accordingly, the separate straightening plate 5163 can be designed as a shape preliminarily defining the direction in which the air flows (fluid path). Further, the thickness dimension of the straightening plate 5163 is about 20 mm. However the dimension may be about 30 mm depending on the size of the hull. It is preferable that the dimension be in an extent without acting as an obstacle in view of control of the flow direction of gas. The material is preferably what does not buckle, is not cracked by stress corrosion and has anti-corrosiveness even when blocks are laid under the straightening plate 5163 under docking situations.

The straightening plate 5163 may be any one of a fixed type and a variable type controlled by various physical quantities. In a case with variable straightening plate 5163, the instruction system of the plate is the control system shown in FIG. 45. The angle and the like thereof are adjusted according to the detection results from the navigational condition detection unit 5500. Further, the separate angle of each of the straightening plates 5163 may systematically be adjusted by the condition setting unit 4220 on the basis of information from the vessel conditions determination unit 4300 (e.g., including at least the direction of the vessel and the ground velocity measured by the GPS, but not limited thereto.) and information from the oceanographic condition determination unit 4400. The control system may be any one of a feedback control and a feed forward control.

While the direction in which the bubbles flow after being injected and conditions where the bubbles intervene around the hull vary according to the navigational conditions of the vessel, oceanic phenomena, weather and other external factors, these factors are predicted and control is performed on the inject conditions including the rate, direction and velocity of gas, thereby allowing the direction of gas injected from the inject port 5161 to be preliminarily determined before exposed to currents. This can therefore inject the bubbles around the bottom of the vessel more effectively, and allows the frictional resistance to be reduced.

Another advantage can be attained by providing the straightening plate 5163. That is, the concave portion of the bottom 9 of the vessel is covered, thereby forming the substantially the same plane with the bottom 9 of the vessel. This attains the advantage that negates the need to consider the positions of the blocks under docking situations. More specifically, the operators lay the blocks at spots with highest stability so as to maintain the stationary condition of the vessel in consideration of security, and try to mount the vessel thereon. On the other hand, since the vessel is huge, the vessel can hardly be moved by cranes or the like. Accordingly, the vessel is carried into a huge reservoir containing water, and the water is drawn out. A principle that waterline falls by drawing water is utilized, and the vessel is mounted on the blocks. Thus, the blocks do not always contact with desired spots. The blocks can be laid at concave portions or convex portions. Thus, the vessel loses the stability accordingly. This increases the risk of operation. The straightening plate 5163 is effective also in view of eliminating the series of operational loads and anxieties.

The operational principle of the distribution component 5162 and/or the straightening plate 5163 at the gas outlet 5040 will hereinafter be described in detailed.

When the current and wind are strong, the vessel sometimes steers obliquely to the current and wind directions in order to hold the traveling direction (this is also referred to as "check helm"), and sails obliquely to the current and wind directions (this is also referred to as "oblique sailing angle"). The vessel occasionally curves. The radius of the curve is different dependently on how to steer. In such cases, if gas is injected in the traveling direction of the vessel, the injected gas is not retained around the bottom 9 of the vessel owing to the current flowing obliquely to the vessel, the vessel flows according to the current and immediately rises. On the other hand, under such situations, the degree of check helm (hereinafter, referred to as the "amount of check helm"), the degree of oblique sailing angle (hereinafter, also referred to as the "oblique sailing angle") and the like are used as variables, and the angles and the like of the distribution component 5162 is changed, and/or the direction of the vessel, the ground velocity and the like are used as variables, and the angle and the like of the straightening plate 5163 is changed. This suppresses that the bubbles are immediately flushed and diffused by the current, retains the bubbles around the bottom 9 of the vessel longer, and allows the frictional resistance reduction effect to be improved. The direction in which the gas to be injected may be controlled, by the negative pressure generating means (not shown) including an aspirator or the like equipped in the chamber 5160, before supplied gas is injected from the inject port 5162.

Figure 48:
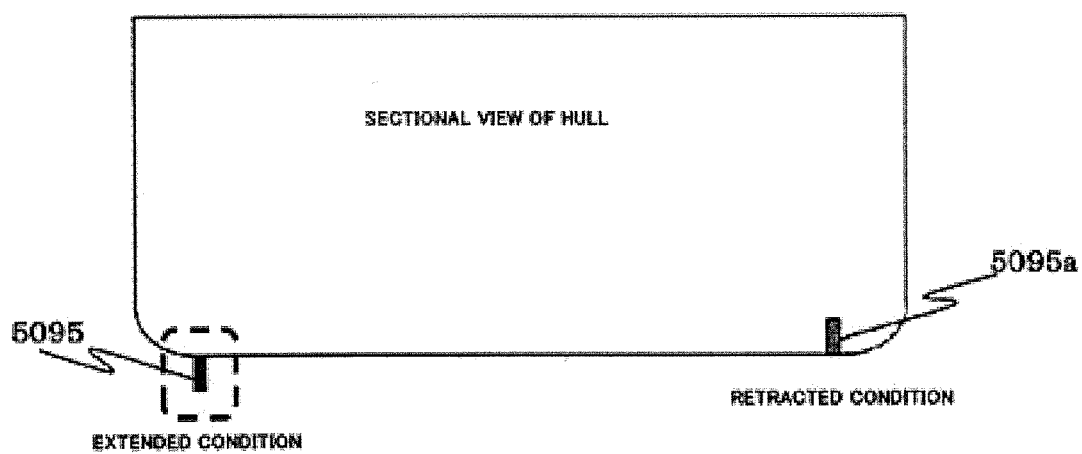
FIG. 48 is a sectional view of a vessel including a retractable diffusion limiting section as diffusion limiting means capable of being stored according to an embodiment of the present invention.

FIG. 48 is a sectional view of a vessel including a retractable diffusion limiting section as a diffusion limiting means capable of being stored according to an embodiment of the present invention. As shown in this figure, diffusion limiting sections 5095 and 5095a are disposed at the opposite ends of the bottom 9 of the vessel (note that it is not in the bilge circle). The sections represent projecting and retracted conditions. Hereinafter, what can realize these conditions is also referred to as a retractable diffusion limiting section.

Figure 49:
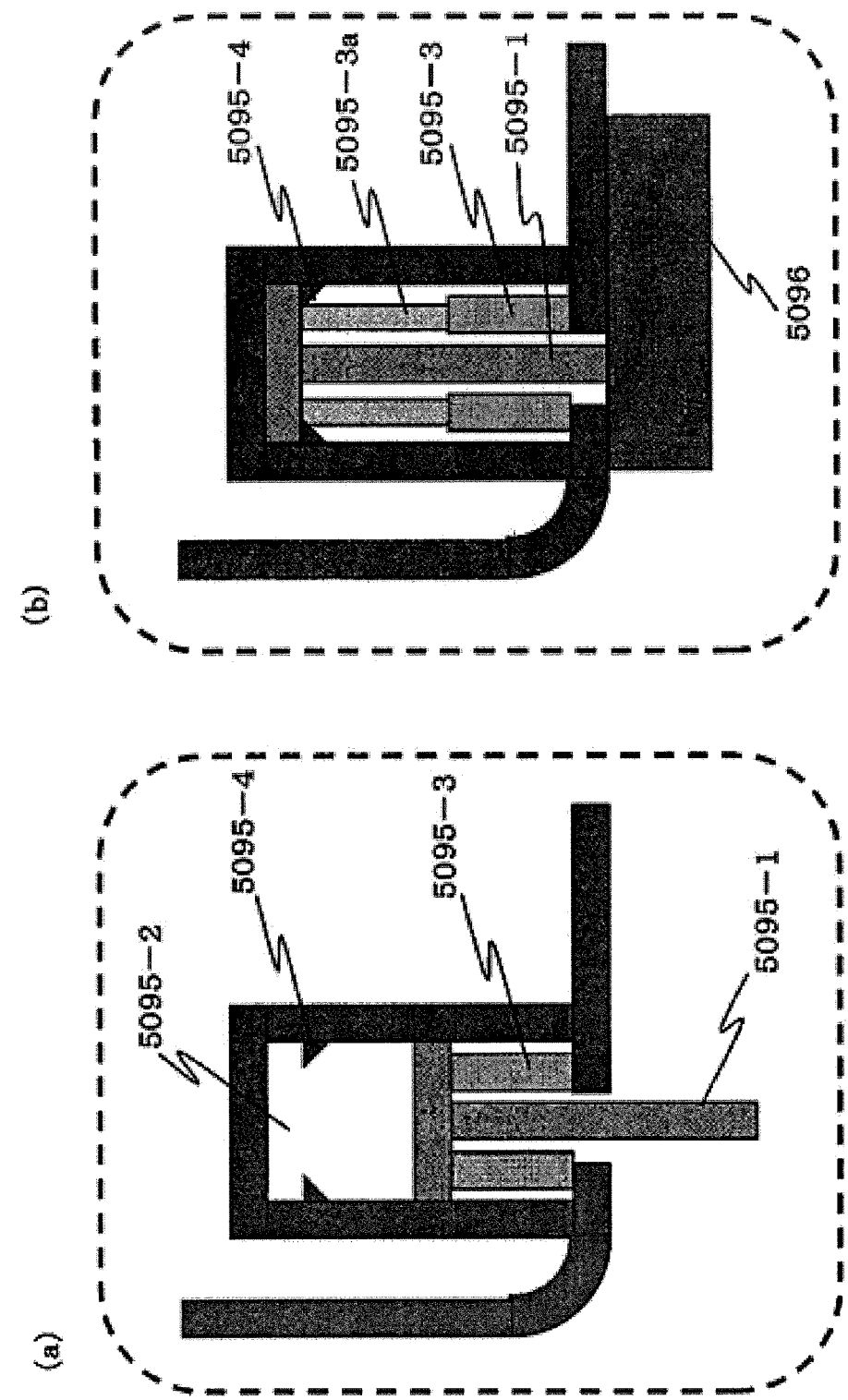
FIG. 49 is an enlarged view of a retractable diffusion limiting section (broken line part in FIG. 48) as the diffusion limiting means capable of being stored according to an embodiment of the present invention.

FIG. 49 is an enlarged view of a retractable diffusion limiting section (broken line part in FIG. 48) as the diffusion limiting means capable of being stored according to an embodiment of the present invention. Referring to this figure, (a) represents a condition where the retractable diffusion limiting section projects, and (b) represents a condition where the retractable diffusion limiting section is retracted. The retractable diffusion limiting section includes an end plate 5095-1 limiting the bubble diffusion from the bottom of the vessel, a storing section 5095-2 for storing the end plate 5095-1, a piston 5095-3 including a piston rod 5095-3a for actuating the end plate 5095-1, and a stopper 5095-4 for holding the end plate 5095-1 in the storing section 5095-2.

The end plate 5095-1 is a plate-like material made of metallic material, such as iron and steel, and FRP. It is preferable that the materials be rigid and resistant to rust owing to adverse effect of moisture and the like. It is further preferable to coat the surface of the materials so as not to cause rust. Methods of arranging the end plate 5095-1 include a method of connecting and arranging a connecting member to the bottom of the vessel by means of a connecting method including bolts, screws and adhesives. However, it is preferable to adopt methods where the vessel main body pertaining to the bottom of the vessel and the end plate are fitted to each other by their shapes and/or both are dovetailed together, or connected by welding. In arrangement, the arranging strength may be improved using the connecting member for reinforcement.

The profile of the end plate 5095-1 may be any one of a substantially round shape, a substantially triangular shape, another polygon-like shape, and quadratic function curve-like shape. The fore of the end plate 5095-1 may be a shape (streamlined shape) where the angle of the surface is finely changed as with the distal end of a sword for facilitating cutting of an object. The end plate 5095-1 in the retractable diffusion limiting section preferably has a T-shaped profile for being retracted in storing section 5095-2. According to this shape, the power of the piston 5095-3 can be transmitted and can be fixed by the stopper 5095-4. It is preferable that the end plate 5095-1 have drag owing to the effect of the piston 5095-3 or a prescribed weight, the degree of protrusion not vary owing to the influence of the water pressure on sailing, and the protrusion not be retracted in the storing section 5095-2. The other entire end plates including the end plate 5095-1 preferably have a longitudinal dimension of about 1 m to 10 m. It is most preferable that the dimension be about 5 m to 6 m, the clearance between the end plates connected to each other be significantly small, and the plates not vibrate owing to rolling on sailing.

Accordingly, it is possible that only the end plates contacting with supporting stages such as blocks under docking situations are retracted, but the other elements are not retracted. This can therefore prevent the damage from occurring, which has been caused owing to a compressing load of the blocks and the like in the conventional non-retractable long end plates whose longitudinal dimension are over 10 m. This also can prevent unnecessary waste of resources owing to retracting operation, which has been required in a case with long plates, even with the retractable end plates.

The storing section 5095-2 is a space that is provided in the bottom 9 of the vessel and capable of storing the end plate 5095-1. The dimensions of the space (width, depth and height) are not subjected to any limitation. It is preferable to be resistant to rust owing to the influence of moisture. It is more preferable that the structure be resistant to immersion.

The piston 5095-3 is provided in the storing section 5095-2, and has function capable of driving (expanding/contracting) the piston rod 5095-3a by change of the pressure (pressurizing/depressurizing) to actuate the end plate 5095-1. The piston may be any one of a hydraulic type, a water-pressurized type and pneumatic type. It is preferable to exert the function even with a structure where the storing section 5095-2 immerges.

The stopper 5095-4 indicates what prevents the retracted end plate 5095-1 from naturally falling by gravity, and is retracted and protrudes in and from the interior wall of the storing section 5095-2 by a prescribed external force. If the pressure adjustment by the piston 5095-3 can prevent the end plate 5095-1 from naturally falling by gravity, the stopper 5095-4 is unnecessary.

Accordingly, in normal sailing, the condition where the end plate 5095-1 protrudes by its self-weight, by reducing the inner pressure of the piston 5095-3, or retracting the stopper 5095-4 in the interior wall of the storing section 5095-2 can be created. Accordingly, when the vessel 1 is sailing and injects the gas from the gas outlet 5040, the diffusion of gas is prevented by the gas plate 5095-1, and bubble can flow while being retained around the bottom 9 of the vessel. Here, if the end plate 5095-1 can be fixed by the stopper 5094-4, the free drop by the self-weight can be prevented without the high pressure condition being maintained.

On the other hand, when the vessel is carried in a dock, the end plate 5095-1 can be retracted in the storing section 5095-2, by increasing the internal pressure of the piston 5095-3, and/or applying an external force (compressing load) in the lower direction of the end plate 5095-1. Accordingly, when the retractable diffusion limiting section is positioned on the blocks under docking situations, the end plate 5095-1 receives an external force (compressing load from the blocks) from the lower direction and retracted in the storing section 5095-2. This negates the need that operators consider the positions of blocks under docking situations. The stored end plate 5095-1 may be fixed in the retracted condition by applying the stopper.

More specifically, the operators lay the blocks at spots with highest stability so as to maintain the stationary condition of the vessel in consideration of security, and try to mount the vessel thereon. On the other hand, since the vessel is huge, the vessel can hardly be moved by cranes or the like. Accordingly, the vessel is carried into a huge reservoir containing water, and the water is drawn out. A principle that waterline falls by drawing water is utilized, and the vessel is mounted on the blocks. Thus, the blocks do not always contact with desired spots. If the end plate 5095-1 cannot be stored and the blocks reside thereunder, the vessel loses stability accordingly, thereby increasing the risk of operation. Further, this causes operational obstacles such as coating of the bottom of the vessel (e.g., peeling off the old coating, and overcoating) and repairs. The retractable diffusion limiting section is effective also in view of eliminating the series of operational loads and anxieties.

Figure 50:
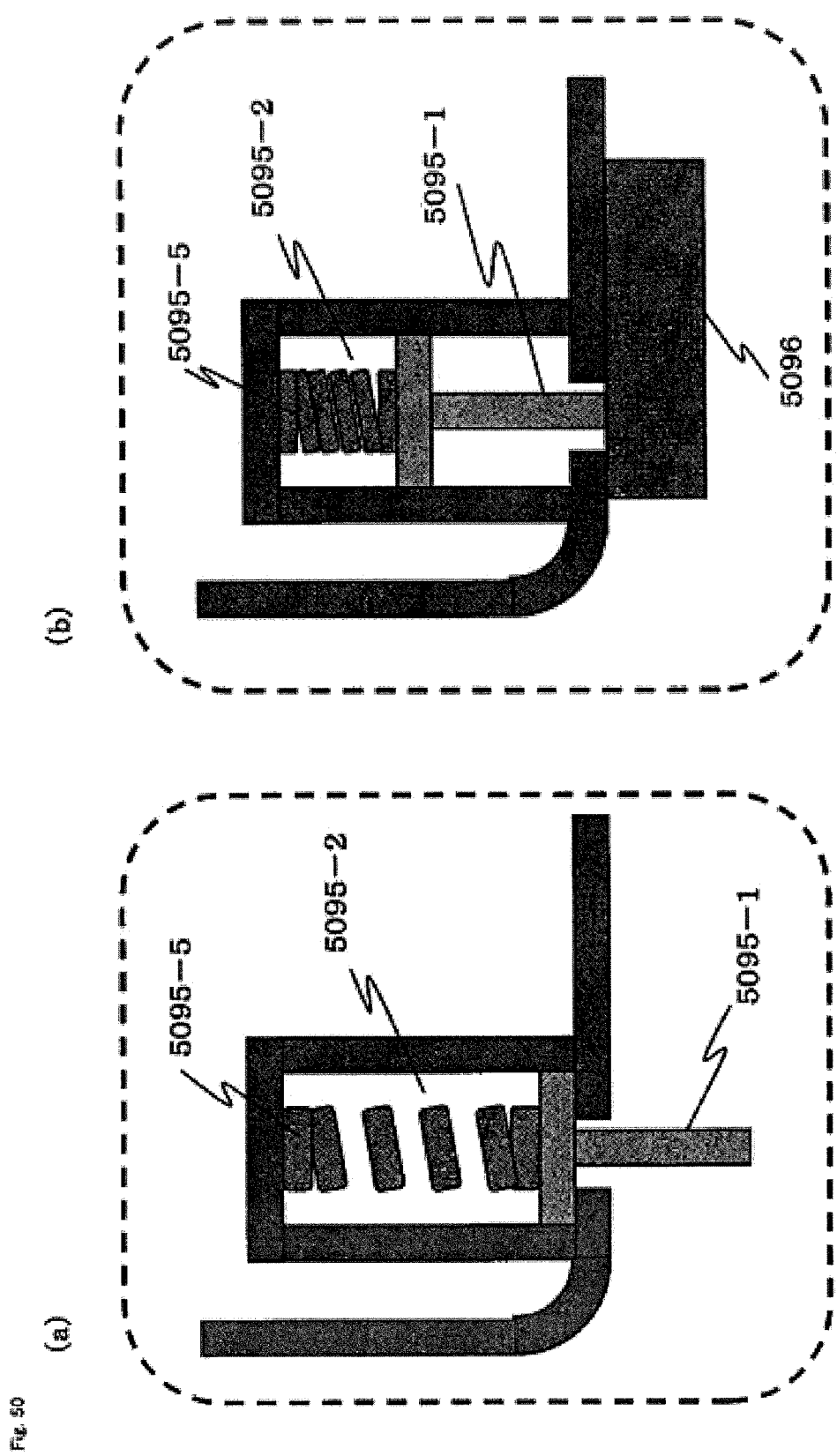
FIG. 50 is an enlarged view/showing another embodiment of a retractable diffusion limiting section (broken line part in FIG. 48) as the diffusion limiting means capable of being stored according to another embodiment of the present invention.

FIG. 50 is the enlarged view of a retractable diffusion limiting section (broken line part in FIG. 48) according to another embodiment as the diffusion limiting means capable of being stored according to an embodiment of the present invention. The retractable diffusion limiting section shown in this figure is arranged such that the spring 5095-5 can urge the end plate 5095-1 in a direction against the external force (compressing load) from the lower direction of the end plate 5095-1. This is different from the retractable diffusion limiting section shown in FIG. 49 in that the force by the spring is used for urging the end plate 5095-1.

Here, the spring 5095-5 is a prescribed resilient body transformable according to the pressing force within the elastic limit. The shape, dimensions and material (e.g., stainless, iron, etc.) are not subjected to any limitation. The spring 5095-5 may be disposed at any one of internal and external spots at the storing section 5095-2. If the spring is disposed externally, coating for making the spring resistant to rust owing to influences of moisture is preferably applied to the spring.

Accordingly, the condition where the end plate 5095-1 protrudes by resilient force of the spring 5095-5 and/or the self-weight can be formed. Application of the external force (e.g., compressing load from the blocks etc.) from the lower direction of the end plate 5095-1 transforms the spring 5095-5, and retracts the end plate 5095-1 in the storing section 5095-2. On the other hand, when the external force is removed, the end plate 5095-1 protrudes by the urging force of the spring 5095-5. The advantageous effects by these operations are analogous to the case with the retractable diffusion limiting section having the above-described piston 5095-3 shown in FIG. 49.

There may preferably be another retractable diffusion limiting section having a mechanism where the end plate 5095-1 protrudes by its self-weight without the spring 5095-5, and application of the external force (e.g., compressing load from blocks etc.) from the lower direction of the end plate 5095-1 retracts the end plate 5095-1 in the storing section 5095-2. In this case, it is preferable to adopt a sufficient weight, material and structure that enables the plate not to be retracted in the storing section 5095-2 against the intention in normal operation, and/or allows protrusion operation to be smoothly performed even for long term use.

Figure 51:
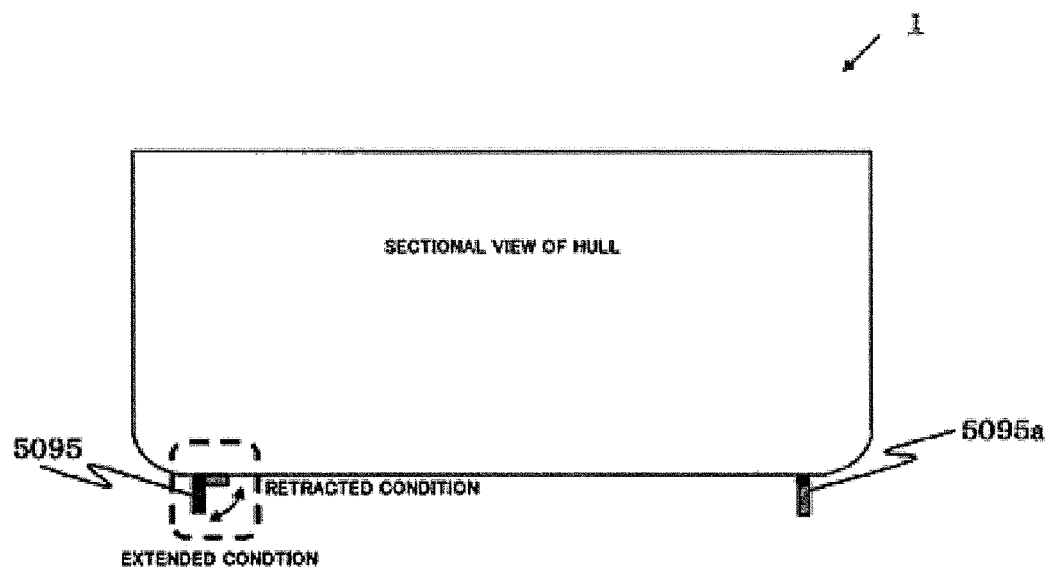
FIG. 51 is a sectional view of a vessel including a bending diffusion limiting section as a diffusion limiting means capable of being stored according to an embodiment of the present invention.

FIG. 51 is a sectional view of a vessel including a bending diffusion limiting section as diffusion limiting means according to an embodiment of the present invention. As shown in this figure, diffusion limiting sections 5095 and 5095a are disposed at the opposite ends of the bottom 9 of the vessel (note that it is not in the bilge circle). The projecting and bending conditions are represented. Hereinafter, what can realize these conditions is also referred to as a bending diffusion limiting section.

Figure 52:
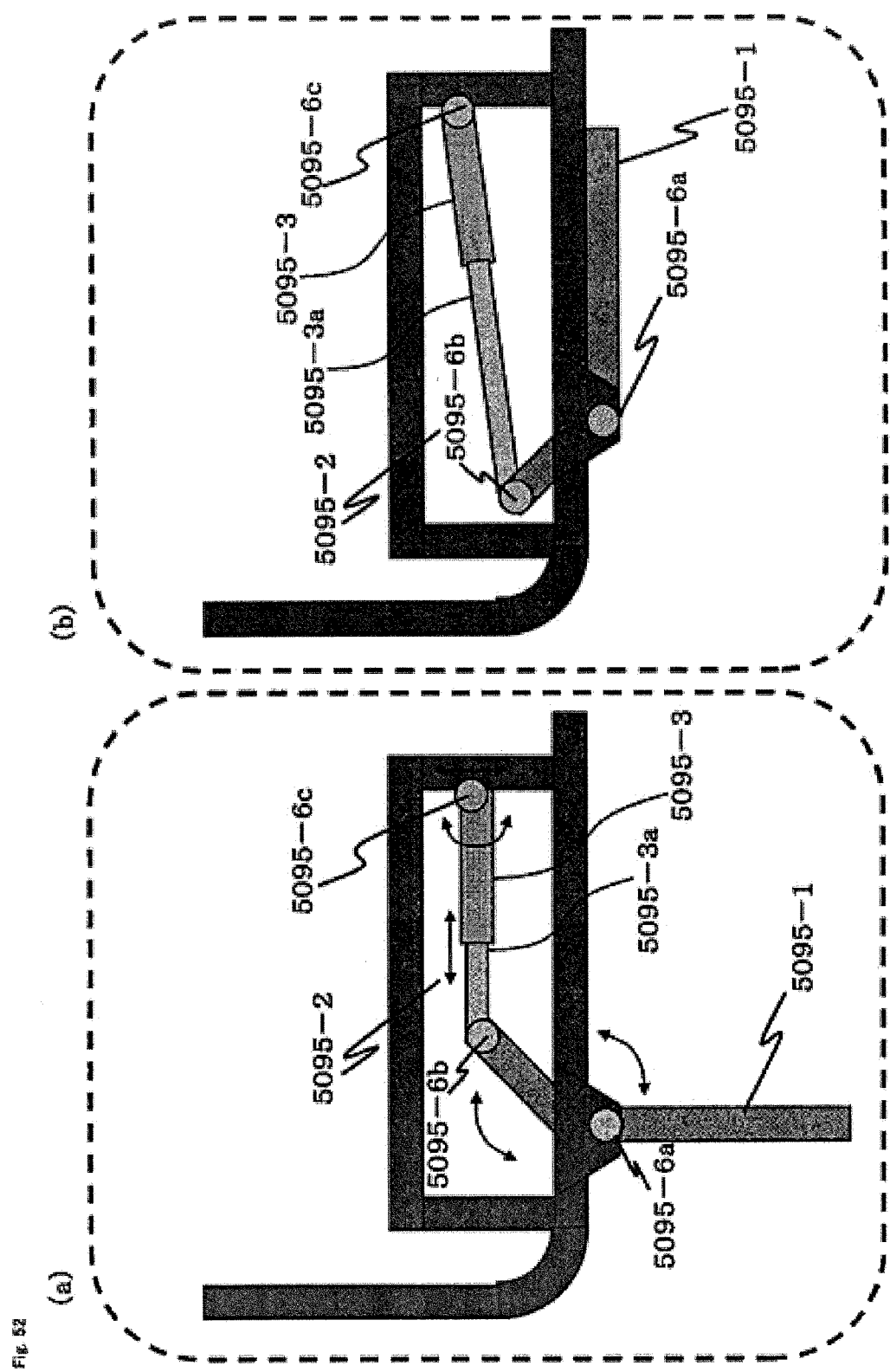
FIG. 52 is an enlarged view of a bending diffusion limiting section (broken line part in FIG. 51) according to an embodiment of the present invention.

FIG. 52 is an enlarged view of a bending diffusion limiting section (broken line part in FIG. 51) according to an embodiment of the present invention. Referring to this figure, (a) represents a condition where the bending diffusion limiting section projects, and (b) represents a condition where the bending diffusion limiting section is bent. The bending diffusion limiting section includes an end plate 5095-1 preventing the bubble diffusion while retaining the bubble under the bottom of the vessel, a storing section 5095-2 for storing the end plate 5095-1, a piston 5095-3 including a piston rod 5095-3a for actuating the end plate 5095-1, a joint 5095-6a bending the end plate 5095-1, a joint 5095-6b connecting the end plate 5095-1 and the piston rod 5095-3a, and a link mechanism including a joint 5095-6b connecting the interior wall of the storing section 5095-2 and the piston 5095-3.

The end plate 5095-1, the storing section 5095-2 and the piston 5095-3 are analogous to those pertaining to the retractable diffusion limiting section according to above-described FIG. 49. In a bent condition, it is preferable that the structure be without difference of height in the diffusion limiting sections 5095 and 5095a (on the same plane), have a concave portion capable of storing the end plate 5095-1 in the bottom 9 of the vessel, and not act as a resistance against sailing of the vessel.

The joint 5095-6a turns and bends the end plate 5095-1 into the bottom 9 of the vessel. The joint 5095-6b connects the end plate 5095-1 and the piston rod 5095-3a to each other, converts linear movement driven by the piston rod 5095-3a into turning movement, and transmits the power to the joint 5095-6a. Further, a joint 5095-6c causes the piston 5095-3 to realize sliding movement, along the turning movement and/or interior wall of the storing section 5095-2. The dimensions, shapes and materials of the joints 5095-6a, 5095-6b and 5095-6c are not subjected to any limitation. It is preferable to adopt a structure resistant to rust owing to influences of moisture and allowing the turning movement and/or the sliding movement to be smoothly performed.

Accordingly, reduction in internal pressure of the piston 5095-3 can drive the piston rod 5095-3a, convert the linear movement of the piston rod 5095-3a into turning movement via the joints 5095-6a and 5095-6b, and develop the end plate 5095-1. On the other hand, increase in the internal pressure of the piston 5095-3 can drive the piston rod 5095-3a, convert the linear movement of the piston rod 5095-3*a* into the turning movement and/or sliding movement via the joint 5095-6*c*, and move the piston 5095-3 to convert the movement into the turning movement via joint 5095-6*b* and turning movement via the joint 5095-6*a*, thereby bending the end plate 5095-1. Further, application of the external force from the lower direction of the end plate 5095-1 (e.g., compressing load from the blocks etc.) can convert the force into turning movement via joints 5095-6*a* and 5095-6*b*, in turn convert this into turning movement and/or sliding movement via joint 5095-6*c*, and drive the piston rod 5095-3*a* and/or piston 5095-3, thereby bending the end plate 5095-1. The advantageous effects of these operations are analogous to the case with the retractable diffusion limiting section including the above-described piston 5095-3 shown in FIG. 49. In order to easily convert the external force from the lower direction of the end plate 5095-1 into the turning movement via the joint 5095-6*a*, it is preferable that the end plate 5095-1 have a shape with an inclination at a prescribed angle into the bottom 9 of the vessel (without sticking to the blocks) or roundness.

There may preferably be another bending diffusion limiting section having a mechanism where the end plate 5095-1 protrudes by its self-weight without the piston 5095-3, and application of the external force (e.g., compressing load from the blocks etc.) from the lower direction of the end plate 5095-1 converts the force into turning movement via the joint 5095-6*a* and bends the end plate 5095-1.

There is a following technical idea as an alternative to the piston 5095-3. For example, the idea may be a structure that attaches a spring (not shown) inside or outside of the storing section 5095-2 and linearly connects the spring and the end plate 5095-1. Accordingly, the end plate 5095-1 protrudes by the self-weight of the end plate 5095-1 and/or the elastic force of the spring. Application of the external force (e.g., compressing load from the blocks etc.) from the lower direction of the end plate 5095-1 transforms the spring, thereby bending the end plate 5095-1. The idea may be a structure that provides a prescribed power source (not shown) at the storing section 5095-2, arranges a pulley (not shown), and winds a wire by means of a rack-and-pinion (not shown), thereby bending the end plate 5095-1, or a structure that changes the length of the end plate 5095-1 by winding a screw.

Figure 53:
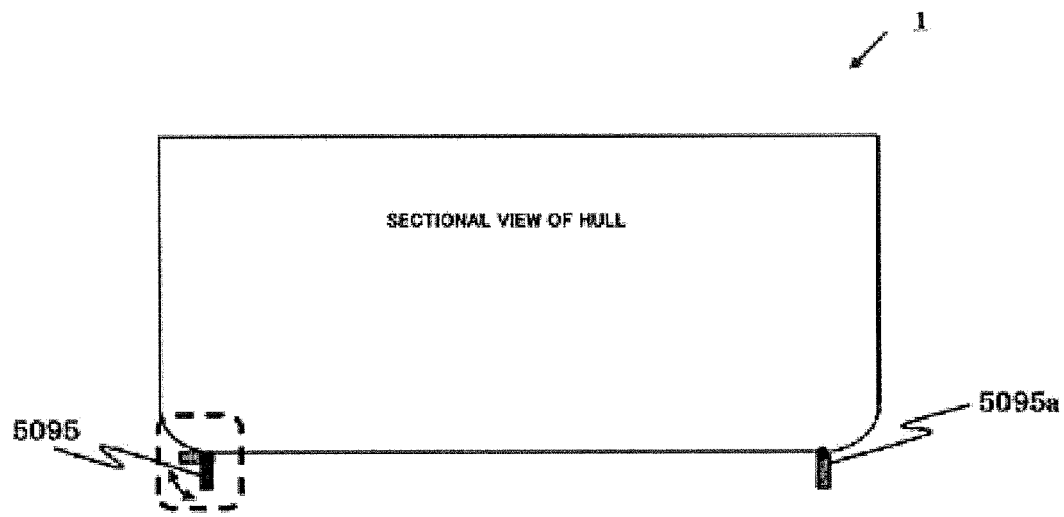
FIG. 53 is a sectional view of a vessel including a bending diffusion limiting section as a diffusion limiting means capable of being stored according to another embodiment of the present invention.

FIG. 53 is a sectional view of a vessel including another bending diffusion limiting section as a diffusion limiting means capable of being stored according to an embodiment of the present invention. This figure represents a condition where diffusion limiting sections 95 and 95*a* are disposed at the opposite ends of the bottom 9 of the vessel (in the bilge circle 95-8) and these sections protrude and bend. Provision of the diffusion limiting sections 95 and 95*a* in the arc of the bilge circle 95-8 also exerts a function of a bilge keel (not shown) that suppresses rolling and turning over onto the side of the vessel against natural phenomena, such as waves and currents at the vessel, and a collision object. Hereinafter, what can realize these conditions are also referred to as the bending diffusion limiting section.

Figure 54:
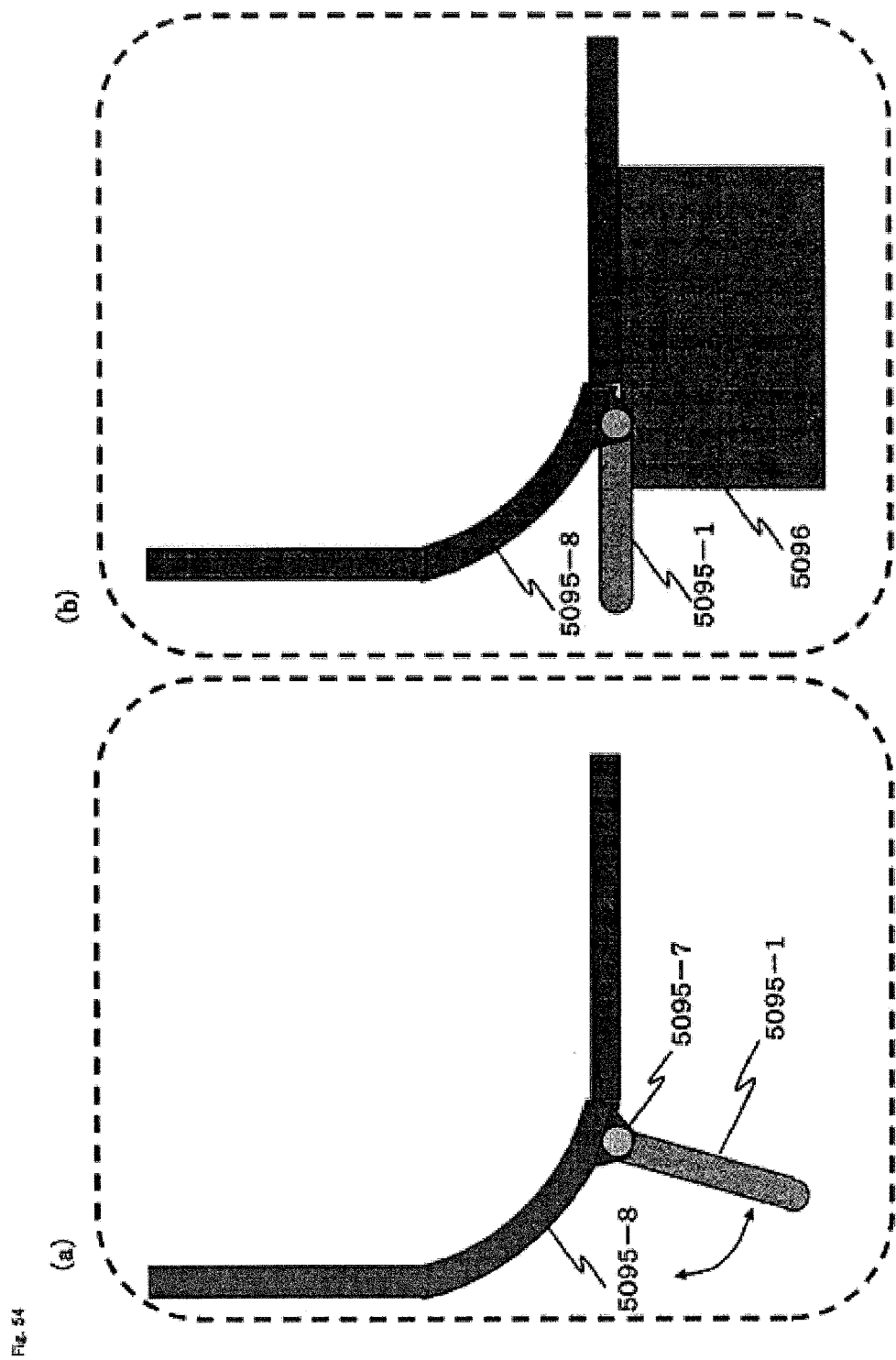
FIG. 54 is an enlarged view of a bending diffusion limiting section (broken line part in FIG. 53) according to another embodiment of the present invention.

FIG. 54 is an enlarged view of a bending diffusion limiting section (broken line part in FIG. 53) according to an embodiment of the present invention. In this figure, (a) shows a condition where the bending diffusion limiting section protrudes, and (b) shows a condition where the bending diffusion limiting section bends. The bending diffusion limiting section includes the end plate 5095-1 that prevents the bubble diffusion and causes bubbles to flow while being retained under the bottom of the vessel, and a pin 5095-7 bending the end plate 5095-1.

The end plate 5095-1 has a configuration substantially identical to that of the above-described retractable diffusion limiting section shown in FIG. 49, and the bending diffusion limiting section shown in FIG. 52.

The pin 5095-7 may be what connects the bilge circle 5095-8 and the end plate 5095-1 and rotates when a prescribed external force is exerted thereon. The pin 5095-7 is preferably arranged at a part where the arc pertaining to the bilge circle 5095-8 and the straight line pertaining to the bottom 9 of the vessel converge. Accordingly, when the end plate 5095-1 is bent, this plate becomes flush with the bottom 9 of the vessel (on the same plane). Since the pin 5095-7 is attached to the outside of the bilge circle 5095-8, it is preferable to apply coating resistant to rust owing to influences of moisture.

The above configuration allows the end plate 5095-1 to protrude by its self-weight. Application of the external force (e.g., compressing load from the blocks etc.) from the lower direction of the end plate 5095-1 can realize an operation that converts the force into turning movement via the pin 5095-7, and bend the end plate 5095-1 outwardly from the bottom 9 of the vessel. In this embodiment, it is preferable to adopt a structure that easily expands outwardly when mounted on blocks (when receiving the external force from an external force effector 5096).

Not only drooping by gravity as described above but also a structure where a spring is provided and utilizes urging by this spring can be adopted as protrusion of the end plate 5095-1. In a case of the gravity drooping type, it is preferable to prevent shaking during sailing. For example, a configuration may be adopted where an expandable stopper, which is not shown, is provided and set during sailing.

Figure 55:
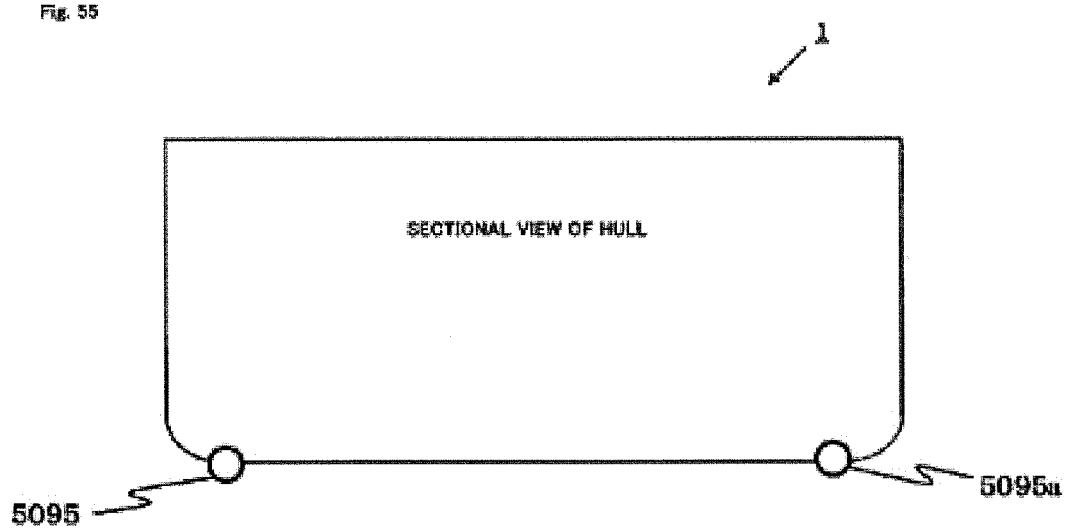
FIG. 55 is a sectional view of a vessel including a diffusion limiting means transformable according to internal force/external force pertaining to an embodiment of the present invention.

FIG. 55 is a sectional view of a vessel including a diffusion limiting means transformable according to internal force/external force pertaining to an embodiment of the present invention. As shown in this figure, the diffusion limiting sections 5095 and 5095*a* including end plates with substantially circular profile in sectional view are disposed at the opposite ends of the bottom 9 of the vessel (possible in the bilge circle) such that the plates are capable of protruding.

Here the end plate 5095-1 defined above is formed with a hollow object made of a material having a certain elasticity, rigidity, flexibility and/or resiliency and strength. This object may be vinyl, rubber or various watertight textile (e.g., materials used for a flak jacket and the bottom of the vessel of an air-cushion vehicle). The shape thereof (e.g., a round, an oval, a triangle, a rectangle, another polygon, etc.) is not subjected to any limitation. The shape may be what includes fluid (gas such as air, liquid such as water or oil, or fine particles (such as powder or dirt)) injected therein or encapsulated therein, thereby allowing a desired shape to be held even in sailing. In particular, the material may preferably be what has flexibility and thereby the end plate is compressed by pressure when the vessel is mounted on blocks under docking situations. The material may be what includes an elastic material such as sponge filled therein or configured solely by an elastic material. The material may be something that is not compressed excessively by water pressure but maintains an expanded state, prevents bubble diffusion during sailing, and causes the bubbles to flow while retaining the bubbles under the bottom of the vessel.

With the above configuration, during the vessel is sailing, a prescribed gas is communicated or liquid or fine particles are injected, or the fluid including gas or liquid or fine particles are injected by opening and closing a prescribed valve, to the end plates that have the substantially circular profile shown in the figure and pertain to the diffusion limiting means 5095 and 5095*a*, and the expanded state is maintained. Accordingly, the end plates can play the same role as that of the plate-like end plates such as iron. On the other hand, under docking situations, the expanded state of the end plates are released, and the end plates are compressed by the pressure when the vessel is mounted on the blocks. This can prevent the end plates from being obstacles against mounting of the vessel on the blocks. Hereinafter, what can realize these conditions is also referred to as a flexible diffusion limiting section. A structure may be adopted where the bypass pipe and the flexible diffusion limiting section 5095 are communicated with each other, the end plate pertaining to the flexible diffusion limiting section 5095 is attached to the air supply pipe 5030 shown in FIG. 41, and thus the end plate pertaining to the flexible diffusion limiting section 5095 is provided, and the distal end of the end plate and the air supply pipe 5030 are connected to each other and thereby causes the bypass gas to communicate to the end plate. A fan (not shown) may separately be provided to communicate air. The advantageous effects according to these operations are analogous to the case with the above-mentioned retractable diffusion limiting section with the piston 5095-3 shown in FIG. 49.

As shown in the figure, grooves having a substantially half-round profile may be provided at the bottom 9 of the vessel to accommodate the end plate 95-1 in the expanded state. This can also reduce the damage to the end plate 5095-1 itself.

Figure 56:
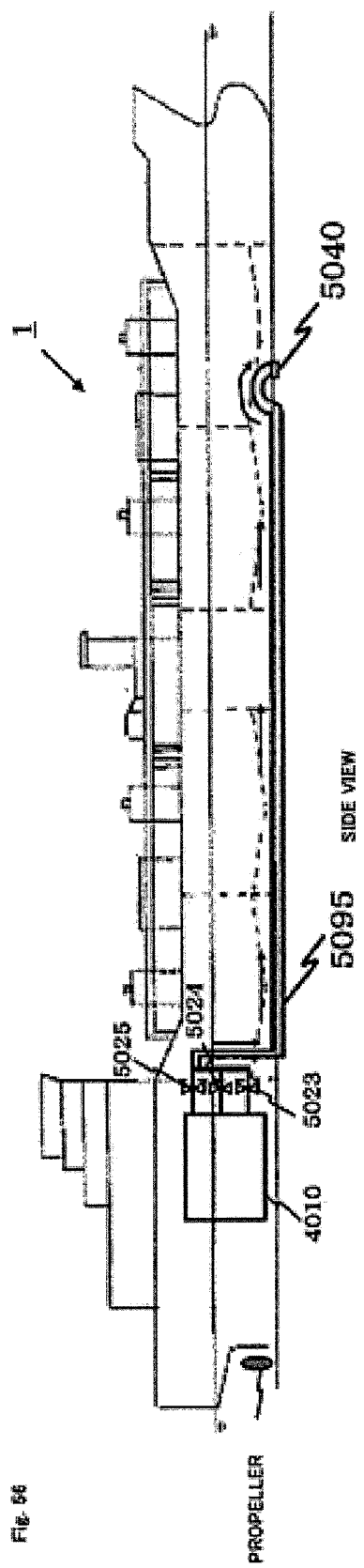
FIG. 56 is a side view of a vessel including a diffusion limiting means of another embodiment transformable according to internal force/external force pertaining to the embodiment of the present invention.

FIG. 56 is a side view of a vessel including a diffusion limiting means of another embodiment transformable according to internal force/external force pertaining to one embodiment of the present invention. This figure shows a flexible diffusion limiting section 5095 where the inside of the hollow structure acts as a path for communicating air to be transferred to the gas outlet and also functions as a duct for the bypass gas. A part of a principal configuration is represented in an exposed manner. As shown in this figure, the vessel 1 includes the main engine 4010 pertaining to the vessel 1, and hollow end plates (not shown). The end plate is sequentially arranged at three bypass pipes (the gas supply or charged air bypass pipe 5023, the scavenging bypass pipe 5024 and the exhaust gas bypass pipe 5025) attached to the main engine 4010, includes bent portions, and functions also as the air supply pipe. The gas outlet 5040 arranged at the bottom of the vessel or the proximity thereof, is connected to the other end of the end plate (not shown), and injects bubbles from the bottom of the vessel or the proximity thereof into the water around the bottom 9 of the vessel.

The bypass gas exhausted from the bypass pipe uses the hollow end plate, which is also functions as the duct and connected up to the bow, as a path. The end plate can maintains the expanded state by transfer of the bypass gas. Under docking situations and the like, in a case of releasing the expanded state, the end plate is compressed by the pressure when the vessel is mounted on the blocks. This can prevent the end plates from being obstacles against mounting of the vessel on the blocks. On the other hand, the bypass gas passes up to the end of the end plate, once enter into the vessel and then is injected from the gas outlet 5040.

Figure 57:
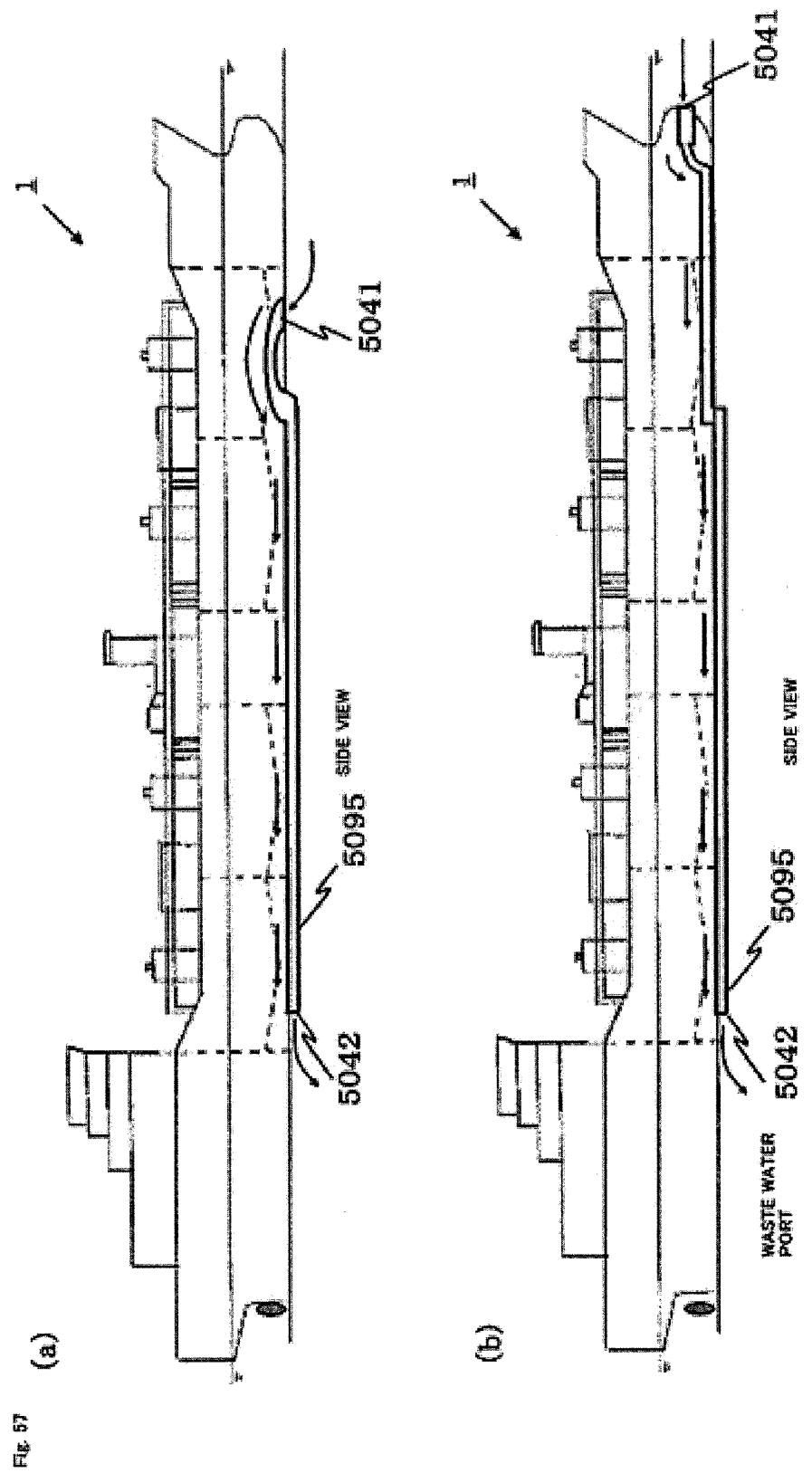
FIG. 57 is a side view of a vessel including a diffusion limiting means of still another embodiment transformable according to internal force/external force pertaining to the embodiment of the present invention.

FIG. 57 is a side view of a vessel including a diffusion limiting means of still another embodiment transformable according to internal force/external force pertaining to an embodiment of the present invention. In the figure, (a) shows a flexible diffusion limiting section 5095 where an intake 5041 drawing water such as seawater is arranged at the bottom 9 of the vessel; (b) shows a flexible diffusion limiting section 5095 where the intake 5041 drawing water such as seawater is arranged at a bow valve section lower than the waterline. These flexible diffusion limiting sections are different from those of the flexible diffusion limiting sections in that the end plate is expanded by injecting water drawn from the outside.

The intake 5041 shown in (a) and (b) preferably has a shape that can easily draw water naturally on sailing, and does not protrude from the bottom 9 of the vessel or the bow as obstacles. Particularly in (a), since water is drawn from the bottom 9 of the vessel, the shape is preferably a slope shape accommodating to sailing conditions of the vessel (on turning, check helm, etc.), or a design with aperture setting of the fluid path. On the other hand, the drawn water is discharged from the discharge port 5042. According to such a configuration, the end plate 5095 can be expanded by water flow (fluid force), suppress the diffusion of the injected gas from the gas outlet 5040 and cause the bubbles to flow while retaining the bubbles around the bottom 9 of the vessel. On the other hand, under docking situations and the like, in a case of releasing the expanded state, the end plate is compressed by the pressure when the vessel is mounted on the blocks. This can prevent the end plates from being obstacles against mounting the vessel on the blocks.

Figure 58:
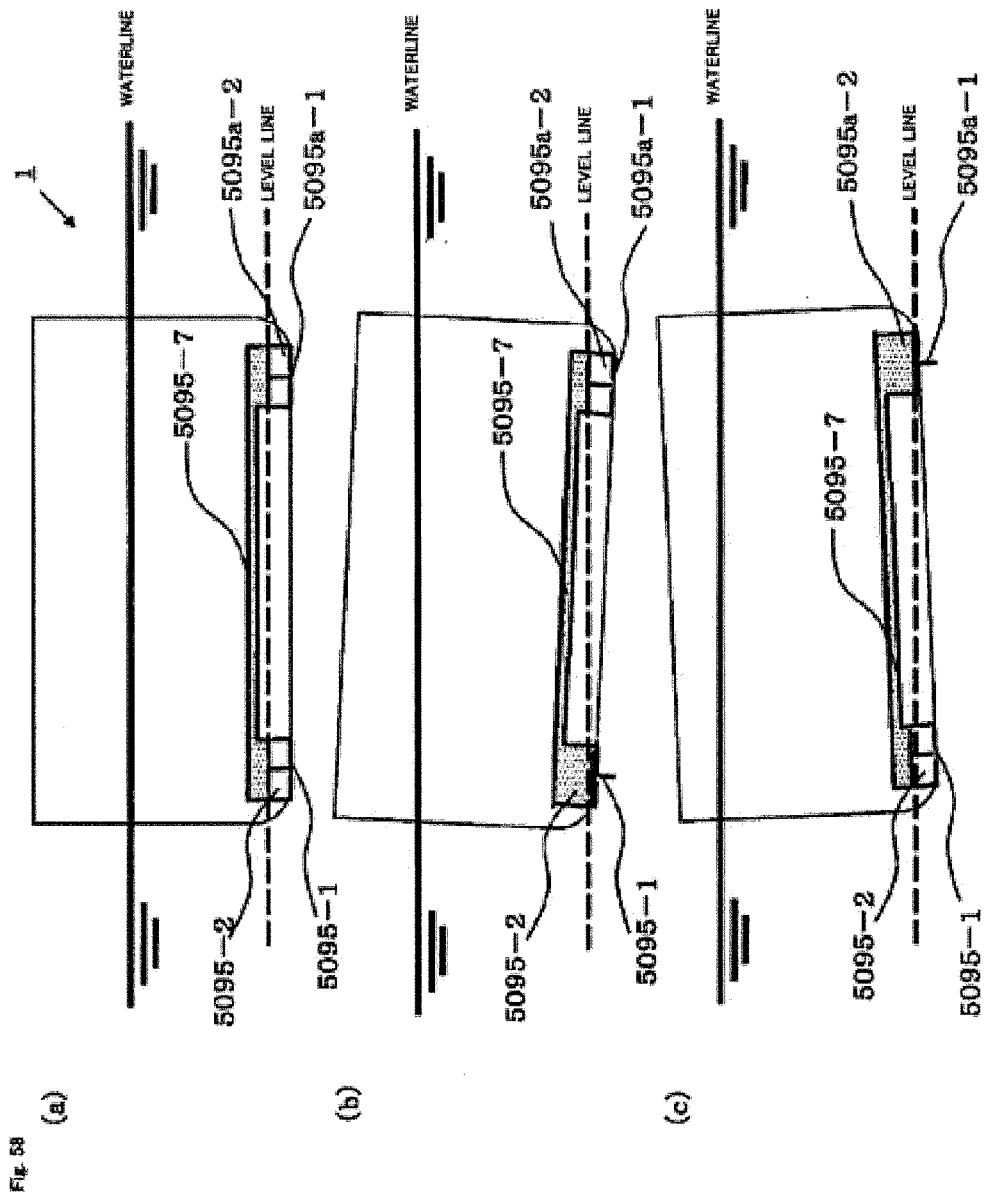
FIG. 58 is a sectional view of a vessel including a diffusion limiting section adjusting the degree of protrusion according to inclination of starboard and port as diffusion limiting means capable of being stored according to an embodiment of the present invention.

FIG. 58 is a sectional view of a vessel including a diffusion limiting section adjusting the degree of protrusion according to inclination of starboard and port as diffusion limiting means capable of being stored according to an embodiment of the present invention. This figure illustrates the retractable diffusion limiting section where the pressure is adjusted according to the inclination of the vessel and the end plate protrude and is retracted. (a) shows a condition where the vessel is not inclined and the end plates evenly protrude. (b) and (c) show a condition where the vessel is inclined and the end plates protrude with the elevated side protruding more. As shown in this figure, the vessel 1 includes the end plate 5095-1, the storing section 5095-2, and a pressure movable section 5095-7 that utilizes buoyancy and protrudes and retracts the end plate 5095-1 by means of change of pressure.

The principle of this invention is that pressure distribution fluid such as gas, liquid and the like in the hull is moved from a side deeper in depth of water to that shallower responsive to the inclination of the vessel by communicating the pressure distribution fluid to the end plates arranged at the starboard and port, and responsive thereto and the end plates arranged at the starboard and port are pressurized or depressurized accordingly. That is, an effect of fluid that evenly maintains the level is utilized, and the degree of protrusion (including a partial protrusion) of the end plate is automatically performed. According to this principle, the end plate can adjust the degree of protrusion from the bottom of the vessel in an engaged manner with the pressure distribution fluid.

More specifically, in the pressure movable section 5095-7, the end plates 5095-1 and 5095*a*-1 are communicated with the pressure distribution fluid (air, water, oil, etc.) therebetween. Accordingly, pursuant to the above principle, the pressure distribution fluid moves from the side deeper in depth of water to that shallower. The pressure movable section 5095-7 may operate according to a sensing function, which cooperates with a controller capable of outputting a desired pressure responsive to the inclination of the vessel detected by a sensor such as an inclinometer (not shown). In this embodiment, it is preferable to add a consideration so as not to let the pressure distribution fluid leak (adoption of a structure such as a bellows, covering of the structure of the end plate, surface coating, etc.).

As shown in (a), in a horizontal condition of the vessel without inclination and movement of a pressure component pertaining to the pressure movable section 5095-7, the end plates 5095-1 and 5095a-1 are preferably stored in the storing sections 5095-2 and 5095a-2. This is because the end plate is prevented from becoming an obstacle while the end plate imposes no load on operations under docking situations. Alternatively, the configuration may be adopted where a part of the end plate preliminarily protrudes, the pressure movable section 5095-7 stores the pressure distribution fluid by means of a pressure adjustment device such as an accumulator, and thereby a compressing load received from the blocks and the like under docking situations can retract the end plate. Further alternatively, the configuration may be a structure where a compressing load received from the blocks and the like compresses the pressure distribution fluid by means of gas and thereby allows the end plate to be retracted.

As shown in (b) and (c), when the vessel 1 is inclined, the pressure component pertaining to the pressure movable section 5095-7 receives buoyancy and moves from the side deeper in depth of water to that shallower. Accordingly, in (b), the pressure component enter the storing section 5095-2, and the end plate 5095-1 is pushed by the pressure and protrudes. On the other hand, because the surplus space of the storing section 5095a-2 is maintained, the end plate 5095a-1 is retracted. Accordingly, end plate 5095-1 can prevent the bubbles from being diffused by buoyancy. The bubbles receive the buoyancy, the vessel is inclined, and the bubbles tend to escape to the end side shallower in depth of water. This almost negates the need to protrude the end plate at the other end. Therefore, in view of operation, the configuration may be a structure where the end plates preliminarily, partially protrude in order not to diffuse bubbles for a slight inclination, and the end plate can be retracted in a case of a larger inclination. Under docking situations and the like, the pressure movable section 5095-7 stores the pressure distribution fluid by means of the pressure adjustment device such as an accumulator. This can prevent the end plate from being an obstacle against mounting the vessel on the blocks.

Alternative thereto, another configuration may be adopted. In this configuration, a sensor is separately provided. The sensor detects the inclination. A section for adjusting protrusion of end plate responsive to inclination (not shown) that adjusts the degree of protrusion of the end plate responsive to the detection result is provided. According to this configuration, the optimal degree of protrusion of the end plate is preset according to the inclination of the vessel, and thereby can realize prevention of bubble diffusion dynamically and efficiently. This sensor may also function as the inclination sensor 57 that detects the inclination owing to rolling.

Figure 59:
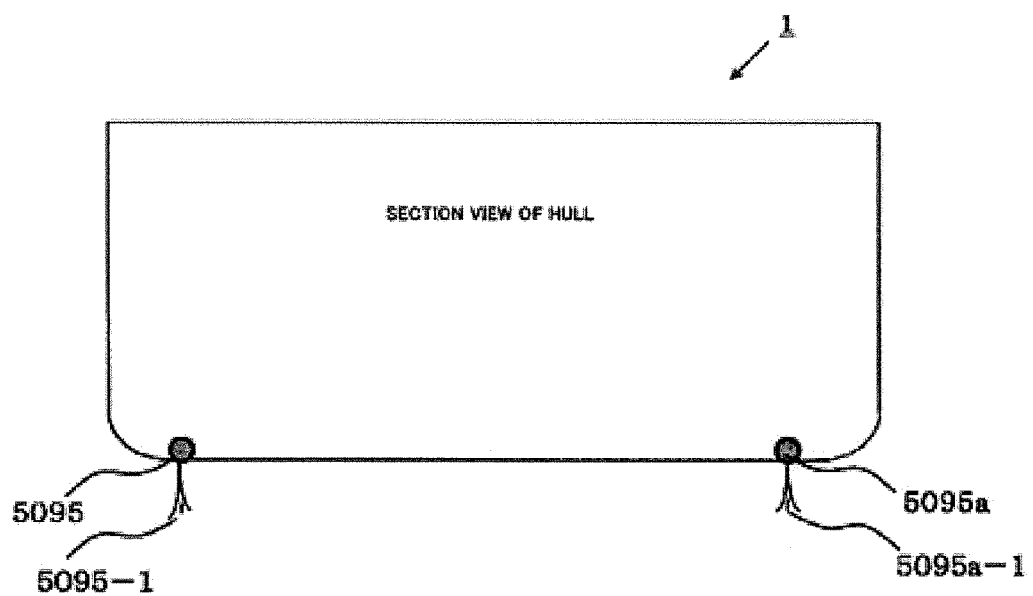
FIG. 59 is a sectional view of a vessel including limiting flow generation means according to an embodiment of the present invention.

FIG. 59 is a sectional view of a vessel including limiting flow generation means according to an embodiment of the present invention. As shown in this figure, limiting flow generators 5095 and 5095a are provided. The limiting flow generators 5095 and 5095a inject liquid such as water by means of injecting mechanisms (not shown) disposed at the opposite ends of the bottom 9 of the vessel (possible in the bilge circle) and generate a flow (water flow) for limiting bubble diffusion.

The number and intervals of injecting mechanisms (not shown) are not limited. It is preferable to include a configuration capable of generating a desired flow of liquid irrespective of the dimensions of the vessel and vessel velocities. More specifically, the liquid injected along with sailing flows aft. The distance of flowing aft is proportional to the vessel velocity. If the vessel velocity is high, the distance flowing aft is extended, but the height dimension of the water flow is shortened. In this case, as a physical quantity, the inject velocity (flow velocity) is more important than the intervals of injecting mechanisms. The types, and average velocity of the vessel, the number of injecting mechanisms, intervals, inject velocity, timing and the like may be different. It may be sufficient to generate a water flow having a prescribed height dimension over the longitudinal direction of the vessel. Further, it is preferable that the inject nozzle pertaining to the injecting mechanism be narrowed to improve the inject velocity and capable of generating a desired pseudo wall by water flow at a small flow rate. Moreover, it is preferable that the generated flow of liquid have a small thickness so as not to become a resistance. A control mechanism may be provided that can control the operation and stopping of the injecting mechanisms on the basis of a certain variable and/or adjust the inject velocity, timing, flow rate or the like as necessary. It is preferable that the injecting direction of the injecting mechanisms be substantially perpendicular to the bottom of the vessel.

According to the above embodiment, the generated water flow forms a wall. As a matter of course in normal sailing, even when the vessel is inclined, the bubbles are blocked by the water flow and incapable of rising, and the bubbles are capable of flowing while being retained around the bottom of the vessel. Since the limiting flow generators 5095 and 5095a and injecting mechanisms do not protrude from the bottom of the vessel, these elements never become navigational obstacles of the vessel. Under docking situations, this obviates the necessity of consideration of positions of the blocks and the like, thereby allowing operators to perform desired operations without the load.

According to the present application, the degree of protrusion of the diffusion limiting means is controlled in an engaged manner with the injecting of bubbles. This obviates the frictional resistance to be formed in unnecessary cases.

Further, the present application can exert a specific advantageous effect. According to the effect, when the relative velocity is high, the degree of protrusion of the diffusion limiting means is caused to be smaller; when the relative velocity is low, the degree of protrusion is caused to be larger. Thus, in particular, when the relative velocity is high and the thickness of the bubbles becomes small, the degree of protrusion is caused to be smaller and thereby reducing the frictional resistance. On the contrary, when the velocity is low and the gas tends to be easily diffused, the degree of protrusion is caused to be larger, thereby allowing the diffusion of gas to be effectively limited.

Moreover, according to the present application, the degree of protrusion of the diffusion limiting means can be adjusted according to the amount of bubbles (e.g., when the amount of bubbles is large, the degree of protrusion is caused to be larger; when the amount of bubbles is small, the degree of protrusion is caused to be smaller.). Further, the degree of protrusion can be adjusted according to the draft (e.g., when waterline has risen, high pressure→bubble size small→the degree of protrusion small). This is also a specific advantageous effect of the present application.

The present invention is not limited to the above embodiments. Instead, various modifications may be made and embodied in a scope without departing from the gist of the present invention.

The above embodiments only represent an example to realize the technical idea pertaining to the present invention. The technical idea pertaining to the present invention may be applied to another embodiment.

INDUSTRIAL APPLICABILITY

The frictional resistance reduction device for a vessel according to the present invention may generally be used in a vessel in waters of all descriptions including rivers and lakes, without limitation to the ocean. In an application to reduction in frictional resistance by a bubble injecting method for a vessel, the present invention may be used for measures against convolvement of bubbles into propeller means.

Further, the present invention may widely be applied to navigational objects and floating objects in the waters without a shape of a vessel. The present invention exerts great usefulness, not only in contribution to energy-saving effects by reduction in frictional resistance, but also in draft adjustment and convenience, widely to the society as a whole, and various industries as a whole.

Moreover, the present invention solves the problems of reduction in efficiency of propeller means owing to convolvement of bubbles, vibration and noise, and exerts great usefulness, also in attainment of energy saving in vessels, widely to the society as a whole, and various industries as a whole.

The invention claimed is:

1. A frictional resistance reduction device for a vessel, comprising:
   a main engine of the vessel;
   a turbocharger that is driven by exhaust gas of the main engine and blowing supplies pressurized gas to the main engine;
   an adjustment valve, which adjusts a mass flow rate of the pressurized gas and/or exhaust gas to be drawn from between the turbocharger and the main engine;
   a gas outlet, which injects the drawn pressurized gas and/or exhaust gas at least to a bottom of the vessel on or below a waterline via a path;
   a scavenging gas pressure sensor, which detects a scavenging gas pressure;
   an exhaust gas temperature sensor, which detects an exhaust gas temperature; and
   a control device, which controls the mass flow rate of the pressurized gas and/or exhaust gas to be drawn, by using the adjustment valve, on the basis of the scavenging gas pressure detected by the scavenging gas pressure sensor and the exhaust gas temperature detected by the exhaust gas temperature sensor,
   wherein when pressure of the pressurized gas and/or the exhaust gas is equal to or more than the pressure at draft, supplying of the pressurized gas and/or the exhaust gas to the gas outlet is started, and when the pressure of the pressurized gas and/or the exhaust gas is equal to or less than the pressure at the draft, supplying of the pressurized gas and/or the exhaust gas to the gas outlet is stopped.

2. The frictional resistance reduction device for a vessel according to claim 1, further comprising a variable nozzle, which maintains gas supply characteristics of the turbocharger, wherein the variable nozzle is controlled according to the mass flow rate of the pressurized gas and/or the exhaust gas to be drawn, a physical quantity related to a heat load on the main engine, and the characteristics of the turbocharger.

3. The frictional resistance reduction device for a vessel according to claim 1, further including a navigational condition detection means, wherein the navigational condition detection means is a relative velocity detector, which detects a relative velocity between a hull and water, and the number of gas outlets and/or an inject rate of gas is increased or decreased according to increase and decrease of the relative velocity.

4. The frictional resistance reduction device for a vessel according to claim 1, further comprising a navigational condition detection means, wherein the navigational condition detection means is a draft detector, which detects a draft of the vessel, and the number of gas outlets and/or an inject rate of gas are increased or decreased according to the draft.

5. The frictional resistance reduction device for a vessel according to claim 1, further comprising a navigational condition detection means, wherein the navigational condition detection means is an inclination detector which detects an inclination of a hull, and the number of gas outlets laterally provided at the vessel and/or an inject rate of gas is controlled.

6. The frictional resistance reduction device for a vessel according to claim 3, wherein the gas outlet is provided on the bottom of the vessel, and the relative velocity detector is provided on a side of the vessel.

7. The frictional resistance reduction device for a vessel according to claim 1, wherein the path runs on or above the waterline and is then connected to the gas outlet.

8. The frictional resistance reduction device for a vessel according to claim 1, wherein the path is blocked by an open/close valve in the proximity of the gas outlet when injecting of the pressurized gas and/or exhaust gas is stopped.

9. A frictional resistance reduction device for a vessel, comprising:
   a main engine of the vessel;
   a turbocharger that is driven by exhaust gas of the main engine and blowing pressurized gas to the main engine;
   an adjustment valve, which adjusts a mass flow rate of the pressurized gas and/or exhaust gas to be drawn from between the turbocharger and the main engine;
   a sensor that detects the mass flow rate of the pressurized gas and/or exhaust gas to be drawn from between the turbocharger and the main engine;
   a gas outlet, which injects the drawn pressurized gas and/or exhaust gas at least to a bottom of the vessel on or below a waterline via a path;
   a control device, which causes the adjustment valve to control the mass flow rate of the pressurized gas and/or exhaust gas to be drawn, which is detected by the sensor, so that the mass flow rate turns into a target value, on the basis of a physical quantity measured or detected in relation to a heat load on the main engine and characteristics of the turbocharger,
   wherein when pressure of the pressurized gas and/or the exhaust gas is equal to or more than the pressure at draft, supplying of the pressurized gas and/or the exhaust gas to the gas outlet is started, and when the pressure of the pressurized gas and/or the exhaust gas is equal to or less than the pressure at the draft, supplying of the pressurized gas and/or the exhaust gas to the gas outlet is stopped.

10. The frictional resistance reduction device for a vessel according to claim 4, wherein the gas outlet is provided on the bottom of the vessel, and the draft detector is provided on a side of the vessel.

11. The frictional resistance reduction device for a vessel according to claim 5, wherein the gas outlet is provided on the bottom of the vessel, and the inclination detector is provided on a side of the vessel.

* * * * *